United States Patent [19]
Seawright

[11] Patent Number: 6,065,245
[45] Date of Patent: May 23, 2000

[54] INTEGRATED AQUACULTURE-HYDROPONICS SYSTEMS: NUTRIENT DYNAMICS AND DESIGNER DIET DEVELOPMENT

[76] Inventor: Damon E. Seawright, HC 65 Box 260C, Animas, N. Mex. 88020

[21] Appl. No.: 09/169,173

[22] Filed: Oct. 7, 1998

Related U.S. Application Data

[60] Provisional application No. 60/061,725, Oct. 10, 1997.

[51] Int. Cl.[7] .............................. C02F 3/32; A23K 1/165; A01K 61/00; A01B 79/00; A01G 31/00
[52] U.S. Cl. ......................... 47/62 R; 47/62 N; 47/58.1; 119/268; 119/230; 119/231; 119/200; 424/442; 210/602
[58] Field of Search ........................... 47/59, 66.6, 62 N, 47/62 R; 119/230, 231, 246–248, 268; 210/602; 424/442

[56] References Cited

U.S. PATENT DOCUMENTS

| | | | |
|---|---|---|---|
| 3,822,504 | 7/1974 | Kuehn et al. | 47/62 R |
| 4,302,905 | 12/1981 | Vaseen | 47/58.1 |
| 4,415,450 | 11/1983 | Wolverton | 210/602 |
| 4,872,985 | 10/1989 | Dinges | 210/602 |
| 5,046,451 | 9/1991 | Inslee et al. | 119/227 |
| 5,121,708 | 6/1992 | Nuttle | 119/200 |
| 5,746,155 | 5/1998 | Logan et al. | 119/230 |
| 5,811,007 | 9/1998 | Stewart et al. | 210/602 |
| 5,820,759 | 10/1998 | Stewart et al. | 210/602 |
| 5,843,762 | 12/1998 | Moll | 435/257.1 |
| 5,854,177 | 12/1998 | Koskan et al. | 504/320 |
| 5,863,433 | 1/1999 | Behrends | 210/602 |
| 5,967,085 | 10/1999 | Kawamura | 119/215 |
| 6,004,576 | 12/1999 | Weaver et al. | 424/442 |

*Primary Examiner*—Michael J. Carone
*Assistant Examiner*—Fredrick T. French, III
*Attorney, Agent, or Firm*—Antonio R. Durando

[57] ABSTRACT

A dietary inclusion model for an integrated aquaculture-hydroponics system is derived from the concept of mass conservation. The model enables the maintenance of near-equilibrium concentrations of Ca, K, Mg, N, and P, suitable concentrations of Mn and Cu, and acceptable accumulation rates of Na and Zn, in representative integrated aquaculture-hydroponics systems, by modifying the mineral concentrations of the fish diets according to the model. The model is readily applicable to virtually any freshwater recirculating fish culture system operating at a recycle ratio sufficiently high to maintain appropriate nitrogen concentrations and having an environment suitable for hydroponic plant culture.

3 Claims, 69 Drawing Sheets

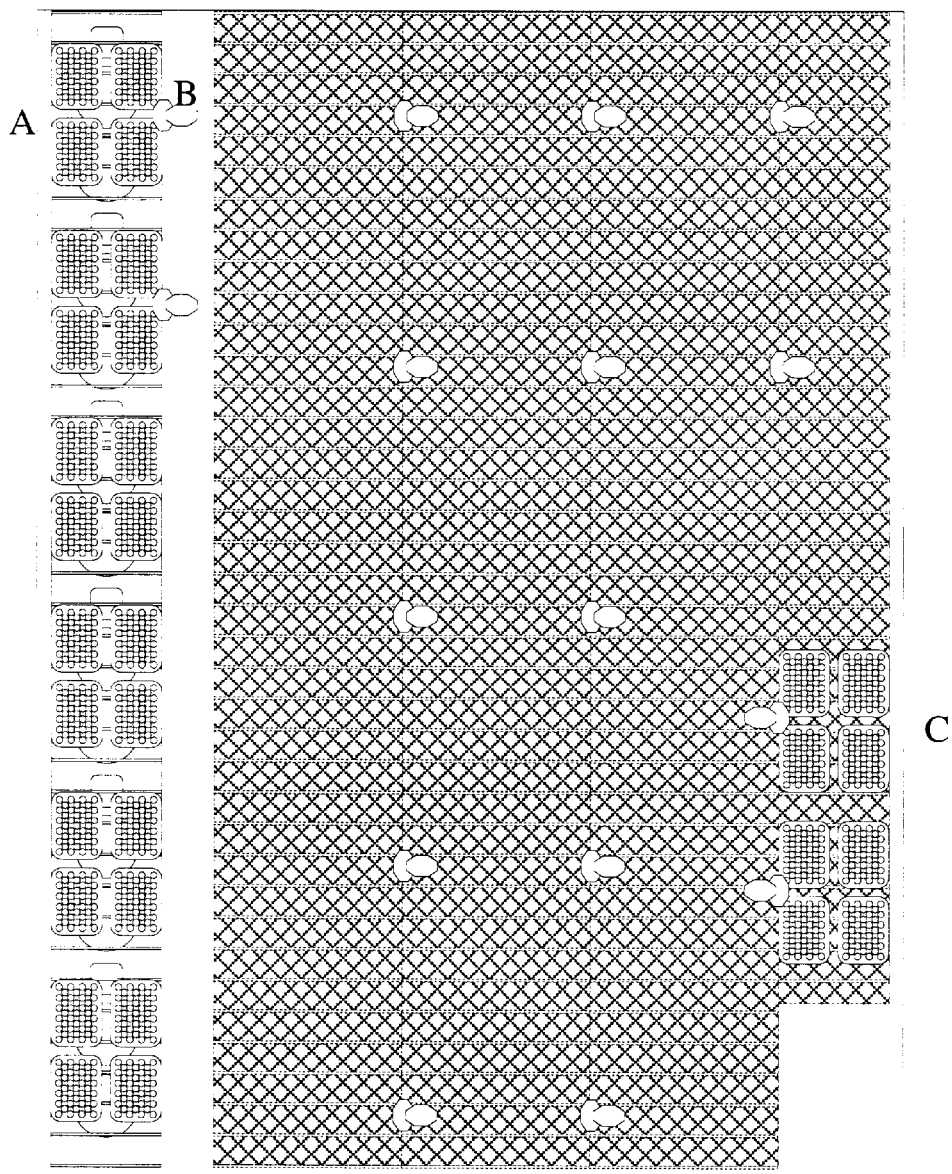
Legend
A. Integrated system
B. High intensity Na lamp
C. Control system
Scale: 1:75
Figure 3.1

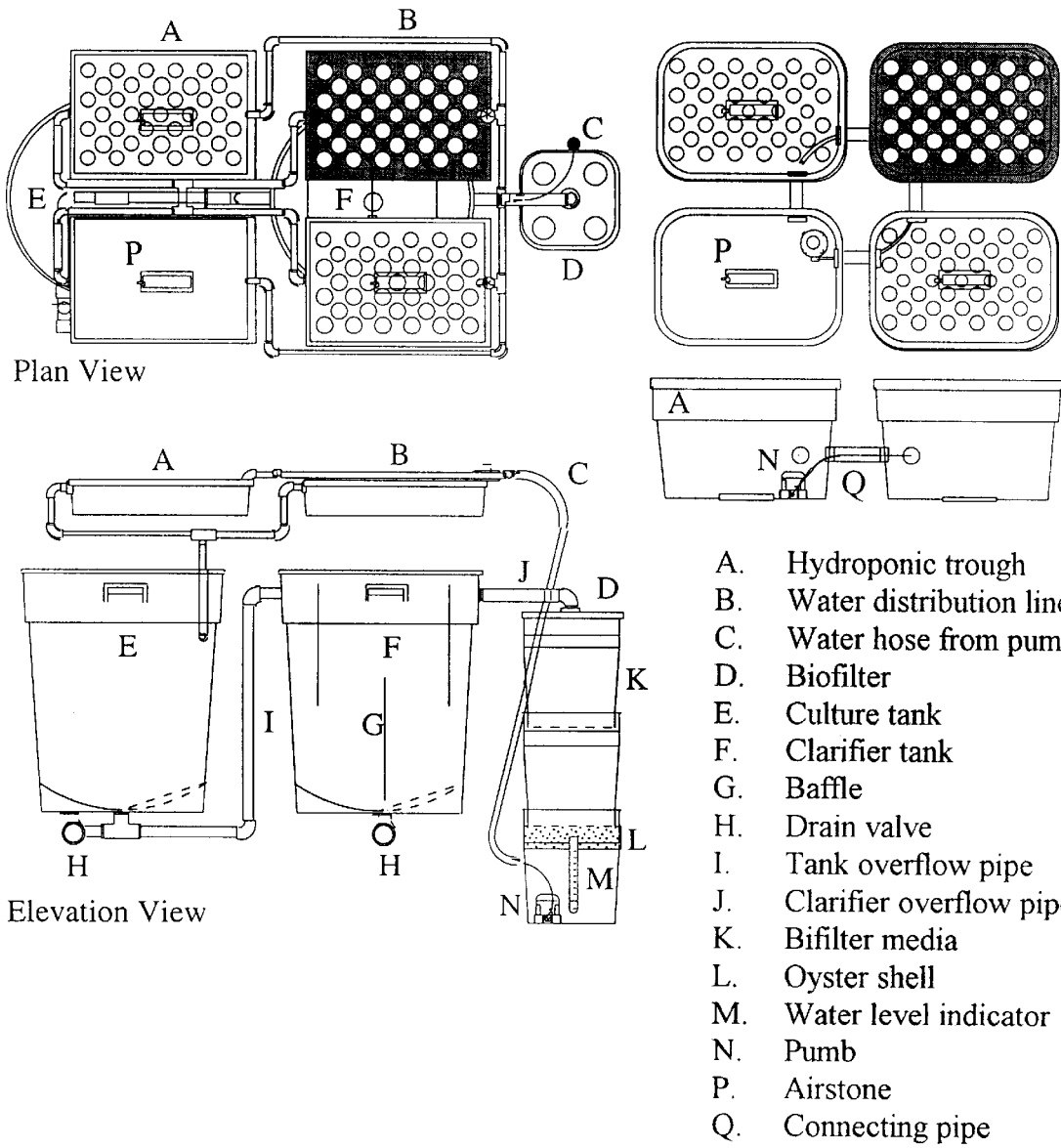
Figure 3.2

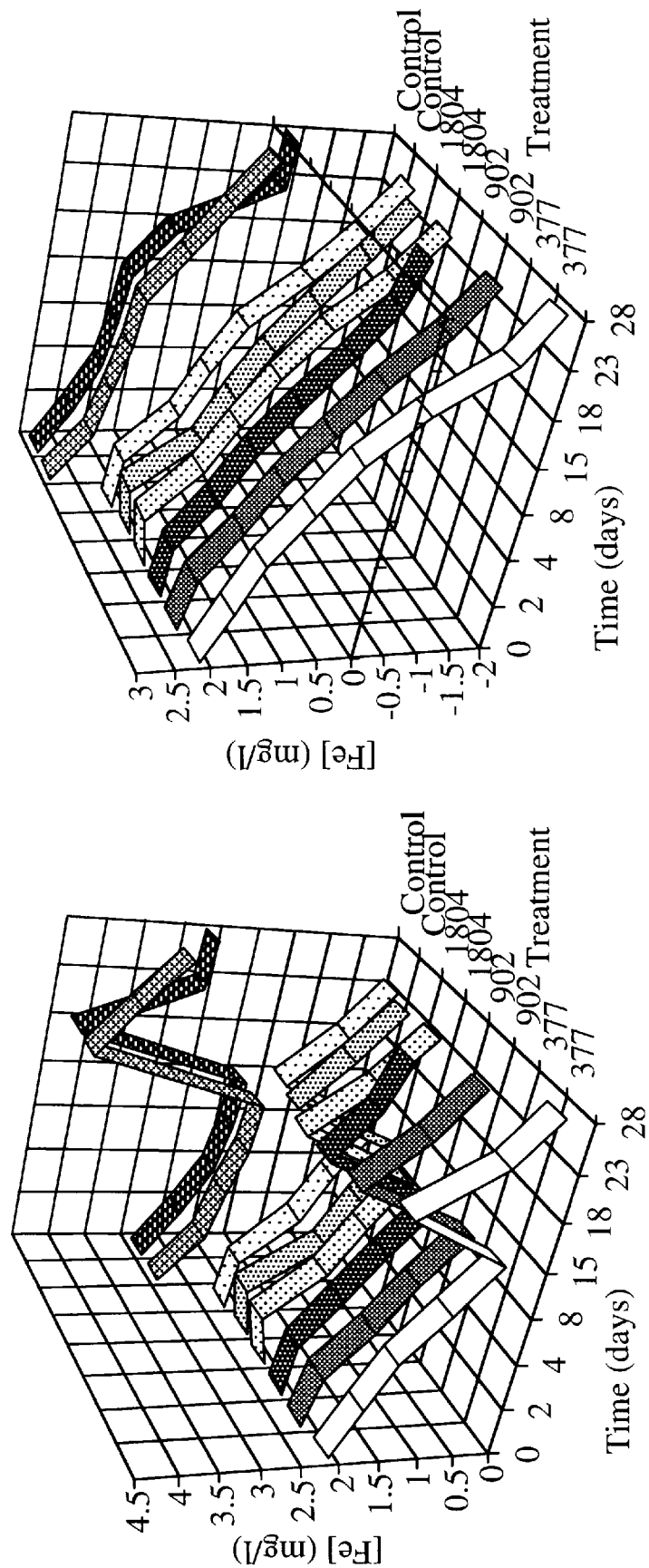
Figure 3.3

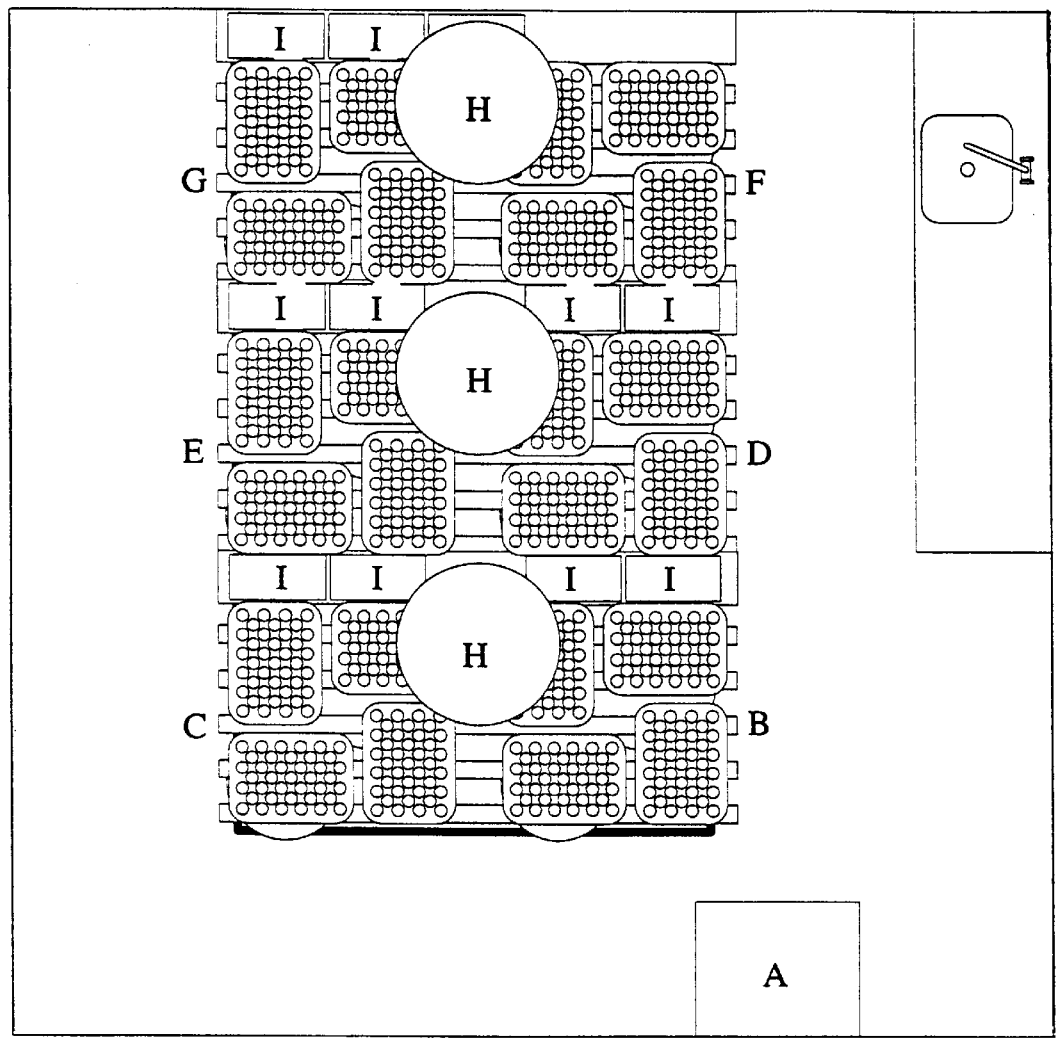
Legend  Scale 1:40
A. Environmental conditioner
B. System 1
C. System 2
D. System 3
E. System 4
F. System 5
G. System 6
H. Metal halide lamp
I. Sowing flats
Figure 3.4

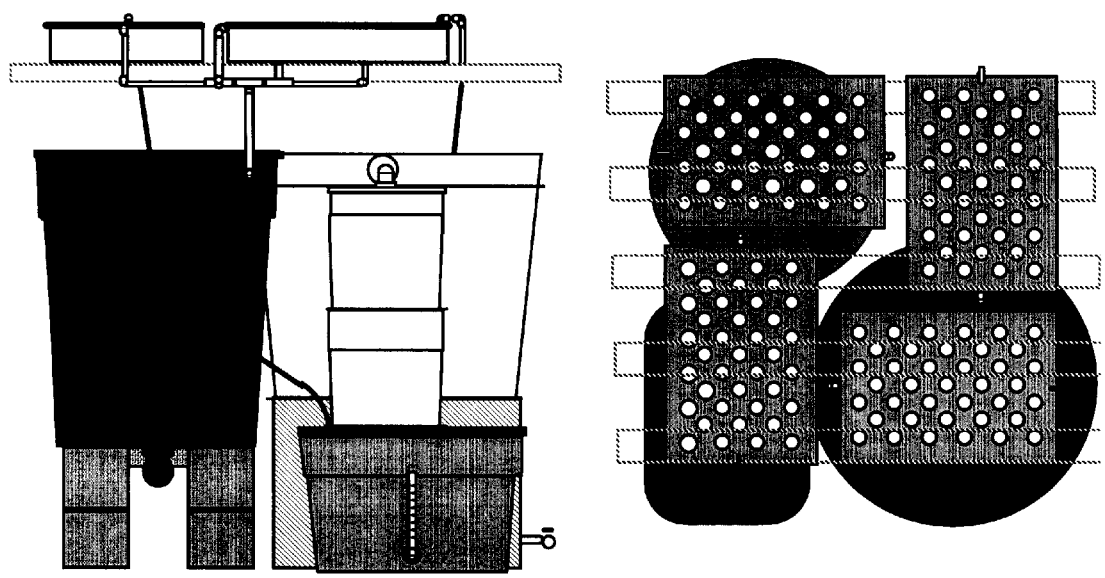
Figure 3.5

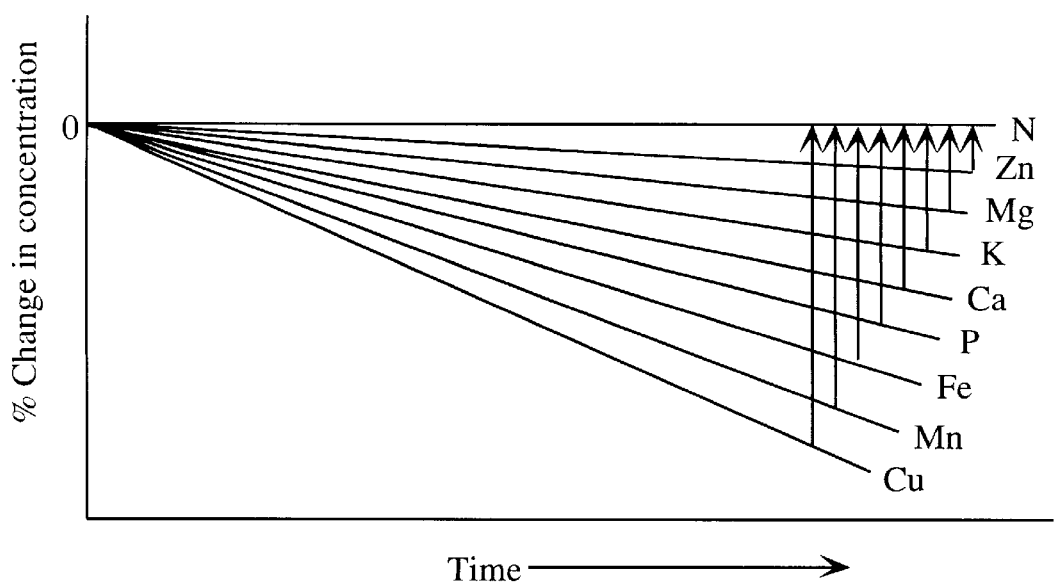
Figure 3.6

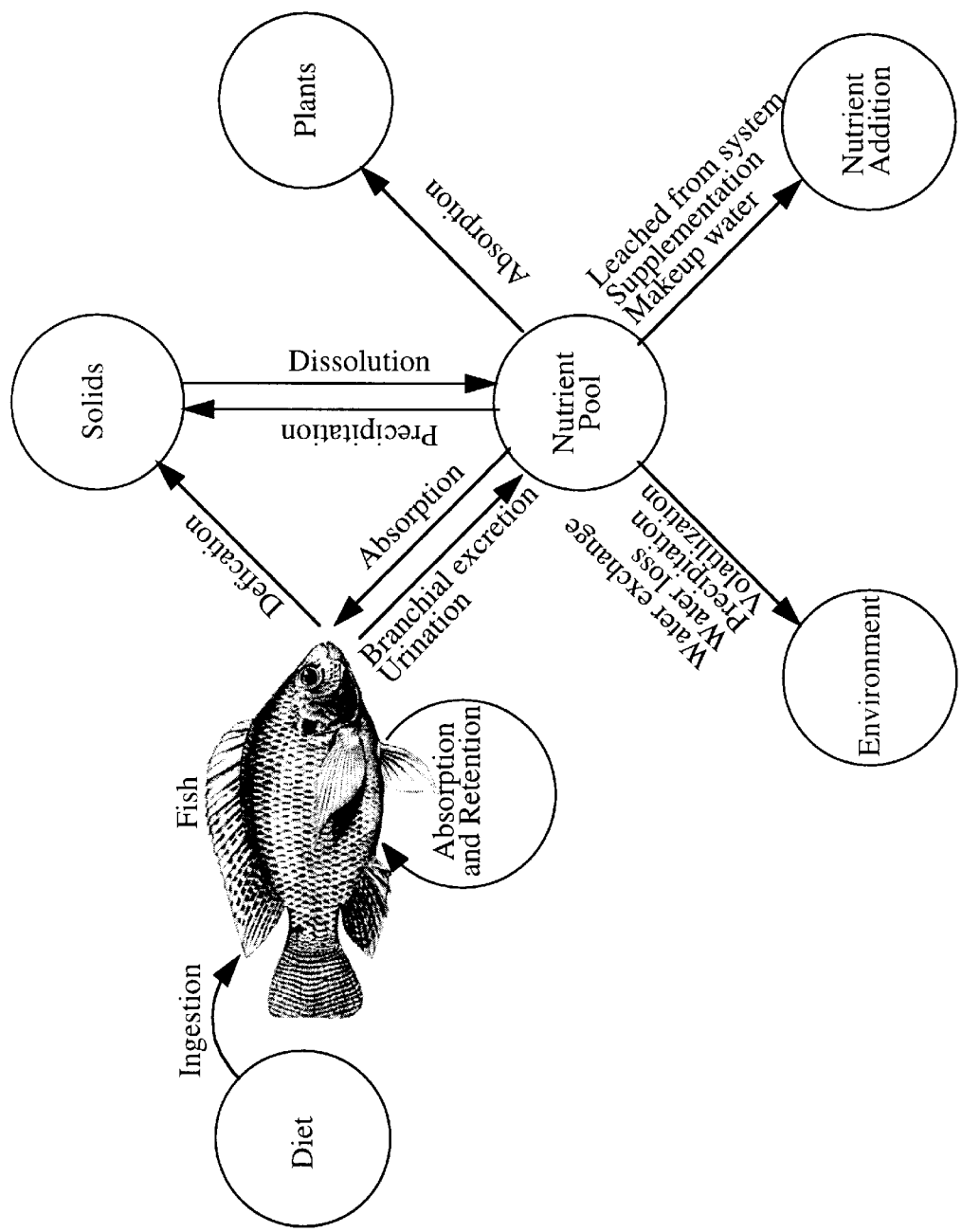
Figure 3.7

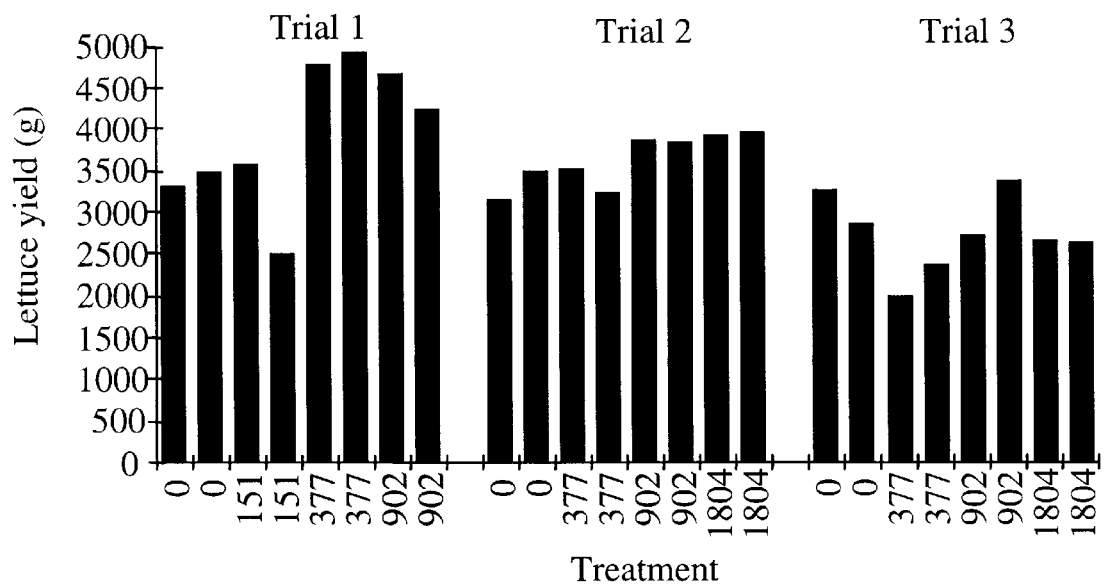
Figure 4.1

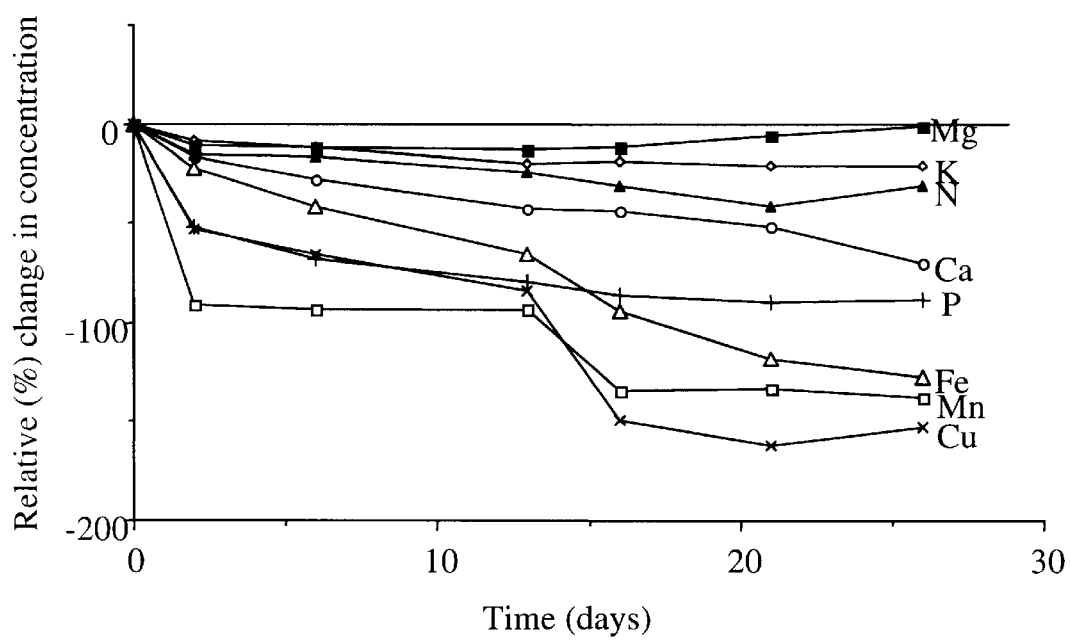
Figure 4.2

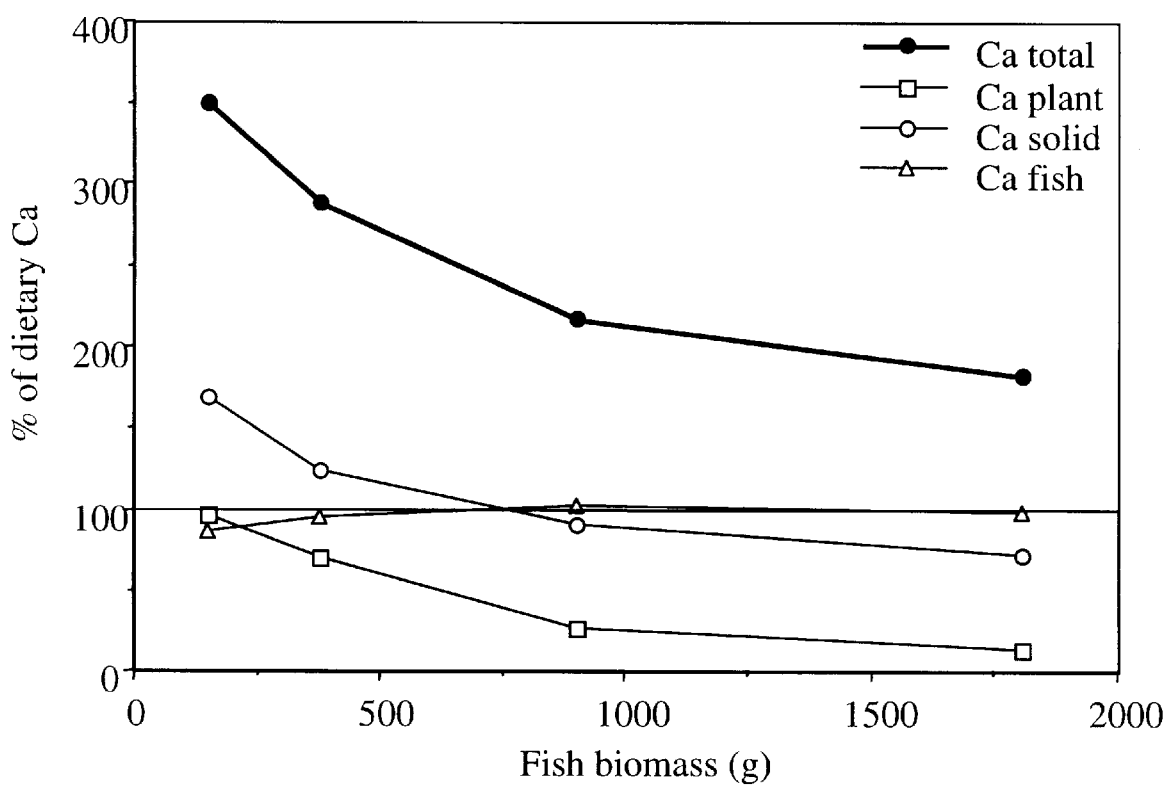
Figure 4.3

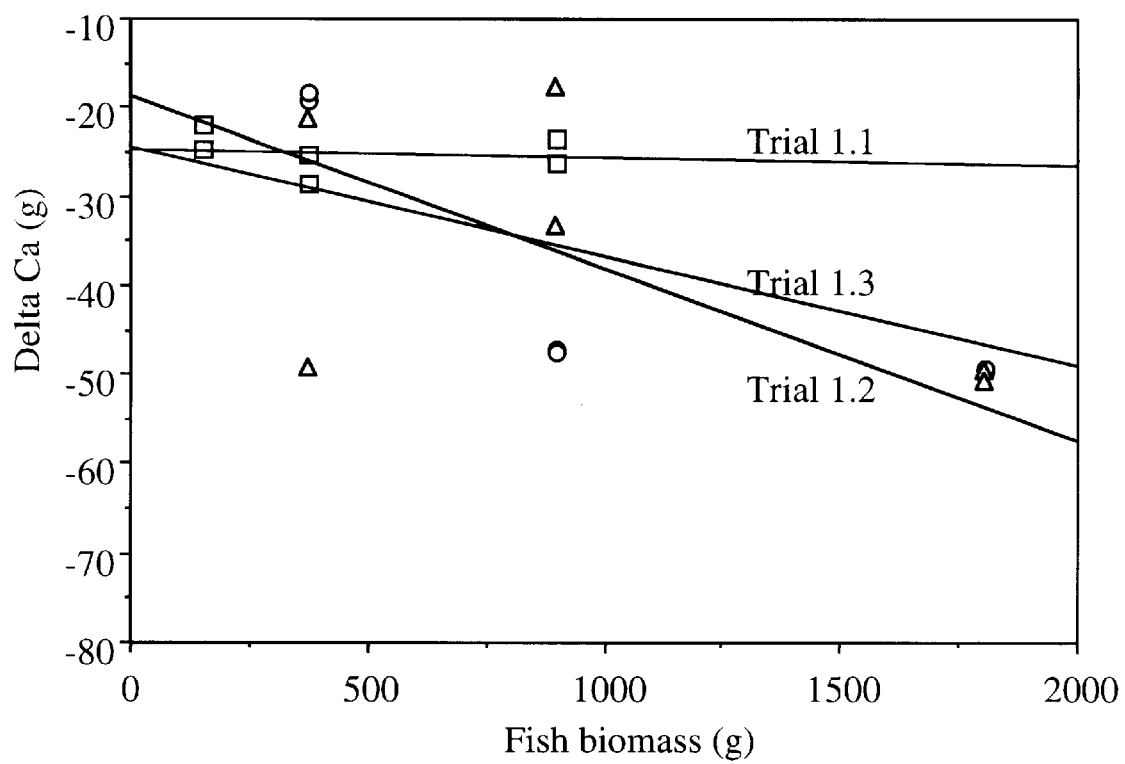
Figure 4.4

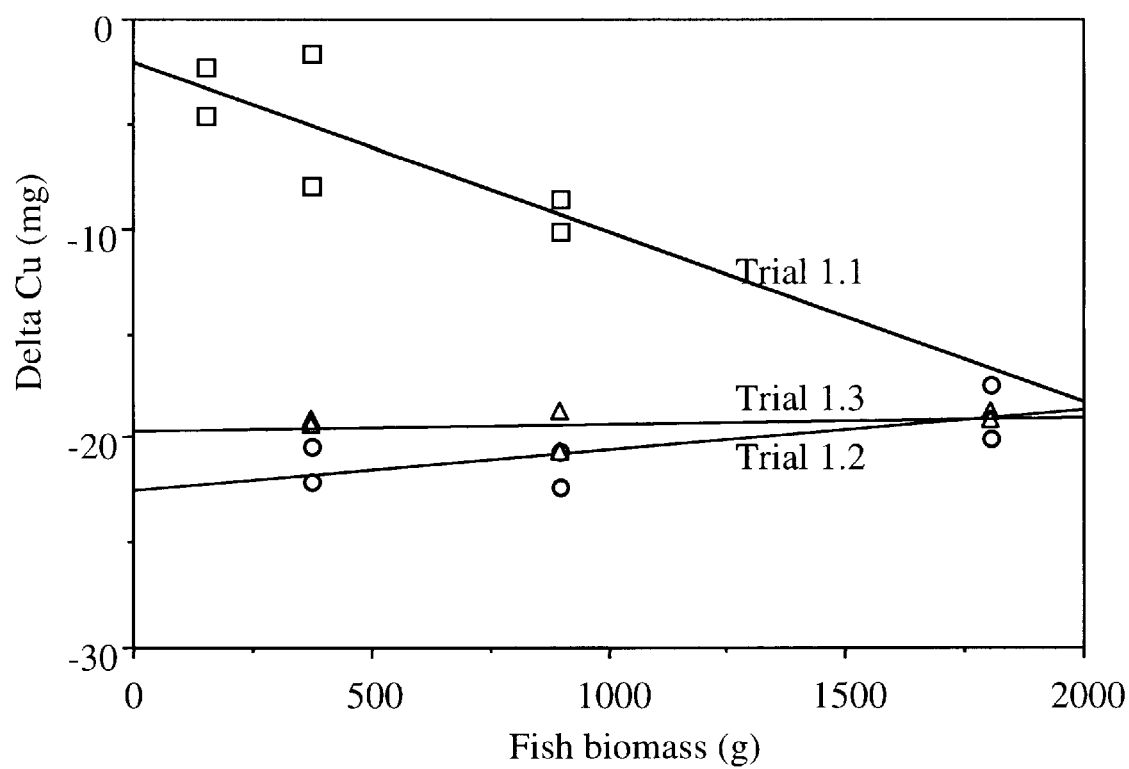
Figure 4.5

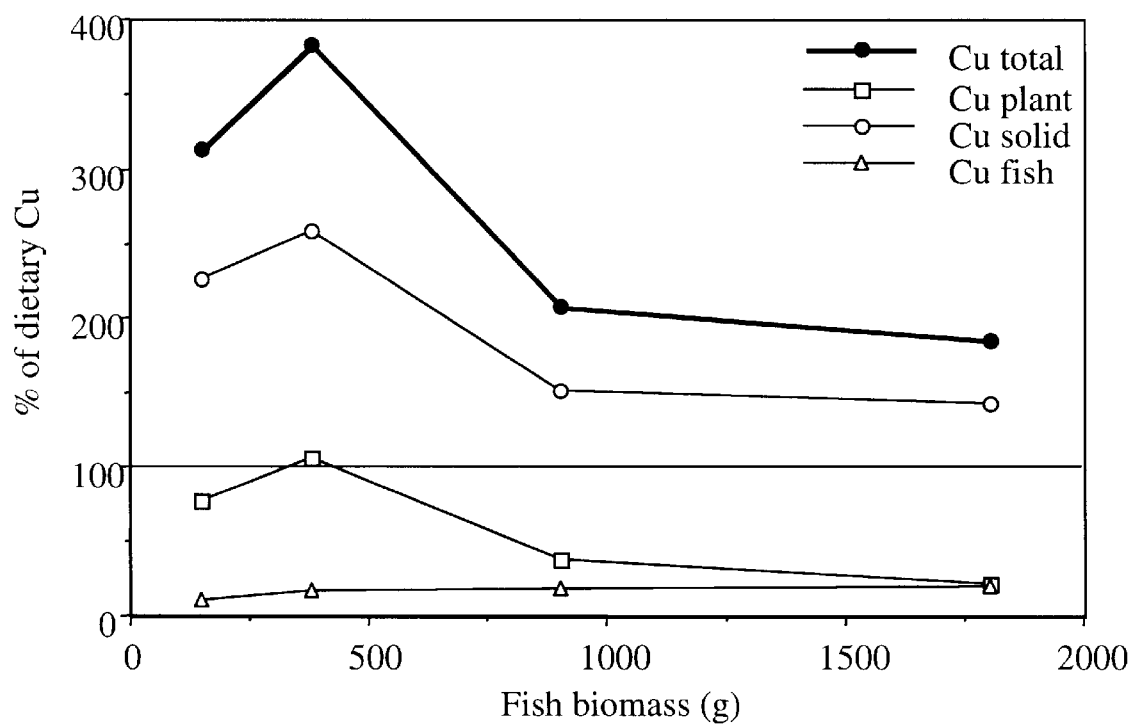
Figure 4.6

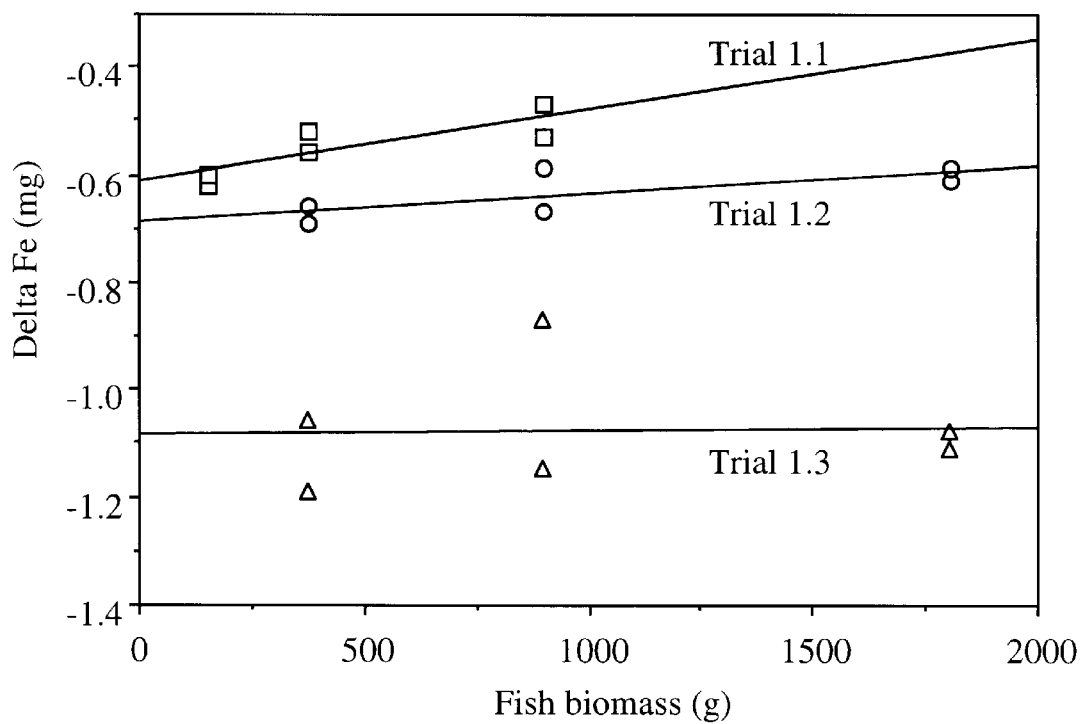
Figure 4.7

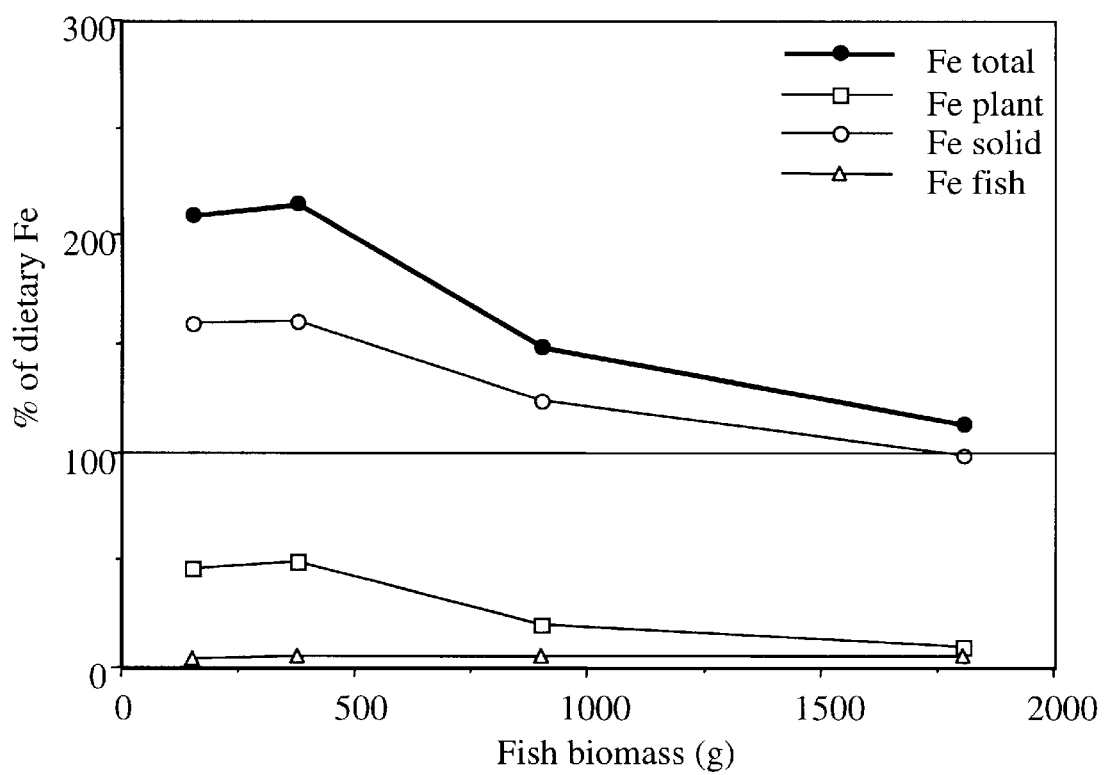
Figure 4.8

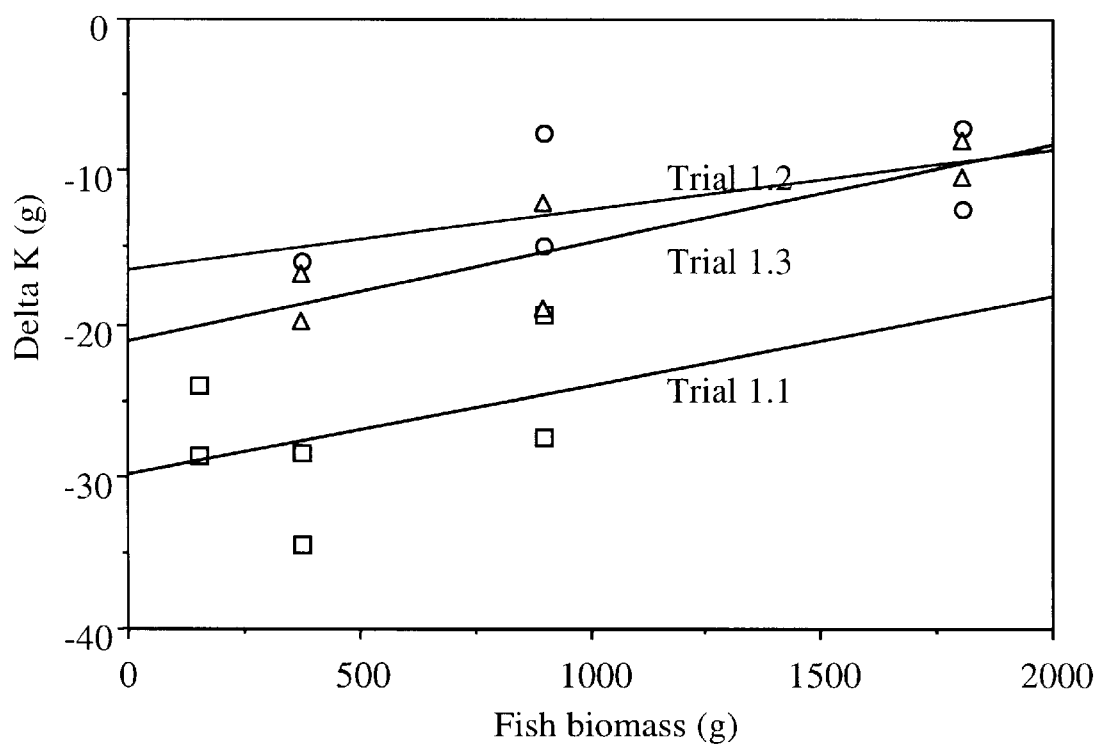
Figure 4.9

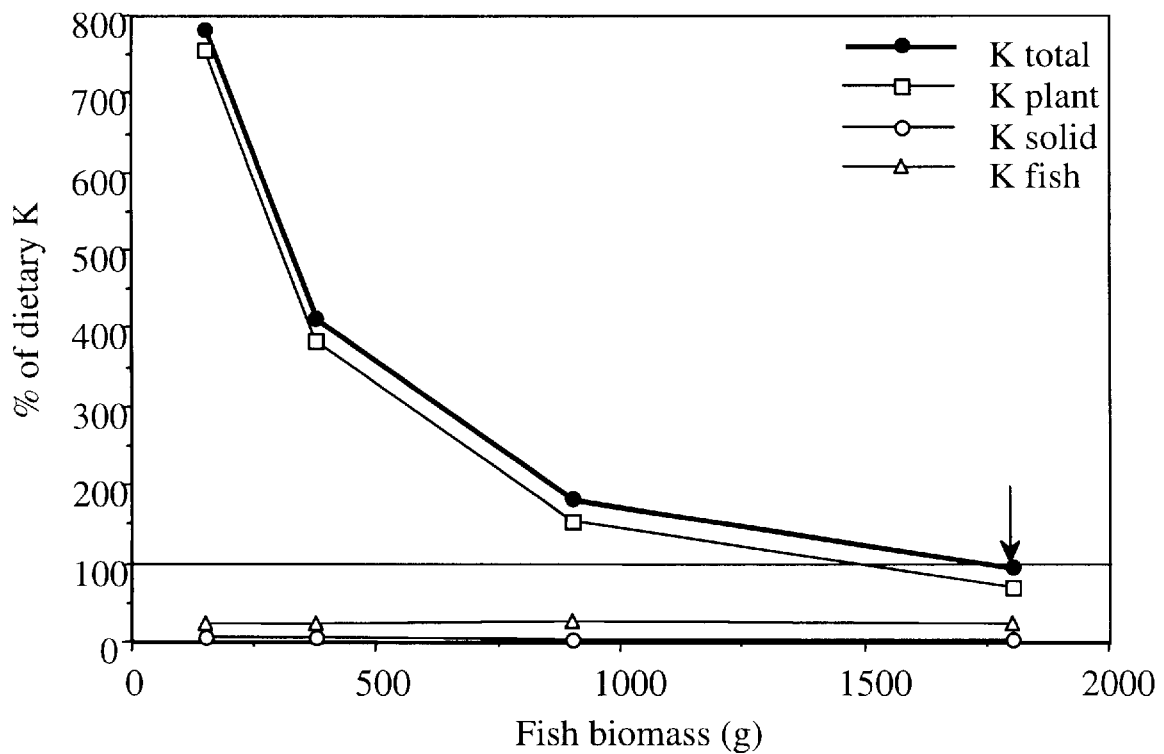
Figure 4.10

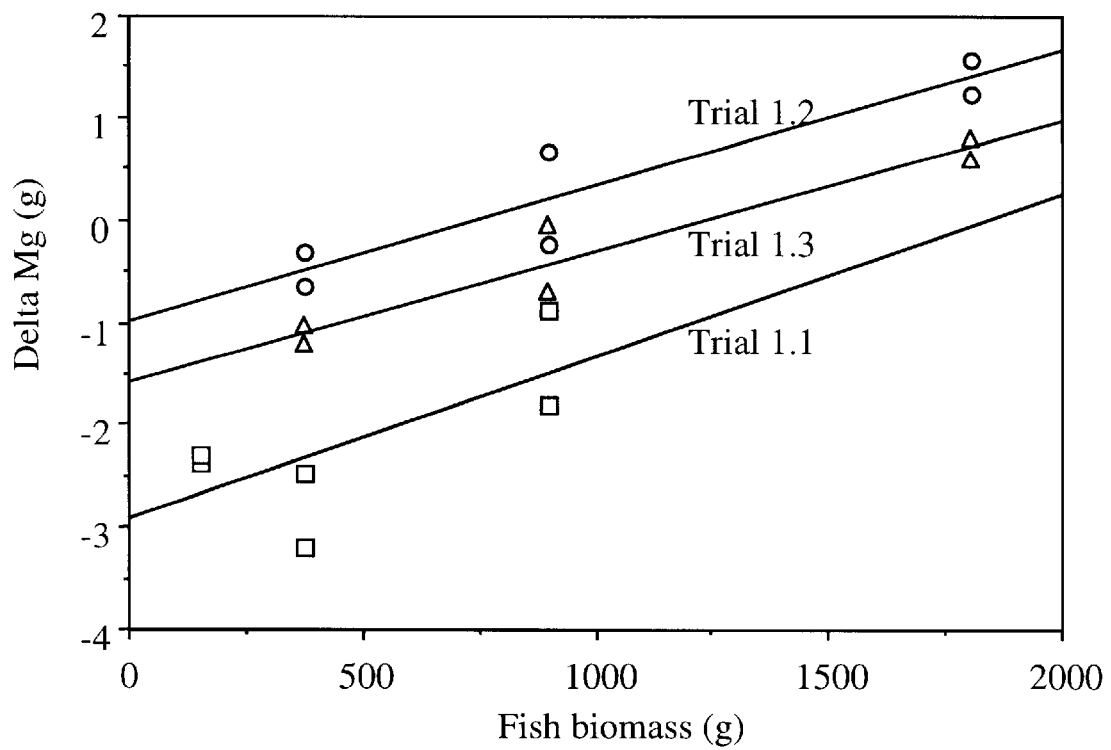
Figure 4.11

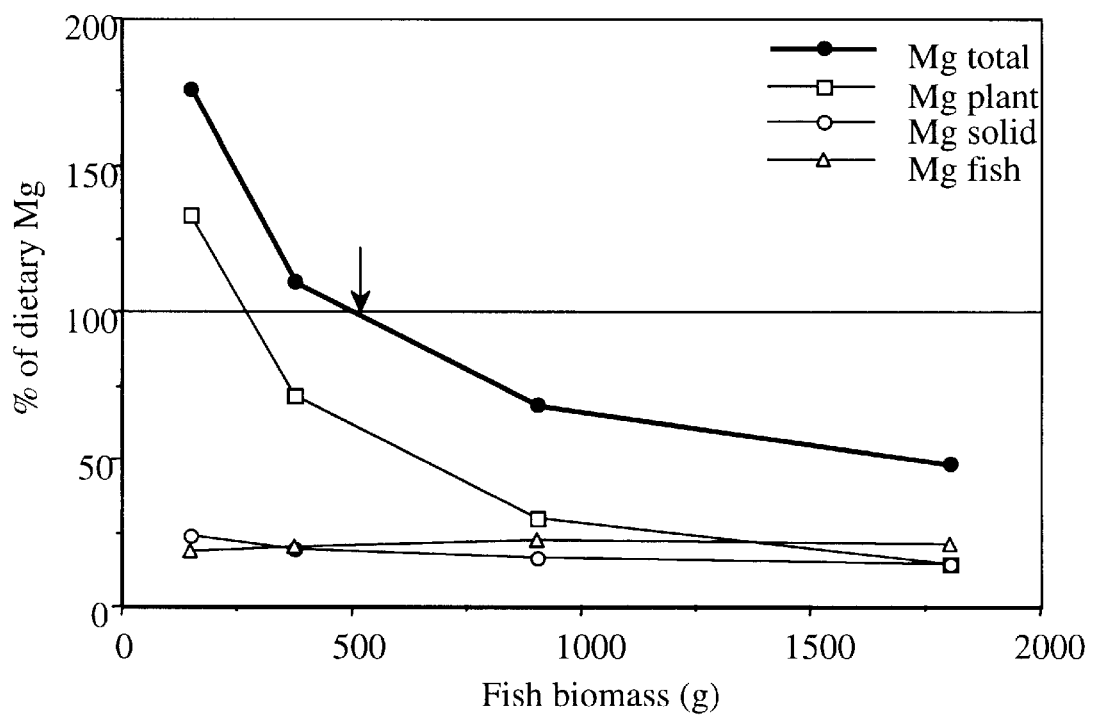
Figure 4.12

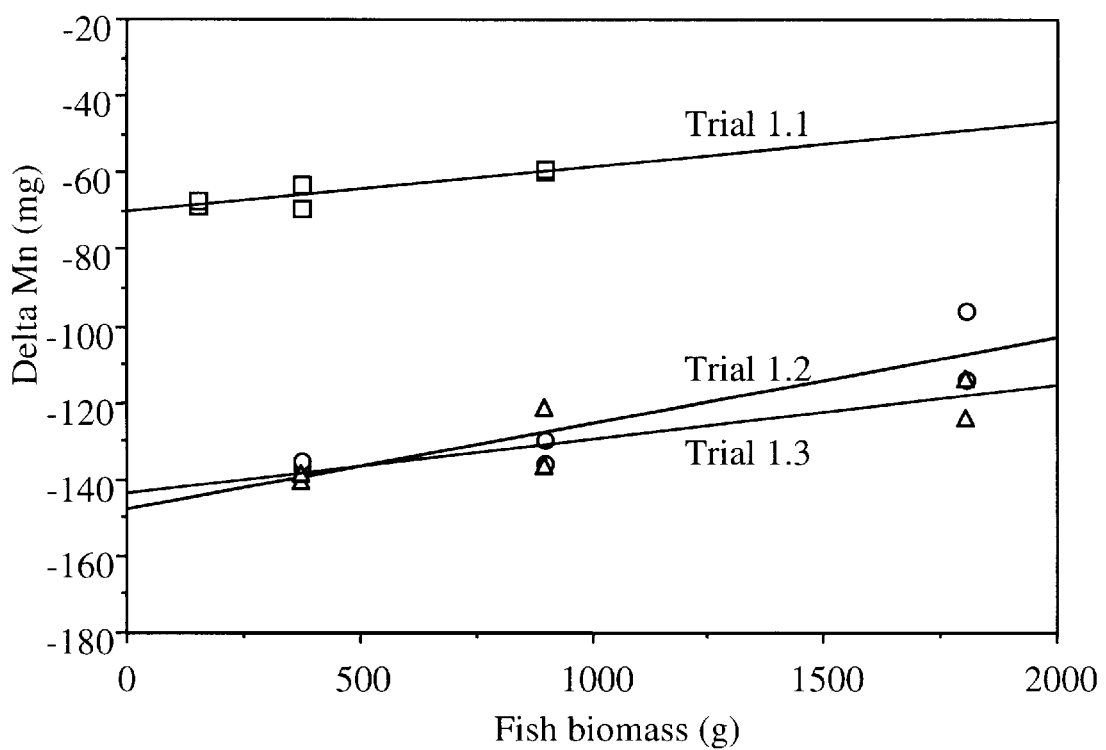
Figure 4.13

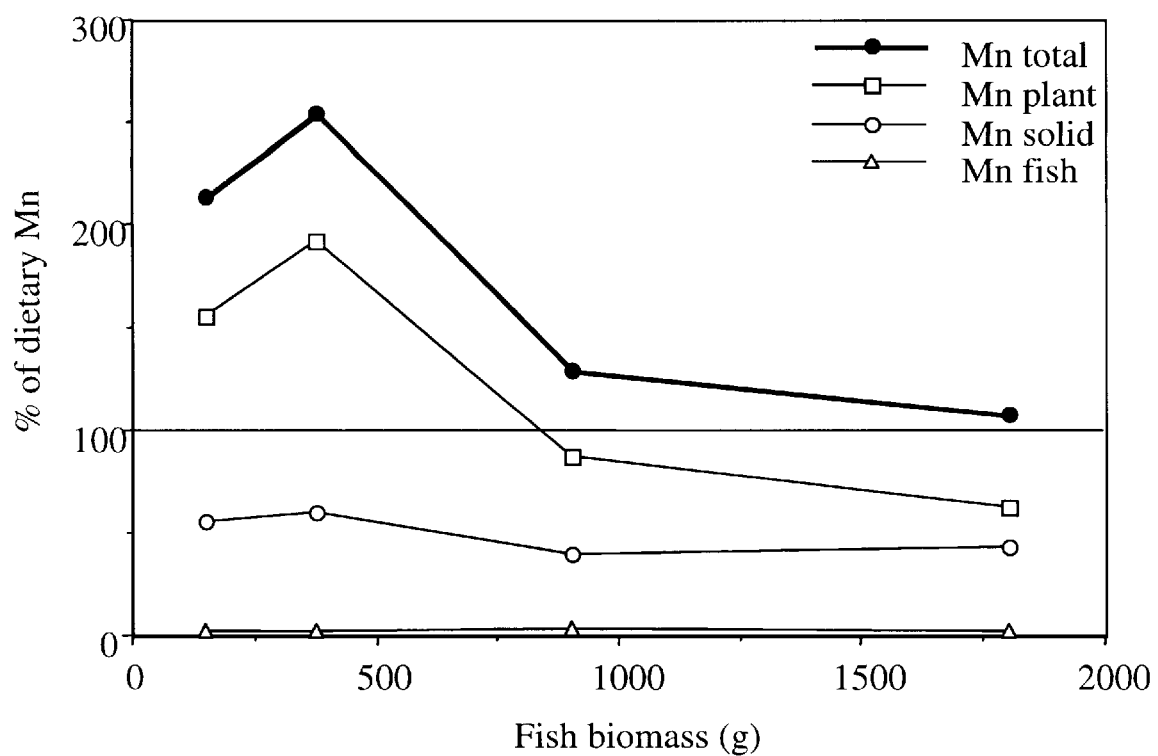
Figure 4.14

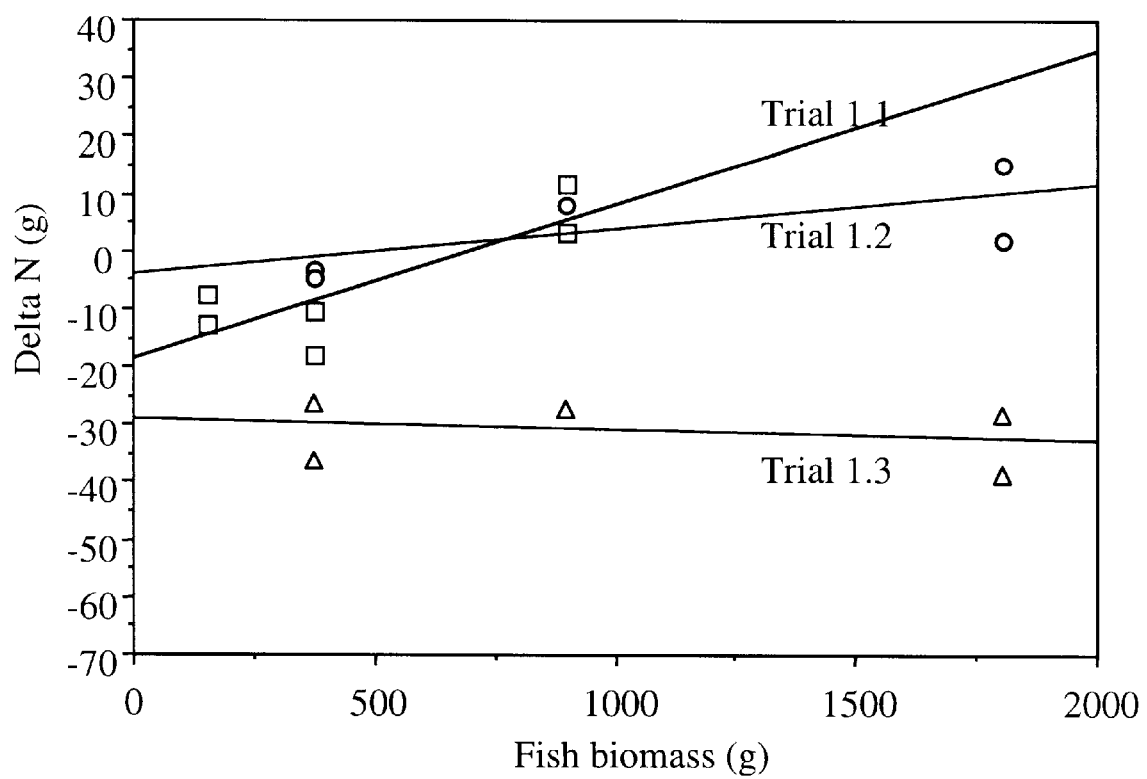
Figure 4.15

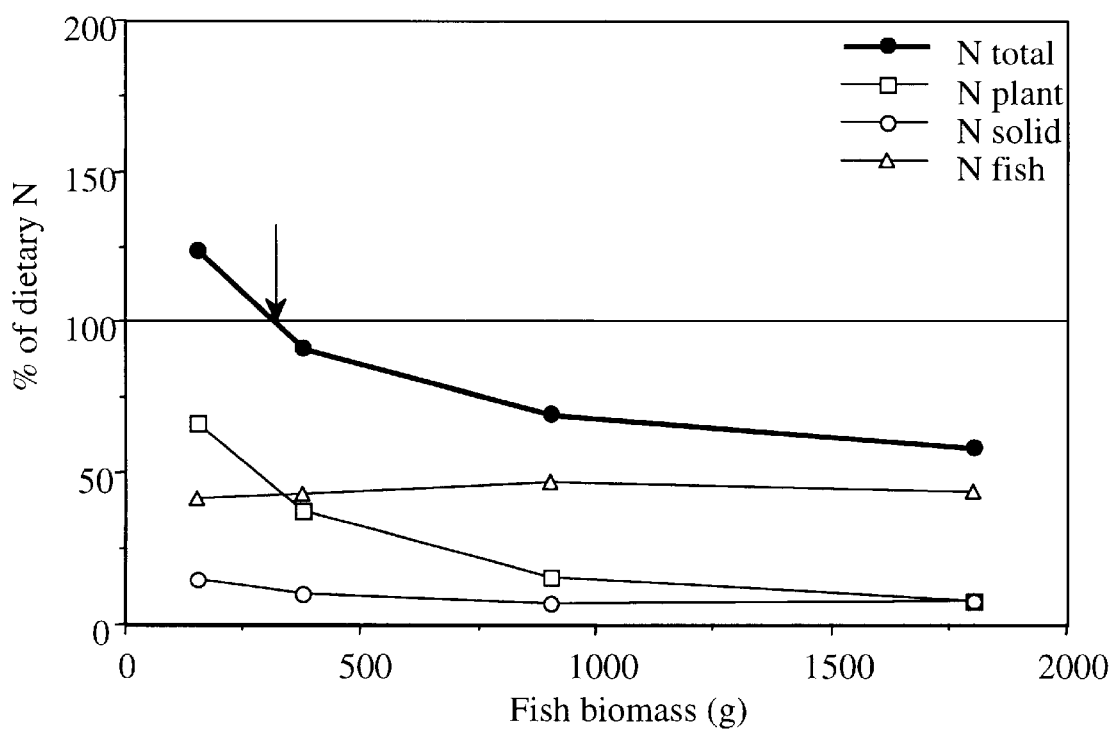
Figure 4.16

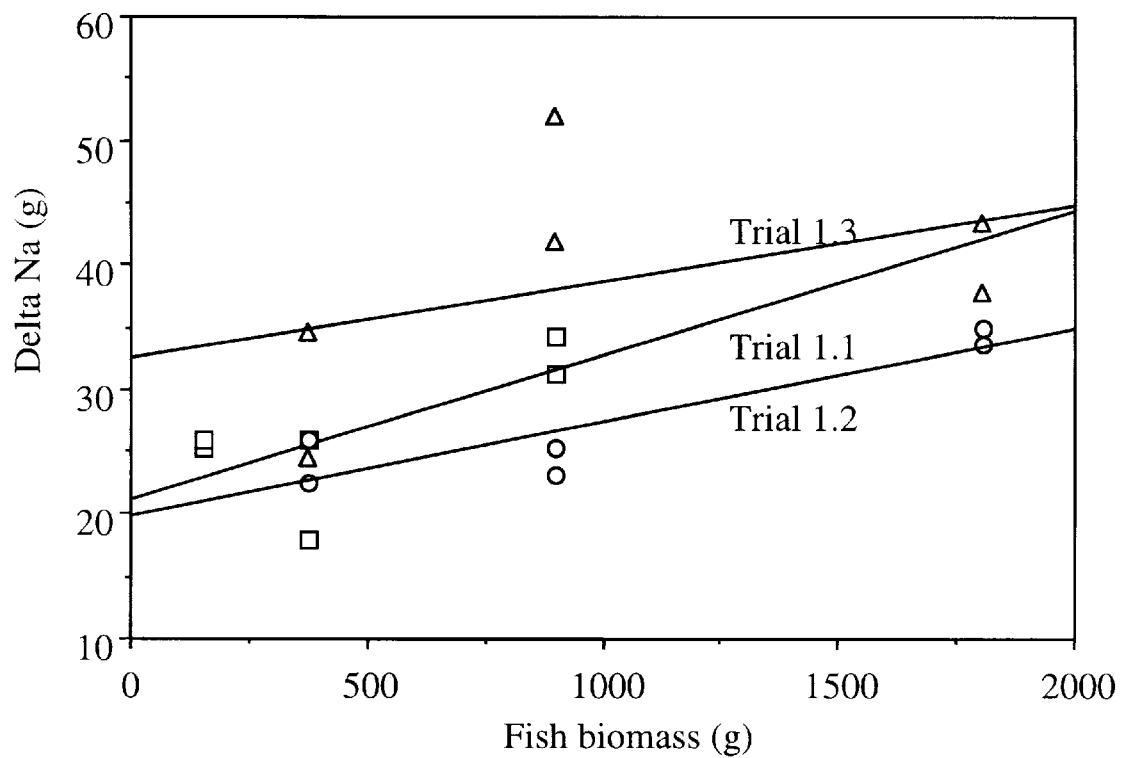
Figure 4.17

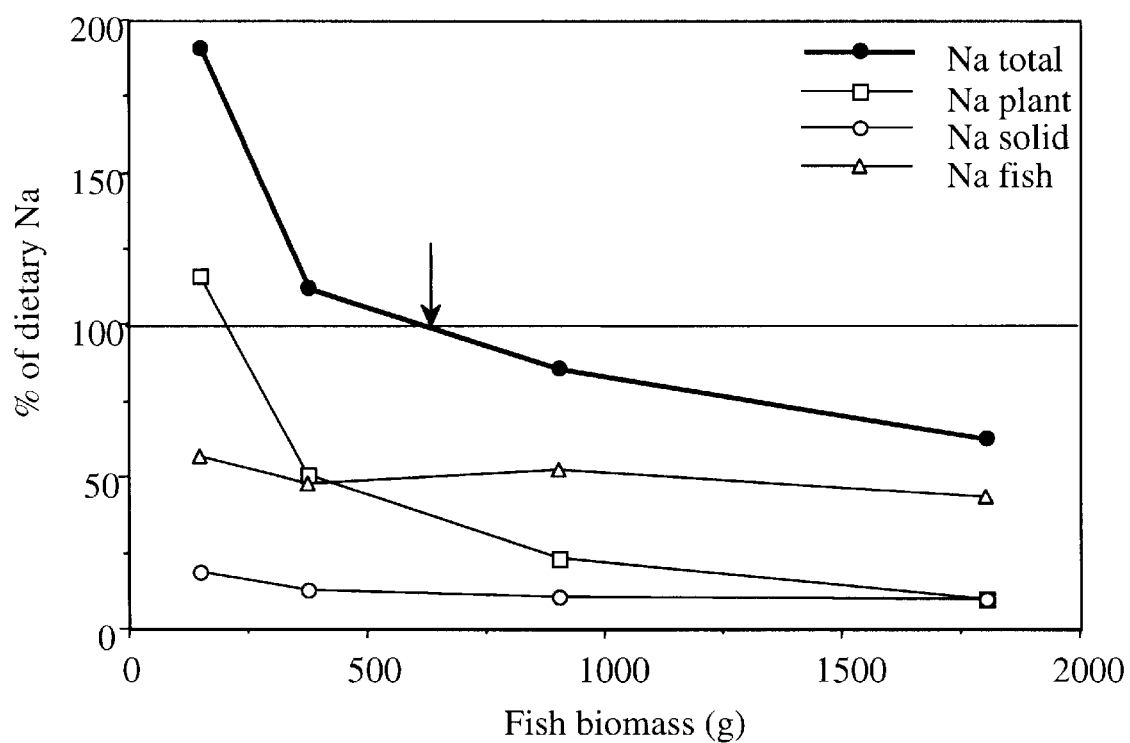
Figure 4.18

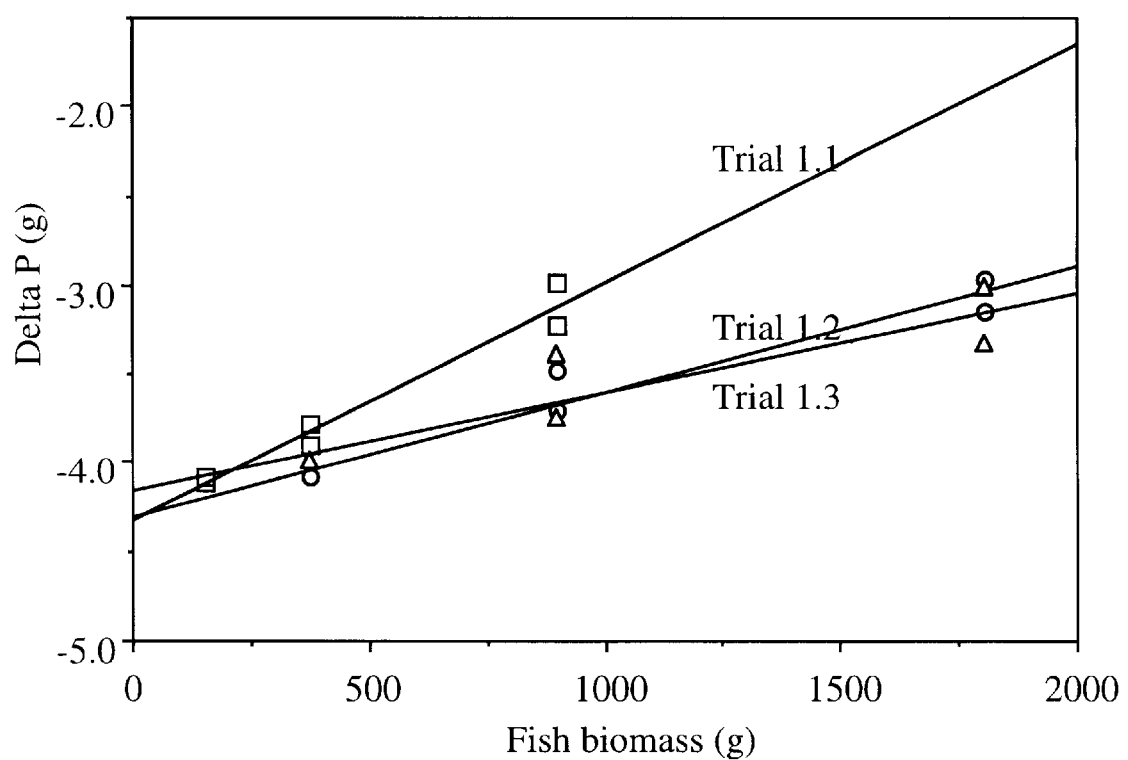
Figure 4.19

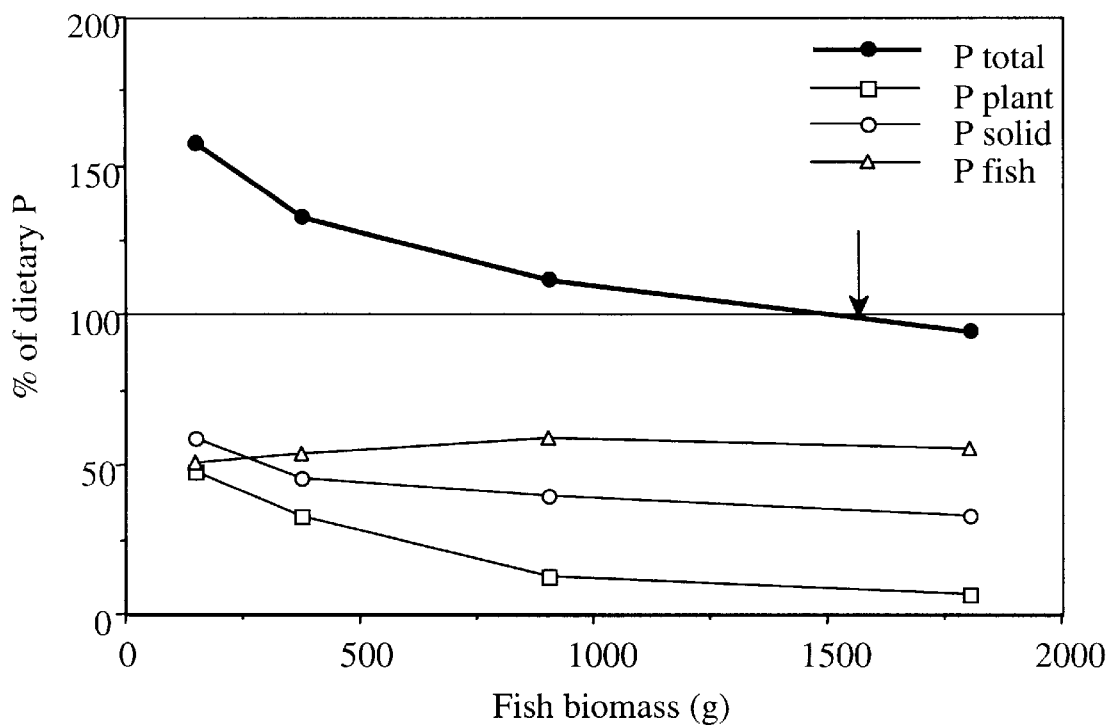
Figure 4.20

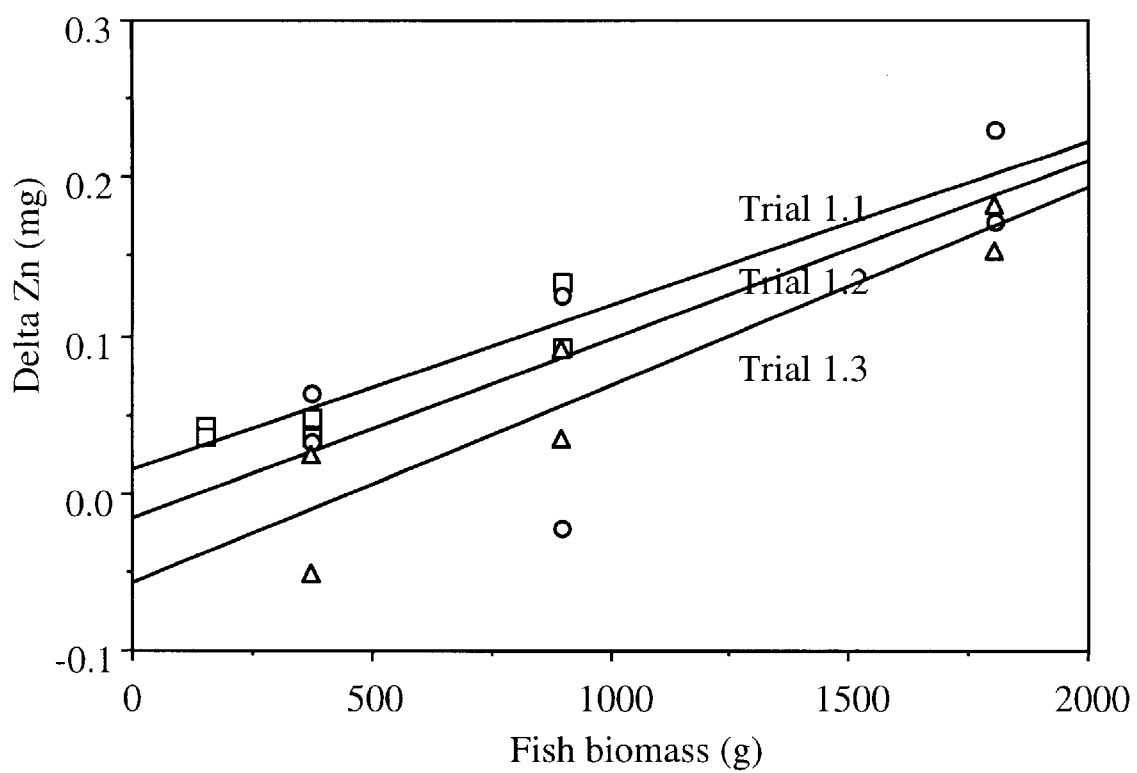
Figure 4.21

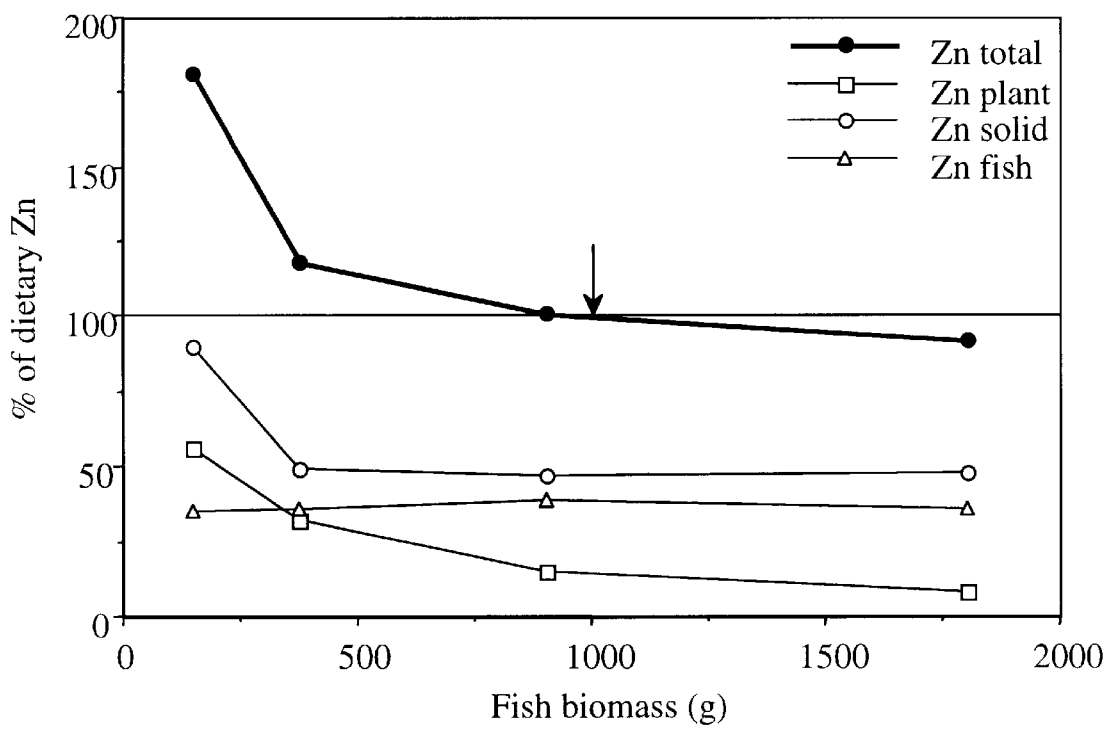
Figure 4.22

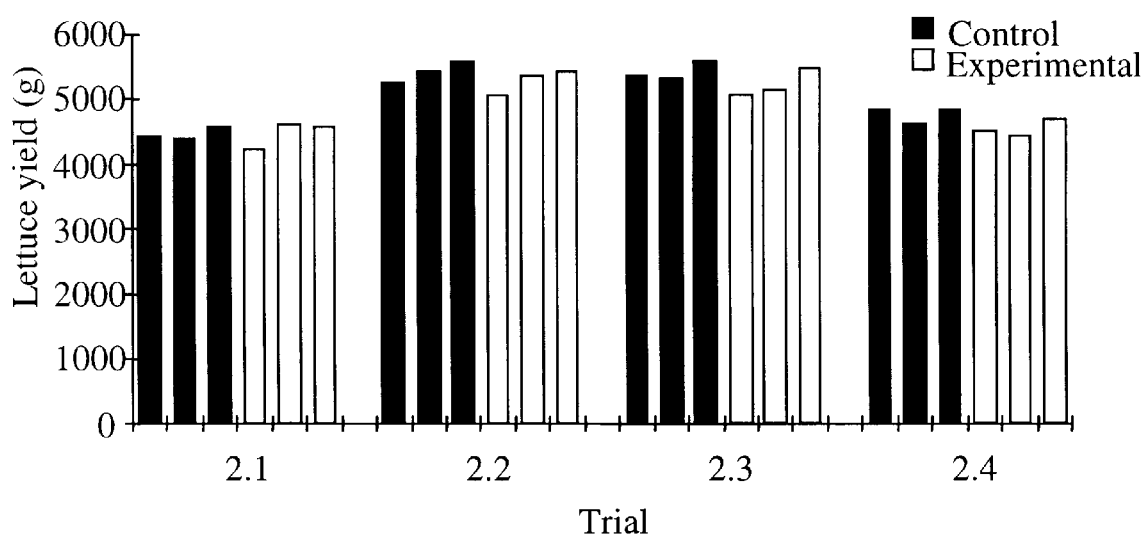
Figure 5.1

Trial 2.1
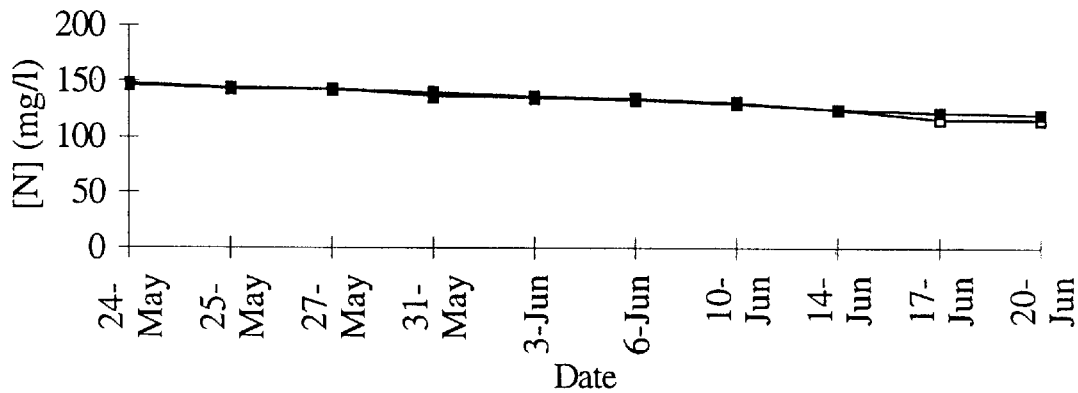
Trial 2.2
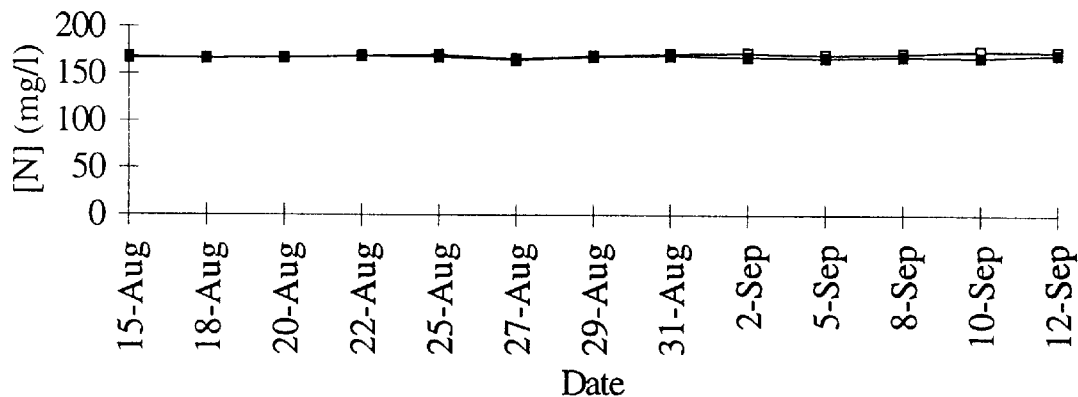
Trial 2.3
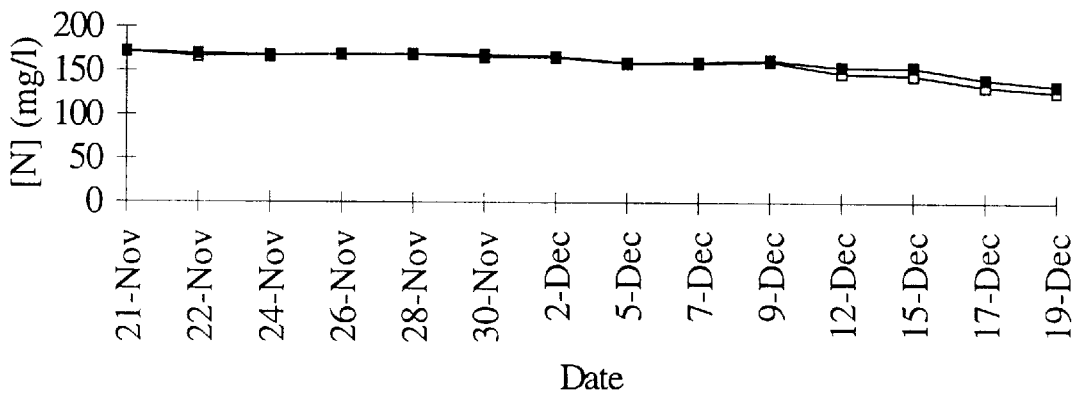
Figure 5.2

Trial 2.1
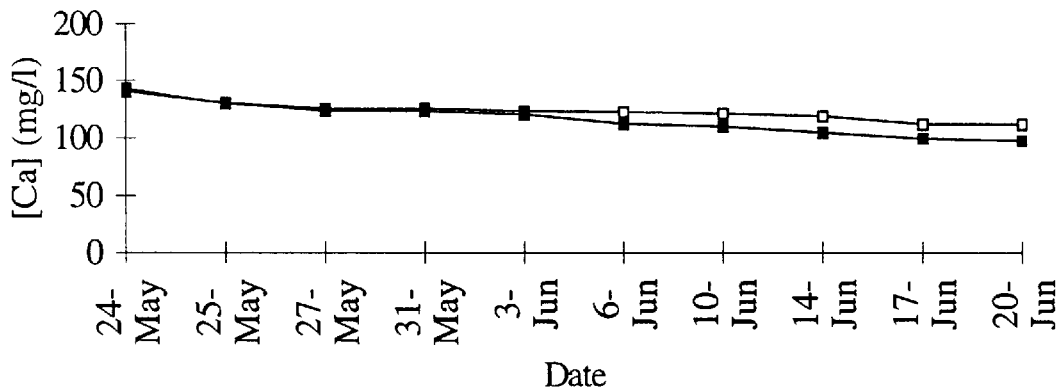
Trial 2.2
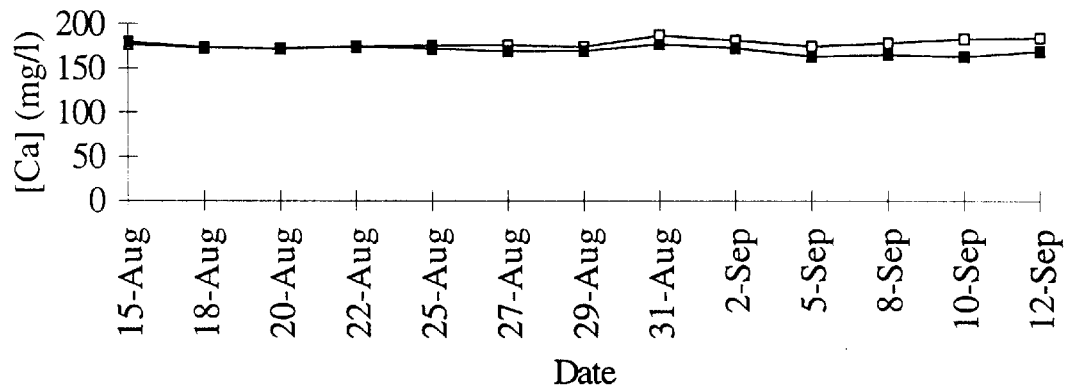
Trial 2.3
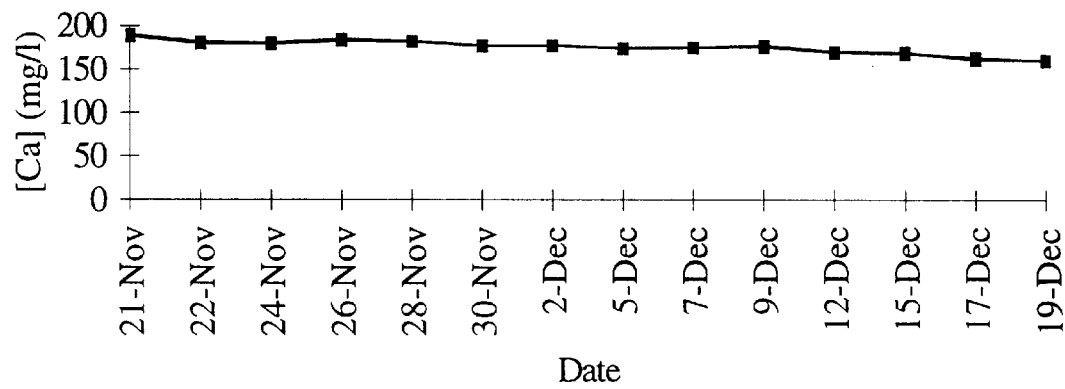
Figure 5.3

Trial 2.1
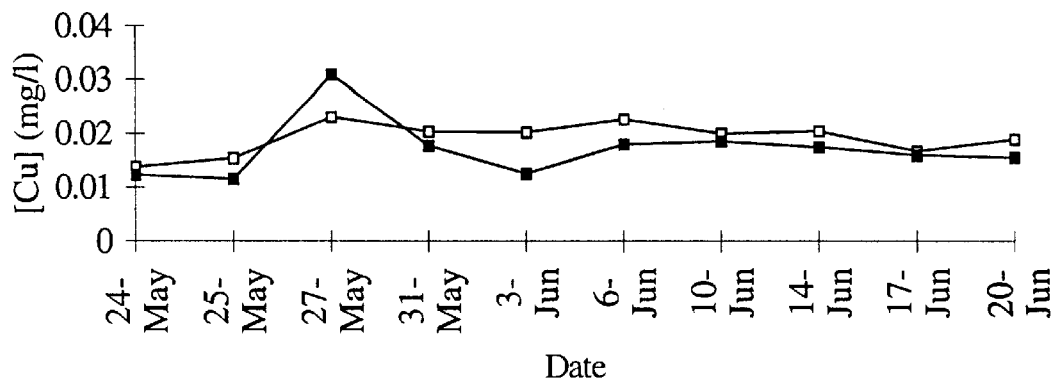
Trial 2.2
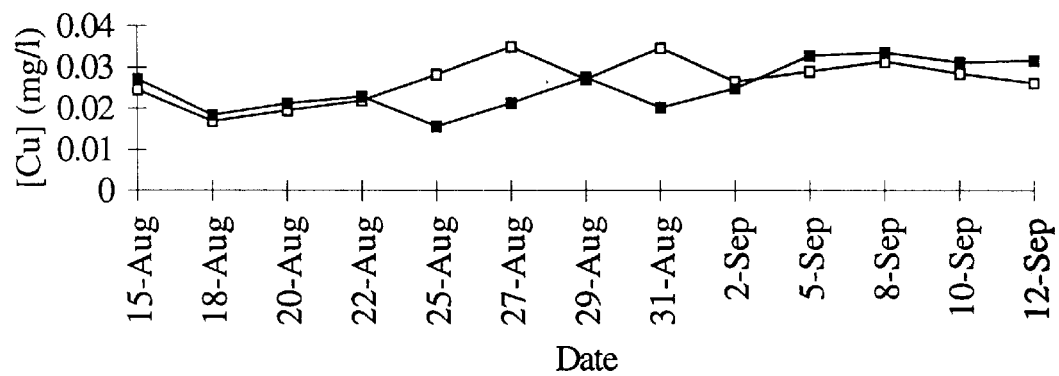
Trial 2.3
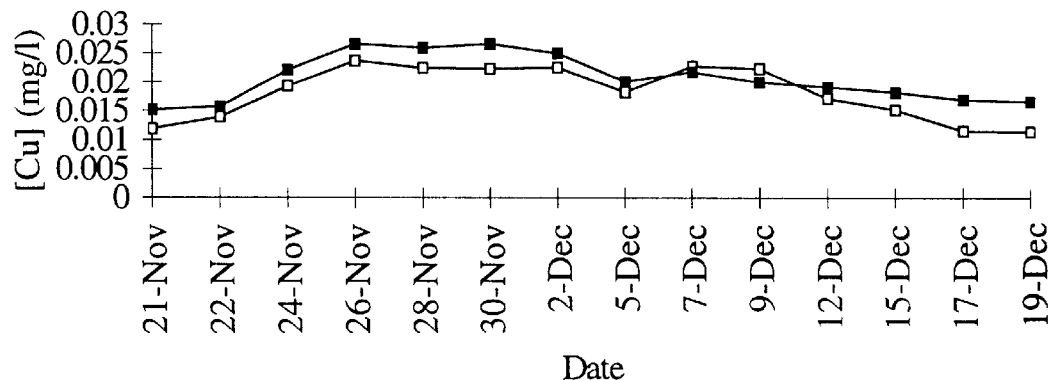
Figure 5.4

Trial 2.1
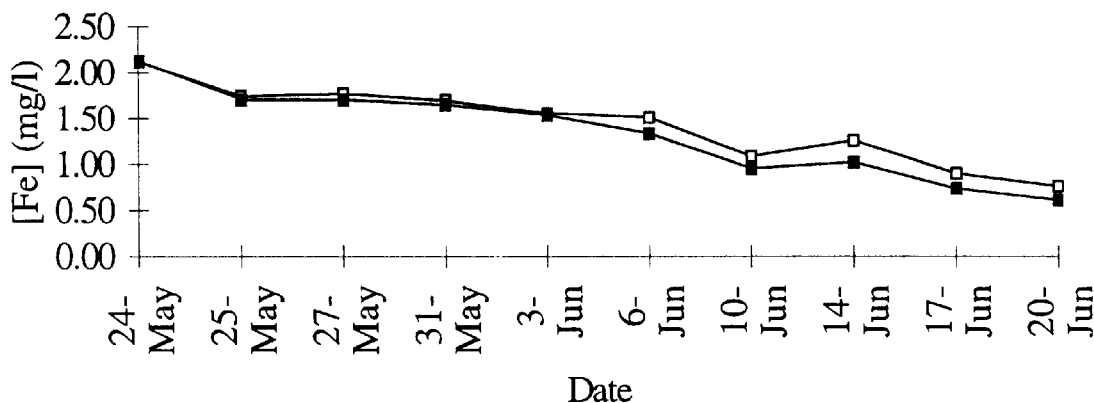
Trial 2.2
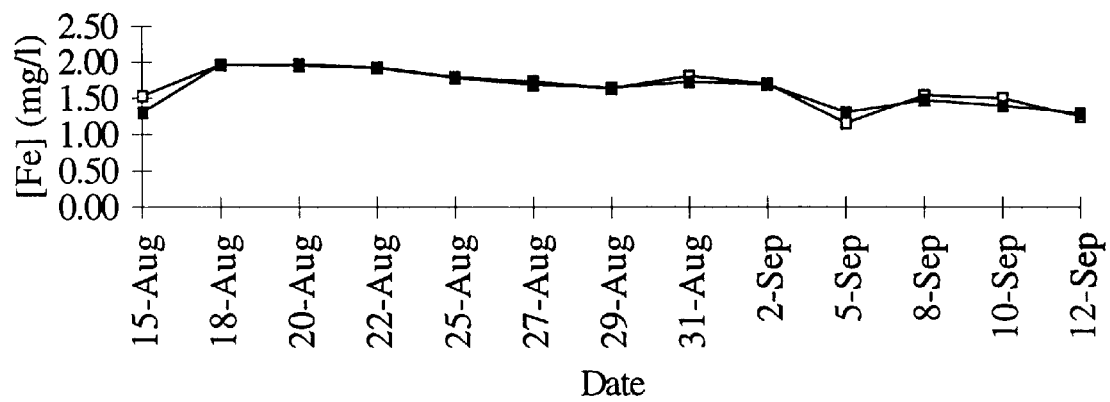
Trial 2.3
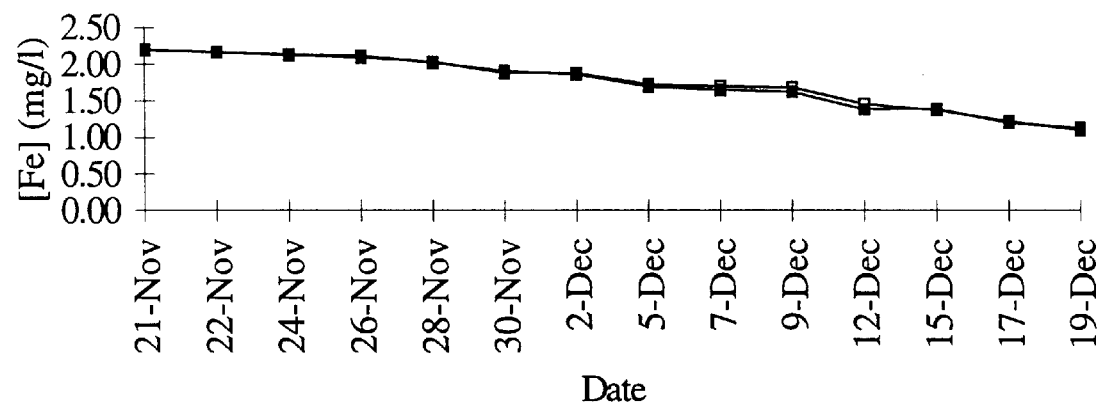
Figure 5.5

Trial 2.1
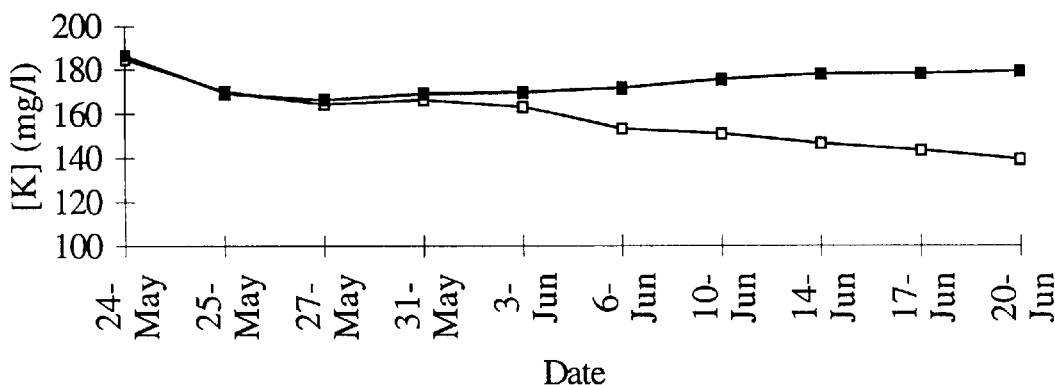
Trial 2.2
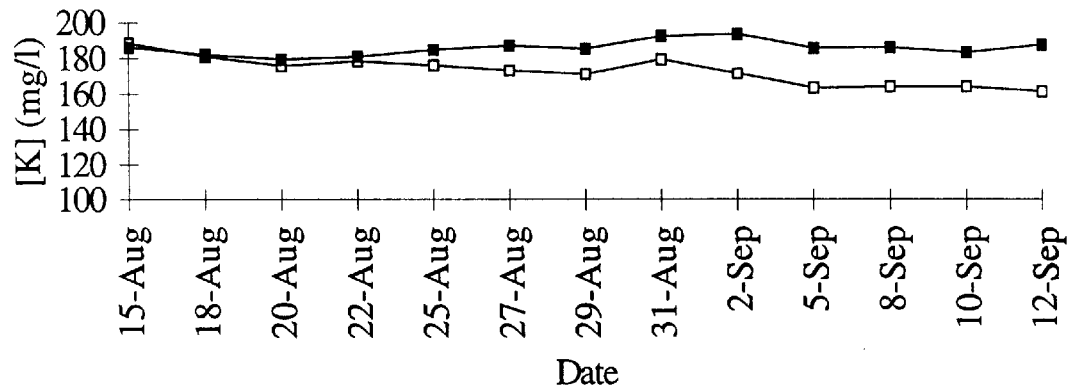
Trial 2.3
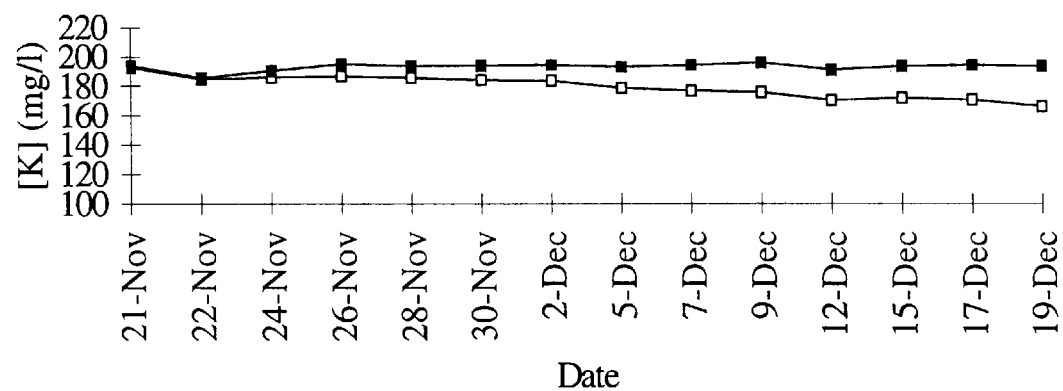
Figure 5.6

Trial 2.1        Legend: —□— Control  —■— Experimental
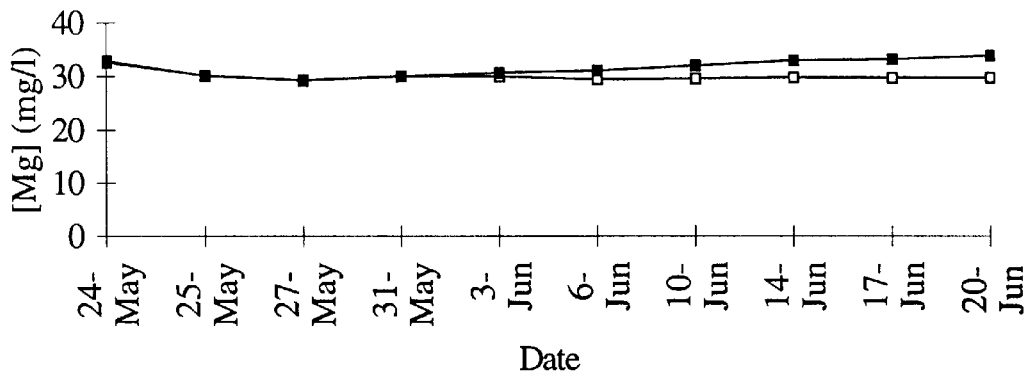
Trial 2.2
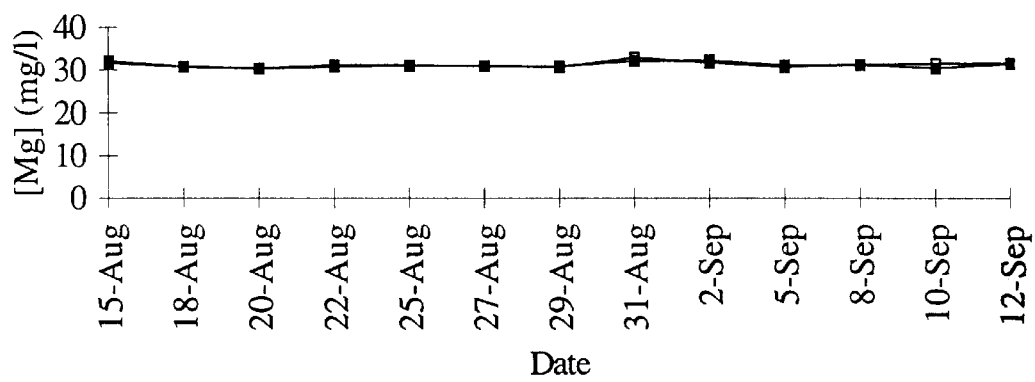
Trial 2.3
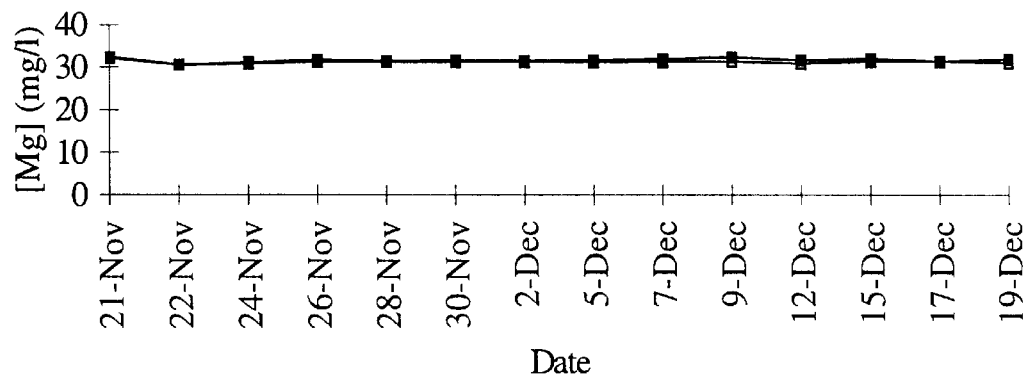
Figure 5.7

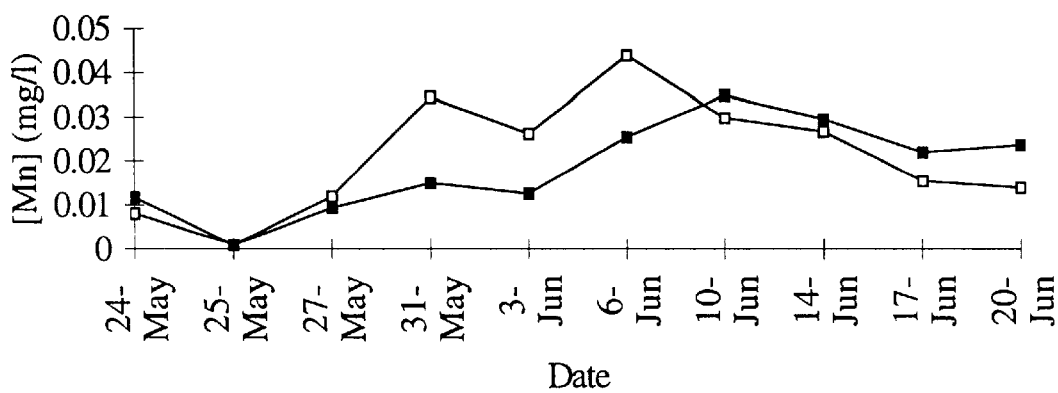
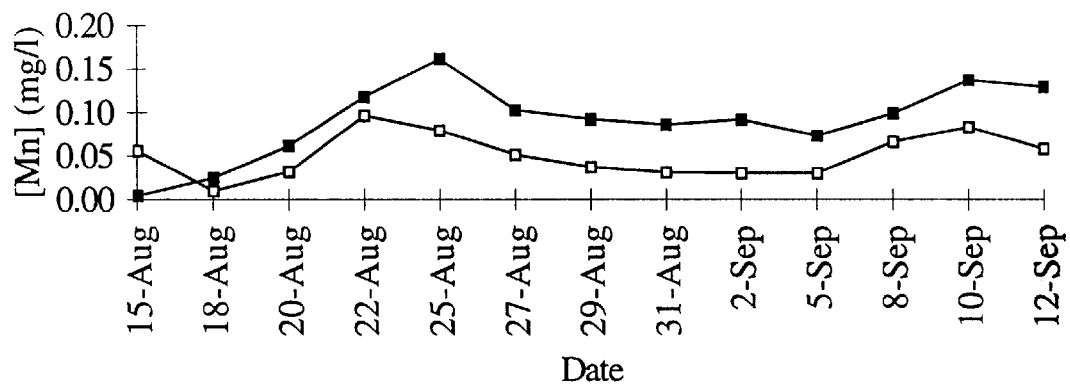
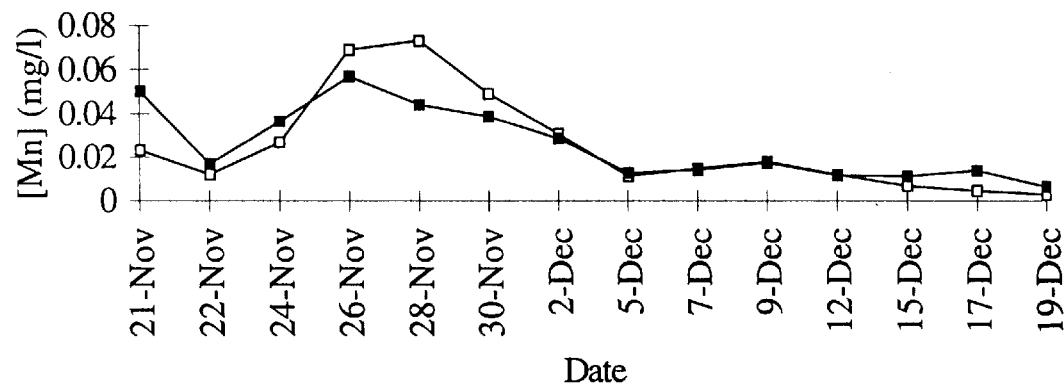
Figure 5.8

Trial 2.1
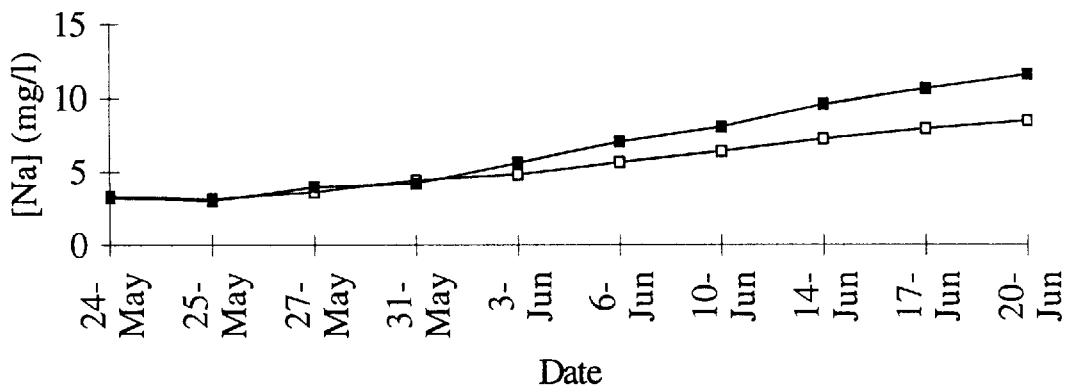
Trial 2.2
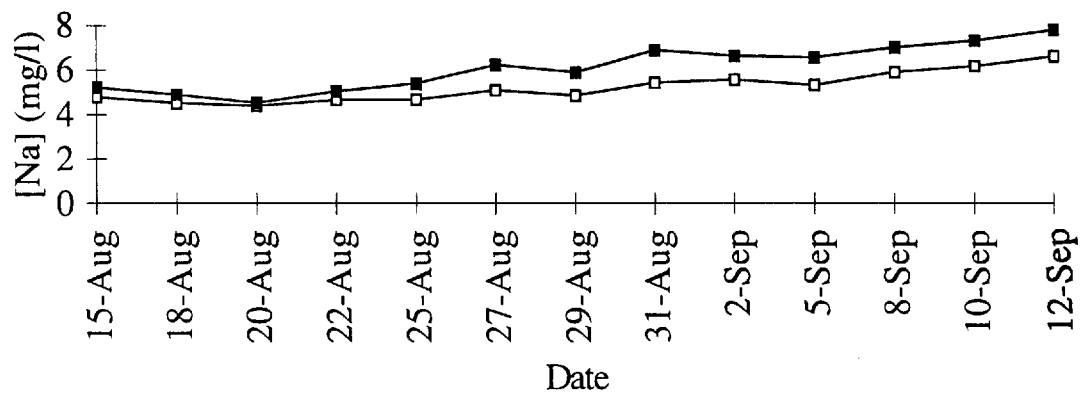
Trial 2.3
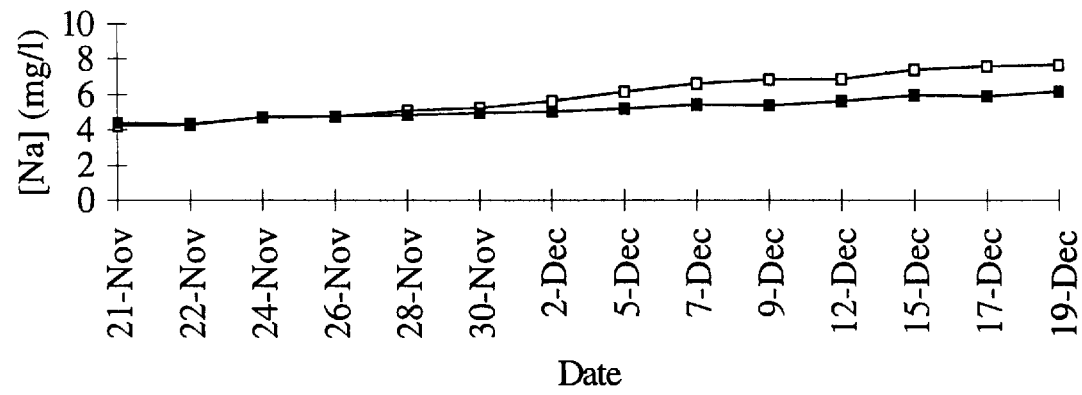
Figure 5.9

Trial 2.1
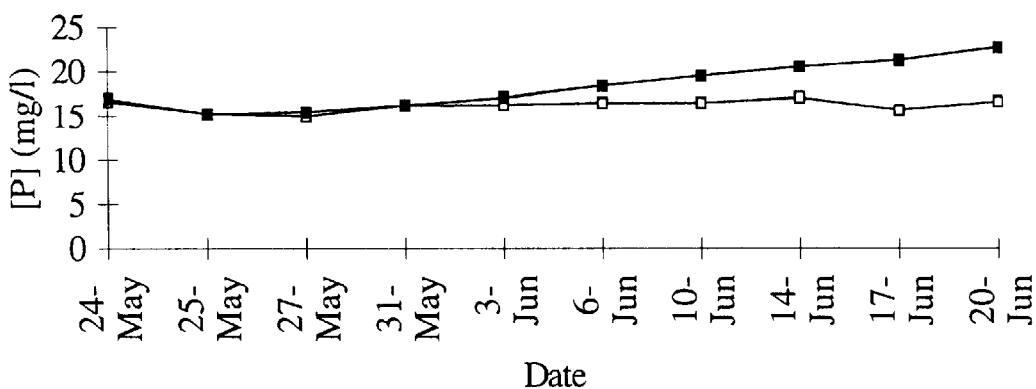
Trial 2.2
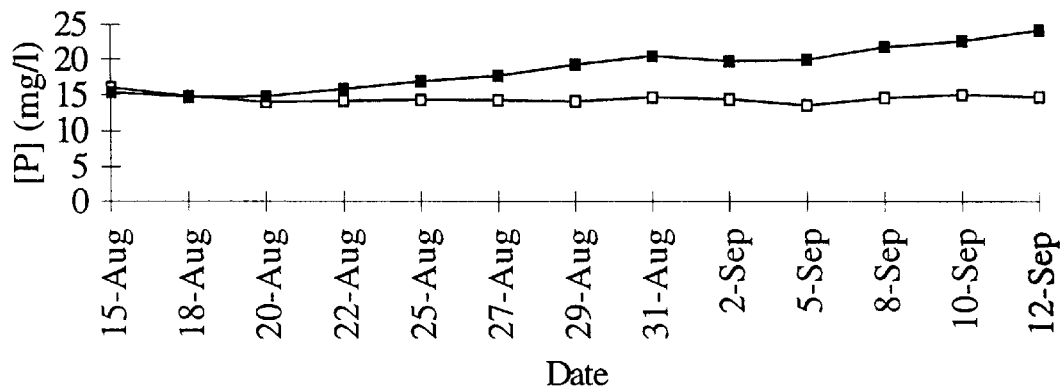
Trial 2.3
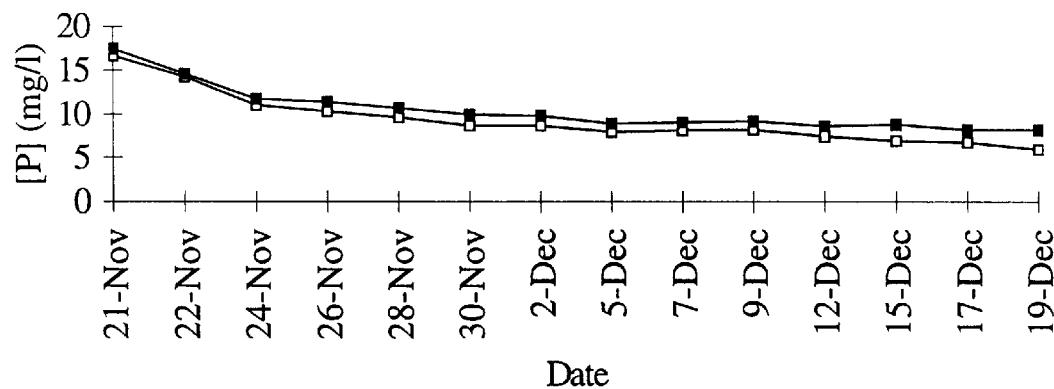
Figure 5.10

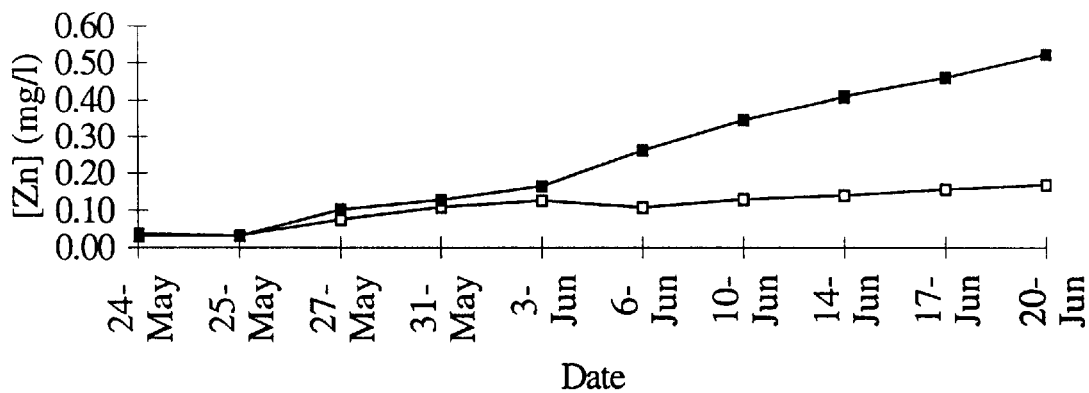
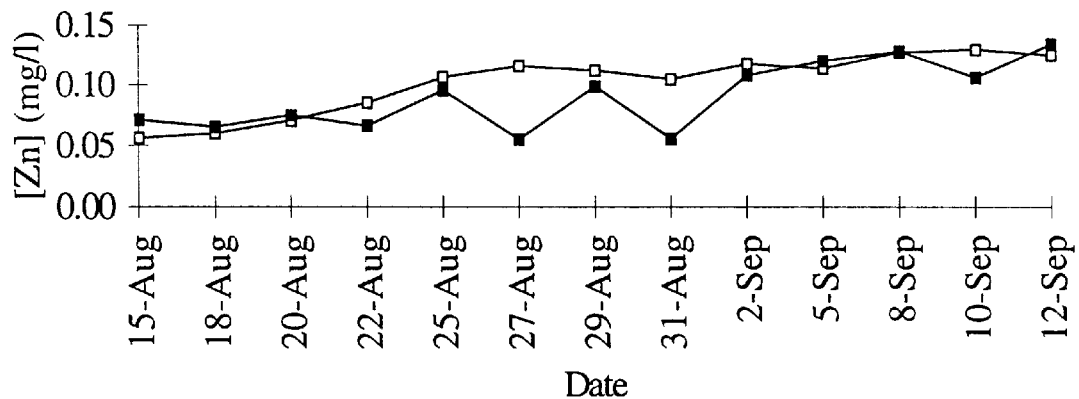
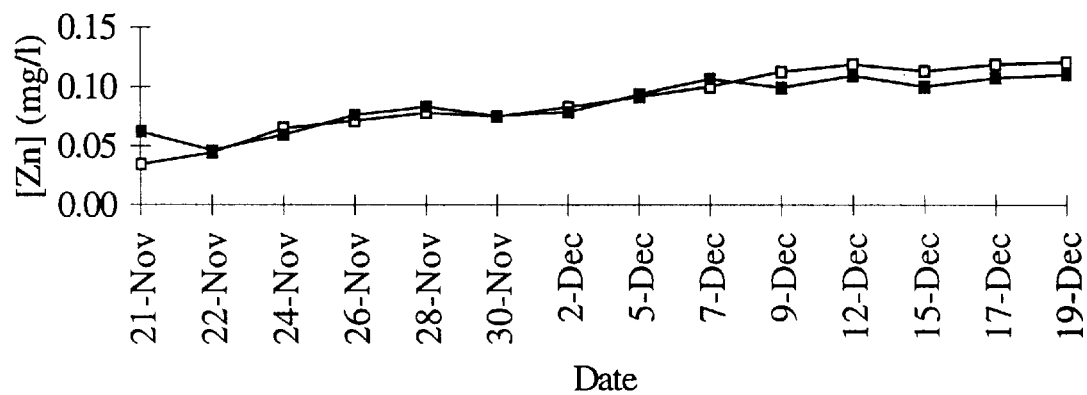
Figure 5.11

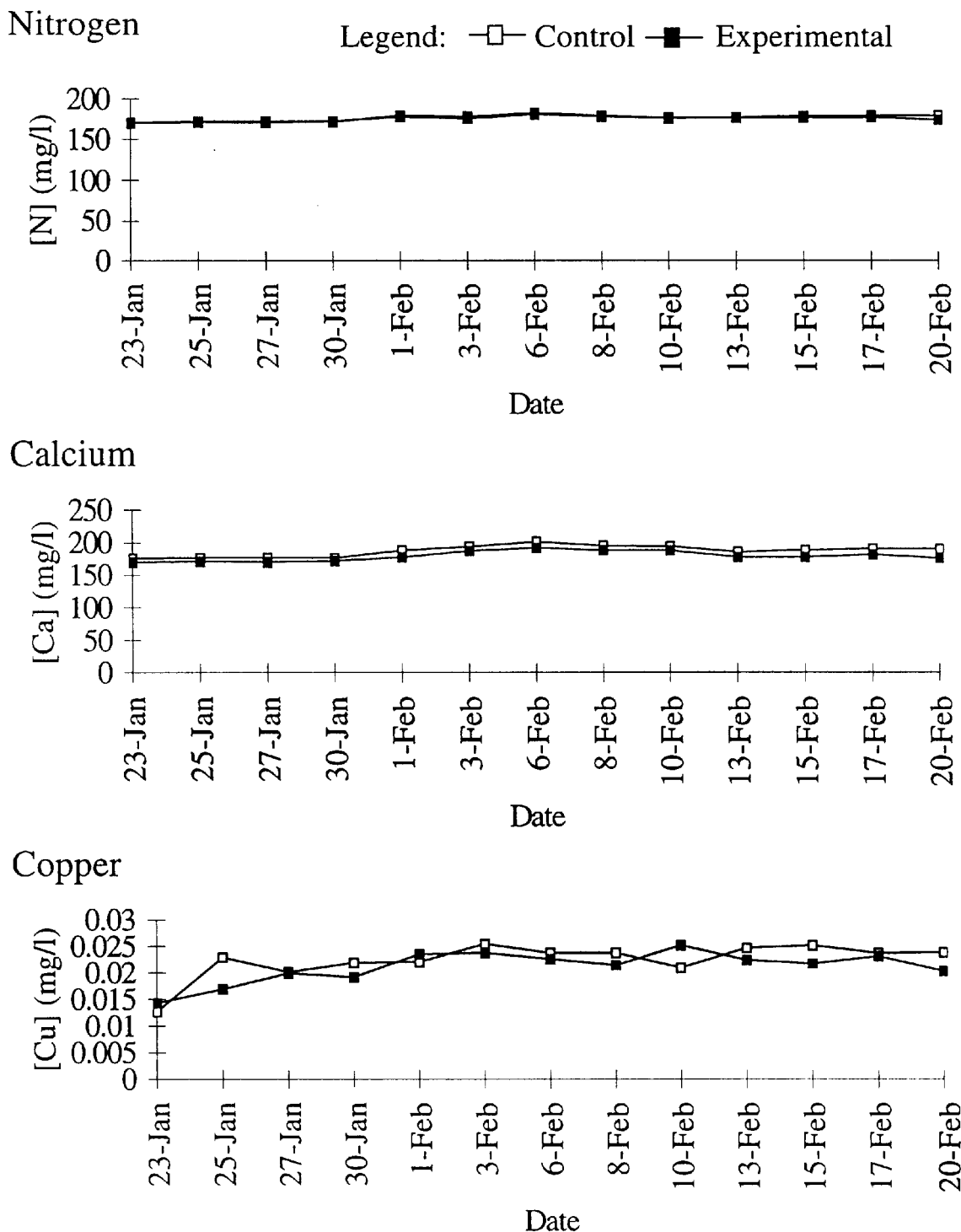
Figure 5.12

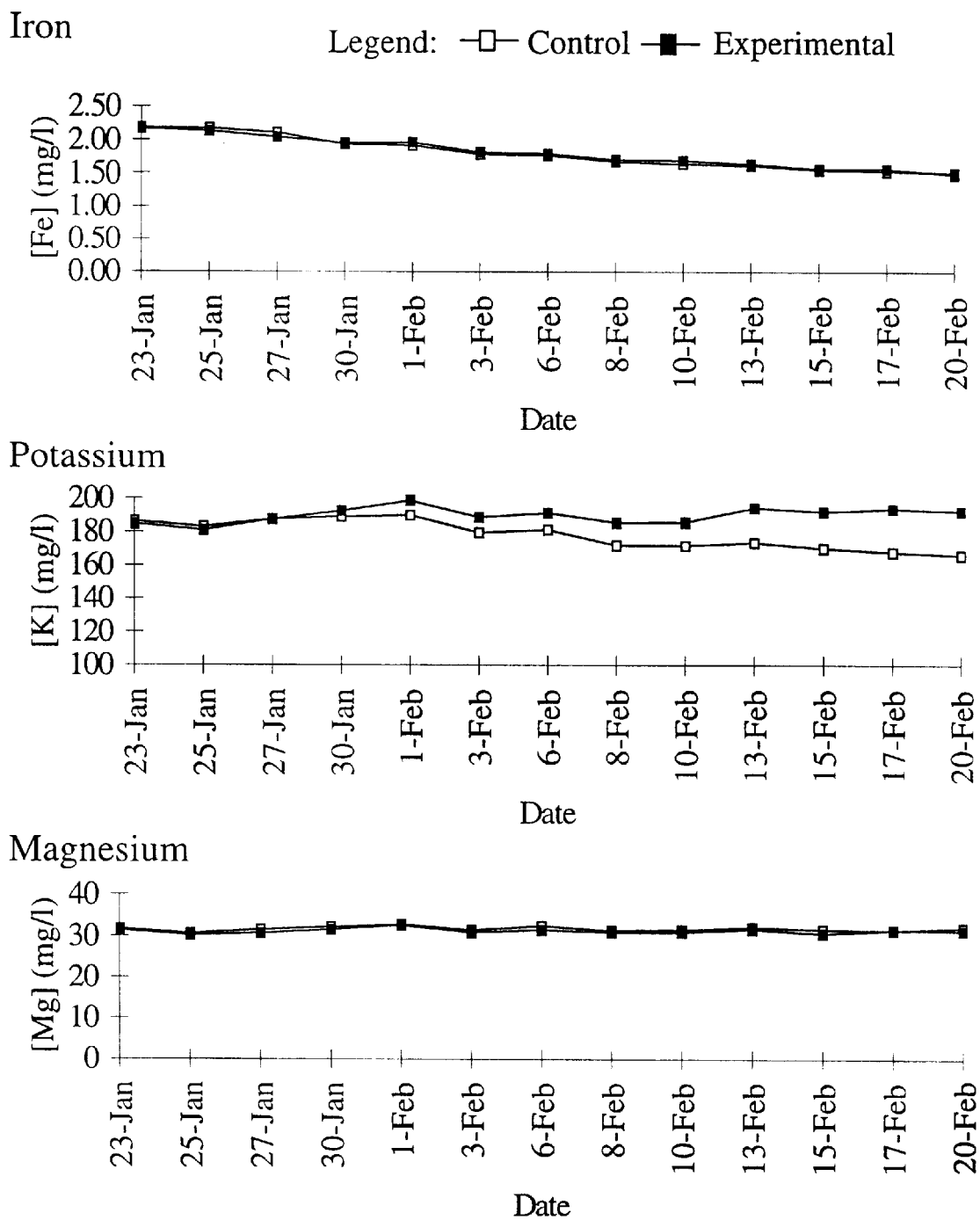
Figure 5.13

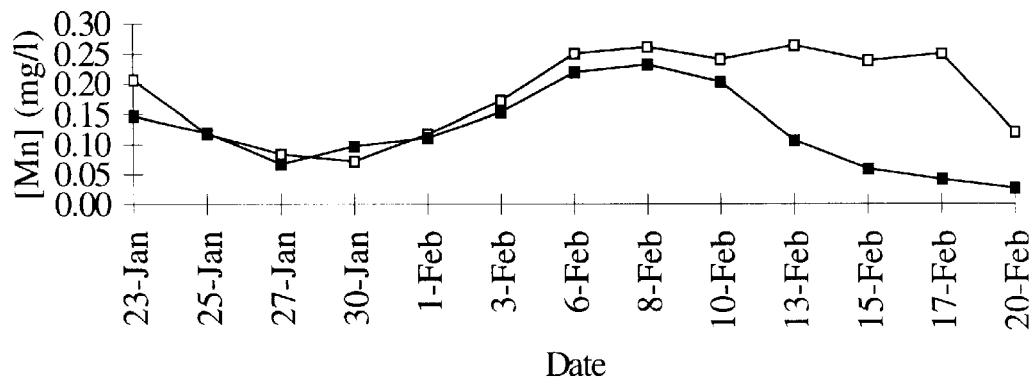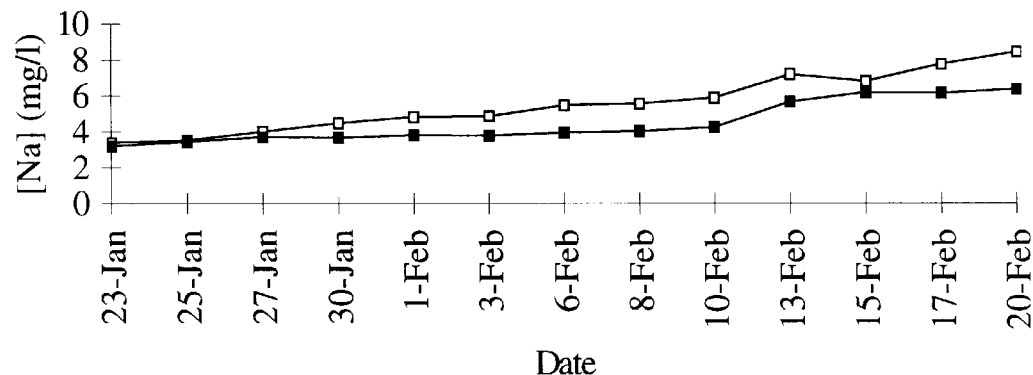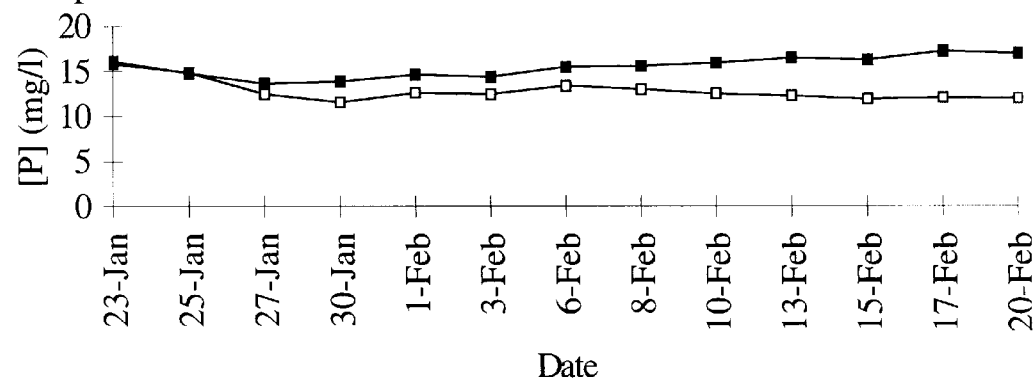
Figure 5.14

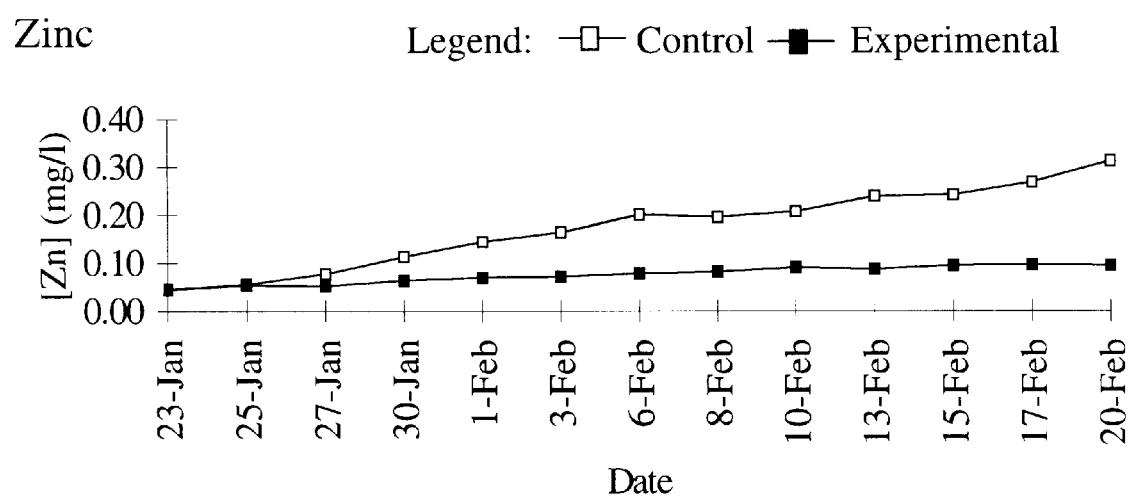
Figure 5.15

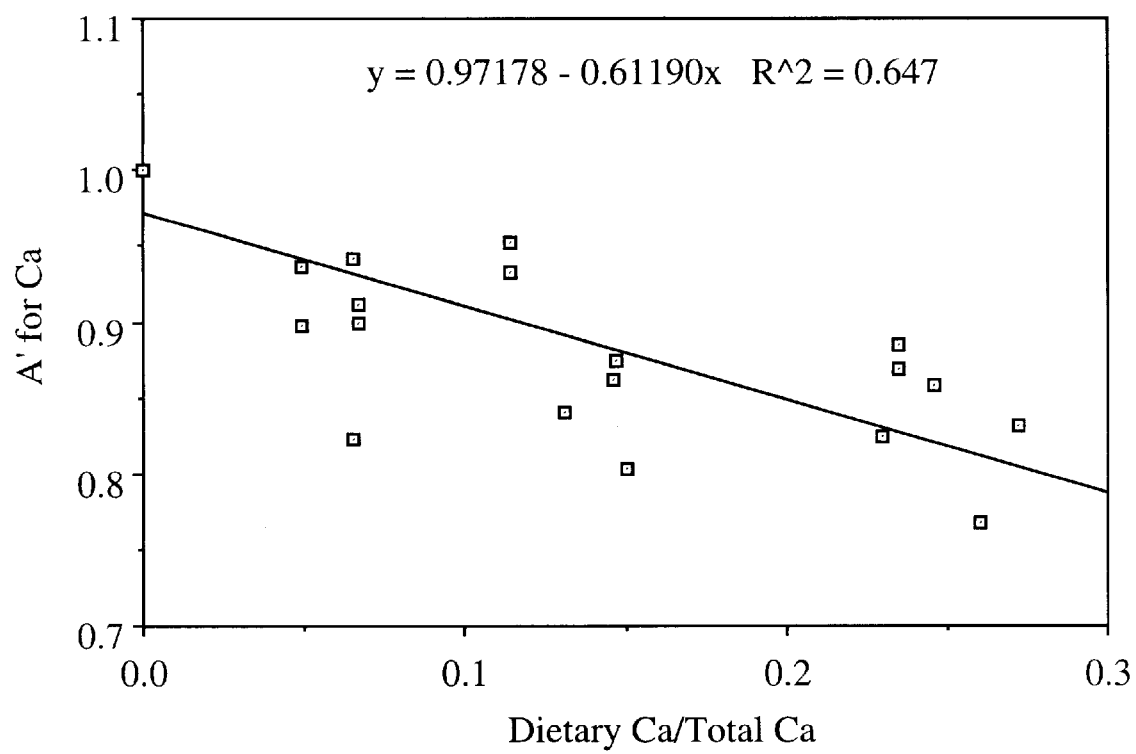
Figure A.12.1

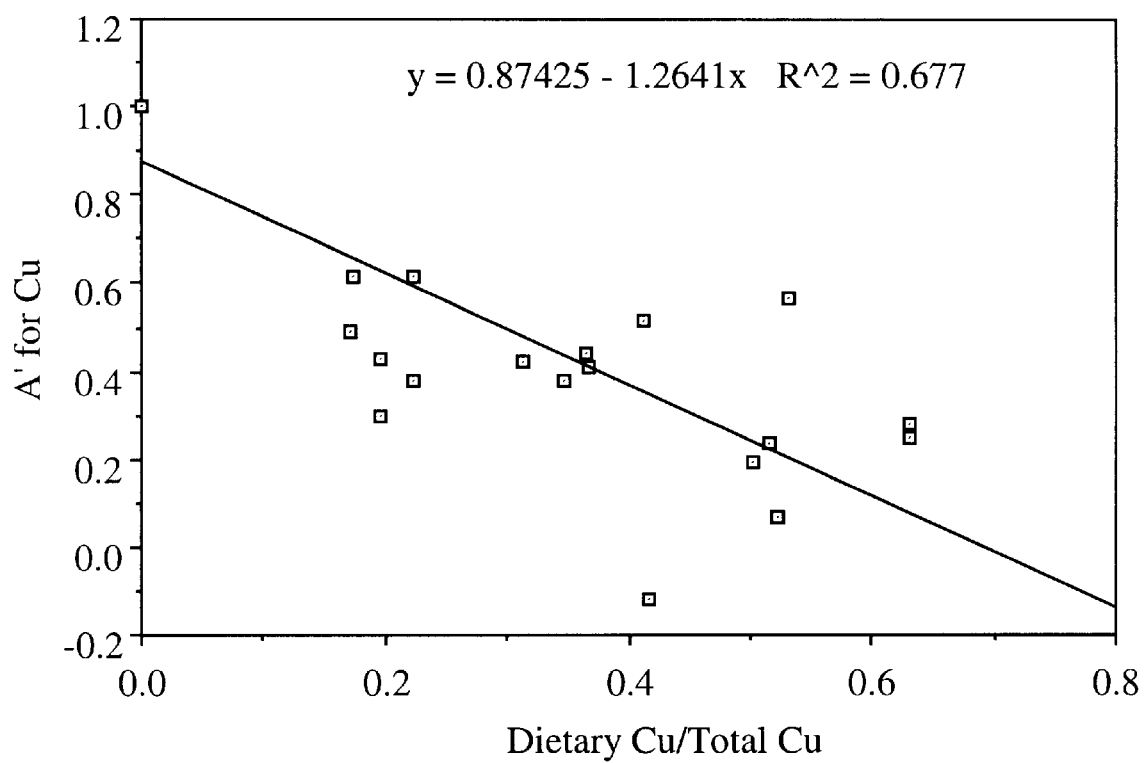
Figure A.12.2

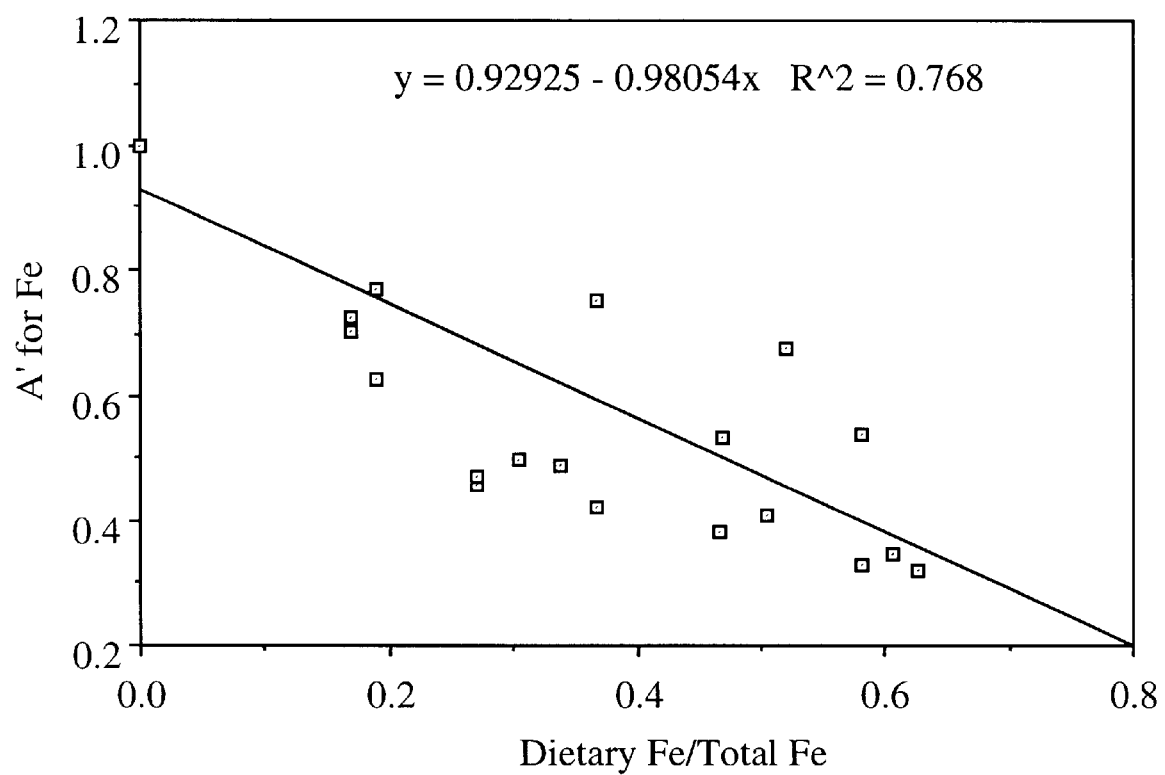
Figure A.12.3

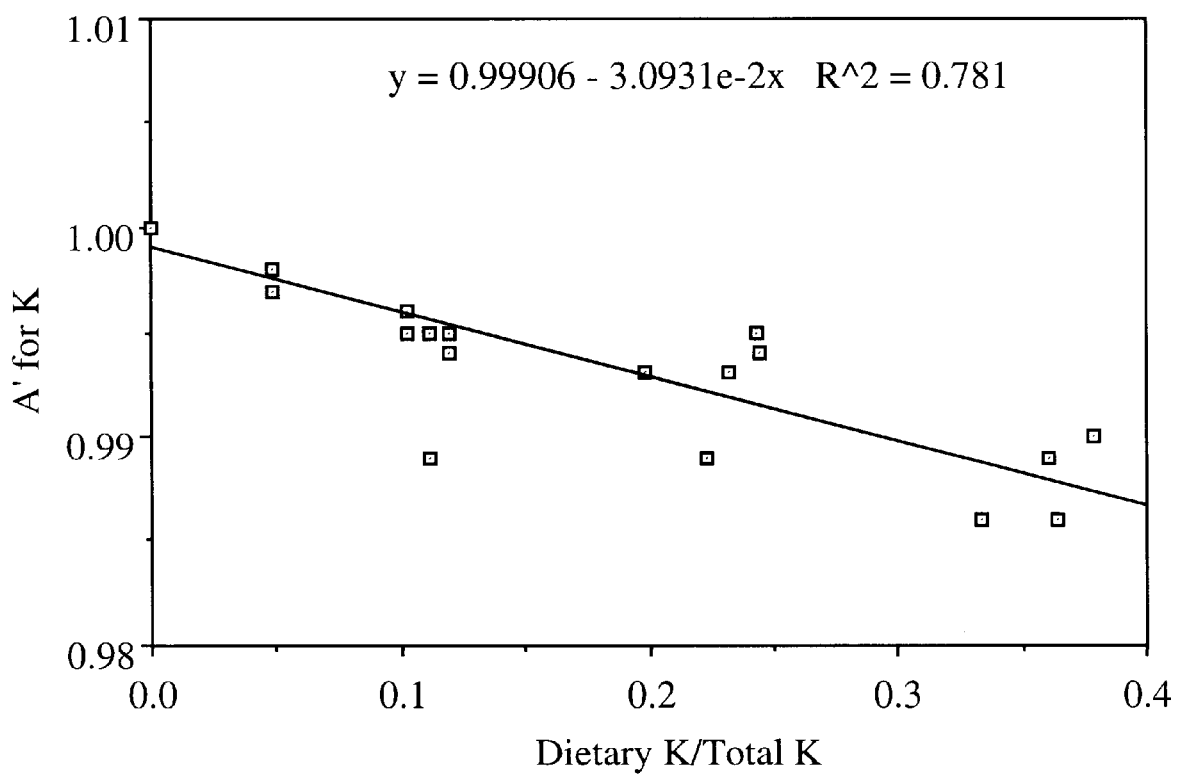
Figure A.12.4

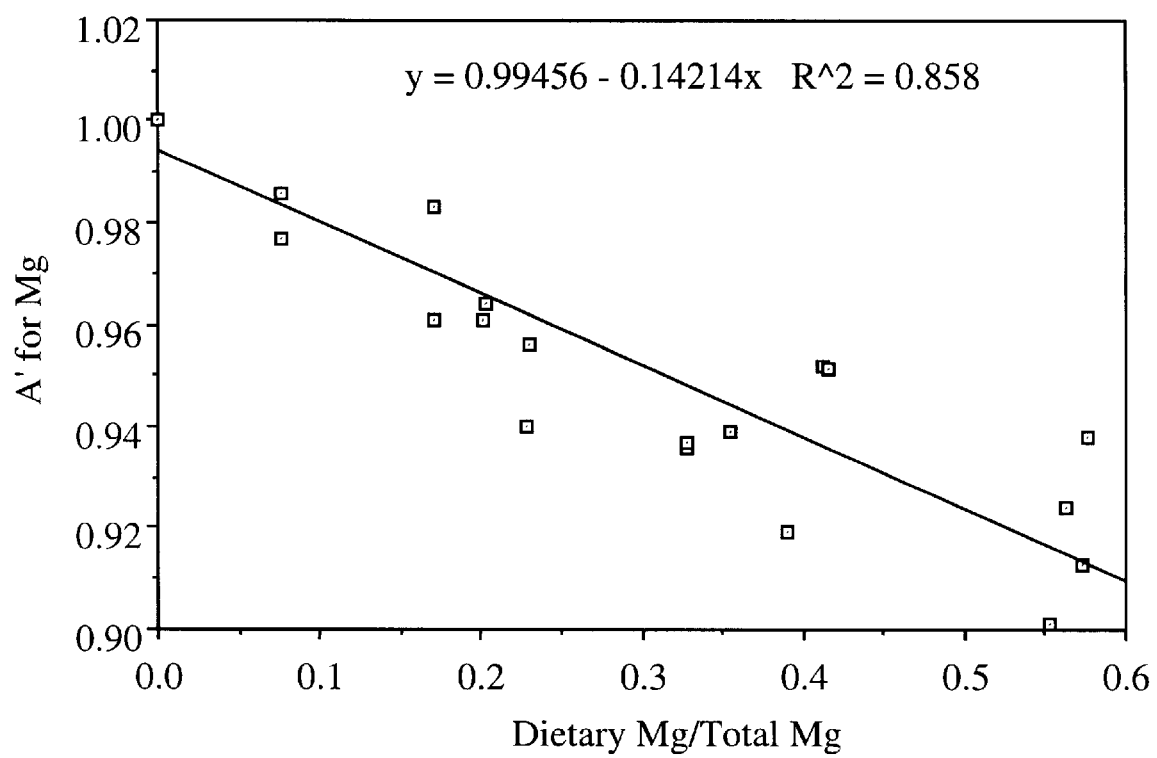
Figure A.12.5

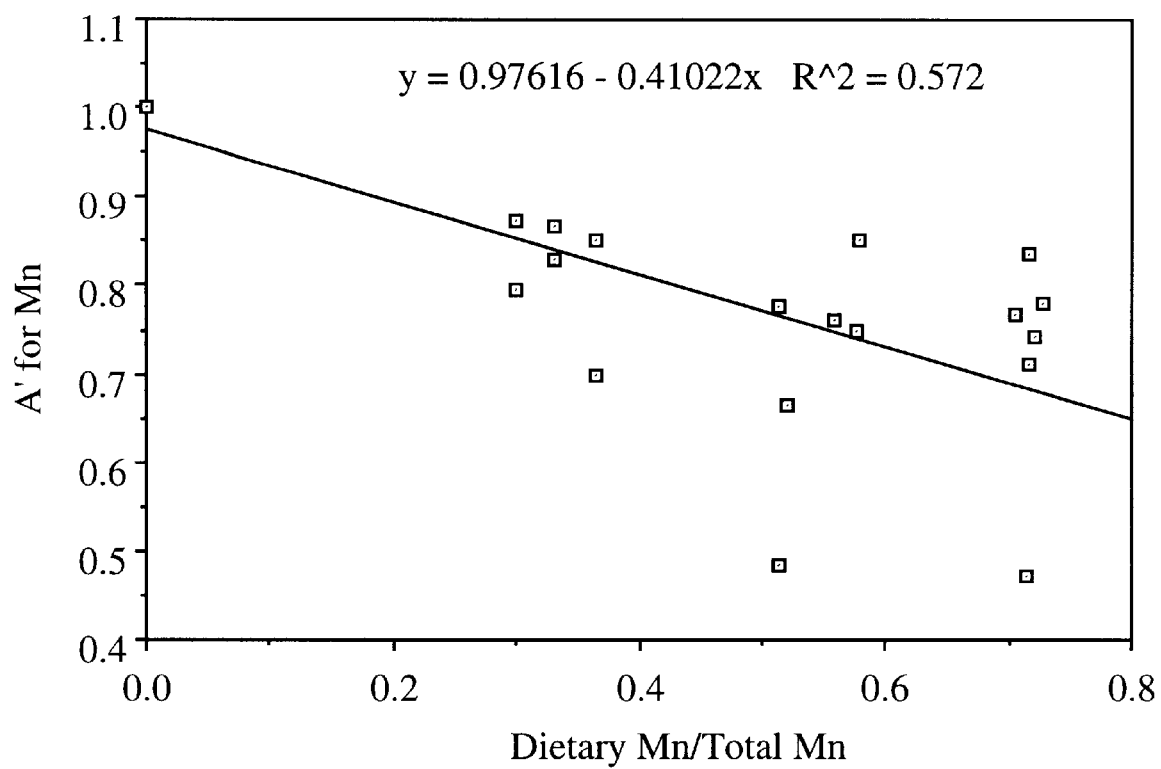
Figure A.12.6

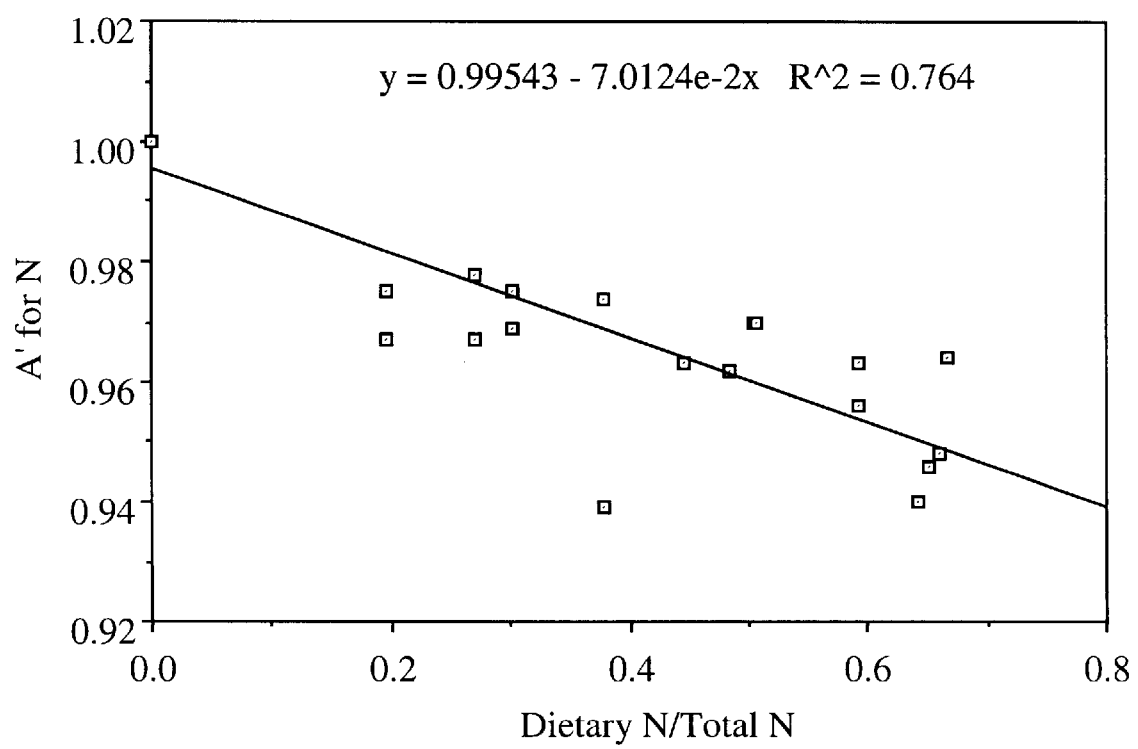
Figure A.12.7

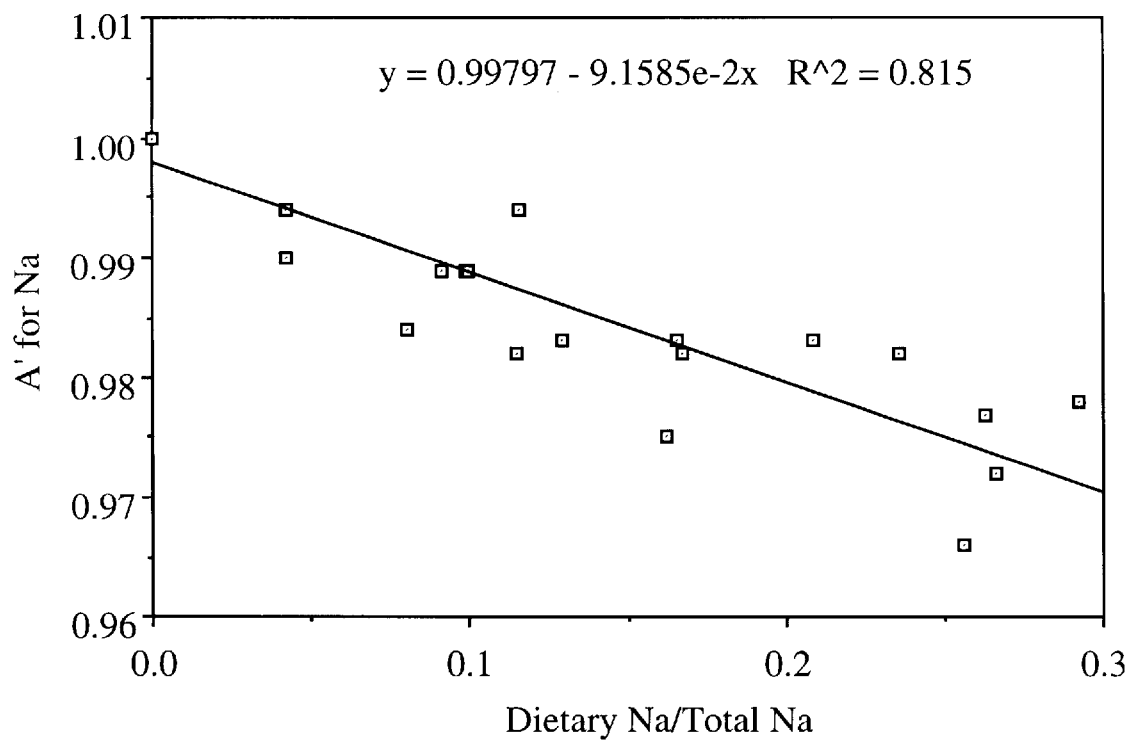
Figure A.12.8

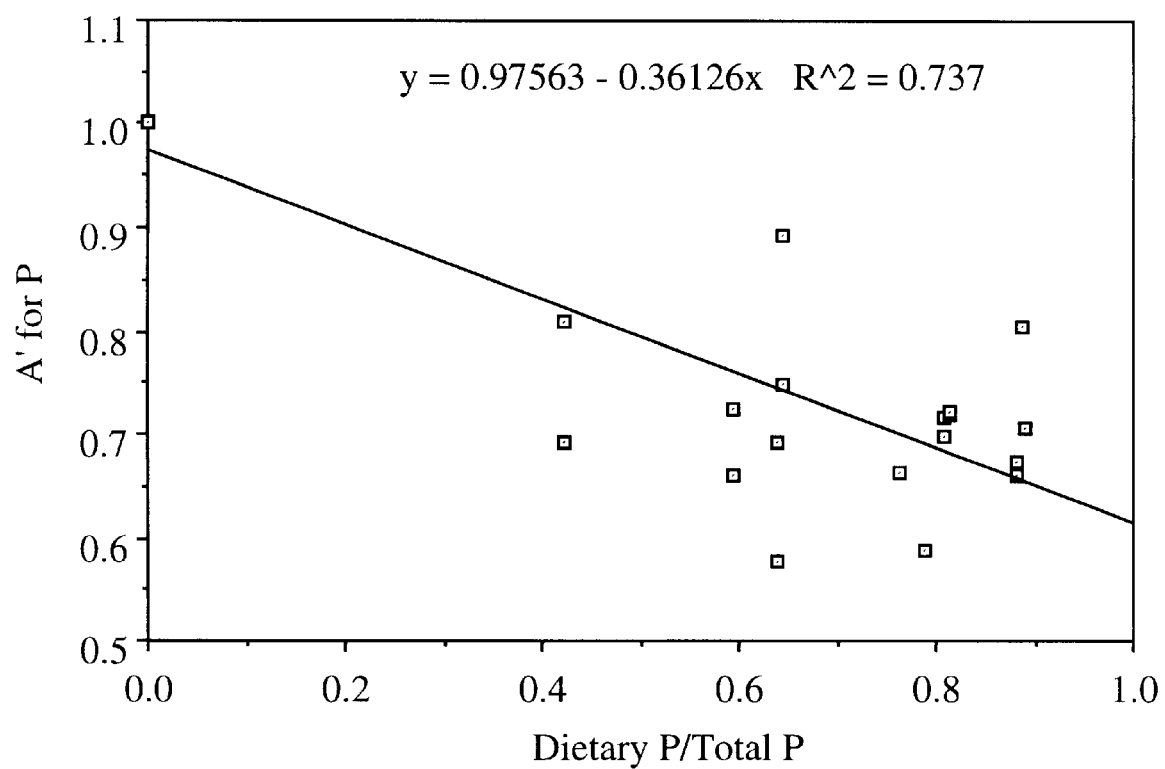
Figure A.12.9

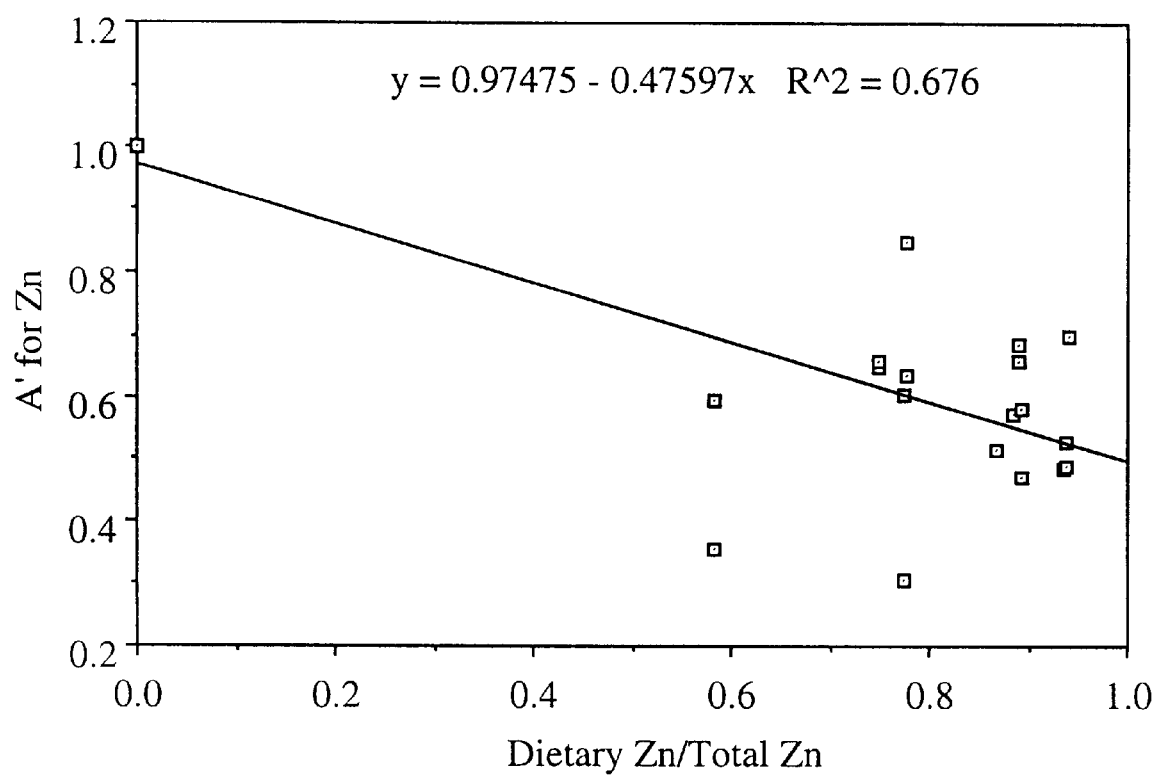
Figure A.12.10

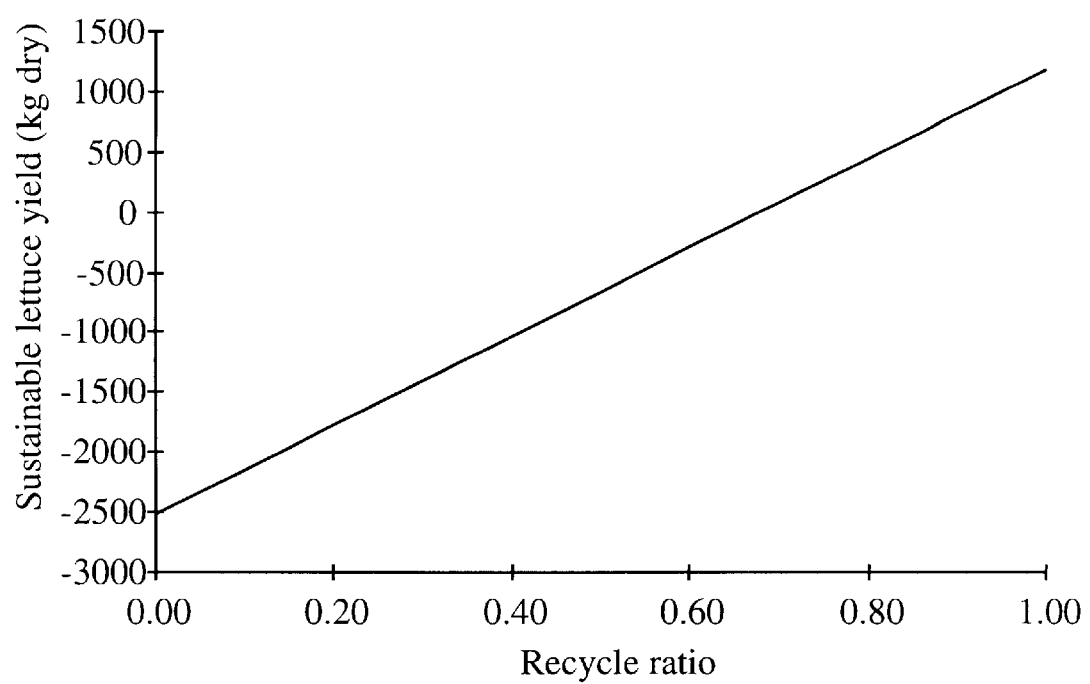
Figure A.16.1

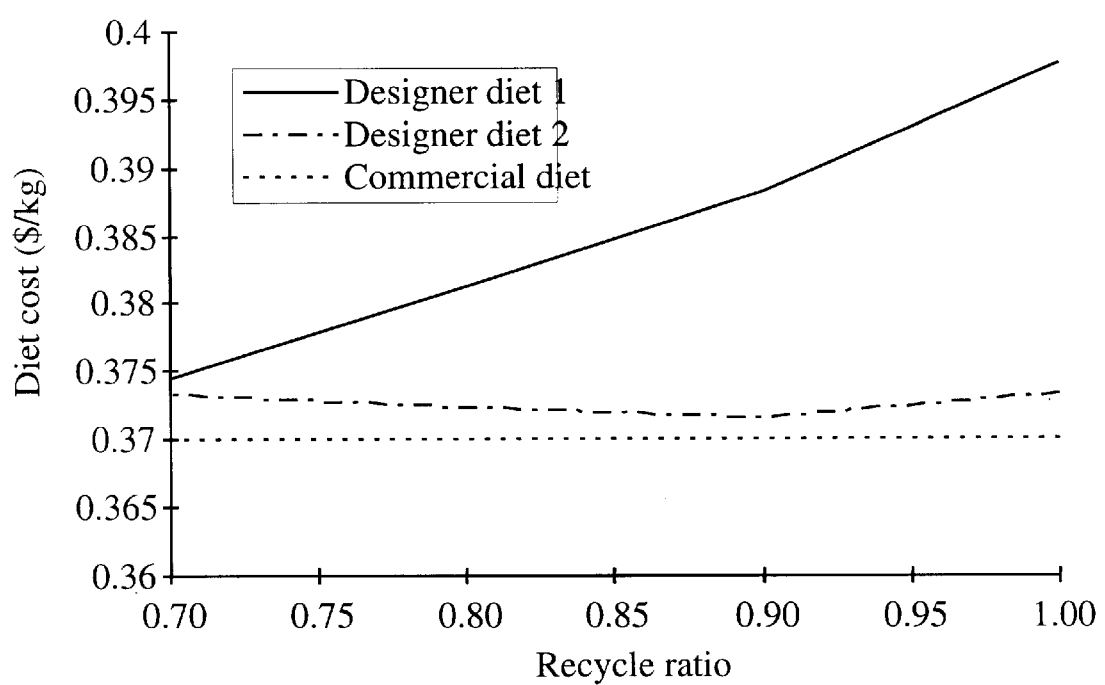
Figure A.16.2

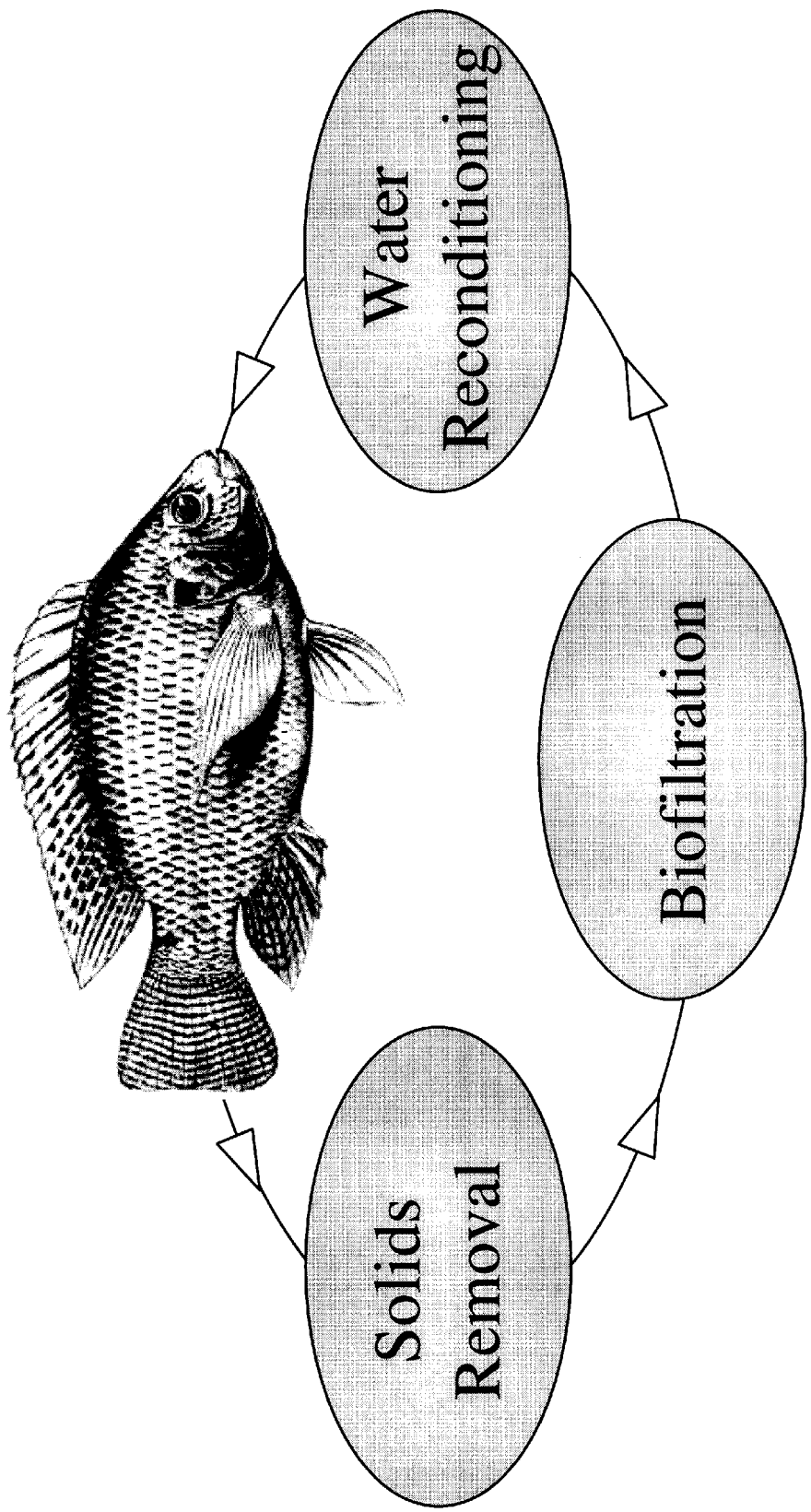
Figure I

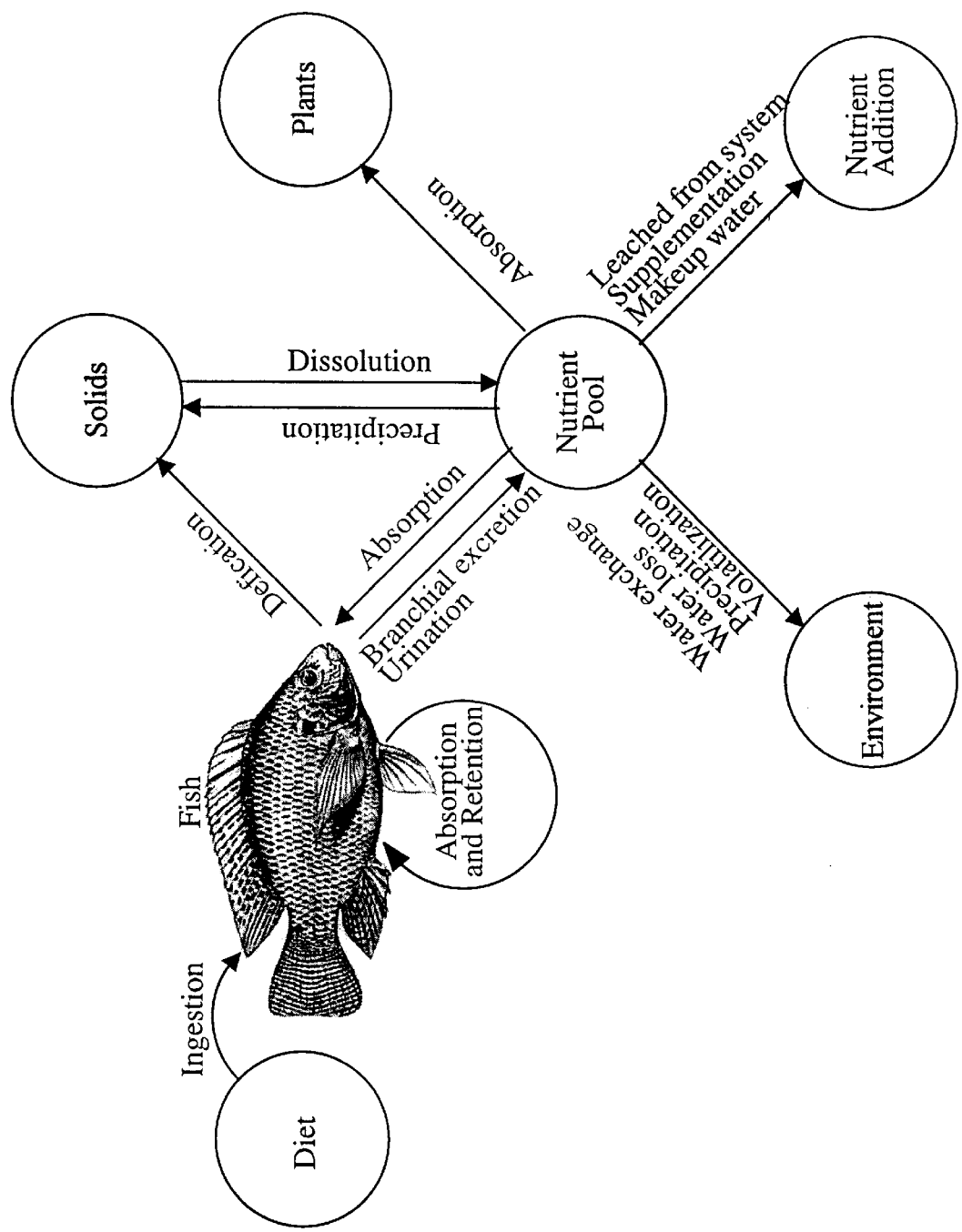
Figure II

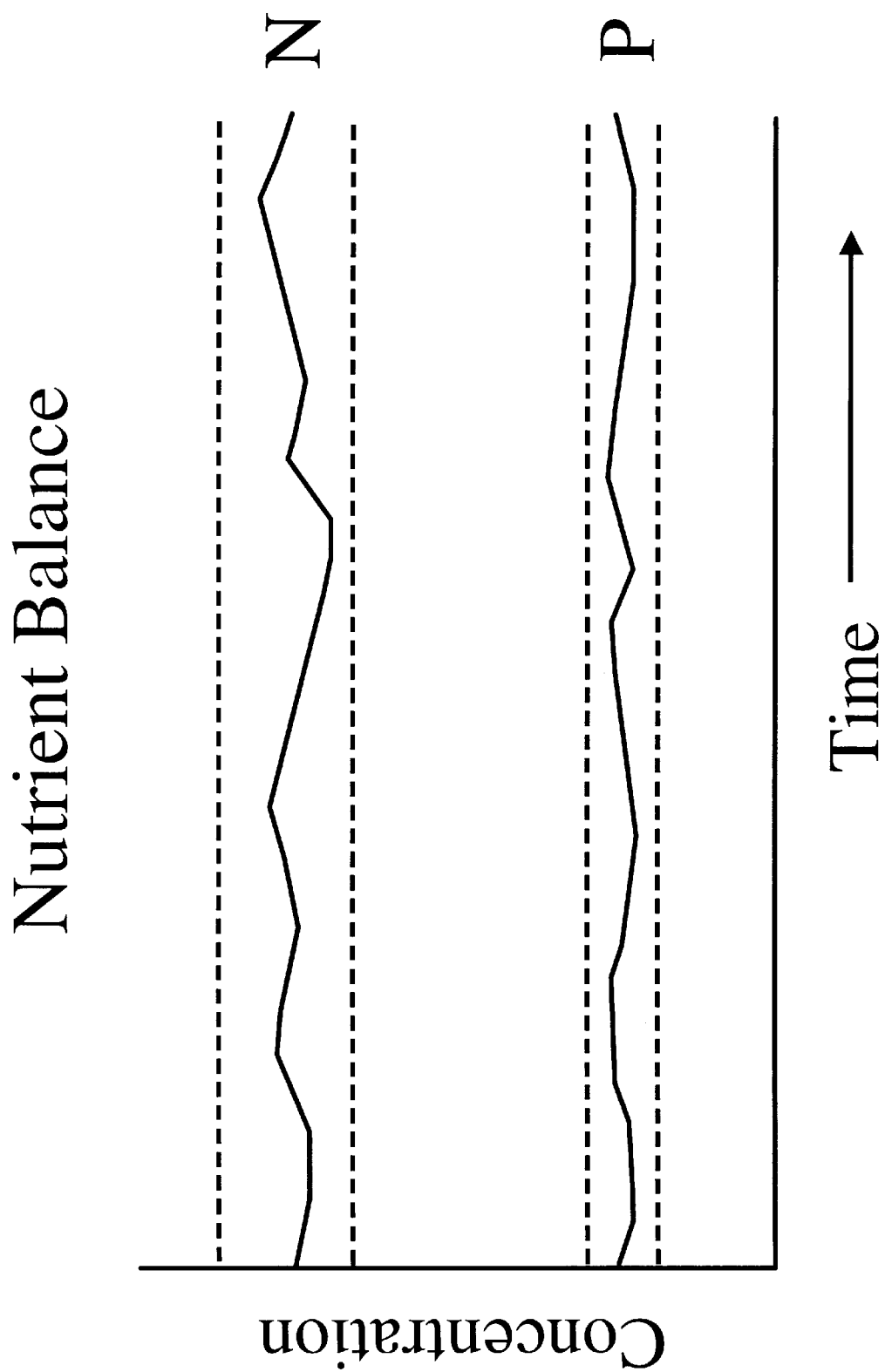
Figure III

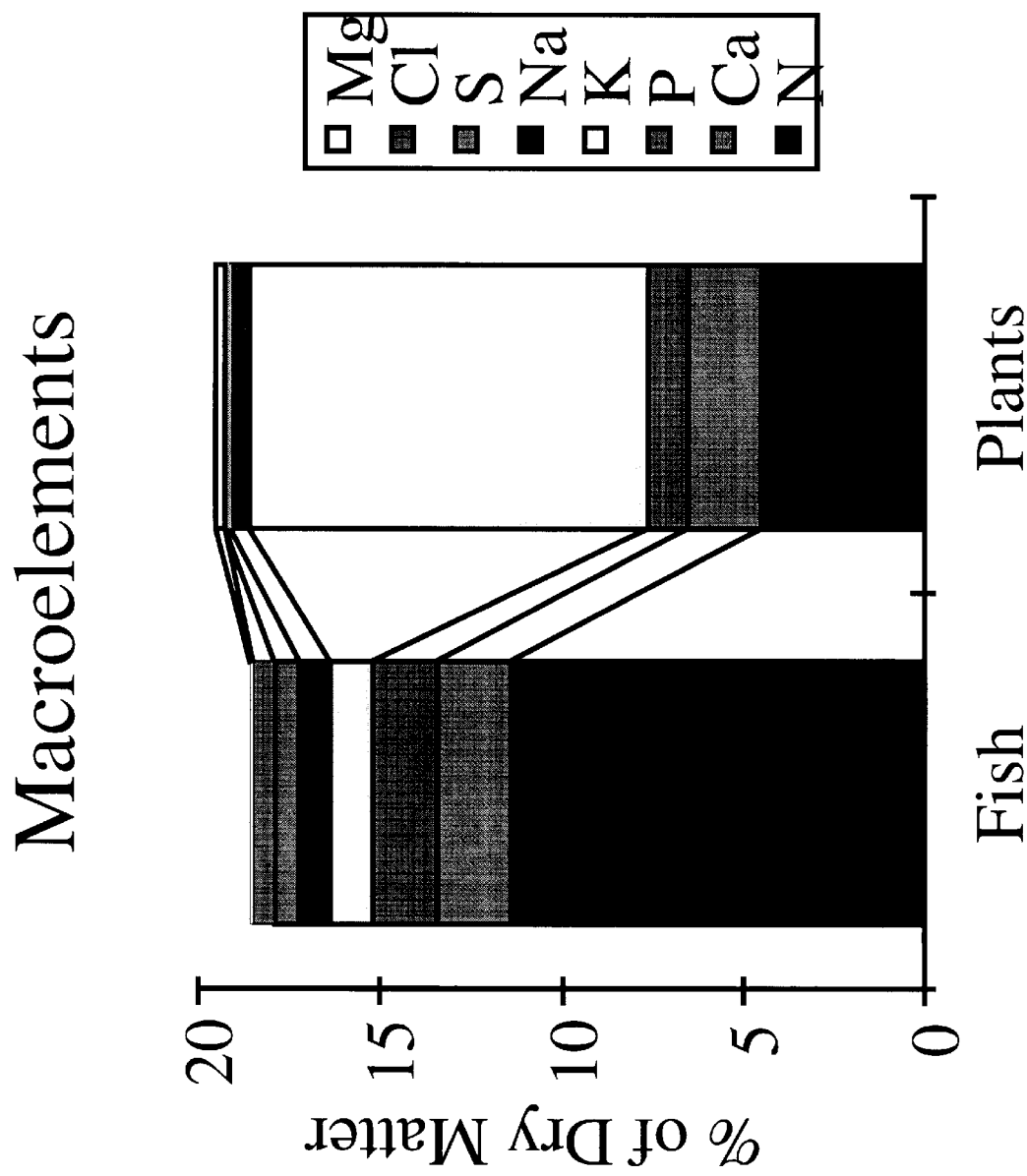
Figure IV

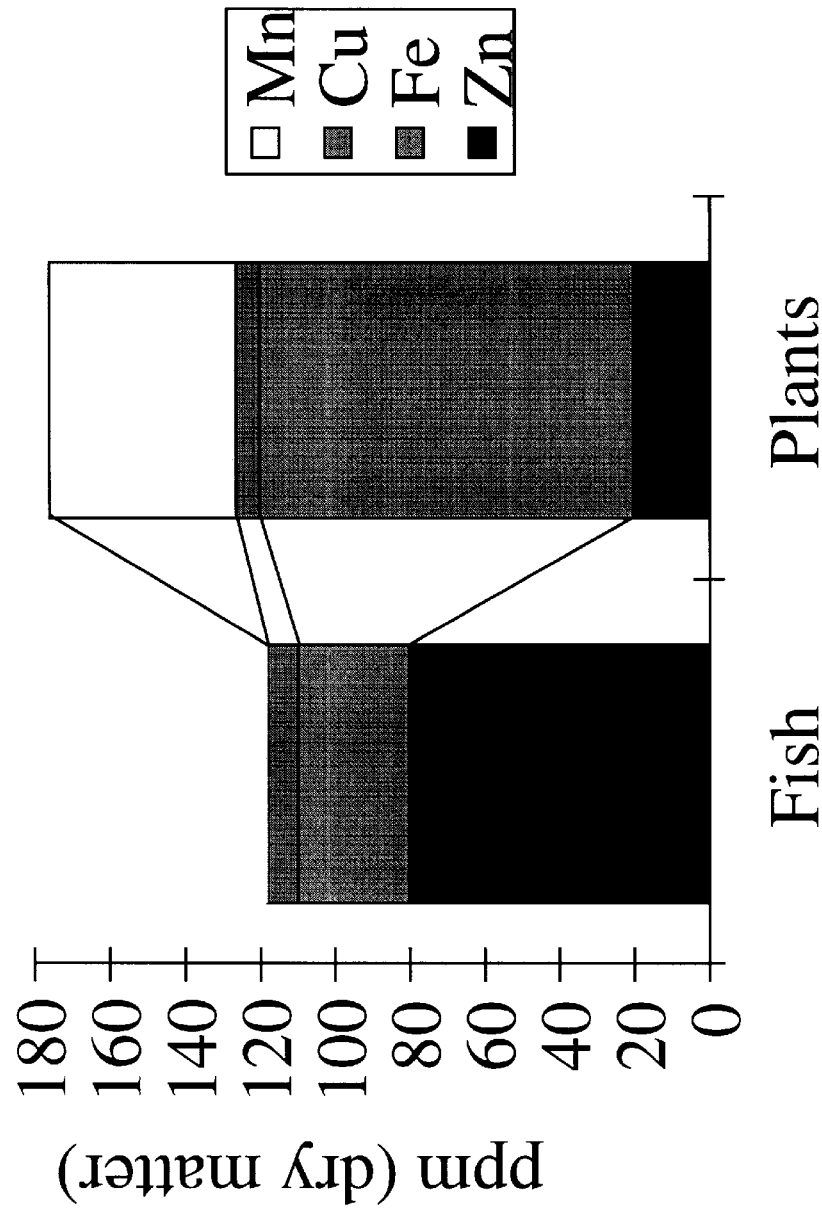
Figure V

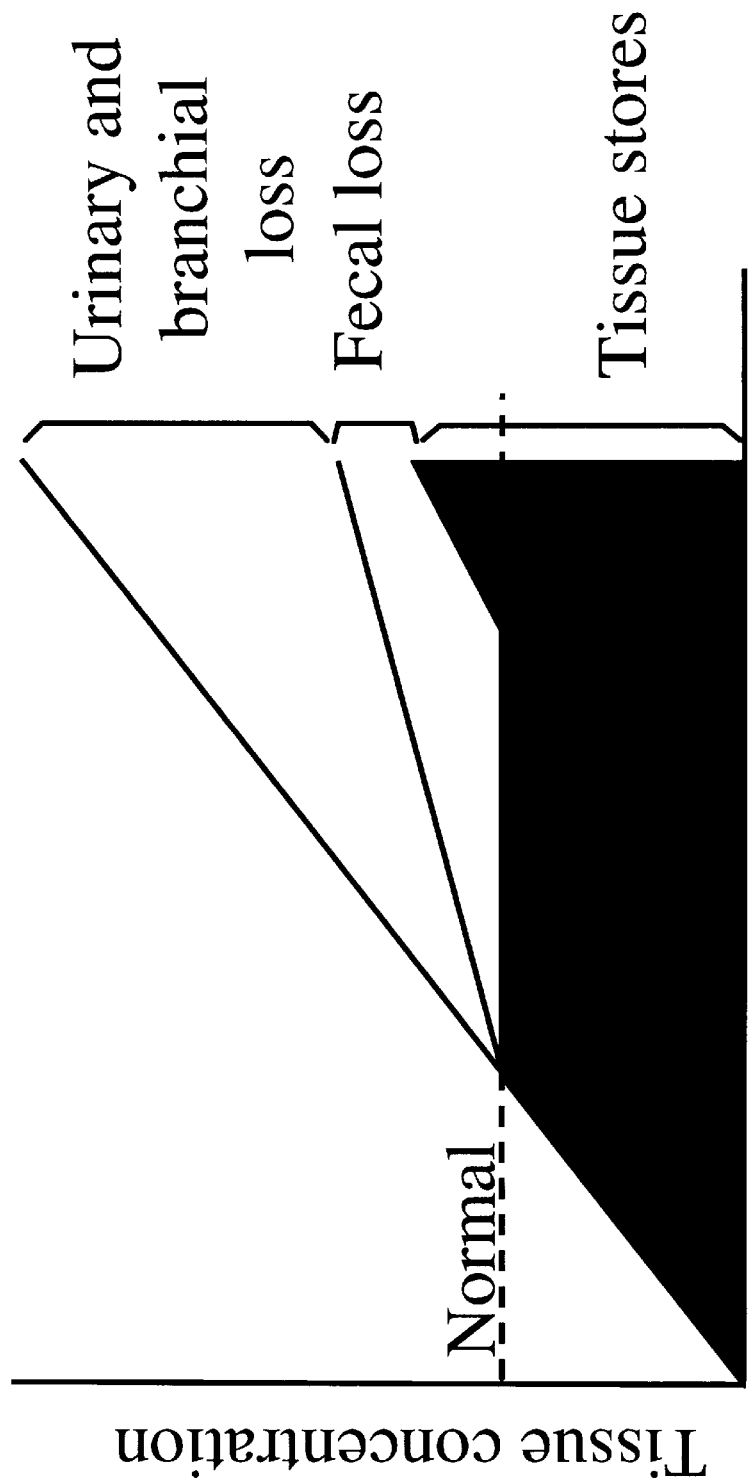
Figure VI

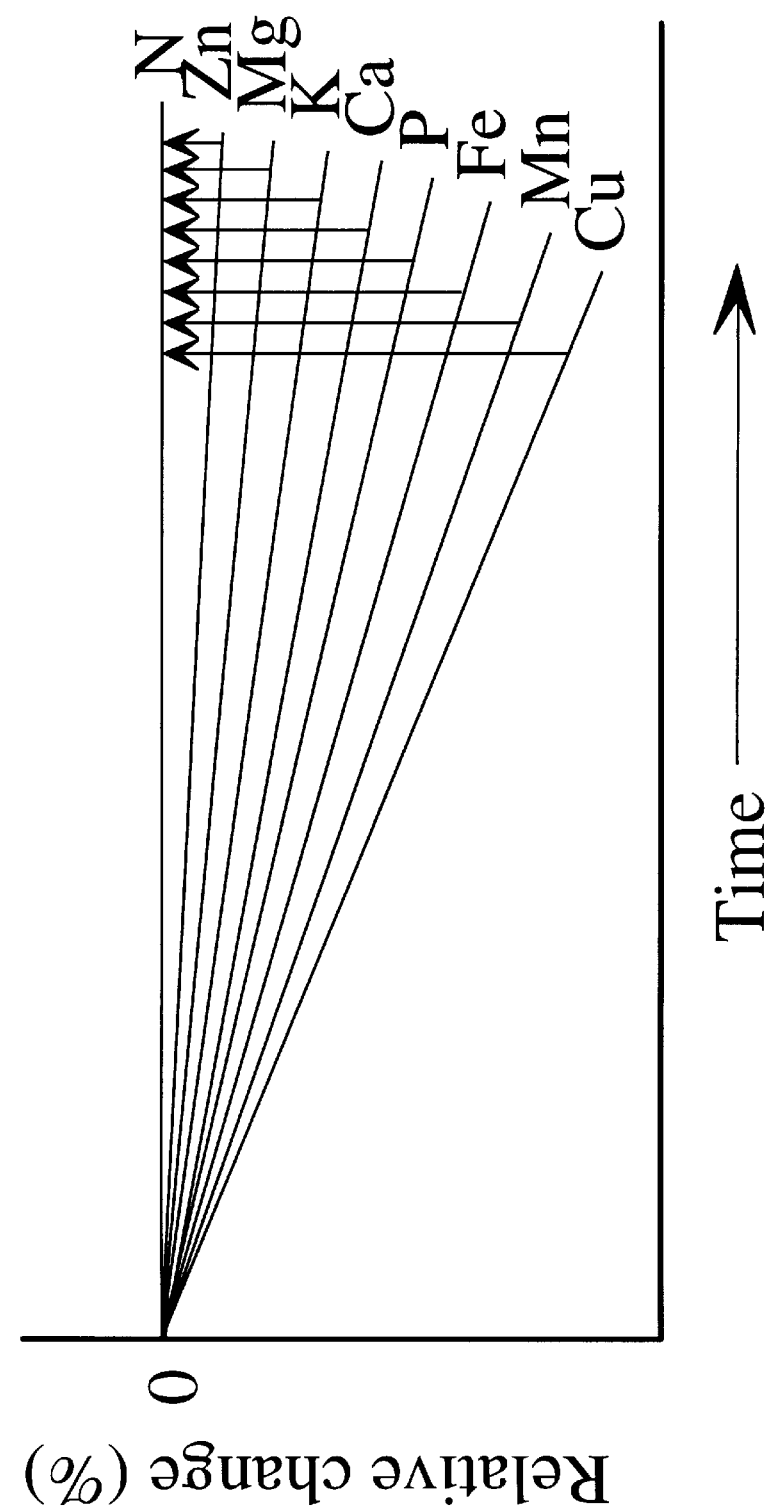
Figure VII

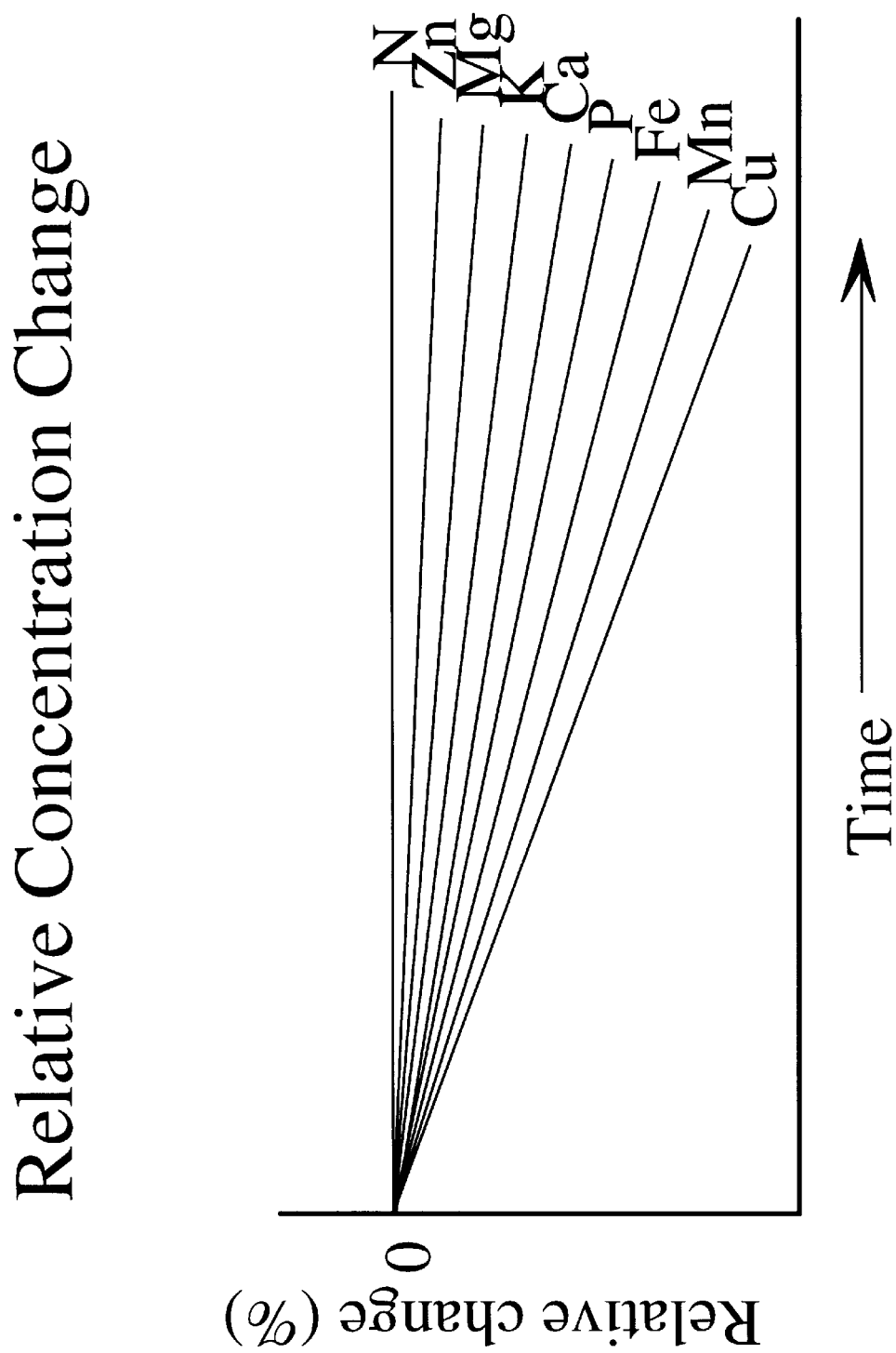
Figure VIII

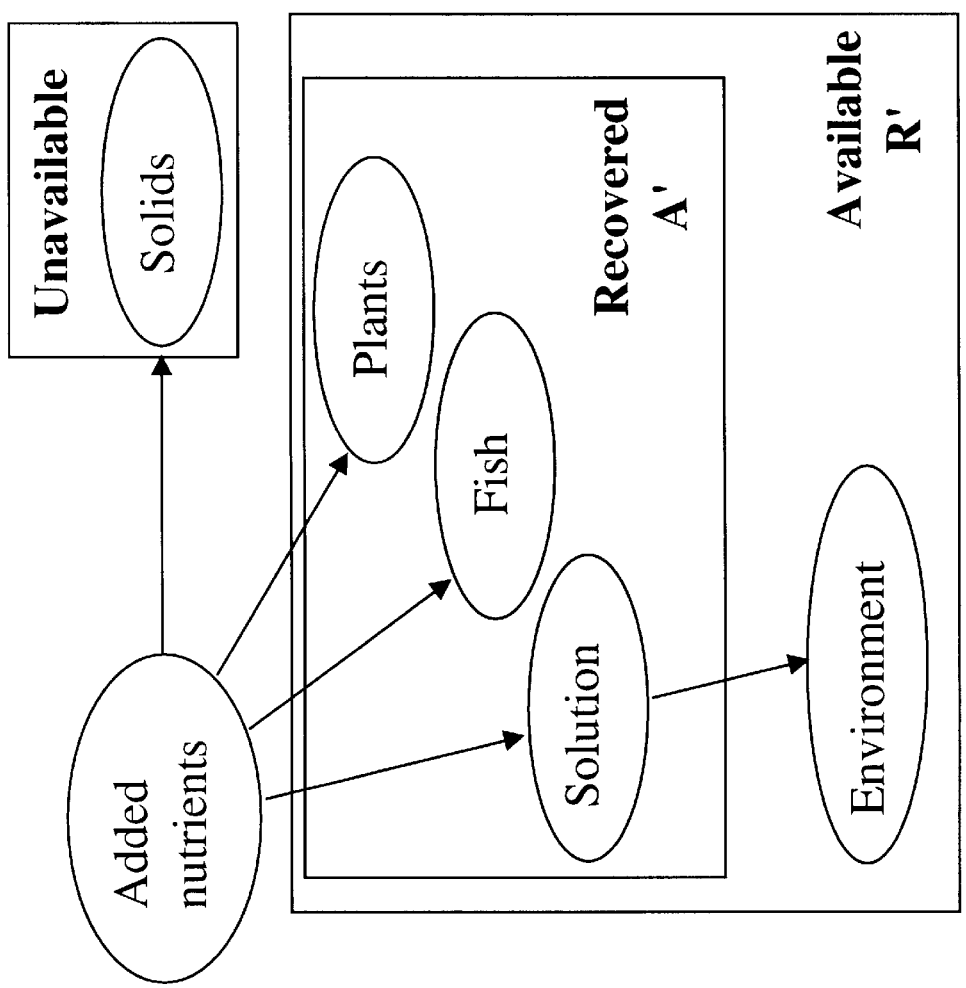
Figure IX $$(N_D + N_A) \, A'R' = N_F + N_P + N_R$$

Figure X $$[N]_D = \frac{N_F + N_P + N_R - N_A}{A'R'D}$$

Figure XI

Steps in Designer Diet Manufacture

- Determine diet quantity necessary for N equilibrium
- Determine the necessary mineral concentrations
- Determine dietary composition
- Determine composition of mineral mix
- Manufacture diet

Figure XII $$[N]_D = \frac{\dfrac{(R_F[N]_F + R_P[N]_P + Q_I[N]_O)}{A'R''} - R_E - Q_I[N]_I}{R_D}$$

Figure XIII

INTEGRATED AQUACULTURE-HYDROPONICS SYSTEMS: NUTRIENT DYNAMICS AND DESIGNER DIET DEVELOPMENT

CROSS-REFERENCE TO RELATED APPLICATIONS

This application is based on U.S. Provisional application Ser. No. 60/061,725, entitled "Integrated Aquaculture-Hydroponics Systems: Nutrient Dynamics and Designer Diet Development," filed by the same inventor on Oct. 10, 1997.

BACKGROUND OF THE INVENTION

1. Field of the Invention

This invention pertains to the field of aquaculture and in particular to the hydroponic cultivation of plants.

2. Description of the Related Art

The integration of aquaculture and the hydroponic cultivation of plants has been examined repeatedly over the past three decades with a wide variety of system designs, plant and aquatic animal species, and experimental protocols (Rakocy and Hargreaves 1993). This research was stimulated by the perceived merits of hydroponics as a method of reducing pollution from fish farms by removing nutrients from the culture water while generating additional revenue through the sale of hydroponic plant products. Closed, recirculating systems have generally been identified as the most appropriate aquaculture system types for integration with hydroponics (hereafter referred to as "integrated systems") because nutritional and environmental conditions can be maintained at levels sufficient for hydroponic plant culture (Nair et al. 1985). Despite the superiority of recirculating systems over other aquaculture system types, the prevalence of nutritional deficiencies and yield reduction in plants in prior studies utilizing recirculating systems, caused by deficient nutrient solutions and/or excessive salt accumulation, indicated that optimal nutrient concentrations could not be maintained over prolonged periods of time if commercially-available diets were used (Van Toever and MacKay, 1981; Sutton and Lewis, 1982; Burgoon and Baum, 1984; Wren, 1984; Fitzsimmons, 1985a, 1985b, 1985c; Nair et al., 1985; Zweig, 1986; Rakocy and Nair, 1987; Rakocy, 1989a, 1989b; Rakocy et al., 1989; Rakocy and Nair, 1987; Rakocy, 1989a, 1989b; Rakocy et al., 1989; Parker et al., 1990; Clarkson and Lane, 1991; Rakocy et al., 1993). As a result, continuous monitoring of nutrient concentrations, nutrient supplementation, and/or water replacement were required to correct for nutrient deficiencies and salt accumulation.

For a given integrated system operating at steady state with no nutrient supplementation, nutrient concentrations will theoretically increase, decrease, or remain constant over time if nutrient production by the fish is greater than, less than, or equal to the nutrient assimilation by plants and other losses, respectively. The rate of change in nutrient concentration can be influenced by varying the ratios of plants to fish (Rakocy et al. 1989; 1993), but the rates of change in concentration for individual nutrients differ because the relative proportions of soluble nutrients excreted by fish do not mirror the proportions of nutrients assimilated by plants. The disparity in accumulation (or reduction) rates of different nutrients quickly results in suboptimal concentrations and ratios of nutrients, thereby reducing the nutritional adequacy of the solution for plants. Accordingly, there does not appear to exist an optimal ratio of plants to fish capable of sustaining nutritionally-adequate nutrient solutions if standard fish diets are used.

The development of fish diets having modified mineral content (hereinafter referred to as "designer diets") has been suggested as a possible means of influencing the accumulation rates of nutrients and reducing or obviating the need to supplement nutrients artificially (Seawright, 1993). Theoretically, the mineral content of a diet can be manipulated to make the relative proportions of nutrients excreted by fish similar to the relative proportions of nutrients assimilated by plants. With such a diet, there would theoretically exist an optimal ratio of fish to plants resulting in optimal nutrient concentrations through time without substantial nutrient supplementation. According to Liebig's law of the minimum, the nutritive constituent present in a limiting amount determines the yield of a plant crop, provided that other environmental factors controlling growth are non-limiting (Douglas 1985). Accordingly, the low concentrations of several important plant nutrients in fish excreta limit plant growth in integrated systems if not supplemented to the solution. If the concentrations of these nutrients in the excreta were increased by augmenting the diet, potentially greater yields and greater utilization of previously underutilized nutrients might be realized.

The predominant technique used in the commercial hydroponics industry to maintain appropriate nutrient concentrations is to begin with a complete nutrient solution and partially or fully replace it on a periodic basis (Resh 1989). During the interim, changes in nutrient concentration are indirectly monitored by measuring the electrical conductivity of the solution and pH and nutrient concentration adjustments are made by metering in acids, bases, or nutrient solutions. The replacement of the nutrient solution is typically justifiable for commercial hydroponics growers because fertilizer comprises only a small component of the operating costs, while the complete replacement of nutrient solutions in integrated systems defies a central rationale for integrating aquaculture and hydroponics, namely the reclamation of otherwise wasted nutrients. In integrated systems, nutrients are continuously being lost in water discharged to help maintain water quality and remove solids. Therefore, if a dynamic balance between nutrient assimilation by plants and nutrient addition is established, periodic solution replacement becomes unnecessary.

Maintaining appropriate nutrient concentrations for plants is crucial because nutrient deficiencies, which dramatically lower yield and market appeal, quickly ensue. Once nutrient-specific deficiencies appear in plants, dramatic, often non-reversible physiological changes have already occurred. Hence, the management of the nutrient profile by the addition of exogenous nutrients once clinical deficiency signs appear is an impractical approach. Alternatively, assays for periodically tracking nutrient profiles, such as atomic absorption spectrophotometry or inductively coupled plasma emission spectrophotometry, are practical only for research facilities and the largest commercial hydroponics operations because of high costs and the technical expertise required. Older colorimetric and titrimetric techniques, while reliable and technically sound, are time consuming and require adequate facilities and expertise. The development of designer fish diets, which would maintain nutrient profiles at near-optimum levels for prolonged periods by creating a dynamic balance between nutrient inputs and outputs, may therefore be of commercial value.

The creation of a designer diet development protocol requires extensive quantitative information on the flow of nutrients through integrated systems. But because the possible combinations of plant and aquatic animal species, system components, operational protocols, and environmental parameters are virtually limitless, a practical approach is to first study nutrient flow within a representative integrated system. Using data derived from a representative integrated system, a dietary inclusion model might be developed, based on principles conserved among all integrated systems.

The concept of designer diet development relies fundamentally on the principle that excretion of soluble minerals by fish will increase in response to increased concentrations or quantities of minerals in the diet. Accordingly, the initial objective of this study was to determine the effect of differing fish biomasses (and hence feed mineral input) on the accumulation rates of different minerals within culture systems having equivalent plant yields. This would serve as a simulation of differing dietary mineral concentrations for those minerals for which soluble nutrient excretion increases with dietary concentrations. Positive responses would indicate which minerals are likely candidates for dietary manipulation. Differences in individual mineral accumulation rates would support the general finding that minerals accumulate at different rates when standard fish diets are used and would indicate that creating equilibrium concentrations for numerous minerals would require differential mineral supplementation.

The ultimate objective of the research was to use quantitative data derived during initial experiments to develop and adequately test a model that would predict the dietary inclusion rates of minerals necessary for maintaining static dissolved mineral concentrations at near-optimal levels for hydroponically-grown plants. This would be accomplished by comparing the changes in concentrations of dissolved minerals between treatments receiving a designer diet and those receiving a control diet not having mineral supplementation above and beyond the requirements of the fish. In the designer diet, the candidate minerals would be manipulated according to the dietary inclusion model. Obtaining equilibrium mineral concentrations at the predicted dietary mineral concentrations would verify the model.

LITERATURE REVIEW

Integrated System Design

Rakocy and Hargreaves (1993) reviewed the literature on the integration of vegetable hydroponics and fish culture. The system designs, plant and animal species used, and hydroponic techniques employed varied widely, but an optimum arrangement of unit process components emerged from the comprehensive review. This arrangement consisted of (in direction of solution flow) a rearing tank for the aquatic animals, solids removal mechanism, biofilter, hydroponics subsystem, and sump.

Nutrient Dynamics

The majority of studies have been conducted under conditions in which nutrient supply was much greater than nutrient assimilation by plants (Rakocy and Hargreaves 1993). Accordingly, the accumulation of salts has been a common occurrence, indicating that higher plant to fish ratios are required. Optimizing component ratios in integrated systems using standard fish diets has been examined by Rakocy (1989b) and Rakocy et al. (1993). They examined the effect of varying the ratios of plants to fish (numbers), ranging from 1.2 to 7.5, on the production of lettuce and the total accumulation of salts as indicated by solution electrical conductivity. They determined that maximum plant yield occurred at a ratio of 1.9 plants (romaine lettuce, Lactuca sativa) to fish (Tilapia nilotica), but total dissolved solids (TDS) concentrations climbed to 900 mg/l in 21 weeks. At this rate of accumulation, systems would have to be flushed at approximately 40-week intervals assuming salt-induced phytotoxicity occurs at 2000 mg/l TDS. The rates of TDS accumulation were inversely proportional to the plant to fish ratio and TDS accumulated in a linear fashion at each treatment level. The accumulation rates of nitrate ($NO_3$—N), sulfate ($SO_4$—S), potassium (K), calcium (Ca), and magnesium (Mg) in the solutions differed substantially between treatments and decreased with higher ratios of plants to fish. At all ratios, the accumulation rates of $NO_3$—N, $SO_4$—S, K, Ca, and Mg were positive, leading them to suggest that the plant component should be vastly increased to keep pace with nutrient production by fish. Total dissolved solids accumulation was slight at a ratio of 7.5, but nutritional deficiencies in plants were observed. The salts KOH and CaO were added to maintain pH above 6.5 and augment Ca and K concentrations, because in practice, those minerals were deficient in the fish excreta. In summary, Rakocy et al. (1993) demonstrated that the accumulation rates of nutrients differed when the plant to fish ratios were varied, and that the accumulation rates of individual nutrients differed within treatments.

Nutrient Mass Balance

The most thorough study of the allocation of nutrients in integrated systems was reported by Parker et al. (1990). Concentrations of Ca, copper (Cu), iron (Fe), K, Mg, manganese (Mn), sodium (Na), and zinc (Zn) in lettuce root and shoot tissue, fecal solids, and fish feed were determined using atomic absorption spectroscopy. These data were used to calculate, using a mass balance model, the relative order in which nutrients would become limiting to lettuce plants. They reported that the theoretical number of lettuce plants that could be grown with a given quantity of dietary nutrient could be determined using the equation:

$$x = \frac{Fe - Fi}{L}$$

where:
  x=number of potential lettuce plants/kg fish food
  Fe=nutrients in 1 kg fish feed (dry) added to a system per crop cycle
  Fi=nutrients in 0.19 kg dry wt. fish tissue (estimated quantity of dry fish yield during the crop cycle)
  L=nutrients contained in 1 lettuce plant The order of limitation, from first limiting nutrient to last limiting nutrient was calculated to be: Ca, K, Fe, Mg, Na, phosphorus (P), Zn, nitrogen (N), Cu, and Mn. The model did not explicitly account for nutrients removed in the solids or lost from the systems, but they stated that the actual number of plants capable of being cultivated is likely less than one-half of the predicted value because of the low observed recovery of nutrients.

Essential Elements for Fish

Calcium

Calcium is readily absorbed from the environment through the gills, skin, oral epithelia, and fins of fish, and is actively absorbed from the diet (NRC 1993). Calcium is excreted primarily by the gills and kidneys although some may be excreted in the gut (Lall 1989). Sufficient Ca is provided by the ingredients in practical diets to meet the requirements of fish (NRC 1993). Calcium and Mg are typically present in low-solubility, complex organic salts with variable degrees of availability and have been demonstrated to interact in the nutrition of both fish and domestic animals (Hilton 1989). Deficiencies in Mg results in renal calcification or nephrocalcinosis (Cowey et al. 1977; Knox et al. 1981, 1983). Although it is apparent that the Ca concentration of a diet influences Mg nutrition, it is not apparent that increasing dietary Ca increases the Mg requirement in the diet (Knox et al. 1981). Hilton (1989) proposed that this observation was due to the ability of fish to absorb Mg from the environment to augment any deficiencies. The availability of Ca may further be reduced by elevated levels of Mg, Sr, Zn, and Cu (Podoliak 1970). Calcium is bound by phytate, thereby reducing the bioavailability of Ca from certain plant sources and Ca availability generally increases as stomach pH decreases by increasing Ca salt solubility (Tacon 1990). Robinson et al. (1987) reported that the dietary Ca requirement of *Tilapia aurea* in Ca-free water was 0.7% of the diet.

Calcium is low in concentration in fish excreta and in the absence of submerged calcareous media, Ca supplementation is required in integrated systems to maintain adequate concentrations for plants unless the fish biomass or the concentrations in the replacement water are sufficiently high (Rakocy et al. 1993). Calcium actively precipitates as hydrous calcium phosphate at elevated pH levels, further reducing availability (Gerber, 1985).

Copper

Fish readily absorb copper from the gastrointestinal tract, gills, fins, and skin, but Cu bioavailability is reduced by high levels of phytate, Zn, Fe, Mo, Cd, inorganic sulfates, and $CaCO_3$ (Tacon 1990). Fish are much more tolerant of elevated dietary than dissolved Cu concentrations because Cu toxicity is observed at environmental concentrations less than 1.0 mg/l in many fish species (Friedman and Shibko 1972) while dietary concentrations as high as 655 mg Cu/kg have been fed to fish without producing toxicity (Knox et al. 1982; Lanno et al. 1985). However, dietary Cu cannot be ignored because toxicity has apparently been demonstrated at dietary inclusion rates as low as 13 mg/kg (Tacon 1990). Channel catfish require 5 mg/kg (Gatlin and Wilson 1986); rainbow trout and common carp require 3 mg/kg (Ogino and Yang 1980); and Atlantic salmon require 5 mg/kg (Lall and Hines 1987).

Iron

Iron is readily absorbed from the environment by fish (Roeder and Roeder 1966), but because environmental concentrations of soluble Fe are typically low, feed is considered the primary source (Lall 1989). Dietary Fe availability is depressed by high dietary levels of phytate, phosphate, Ca, Cu, and Zn (Tacon 1990). Inorganic Fe forms are generally more available than organically-bound sources (Tacon 1990) although the bioavailability of Fe in feedstuffs is not well established for fish. The Fe in plant feedstuffs can be bound in the Fe-phytin complex, which is unavailable to fish. Ferrous iron ($Fe^{+2}$) is more readily absorbed than the ferric ($Fe^{+3}$) form. Ascorbic acid nutrition is strongly involved in the metabolism of Fe although elevated levels of ascorbic acid did not appear to increase Fe absorption when the ferrous form predominated in the diet (Lanno et al. 1985b). Catfish require 30 mg Fe/kg (Gatlin and Wilson 1986), Atlantic salmon require 60 mg/kg(Lall and Hines 1987), and eel require 60 mg/kg (Nose and Arai 1979).

Potassium

Potassium is readily absorbed by fish from the environment although chinook salmon are unable to satisfy their entire requirement from the water if low K diets are fed (Shearer 1988). The abundance and high bioavailability of K in feedstuffs typically precludes dietary supplementation and the biological availability of K in natural feedstuffs is typically high because it is present primarily in freely-soluble forms. Shearer (1988) demonstrated that in chinook salmon, whole body K concentration was saturated at a dietary level between 0.6 and 1.2% of the diet and they concluded that the fish required 0.8% K in the diet.

Magnesium

Magnesium is absorbed directly from the environment or the diet, although branchial uptake of Mg has yet to be demonstrated (Lall 1989). The Mg requirement of rainbow trout can be met by water-borne or dietary sources and the requirement may be fully met if water-borne concentrations are sufficiently high (Shearer and Åsgård 1992). In freshwater fish, most of the excess dietary Mg is excreted renally (Oikari and Rankin 1985). Low Mg levels with high Ca levels may cause renal calcification and nephrocalcinosis (Cowey et al. 1977; Knox et al. 1981, 1983). Dabrowska et al. (1989b) demonstrated the relationship between protein level and Mg requirement by mitigating Mg deficiency and toxicity signs in *T. nilotica* by increasing protein level. They concluded that the Mg requirement of *T. nilotica* was increased by incremental increases in protein concentration and that mild excesses of dietary Mg could have pronounced effects on fish, particularly at low protein levels. At low protein levels with Mg-deficient diets, whole-body hypercalcinosis was evident. Increased levels of Mg in the diet generally resulted in increased whole body levels of Mg, Ca, K, and P. Magnesium-deficient and Mg-excessive diets also led to poor growth. Dramatic growth retardation at elevated dietary Mg concentrations (0.32%) and low protein levels (24%) and slight growth retardation at high protein levels (44%) were apparent. The Mg requirements for most fish are approximately 0.04–0.06% of diet (Ogino and Chiou 1976; Ogino et al. 1978; Nose and Arai 1979; Knox et al. 1981; Gatlin et al. 1982; Shearer 1989). Dabrowska et al. (1989b) determined the dietary Mg requirement of *T. nilotica* to be 0.06–0.08% of the diet and Reigh et al. (1991) recommended that *T. aurea* diets should contain at least 0.05% Mg for optimum growth and normal tissue mineralization. Dabrowska et al. (1989a) compared the availability to *T. nilotica* of Mg in the supplements Mg-acetate, Mg-sulfate, and Mg-oxide, and found that the acetate had the greatest Mg bioavailability, followed by the oxide and sulfate.

Manganese

Manganese uptake from the environment has been demonstrated (Miller et al. 1980) although the mechanics are poorly understood. Manganese is more efficiently absorbed gastrointestinally, although absorption is low. High dietary levels of phytates, Ca, and P further depress Mn absorption (Lall 1989). Manganese sulfate was found to have the greatest availability of several Mn compounds ($MnSO_4$, $MnCO_3$, $MnO_2$, and $MnCl_2$) to carp (Satoh et al. 1987). Manganese requirements have been demonstrated for catfish (2.4 mg/kg; Gatlin and Wilson 1984) and rainbow trout (13 mg/kg; Ogino and Yang 1980).

Sodium

Sodium can be absorbed directly from the environment and from the diet (Tacon 1990). Sodium, much like K, has high biological availability in natural feedstuffs and most practical diets provide sufficient Na without supplementation (Lall 1989).

Phosphorus

Phosphorus is absorbed from both the environment and the diet and is excreted primarily in the urine (Lall 1989). Phosphorus availability varies dramatically in different feedstuffs. The P in feedstuffs of plant origin is found primarily in the form of phytin, which is unavailable to fish (Lall 1989). Increasing the Ca:P ratio of the diet may interfere with P absorption while a low Ca:P ratio may reduce Ca absorption (Lall 1989). The available P requirement reported for fishes ranges from 0.3 to 0.7% of the diet (Lall 1989). Haylor et al. (1988) determined that 0.46% available P was required for maximum growth and bone mineralization in *T. nilotica*. Also, Robinson et al. (1987), working with *T aurea*, determined that 0.5% P was required in casein-based diets for normal bone mineralization.

Zinc

Fish can accumulate Zn from the diet and the environment. Zinc is normally excreted by the kidneys and gill chloride cells. Zinc deficiencies have been demonstrated for several species of fish (Ogino and Yang 1978, 1979; Ketola 1979; Gatlin and Wilson 1983) indicating that absorption from the environment is insufficient to meet the nutritional requirements. Elevated Zn concentrations up to 1700 mg/kg diet did not affect growth in rainbow trout (Wekell et al. 1983). Calcium phosphate (tribasic) has been demonstrated to reduce Zn availability in rainbow trout (Hardy and Shearer 1985); elevated dietary Fe concentrations reduce Zn uptake in rainbow trout (Wekell et al. 1986); and the bioavailability of Zn is reduced in the presence of phytate (McClain and Gatlin 1988). McClain and Gatllin (1988) found that scale and bone deposition of Zn were depressed at phytate levels of 1.5% of the diet, although they saw no effect of elevated dietary Ca. Based on scale and bone deposition values, they determined the requirement level for *T. aurea* to be 20 mg/kg. That value was similar to values determined for rainbow trout (5–15 mg/kg; Ogino and Yang 1978), carp (15–30 mg/kg, Ogino and Yang 1979), and channel catfish (20 mg/kg, Gatlin and Wilson 1983).

Plant Nutrition and Hydroponics

A comprehensive review of plant nutrient requirements and functions of each is beyond the scope of this review but readers are directed to the numerous reviews on the subject (Clarkson and Hanson 1980; Winsor and Adams 1987; Mengel and Kirkby 1987; Glass 1989). Likewise, excellent reviews of hydroponic methods can be found in Cooper (1984), Douglas (1985), Jensen and Collins (1985), and Resh (1991). Virtually all hydroponic techniques have been applied to integrated systems (Rakocy 1993), yet the most successful hydroponic techniques appear to be determined by their compatibility with suspended solids. Many hydroponic substrates are subject to clogging; nutrient film technique (NFT) systems are subject to root obstruction by solids, ultimately leading to root death and poor growth (Burgoon and Baum 1984); and aeroponics emitters are subject to clogging. The most promising technique appears to be recirculating water culture, with plants supported directly over the solution with no rooting medium (Rakocy 1989).

BRIEF SUMMARY OF THE INVENTION

The ultimate objective of this invention was to use quantitative data derived during initial experiments to develop and adequately test a model that would predict the dietary inclusion rates of minerals necessary for maintaining static dissolved mineral concentrations at near-optimal levels for hydroponically-grown plants. This was accomplished by comparing the changes in concentrations of dissolved minerals between treatments receiving a designer diet and those receiving a control diet not having mineral supplementation above and beyond the requirements of the fish. In the designer diet, the candidate minerals was manipulated according to the dietary inclusion model. Obtaining equilibrium mineral concentrations at the predicted dietary mineral concentrations verified the model.

BRIEF DESCRIPTION OF THE DRAWINGS

FIG. 3.1. Plan view of phase 1 experimental facility.

FIG. 3.2. Integrated aquaculture-hydroponic system and control system.

FIG. 3.3. Illustration of the nutrient correction procedure for supplemental nutrients.

FIG. 3.4. Plan view of phase 2 facility.

FIG. 3.5. Elevation and plan views of the phase 2 integrated aquaculture-hydroponics system.

FIG. 3.6. Theoretical example of relative changes in nutrient concentrations in an integrated system using a standard fish diet.

FIG. 3.7. Generalized mass balance flow of nutrients through an integrated aquaculture-hydroponics system.

FIG. 4.1. Phase 1 fresh lettuce yields.

FIG. 4.2. Example of the variability in change among constituents observed during phase 1.

FIG. 4.3. Recovery of Ca in plants, fish, and solids, as a percent of dietary Ca for trials 1.1, 1.2, and 1.3 combined.

FIG. 4.4. Changes in the quantity of dissolved Ca during the three trials of phase 1.

FIG. 4.5. Changes in the quantity of dissolved Cu during the three trials of phase 1.

FIG. 4.6. Recovery of Cu in plants, fish, and solids, as a percent of dietary Cu for trials 1.1, 1.2, and 1.3 combined.

FIG. 4.7. Changes in the quantity of dissolved Fe during the three trials of phase 1.

FIG. 4.8. Recovery of Fe in plants, fish, and solids, as a percent of dietary Fe for trials 1.1, 1.2, and 1.3 combined.

FIG. 4.9. Changes in the quantity of dissolved K during the three trials of phase 1.

FIG. 4.10. Recovery of K in plants, fish, and solids, as a percent of dietary K for trials 1.1, 1.2, and 1.3 combined.

FIG. 4.11. Changes in the quantity of dissolved Mg during the three trials of phase 1.

FIG. 4.12. Recovery of Mg in plants, fish, and solids, as a percent of dietary Mg for trials 1.1, 1.2, and 1.3 combined.

FIG. 4.13. Changes in the quantity of dissolved Mn during the three trials of phase 1.

FIG. 4.14. Recovery of Mn in plants, fish, and solids, as a percent of dietary Mn for trials 1.1, 1.2, and 1.3 combined.

FIG. 4.15. Changes in the quantity of dissolved N during the three trials of phase 1.

FIG. 4.16. Recovery of N in plants, fish, and solids, as a percent of dietary N for trials 1.1, 1.2, and 1.3 combined.

FIG. 4.17. Changes in the quantity of dissolved Na during the three trials of phase 1.

FIG. 4.18. Recovery of Na in plants, fish, and solids, as a percent of dietary Na for trials 1.1, 1.2, and 1.3 combined.

FIG. 4.19. Changes in the quantity of dissolved P during the three trials of phase 1.

FIG. 4.20. Recovery of P in plants, fish, and solids, as a percent of dietary P for trials 1.1, 1.2, and 1.3 combined.

FIG. 4.21. Changes in the quantity of dissolved Zn during the three trials of phase 1.

FIG. 4.22. Recovery of Zn in plants, fish, and solids, as a percent of dietary Zn for trials 1.1, 1.2, and 1.3 combined.

FIG. 5.1. Phase 2 lettuce yields by trial.

FIG. 5.2. Phase 2 dissolved $NO_3$—N concentrations.

FIG. 5.3. Phase 2 dissolved Ca concentrations.

FIG. 5.4. Phase 2 dissolved Cu concentrations.

FIG. 5.5. Phase 2 dissolved Fe concentrations.

FIG. 5.6. Phase 2 dissolved K concentrations.

FIG. 5.7. Phase 2 dissolved Mg concentrations.

FIG. 5.8. Phase 2 dissolved Mn concentrations.

FIG. 5.9. Phase 2 dissolved Na concentrations.

FIG. 5.10. Phase 2 dissolved P concentrations.

FIG. 5.11. Phase 2 dissolved Zn concentrations.

FIG. 5.12. Dissolved $NO_3$—N, Ca, and Cu concentrations during trial 2.4.

FIG. 5.13. Dissolved Fe, K, and Mg concentrations during trial 2.4.

FIG. 5.14. Dissolved Mn, Na, and P concentrations during trial 2.4.

FIG. 5.15. Dissolved Zn concentrations during trial 2.4.

FIG. A.12.1. A' values at different ratios of dietary Ca to total Ca.

FIG. A.12.2. A' values at different ratios of dietary Cu to total Cu.

FIG. A.12.3. A' values at different ratios of dietary Fe to total Fe.

FIG. A.12.4. A' values at different ratios of dietary K to total K.

FIG. A.12.5. A' values at different ratios of dietary Mg to total Mg.

FIG. A.12.6. A' values at different ratios of dietary Mn to total Mn.

FIG. A.12.7. A' values at different ratios of dietary N to total N.

FIG. A.12.8. A' values at different ratios of dietary Na to total Na.

FIG. A.12.9. A' values at different ratios of dietary P to total P.

FIG. A.12.10. A' values at different ratios of dietary Zn to total Zn.

FIG. A.16.1. Daily plant yield potential at different recycle ratios according to the hypothetical commercial designer diet scenario presented in Appendix 16.

FIG. A.16.2. Diet costs at different recycle ratios for the hypothetical commercial designer diet scenario presented in Appendix 16.

FIGS. I–XIII are schematic representations of the aquaculture system and mathematical approach of the invention for developing a model for designing an optimal diet.

DESCRIPTION OF THE PREFERRED EMBODIMENTS OF THE INVENTION

Materials and Methods
Phase 1: Nutrient Dynamics in Integrated Systems
Experimental System Requirements The initial step toward the development of diets for use in integrated systems required an appropriate experimental system and experimental method. Careful consideration was given to design characteristics, operational parameters, and choice of plant and aquatic animal species. Accurate accounting of nutrients required minimizing unknown or unquantifiable nutrient sinks, nutrient sources, and water losses. Frequent collection of solids was necessary to reduce the volatilization and loss of anaerobically-generated gasses ($H_2S$ and $N_2$) from floating fecal mats and anaerobic sludge within the settling tanks. The system components were made of opaque plastics to prevent nutrient leaching and to reduce light infiltration. Direct exposure of the culture medium to light was minimized to reduce algae growth and Fe precipitation. The quantity and mineral content of the replacement water was carefully monitored.

Experimental Organism Requirements

Although many hydroponically-grown plants grow rapidly in integrated systems, rigorous maintenance of biomass requires a plant with uniform and predictable growth and yield. Plants such as cucumbers and tomatoes exhibit dramatic changes in physiology, in which nutrients are differentially allocated to fruit and vegetative growth as a function of age or size. This characteristic makes the correlation between nutrient assimilation and growth less quantifiable in experiments having short duration. Growth should correlate strongly with nutrient uptake so that sustainable yield results in sustainable nutrient assimilation. Therefore, the experimental plant should be non-fruit bearing and the vegetative growth should be a relatively accurate correlative measure of nutrient assimilation. A heat tolerant variety of romaine lettuce (*Lactuca sativa longifolia* c.v. Jericho) was selected as the experimental plant because of its rapid, predictable germination of seeds and vegetative growth, heat tolerance, and amenability to water culture.

The aquatic animal should be tolerant of adverse water quality, which is periodically associated with recirculating systems, and the operational procedures (handling, weighing, etc.) associated with the experiment. Nile tilapia (*Tilapia nilotica*) was selected as the experimental fish because of its rapid, predictable growth, tolerance of poor water quality, disease resistance, tolerance to handling, and common use in recirculating aquaculture systems.

Other Experimental Considerations

As fish and plants grow, their physiological characteristics and nutritional requirements change. Consequently, the biological processes influencing the flow of nutrients through the integrated system ("nutrient dynamics") are constantly changing if the biomass, yield, and physiological function of both plants and fish are not held relatively constant over time. The asynchronous growth characteristics of plants and fish therefore require the continuous cropping of both fish and plants to maintain approximately stable biological conditions. Environmental factors such as pH, conductivity, and solution temperature can dramatically alter the physiology and hence nutrient assimilation of plants (Resh, 1989). Similarly, mineral assimilation in fish may be affected by ambient nutrient concentrations (Shearer and Åsgård, 1992) and physiological status (Shearer, 1984). Therefore, a system in which nutrient dynamics are to be quantified requires that the environmental factors influencing fish activity and growth, photosynthetic activity, plant and fish physiology, plant and fish health, and biological filtration remain relatively constant over the period of the experiment. Consequently, known quantities of nutrients should be added to the system initially to avoid nutritional deficiencies in plants. Maintaining constant biological conditions in small culture systems entails the continuous culling of fish as they grow and requires a hydroponic system with a harvesting and planting regime capable of minimizing the variation of plant yield and biomass over time. Lastly, the experiment should be of sufficient duration to observe significant differences in the response variable (i.e., change in nutrient concentration), but should be terminated before the nutritional adequacy of the solutions differ among treatments.

Experimental Protocol
Location

During the initial series of experiments (collectively referred to as "phase 1"), all systems were located in the same room of a glasshouse located at the University of Washington (Seattle). All integrated systems were located along the west glass wall of the room and both control systems were located along the east glass wall of the room (FIG. 3.1). Average daily radiation was slightly lower in the northwest corner and along the east wall than in the southwest corner, so additional lighting was provided by high intensity sodium lamps for 16 hours per day.

System Design

The phase 1 facility consisted of six experimental integrated systems and two control systems. Three experimental treatments and one control treatment were used for each of three 28-day trials. Each integrated system was comprised of one round, 114 liter (l), round-bottomed tank, one round, 114 l round-bottomed clarifier tank fitted with three vertically-oriented baffle boards, a three-stage trickling biofilter with two 23 cm layers of Styrofoam packing chip substrate and one 10 cm layer of large oyster shells, and four 22.7, l plastic hydroponic troughs (FIG. 3.2). The fish and clarifier tanks were made of modified plastic refuse containers (Rubbermaid Inc., Wooster, Ohio); baffles were made of plastic sheets; biofilters were made of modified, 15 l, square, plastic buckets; and hydroponic troughs were modified 22.7 l, rectangular, plastic storage containers (Rubbermaid Inc., Wooster, Ohio). The outside of each hydroponic trough was painted with white epoxy paint to reduce light penetration. The lids of all hydrophonic troughs were perforated with 40, 4 cm holes to hold the plant support plugs in place. Water was heated by a 250 watt submersible heater located within the clarifier tank.

Water flow within the system was driven by a submersible pump (Model 1A, Little Giant Co., Oklahoma City, Okla.) delivering 6 liter per minute (l/m) to the hydroponic tanks collectively. The submersible pump was located in the lowest chamber of the biofilter. Water was pumped directly to a distribution line which delivered water to each of the four hydroponic troughs. Water flow into all troughs was equalized by valve adjustment along the distribution line. Water from each trough passed by overflow through the trough outlets, situated 3 cm below the lip of each trough, and joined at a manifold prior to flowing into the culture tank. Water flowed into the culture tanks obliquely, thereby generating gentle, counterclockwise currents. Water exited each culture tank through a centered bottom outlet, then flowed vertically through a 3.2 cm pipe, and poured by overflow into the clarifier tank. In the clarifier tank (19 minute retention time), the bulk flow of water passed under the first and third baffles and over the second, lower baffle. Water flowed through the clarifier outlet to the biofilter where it then trickled through the three separated layers of biofiltration media and returned to the lower chamber of the biofilter to be pumped again through the system. A vertically-oriented, incrementally-marked, transparent pipe, which was continuous with the bottom of each biofilter, served as a water level indicator for the whole system because water level fluctuation occurred only in the lowest chamber of the biofilter. Operational volumes ranged from 320 to 330 l for the six integrated systems.

A 15 cm airstone delivering compressed air was fastened to the bottom of each hydroponic trough with silicon cement. This aerated water flowing into the culture tanks, provided oxygen to plant roots, and prevented fine solids from settling on the plant roots. Additional 30 cm airstones delivered compressed air directly into the culture tanks. Compressed air also flowed into the lower chamber of the biofilter and exited through vents in the lid of the biofilter to increase the off-gassing of dissolved $CO_2$.

Each control system was comprised of four, 72 l hydroponic tanks interconnected 20 cm below the water surface by four 5.1 cm pipes (FIG. 3.2). A submersible pump delivering 6 lpm was located in one of the four troughs. Water was pumped from that trough through a 1 cm hose that passed through the interconnecting pipes to the other three tanks. Water flowed passively through the connecting pipes back to the pump tank at a rate sufficient to maintain uniform water levels in the four tanks. The pump uniformly mixed the solutions in each of the four tanks and produced enough heat to maintain solution temperature equal to that of the integrated systems. Both controls had volumes of approximately 242 l. One 15 cm airstone was fastened to the bottom of each control tank, using silicon cement, to aerate plant roots.

Fish

Sex-reversed *Tilapia nilotica* fry (mean wt.=0.77 g) were obtained from a commercial source (Manatee Aquaculture, Myakka City, Fla.) and fed two commercial diets (Biodiet starter, Bioproducts Inc., Warrenton, Oreg. and ground Floating Catfish 35, Rangen Inc., Buhl, Id.) at 5% of body weight per day (bw/d) for a period of five weeks prior to the first experimental trial. Fish were maintained in the experimental integrated systems prior to the first experiment.

Three experimental fish biomass treatments and one control treatment (no fish) were maintained during the three trials of phase 1 in order to examine the effects of differing ratios of fish to plants on the rates of change in concentration of nutrients. The selected initial fish biomass levels were expected to generate available quantities of N that were, respectively, greater than, equal to, and less than the quantity of N assimilated by the plants, thereby resulting in increasing, static, and decreasing N concentrations over time. Assuming negligible denitrification, $NO_3$—N was expected to accumulate faster than any other nutrient. A lettuce N content (dry wt.) of 4.5% and moisture content of 90% (Resh, 1988), feed N content of 5.6% (35% protein, protein/N≈6.25), feeding rate of 5% bw/d, fish N retention of 37% (Zweig, 1986), negligible sludge N content, negligible uneaten feed, and 100% N recovery were assumed. It was calculated that a treatment size of 377 g of fish would theoretically result in equilibrium between N assimilation by plants at normal growth and N production by fish. Biomass treatment levels greater than and less than 377 g were theoretically required for $NO_3$—N to increase and decrease with time, respectively. Lettuce growth is typically not N limited between $NO_3$—N concentrations of approximately 80 to 340 mg/l (Maynard and Barker, 1971). Accordingly, the $NO_3$—N concentrations at the end of a trial had to fall within the range of 80 to 340 mg/l for nutrient solutions among treatments to be considered nutritionally-equivalent. Encompassing biomass treatment levels were chosen that would theoretically result in an increase of 100 mg/l $NO_3$—N (902 g of fish), decrease of 43 mg/l $NO_3$—N (151 g of fish), and decrease of 72 mg/l $NO_3$—N (0 g of fish; control), over a 28-day trial. In practice, $NO_3$—N concentrations decreased slightly in all systems during the first trial (trial 1.1), apparently due to denitrification, so biomass treatment levels were increased to 377, 902, and 1804 g (doubling of 902 g biomass) for trials 1.2 and 1.3. It was expected that the new range of biomass treatments would encompass the theoretical biomass resulting in N equilibrium.

At the initiation of trial 1.1, systems were flushed and fingerling *T. nilotica* having an average weight of 3.8 g were added to each system up to the treatment biomass. Treatments were randomly allocated among systems. Due to our inability to obtain fish of similar size for trials 1.2 and 1.3, fish from the prior trial were pooled and reallocated to the integrated systems up to the treatment biomass for the following trial. Mean fish weights were 11.9 and 37.8 g at the initiations of trials 1.2 and 1.3, respectively. Hand-feeding, six times per day, at a rate of 5% bw/d, commenced immediately after stocking at the beginning of the trial. Fish were fed a 3.2 mm commercial floating catfish diet which was determined to have the composition presented in Table 3.1. Feed was refrigerated at 2° C. until use.

At the initiation of trials 1.2 and 1.3, fish left from the prior trial were removed, weighed, and restocked to the treatment biomass levels of 377, 902, and 1804 g after the systems were flushed. The feeding rate and diet were the same as during trial 1.1. Approximately half of the fish within a system were collected weekly before feeding to obtain weight estimates. The fish were drained in a net and weighed to determine average fish weight. Total fish biomass was extrapolated from the sample values using the known fish numbers in each system and sufficient fish were removed to re-establish the initial treatment biomass levels. The culling procedure was adjusted for any fish mortalities. Average fish growth, yield, and feed efficiency were determined weekly following sampling. During trial 1.3, fish were not weighed during the last two weeks of the trial because the fish were not recovering as well from the weighing procedure as during trials 1.1 and 1.2. Fish samples were taken and immediately dried at 70° C. to a constant weight.

Lettuce

Lettuce seeds were sown weekly in flats of coarse (#16) silica sand. Flats were irrigated daily with a nutrient solution[1]. Twenty-one days after sowing, lettuce seedlings ("age 0") were harvested from the flats by emerging both seedlings and sand into tempered water to remove the sand from the seedling roots. Seedling roots were teased apart and seedlings of uniform size (approximately 1 gram fresh weight) were selected for transplantation to the hydroponic troughs. The seedling roots were threaded through the 1.75 cm core of a beveled, polystyrene support plug so that the root collar was centered in the core and the seedling was secured against the side of the core by a piece of rolled, Dacron wool. The seedling and plug were then inserted into a 4 cm hole in the lid of a hydroponic trough so the roots were directly immersed in the culture medium.

[1]Solution contained 500 mg of Peters 20-10-20 (N-P-K) Peat-Lite Special® (Grace-Sierra Horticultural Products Company, Richardson, Tex.), 100 mg of $MgSO_4 \cdot 7H_2O$, and 40 mg of FeDPTA (10%; Miller Chemical and Fertilizer Corp., Hanover, Pa.) per liter of solution.

A weekly transplanting and harvesting regime was devised to generate sustainable lettuce yield and biomass levels for both control and experimental systems within and between experimental trials. At any one time, each of the four hydroponic troughs of each system contained a different age of lettuce. The difference in age among the lettuce plants of different troughs was a multiple of 7 days. Every week, for both integrated and control systems, all of the 28-day old ("age 4"), seven of the 21-day old ("age 3"), twelve of the 14-day old ("age 2"), and six of the 7-day old ("age 1") lettuce plants were harvested from each of the four troughs, respectively. Age 0 seedlings were then transplanted to the trough from which all the age 4 lettuce had been harvested. This transplanting and harvesting regime resulted in a rotating distribution of 30 age 0–1, 24 age 1–2, 12 age 2–3, and 5 age 3–4 plants, respectively, at any time during a trial. The regime was initiated 9 weeks prior to trial 1.1 while the hydroponic troughs were detached from the recirculating systems, so that at the beginning of trial 1.1, the sustainable biomass level would be present.

The hydroponic troughs of the integrated and control systems were filled with the nutrient solution used to irrigate the sowing flats during the weeks prior to trial 1.1. The resulting nutrient concentrations closely approximated the nutrient concentrations to be used during the experimental trials.

At the end of trials 1.1 and 1.2, systems were harvested as usual and the remaining plants became the initial plants for trials 1.2 and 1.3, respectively. At the end of trial 1.3, all plants were harvested. Mechanically-damaged, pest-damaged, pest-infested, and mutant plants were removed before healthy, vigorous plants were. During harvest, plants were separated from the support plugs and Dacron wool after which plant roots were allowed to drip dry over the fish tank. Total fresh (root and shoot) and shoot weights were determined and recorded for each age group within each experimental and control replicate. The trial yields for each replicate were determined by summing the weights harvested during the trials; the initial plant biomasses were assumed to equal the final biomasses following the partial harvest of plants on the last day of each trial. Subsamples from each age group of each system were weighed and then dried to a constant weight in a drying oven at 66° C. for 5–6 days.

Pre-Trial Procedure

There was no inter-trial period during phase 1 because experiments were executed sequentially with the last day of one trial being the first day of the subsequent trial. On the last day of each trial, plants were harvested according to the harvest regime previously outlined, fresh plant yields for each experimental and control system from the previous trial were determined, and samples were collected and dried for mineral analyses. Following the plant harvest, fish were removed; tanks, clarifiers, hydroponic troughs, and biofilters were completely drained; hydroponic troughs were scrubbed clean; and fish and clarifier tanks were cleaned by water jet. Systems were then refilled with tempered (24° C.) city water which was dechlorinated using sodium thiosulfate.

Fish from each system were enumerated to determine mortalities and weighed. Systems with fish having the most similar weight were used to stock the systems for the subsequent trial. Fish were carefully enumerated as they were stocked into each system up to the treatment biomass associated with each system. Hand-feeding at 5% bw/d commenced immediately.

At the beginning of each trial, the integrated systems were inoculated with nutrient solutions[1]. Nutrient concentrations in the control systems were 36% higher than those in the integrated systems because they had slightly smaller volumes and equal quantities of nutrients were added to both integrated and control systems. Known quantities of certain macronutrients and micronutrients were periodically added to the culture medium to avoid nutrient deficiencies or mitigate suspected deficiencies (Appendix 1). Sodium bicarbonate was used to maintain alkalinity above 100 mg/l (as $CaCO_3$).

[1]Solutions of $KH_2PO_4$, $KNO_3$, $Ca(NO_3)_2 \cdot 4H_2O$, $MgSO_4 \cdot 7H_2O$, $H_3BO_3$, $MnCl_2 \cdot 4H_2O$, $CuCl_2 \cdot 2H_2O$, ZnCl, $Na_2MoO_4 \cdot 2H_2O$, and FeNaEDTA were added to all systems. The nutrient solution compositions and resulting elemental concentrations are listed in Appendix 1.

Sample Collection, Preparation, and Storage

Lettuce subsamples were obtained weekly from the lettuce harvested from each system and were comprised of all the age 1, all of the age 2, three of the age 3, and one of the age 4 plants harvested. Subsamples were weighed on a pre-tarred paper towel, dried to a constant weight at 66° C., ground through a #10 screen in a Wiley mill (Arthur H. Thomas Co., Philadelphia, Pa.), and stored in borosilicate glass scintillation vials (The Vial, Research Products International, Inc., Mt. Prospect, Ill.) for proximate analysis.

Fish subsamples were taken from the fish culled during the weekly harvest and were euthanized by MS-222 overdose, sectioned, dried for 4 to 5 days at 66° C., ground in a Wiley mill, and stored in scintillation vials. Fish samples were re-dried overnight at 105° C. prior to proximate analysis.

Solids were collected weekly by opening the valve at the base of the clarifier, collecting the slurry in a plastic bucket, and decanting the slurry into filter apparatus. The filter apparatus was comprised of a pre-tarred Dacron wool filter placed inside a plastic plant pot having a perforated bottom. The filter apparatus was placed on the tank screen lid so that the filtrate fell directly into the tank. When the solids had drained sufficiently to have a paste-like consistency, a subsample was taken and spread out on a piece of aluminum foil. The subsamples were then dried for 4 to 5 days at 66° C., ground in a Wiley mill, and stored in scintillation vials.

Three water samples were collected twice weekly from each system into 125 ml polyethylene storage bottles. Two samples were immediately frozen at −28° C. for later $NO_3$—N and mineral analysis. The third sample was analyzed for total ammonium nitrogen (TAN), $NO_2$—N, and alkalinity using test kits (Hach Company, Loveland, Colo.). Water temperature and pH were recorded each time water was collected for the determination of unionized ammonia levels, and water level was recorded so nutrient concentrations could later be corrected for differences in system volume at the time of sampling. Water lost to evaporation and transpiration was replaced daily with distilled water.

Pest Control

Pest control was only necessary during phase 1. Thrips were controlled by applications of the parasitic spider mite *Encarsia formosa*. Moth larvae were controlled by manual removal and by spraying lettuce plants with a dilute solution of *Bacillus thuringiensis* var. Kurstaki (Safer Inc., Wellesley, Mass.). White fly and aphid populations were controlled by periodic applications of an insecticidal soap (Safer Insecticidal Soap, Safer Inc., Wellesley, Mass.).

Statistical Design and Analysis

Three experimental treatments were allocated, in duplicate, among the six integrated systems during each trial. Control treatments were always allocated to the control systems. Experimental treatments for trial 1 (151, 377, 902 g fish/system) differed slightly from the treatments of trials 2 and 3 (377, 902, and 1804 g fish/system) because $NO_3$—N decreased in all treatments of trial 1.

Data from trials 1.1, 1.2, and 1.3 was analyzed using one-way factorial analysis of variance, modeled as a regression, because of missing cells in the experimental design. Before data combination, factors potentially influencing response variables that differed between trials (e.g., total solar flux, lettuce yield, etc.) were examined for covariation with the response variables. If the incorporation of the factor into the regression model did not contribute significantly (determined by the partial F test) to the explanation of the variation in the response variable, the data were combined. Multiple mean comparisons (Fisher PLSD) were performed on sample data using Statview SE+ Graphics (Abacus Concepts, Inc., Berkeley, Calif.). Unless otherwise stated, the significance level was 5%.

Sample Analysis

Nitrogen concentrations of dried lettuce tissue, dried fish tissue, and solids were determined by Kjeldahl N determinations using a Kjeldahl digestion and distillation apparatus as described in Appendix 2 (AOAC 1975). Samples were analyzed for Ca, Cr, Cu, Fe, K, Mg, Mn, P, Na, Sr, and Zn using an inductively coupled argon plasma emission spectrophotometer (Jarrell-Ash AtomComp, Fisher Scientific, Waltham, Mass.) following the sample preparation steps outlined in Appendix 2.

During phase 1, nutrient concentrations were standardized by correcting for variations in system volume at the time of water sampling, additions of supplemental nutrients, and nutrients added in the makeup water. Although the makeup water was distilled, correction for some trace minerals was required. Corrections for variation in system volume and makeup water were relatively minor, but corrections for supplemental nutrients were significant and allowed the trends in concentration change to be more clearly deciphered. FIG. 3.3 illustrates the result of correcting for the addition of Fe to all systems during trial 1.3. Corrections during phase 1 were necessary only for Ca, Cu, and Fe.

Phase 2: Designer Diet Development

Experimental Protocol

Location

During Phase 2, all systems were located inside a controlled environment chamber with a dehumidification, heating, cooling, and air filtration system. Lighting was provided by three fluorescent light banks and three, 1000-watt metal halide lamps operating at a 14-hour photoperiod. The phase 2 facility plan view is illustrated in FIG. 3.4.

System Design

The fish tanks, trickling biofilters, pumps, and hydroponic troughs used during phase 1 were used in the phase 2 systems, although the settling tanks, sumps, water distribution systems, and component orientations differed (FIG. 3.5). The baffled settling tanks were replaced with 200 l, conical-bottomed, white plastic tanks. Each settling tank could be drained rapidly by opening a valve connected to the cone bottom. The settling tanks were supported by vertically-oriented, 60 cm long sections of 60 cm galvanized steel culvert pipe that contacted the tanks at the bases of the cones. Each tank drain was connected to the side of the clarifier tank by an opaque, 3.8 cm flexible tube. Bulkhead fittings, having 3.8 cm inner diameters with male tubing adapters outside the tanks and flow diverters on the inside, were located 18 cm above the bases of the cones. Water flowed from the tank drains to the settling tanks through the bulkhead fittings and was forced into a counter-clockwise flow pattern within the settling tank by the flow diverters. Settling tanks were fitted with circular, transparent plastic screen panels that were submerged 2 cm and covered the entire surface area of each tank. All water flowed through the filter before exiting the settling tank. Tank overflows were located 7 cm below the lips of the tanks. Approximately 50% of the tank surface area of the settling tanks was covered with round, plastic lids to reduce air current and evaporative heating losses.

The trickling biofilters rested inside the sump tanks and passed through square holes cut into the sump tank lids. Each sump was made of a 72 l plastic storage container with an incrementally-marked water level indicator and float valve. The float valve was connected to a deionized water supply. A submersible pump delivering approximately 6 lpm was located on the bottom of the sump adjacent to the biofilter.

Water was pumped through a 1 cm hose to a manifold which divided the flow four ways. Water flowed from the manifold to the four hydroponic troughs through 1 cm hoses and PVC nozzles into the hydroponic troughs. Each nozzle had a 6.4 mm hole drilled into the side above the water that prevented siphon development during pump failure. Unlike the phase 1 water delivery system, the water was provided to the hydroponic troughs under pressure resulting in better flow distribution among the hydroponic troughs. Water flow rates within the hydroponic troughs and fish tanks were similar to phase 1. Aeration in the hydroponic troughs and fish tanks was the same as during phase 1 although no airlines were inserted into the lower chamber of the biofilter for $CO_2$ off-gassing.

Fish

Mixed sex, sibling tilapia fry were obtained from naturally-spawned broods. Fish were fed a #4 trout crumble diet (Rangen, Inc., Buhl, Id.) until they were able to eat a 3.2 mm floating diet, on which they were maintained until their use in the experiments. Fish were maintained on restricted rations until use with the objective of producing fish of approximately 50 to 60 g at the beginning of each experiment.

The objective of the initial biomass selection was to identify the biomass of fish that would generate a quantity of soluble N equal and opposite to the quantity absorbed and retained by plants and lost by the volatilization of $N_2$. Mean stocking weights were 853, 1422, 1426, and 1364 g for trials 2.1, 2.2, 2.3, and 2.4, respectively. Stocking rates did not differ between control and experimental treatments. The assumptions used for the determination of initial biomasses are listed in Table 3.2.

Mean fish weights were 64.0, 51.6, 56.3, and 28.8 g for trials 2.1, 2.2, 2.3, and 2.4, respectively. Smaller fish were used for trial 2.4 because of a lack of suitable, larger fish. At the initiation of each trial, fish were weighed and approximately the same weight of fish were added to the tanks of each control and experimental system. Feeding commenced at 27 times per day immediately after fish were stocked, using automatic feeders (Model AF6, Sweeney Enterprises, Inc., Boerne, Tex.).

All fish from each system were removed and weighed at the midpoint and end of each experiment. Sufficient fish were removed at mid-trial to re-establish initial biomass levels and all of the fish were prepared for analysis (described later).

Lettuce

The lettuce sowing, transplanting, and harvesting regime during phase 2 was the same as during phase 1, with two exceptions. Twenty-four, rather that 30 seedling lettuce plants were transplanted to the hydroponic trough from which the age 4 plants were harvested; and lettuce seedlings were transplanted two weeks, rather than three weeks, after sowing. The resulting distribution of plants was 24 age 0–1, 24 age 1–2, 12 age 2–3, and 5 age 3–4 plants, respectively, at any time during a trial. Lettuce seedlings were initially transplanted to a peripheral hydroponic trough (refer to FIG. 3.4). After one week, those plants were moved diagonally to a central trough by lifting the entire trough lid and attaching it to the central trough. Plants of the central diagonal trough were then moved to the peripheral trough. The central plants remained in the same trough for two weeks, after which (now age 3) they were again moved to the original peripheral trough. One week later, the five age 4 plants were harvested and replaced by 30 age 0 transplants. The net result of the plant rotations was that seedlings were always transplanted to the peripheral trough from which the age 4 plants had been harvested. That procedure alternated each week between the two peripheral troughs of each system. The shoot and total fresh weights of harvested plants were determined immediately after harvest and subsamples of plants of each age from each system were taken.

Between experiments, plants were maintained on the nutrients left at the end of the previous experiment, supplemental nutrients, and nutrients excreted by fish. Some fish were left in each system at the end of each trial to maintain the biofiltration capacity of the systems. Fish were fed the same diet type as during phase 1 at approximately 3% bw/d, until immediately prior to the next trial. Iron (as FeNaEDTA) was added at the end of each trial to increase Fe concentrations to approximately 2.5 mg/l. Plants were harvested in the same fashion as during an experiment.

Pre-Trial Procedure

At the beginning of each trial, lettuce plants were harvested according to the previously outlined harvest regime, fish from the previous trial were removed and euthanized by MS-222 overdose, systems were completely drained, all system components but the biofilters were scrubbed, washed by water jet, and flushed with city water, and systems were refilled with warm (24° C.), dechlorinated (by activated carbon filtration) city water. The submersible heaters were turned on and new fish were added up to the experimental biomass level when the system temperature equaled the holding tank temperature. Fish were weighed and enumerated prior to stocking. Feeding of fish commenced several hours after stocking at a rate of 4% bw/d. All systems were inoculated with nutrients as during phase 1, resulting in the elemental concentration listed in Appendix 1.

Sampling Collection, Preparation, and Storage

The weekly lettuce subsamples taken from lettuce harvested from each system consisted of all of the age 2 plants, three of the seven age 3 plants, and one of the five age 4 plants. Individual subsample plants were randomly selected from the harvested plants, and the subsample was weighed, placed on a paper towel, dried overnight at 105° C., and ground in a coffee mill (Braun 4045, Braun AG, Kronberg, Germany).

The fish were euthanized by MS-222 overdose and vacuum-packed within a plastic bag; the vacuum-packed bag was placed, together with a 200 g stainless steel rod, into another bag which was also vacuum-packed; and the bags and their contents were frozen at −40° C. for analysis. At the end of each trial, the bags were placed in boiling water for approximately 30 minutes. The bags were removed from the water, opened, and the cooked fish within the inner bag were blended for approximately 2 minutes. A subsample of approximately 125 g was decanted into a pre-tarred aluminum drying pan and the wet weight was recorded. The subsample was then dried overnight at 105° C. The dried fish wafer was weighed, together with the drying pan. Then, the wafer was pulverized to a fine, homogenous powder with a mortar and pestle. Approximately half of each sample was stored in a scintillation vial while the remainder was discarded.

Solids were collected weekly by opening the valve at the base of the clarifier, collecting the slurry into a clear plastic container, allowing the solids in the sample to settle in the container, pouring off the supernatant into the clarifier, and pouring the settled solids into the filter apparatus. The filter apparatus was comprised of a 10 cup coffee filter placed inside a plastic plant pot having a perforated bottom. All of the collected solids were spread onto a pre-tarred piece of aluminum foil, dried overnight at 105° C., and ground to a fine powder by twice passing the dried solids flakes through a coffee mill. The samples were homogenized by shaking and were stored in scintillation vials.

Two water samples were collected into polyethylene storage bottles from the fish tank of each system, three times weekly in the morning. One sample was frozen immediately at −40° C. for later analysis, while the other sample was used for the determination of TAN, $NO_2$—N, pH, and alkalinity as during phase 1. Water temperature was recorded at each water sampling. Water level was recorded the evening before the sampling and the deionized water system was pressurized to fill each system to the maximum volume. The water system was left on until samples were taken so that corrections for water volume at the time of sampling were unnecessary.

Statistical Design and Analysis

Treatments were allocated among experimental systems according to a randomized block design (Hurlbert 1984) to reduce the likelihood of light gradient effects on response variables. Each block was comprised of a pair of systems receiving most of their light from a given metal halide lamp. The blocks consisted of systems 1 and 2, 3 and 4, and 5 and 6 (refer to FIG. 3.4). Within blocks, the experimental treatments were randomly assigned, using random number tables (Zar 1984), to one of the two systems and the control treatments were assigned to the remaining systems.

The two-sample t test (Zar 1984) was used to test for significant differences between control and experimental treatment responses (change in nutrient concentration over the experimental trial) using Statview SE+ Graphics (Abacus Concepts, Inc., Berkeley, Calif.). Unless otherwise stated, the significance level was 5%. Nutrients that changed in concentration less that 5% were considered to be in equilibrium while nutrients that changed in concentration by more than 5% were not considered to be in equilibrium.

Sample Analysis

During phase 2, $NO_3$—N concentrations were determined by the ultraviolet spectrophotometric screening method (APHA 1992); N concentrations of dried lettuce tissue, fish tissue, and solids were determined as Kjeldahl N (AOAC 1975); and elemental analyses were conducted according to the methods outlined in Appendix 2.

Dietary Inclusion Model

Introduction

A dietary inclusion model for designer diets depends upon the fish absorbing from the diet a significant proportion of the bioavailable fraction of the mineral[1] and excreting the unassimilated fraction branchially, or in the urine or feces. Designer diet development is possible because fish have the ability to homeostatically control the whole-body concentrations of minerals (Shearer 1984). If the concentrations or quantities of available minerals in fish diets exceed the required levels for the fish, the excess minerals are absorbed and excreted through the gills or urine (Lall 1989) and/or the uptake of the excess minerals is prevented by complexing agents (Wekell et al. 1983) or other means.

[1]The word "mineral," although technically referring to any inorganic substance, here includes N, which is the only exception to the technical definition. The word "nutrient" is not used because it encompasses many nutrients for which dietary manipulation is not applicable.

With low to moderate levels of denitrification, N (as $NO_3$—N) accumulates faster than most minerals in closed, integrated systems receiving commercially-available diets (Rakocy et al. 1993). Therefore, if the quantity of soluble N excreted by fish in an integrated system is set equal to that assimilated by plants, recovered in the solids, and lost due to denitrification, by adjusting the fish to plant biomass ratio, dissolved N concentrations will theoretically remain constant while the concentrations of most minerals will decrease with time. Since minerals are commonly added to diets in the mineral mix, they could be supplemented so as to increase the quantity that is excreted by fish, potentially resulting in equilibrium concentrations (FIG. 3.6).

Model Development[2]

A dietary inclusion model was developed assuming that at equilibrium, the quantity of minerals added in the makeup water, mineral supplements, and that leached from system components (hereinafter collectively referred to as "exogenous nutrients"), and added in the diet, equals the quantity of minerals removed or lost from the system. Theoretically, $$N_D + N_A = N_L + N_F + N_P + N_R, \quad (1)$$

where, $N_D$=Quantity of mineral added in the diet $N_A$=Quantity of mineral added in the makeup water and supplements, or leached from the system components $N_L$=Quantity of mineral lost from the system $N_F$=Quantity of mineral absorbed and retained by the fish $N_P$=Quantity of mineral absorbed and retained by the plants $N_R$=Quantity of dissolved mineral remaining in the system at the end of the experiment Expanding the loss term to its constituent components, $$N_D + N_A = N_{Pr} + N_V + N_I + N_M + N_S + N_F + N_P + N_R \quad (2)$$

where, $N_{Pr}$=Quantity of mineral precipitated from the solution that is not deposited in the solids $N_V$=Quantity of mineral lost by volatilization $N_I$=Quantity of mineral lost by intentional or unintentional water discharge $N_M$=Net quantity of mineral uptake by algae, microbes, etc.

$N_S$=Quantity of mineral removed in the solids

This general mass-balance relationship and the flow of minerals through integrated aquaculture-hydroponics systems is illustrated in FIG. 3.7.

[2]Refer to Appendix 17 for the definitions to model acronyms.

Adjusting the Model for Mineral Availability

If the fish diet is the only source of a particular mineral, all but the quantity removed in the solids is "available" to the system. The available fraction of the mineral is used by plants and fish, and may ultimately be lost due to precipitate formation (precipitates not deposited in the solids), volatilization, and water loss. The available fraction can be represented mathematically by an availability term, referred to as "system availability," to differentiate it from bioavailability. This term is defined as:

$$\text{System availability}(A) = \frac{(N_D - N_S)}{N_D}. \quad (3)$$

Nutrients deposited in the solids are used to determine A. Since minerals entrained in the feces are subject to leaching during transport to and after deposition in the solids removal component of the system, the A value of a mineral is dependent upon system design parameters (e.g., distance between tank outlet and point of deposition), system operation (e.g., frequency of solids removal), and environmental parameters (e.g., temperature).

The bioavailability of a mineral, namely the proportion of a mineral available to an animal at dietary inclusion rates slightly less than the nutritional requirement, may be very different than system availability. As the inclusion rates of minerals increase beyond the required levels for fish, or when fish are fed increasing quantities of feed per fish, the proportions of dietary minerals retained by fish decrease (Shearer and Åsgård 1990). Accordingly, the A values determined during phase 1 do not necessarily reflect the true bioavailability of the minerals because the mineral inclusion rates were much greater than the minimum requirements for *T. nilotica*. Moreover, fish have the ability to absorb many minerals directly from the water and the entire requirement can, under certain circumstances, be met by environmental availability. The elevated mineral concentrations in the water of integrated systems increases the likelihood that some of the minerals present in the feces were actually absorbed initially from the water, thereby further differentiating bioavailability from A.

Rarely is the diet the sole source of minerals for an integrated system. Accordingly, the A term must account for the deposition of non-dietary minerals in the solids. The precipitation of minerals, a principle mode by which the availabilities of exogenous minerals are reduced, does not discriminate between soluble minerals excreted by the fish and minerals added directly to the system. The A term should therefore be adjusted for the availability of minerals added exogenously:

Adjusted system availability $$(A') = \frac{N_D + N_A - N_S}{N_D + N_A} \quad (4)$$

Rearranging equation 2, we have $$N_D + N_A - N_S = N_{Pr} + N_V + N_I + N_M + N_F + N_P + N_R. \quad (5)$$

Therefore, $$(N_D + N_A)A' = N_{Pr} + N_V + N_I + N_M + N_F + N_P + N_R. \quad (6)$$

Additional Implications of Adjusted Availability

The term $N_S$ can be partitioned into three components:

$$N_S = N_{DS} + N_{DP} + N_{AP} \quad (7)$$

where:

$N_{DS}$=Minerals entrained in solids directly from the fish
$N_{DP}$=Soluble minerals excreted by the fish that precipitate and collect in the solids
$N_{AP}$=Soluble minerals added exogenously that precipitate and collect in the solids By substituting equation 7 into equation 4, we have $$A' = \quad (8)$$
$$\frac{N_D + N_A - (N_{DS} + N_{DP} + N_{AP})}{N_D + N_A} = \frac{N_D - (N_{DS} + N_{DP})}{N_D + N_A} + \frac{N_A - N_{AP}}{N_D + N_A}$$

and by multiplying through by 1, we have $$A' = \frac{N_D - (N_{DS} + N_{DP})}{N_D + N_A} \cdot \frac{N_D}{N_D} + \frac{N_A - N_{AP}}{N_D + N_A} \cdot \frac{N_A}{N_A}. \quad (9)$$

By rearranging equation 9, we have, $$A' = \frac{N_D - (N_{DS} + N_{DP})}{N_D} \cdot \frac{N_D}{N_D + N_A} + \frac{N_A - N_{AP}}{N_A} \cdot \frac{N_A}{N_D + N_A}. \quad (10)$$

Equation 10 indicates that the A' term is a function of the availabilities of both dietary and exogenous minerals multiplied by their relative proportions. However, the inability to distinguish $N_{DS}$ from $N_{DP}$ or $N_{AP}$ in the solids prohibits the validation of equation 10 unless all minerals are exclusively provided through the diet or by exogenous supplementation.

The A' term will generally exceed the A parameter for any given mineral because the digestive and excretion processes always leave some fraction of each mineral entrained in the feces. Additionally, since the precipitation of minerals does not discriminate between dissolved mineral forms generated by the fish and the same mineral forms added exogenously, the "availability" of exogenous minerals and soluble minerals excreted by fish are reduced proportionately by precipitation. The A' term reduces to the A term when all the minerals are provided to the system through the diet, suggesting that the maximum availability of a mineral will occur when all of the mineral is provided exogenously and that the minimum availability will occur when all of the mineral is provided in the diet.

Model Adjustment for Mineral Recovery

Not all of the available (non-solids) minerals are recovered in the fish, lettuce, and remaining solution. Nutrients may be lost by volatilization (e.g., N as $N_2$ and $NH_3$; S as $H_2S$), as precipitates not recovered in solids (e.g., hydrous calcium phosphate which often accumulates on heater elements), by intentional or unintentional water loss, or by net uptake of minerals by algae and microbes. Accordingly, the model must be adjusted for the recovery of minerals made available to the system. Under certain circumstances, the recovery of a mineral may exceed 100% because of unknown mineral sources (e.g., a galvanized steel component of the system) or inaccurate quantification of mineral inputs (e.g., unaccounted for fluctuations in the mineral content of the replacement water). The model adjustment for recovery must be able to accommodate such circumstances.

As previously described, the minerals made available to a system with an exogenous mineral source are equal to $$N_D + N_A - N_S, \quad (11)$$

and the quantity of available minerals recovered from a system is $$N_F + N_P + N_R. \quad (12)$$

Therefore, the recovery of the available fraction of a mineral is $$\text{Adjusted recovery } (R') = \frac{N_F + N_P + N_R}{N_D + N_A - N_S}. \quad (13)$$

In the absence of exogenous minerals, the $N_A$ term is dropped and the recovery is described by $$\text{Recovery } (R) = \frac{N_F + N_P + N_R}{N_D - N_S}. \quad (14)$$

Rearranging equation 6 we have, $$(N_D + N_A)A' - N_{Pr} - N_V - N_I - N_M = N_F + N_P + N_R. \quad (15)$$

By rearranging equation 13, we have, $$(N_D + N_A - N_S)R' = N_F + N_P + N_R. \quad (16)$$

By using equation and equation 16, we have, $$(N_D + N_A)A'R' = N_F + N_P + N_R. \quad (17)$$

Equation 17 can be modified as, $$(D[N]_D + N_A)A'R' = F[N]_F + P[N]_P + N_R, \quad (18)$$

where, $D$ = Quantity of dry diet $[N]_D$ = Mineral concentration of dry diet $F$ = Fish yield (dry matter)

$[N]_F$ = Mineral concentration in dry fish tissue $P$ = Plant yield (dry matter)

$[N]_P$ = Mineral concentration in dry plant tissue

This model, when applied ex-post facto to experimental data, described exactly ($r^2$=1.0) the changes in the quantities (or concentrations) of each dissolved mineral from the beginning to the end of each experiment of phase 1. By solving for $[N]_D$, we arrive at the final dietary inclusion model used to predict the mineral inclusion rates necessary to achieve equilibrium concentrations of minerals through time:

$$[N]_D = \frac{\frac{N_F + N_P + N_R}{A' \cdot R'} - N_A}{D}. \quad (19)$$

The utility of any model lies in its ability to predict or describe the outcome of a response variable when predetermined or estimated parameters are used prior to the experiment or period of observation. Based on phase 1, the values for A' and R' for individual minerals appear to be reasonably conserved when the system design, operational protocol, and water quality characteristics remain unchanged. The mineral concentrations of fish and lettuce tissue should be estimable in order to predict changes in mineral concentrations. Plant tissue may exhibit dramatic fluctuations in tissue mineral concentrations because of different dissolved concentrations of a mineral, ratios of nutrients, solution conductivities, light and temperature regimes, ages, and stages of maturity. Likewise, whole body mineral concentrations in fish may change with age, diet, reproductive state, and condition. A pilot study conducted under similar conditions to that of the experiment is recommended to develop preliminary estimates of model parameters.

Determination of Dietary Inclusion Rate

In order to determine the dietary inclusion rate, the quantities of minerals to be absorbed and retained by fish and plants, added to initially fertilize the solution, and added in the makeup water and supplements must be estimated. The first step is to determine the initial biomass of fish and feed to be fed during the period under examination. The required quantity of feed is that which, in addition to exogenous N, provides a quantity of N (corrected for availability and recovery) equal and opposite to the quantities absorbed and retained by the fish and plants, thereby resulting in equilibrium dissolved N concentrations. The quantity of N in a diet is dependent on dietary protein concentration and the protein concentration requirement for the species and age of fish is assumed for the designer diet. An example of the determination of initial fish biomass based on N equilibrium and using the initial biomass value, a determination of the dietary inclusion rate for K, is located in Appendix 3.

Additional Considerations

Increasing some mineral concentrations in the diet may reduce the bioavailability of other minerals and the bioavailabilities of minerals added to diets as mineral supplements are typically greater than the bioavailabilities of the same minerals found in the basal feedstuffs. Accordingly, preliminary model parameter estimates, based upon pilot study diets, might be markedly different from those ultimately determined for the designer diet. Consequently, the development of a designer diet is likely to be a process of 2 to 3 iterations as model parameters are refined.

Constraints to Mineral Manipulation

Several constraints exist, including bioavailability and toxicity, making some minerals less likely candidates for dietary manipulation than others. A significant fraction of the mineral added in the diet must be excreted by the fish and made available to plants in a soluble form. The bioavailable fraction of the mineral must, in addition to exogenously added minerals, satisfy the mineral requirements of the fish, plants, and other mineral sinks in order to produce stable mineral concentrations. During phase 1, the quantities of Cu and Fe recovered in the solids consistently exceeded the quantities added in the diet, indicating that Cu and Fe had low bioavailabilities and that dissolved Cu and Fe were lost to precipitation. Accordingly, it seemed as if no reasonable quantity of Cu or Fe could be added to the diet which would provide sufficient available minerals for the system.

The dietary inclusion rates of minerals should not exceed toxic levels for fish. This is of particular concern for trace minerals such as Fe, Cu, and Zn for which toxic levels may not differ substantially from levels common in practical diets. Also, the quantity of a particular mineral supplement should not interfere with pellet manufacture, reduce pellet stability, or reduce palatability.

Phase 2 Design Procedure

The first step in the design procedure was to determine the proximate composition of the dietary ingredients. Solvent-extracted soybean meal, wheat flour, wheat middlings, whole corn, and anchovy meal were obtained from a commercial feed manufacturer (Rangen Inc., Buhl, Id.); along with percent moisture, protein, and lipid values of the lots from which dietary ingredients came. Percent protein and moisture values were reconfirmed, although lipid values were not. Mineral concentrations were determined according to methods outlined in Appendix 2. The proximate analysis of the phase 2 dietary ingredients is presented in Appendix 4.

The proximate composition data were entered into a diet design spreadsheet (developed by R. W. Hardy, NMFS) and the basal diet composition was determined so as to yield a 35.0% protein concentration (dry wt.), emulate commercial tilapia diet formulations, and to provide both a complete amino acid profile and a digestible energy (DE) content of approximately 8.5 kcal/g protein. Amino acid estimates were based on published amino acid profiles for the dietary ingredients (NRC 1983); amino acid requirements for *T. nilotica* were based on published estimates (Santiago and Lovell 1988); and DE values were based on digestibility of gross energy values for the fish meal, soybean meal, corn, and wheat, as determined by Popma (1982) for *T. nilotica*. The objective protein concentration was 35% because De Silva et al. (1989) demonstrated that young tilapia exhibit maximum growth at approximately 34% protein.

Next, the quantity of dietary N added during an experimental trial that would result in N equilibrium had to be estimated. Using estimates of A', R', amounts of N to be supplemented, N concentrations of dry lettuce and fish tissue, FCR, percent protein content of the diet, and percent moisture estimates for fish and lettuce, the quantity of dry diet could be estimated (see Appendix 3). The equivalent quantity of dry diet on a wet weight basis was determined by dividing the dry weight by the predicted proportion of dry matter. The quantity of fish required, fed at a specified feeding rate (percent bw/d) for a experiment of specified duration, could then be calculated.

Estimates for A', R', $[N]_P$, $[N]_F$, $N_A$, FCR, and the known quantity of dry diet to be fed over the course of the experiment were used to determine the mineral inclusion rates predicted to result in equilibrium dissolved mineral concentrations. The phase 1 values of A, A', R, R',$[N]_P$, $[N]F$, $N_A$, and $N_R$ are listed in Appendix 5; those values were used to determine the mineral inclusion rates for the trial 2.1 experimental diets.

The concentrations of minerals in the basal diet were determined using the mineral composition data of the basal ingredients. The discrepancies between the basal mineral levels and the levels predicted by the dietary inclusion model were calculated. The quantities of reagent grade mineral supplements required to provide the objective mineral concentrations were then calculated. The reagents used to meet the mineral specifications of the designer diets were anhydrous $Ca(H_2PO_4)_2$, $FeSO_4·7H_2O$, $MgO$, $MnSO_4·H_2O$, $NaH_2PO_4·H_2O$, $K_2HPO_4$, $NaCl$, $ZnO$, $K_2SO_4$, $MgHPO_4·3H_2O$, and $KCl$, all of which are reagents with established uses as mineral sources for fish nutrition (Tacon 1990).

Diets were formulated by adding the carboxymethylcellulose, alphacellulose, mineral mix, and vitamin premix together, and thoroughly mixing them in a V-mixer (Patterson-Kelly Co., East Stroudsburg, Pa.) prior to the addition of the other dry ingredients. The remaining ingredients were added in succession, in order from the least to greatest dietary proportion, and each ingredient was allowed to thoroughly mix before adding subsequent ingredients. The homogenized ingredients were transferred to a mixer (Hobart Mfg. Co., Troy, Ohio) and the soybean oil, micro-mineral solution, and deionized water were added, in that order, while mixing. Deionized water was added until the mixture was approximately 45% moisture, at which time the mixture was compacted in the barrel of a cold-extrusion pellet mill (Advanced Hydrolyzing Systems, Inc., Astoria, Oreg.). The pellets were extruded through ⅛" dies and were cut to lengths of approximately 3/16". Pellets were air-dried to approximately 7 to 8% moisture and were stored in plastic bags at −28° C. until use.

Trial 2.1

Trial 1 was conducted as a pilot study to determine; 1) the model parameters for the new experimental facility (e.g., lettuce yield, fish growth, A', and R'), 2) if the supplementation of minerals at a fixed fish to plant biomass ratio affected nutrient concentrations as increasing the fish to biomass ratios while using fixed dietary mineral concentrations did during phase 1, and 3) to ascertain if model parameters determined during phase 1 under different conditions were robust enough to allow accurate prediction of appropriate dietary mineral concentrations.

The model parameter estimates determined during phase 1 were used for the development of the experimental diet in trial 2.1 (Appendix 5). The resulting dietary composition and mineral mix composition are listed in Tables 3.3 and 3.4, respectively. Owing to a spreadsheet calculation error, the mineral concentrations of the basal ingredients used for the calculations were 50% of the actual values. Accordingly, the values used to determine the quantities of supplemental nutrients were too low and the resulting mineral additions were too high for most minerals. The objective and actual mineral concentrations are listed in Appendix 6.

It was determined prior to trial 2.1 that $CaCO_3$ was the most suitable alkalinity source for the phase 2 experiments because its low solubility, relative to $NaHCO_3$, would result in lower alkalinity and pH values, thereby reducing the precipitation of P and some micronutrients. As the $CaCO_3$ neutralizes the hydrogen ions produced during nitrification, Ca is liberated into the water. The quantity of Ca liberated as a function of nitrification has been estimated by both stoichiometric and empirical means. Haug and McCarty (1971) reported that 7.13 kg of bicarbonate alkalinity (as $CaCO_3$) was required to neutralize the hydrogen ions liberated during the oxidation of 1.0 kg of $NH_4$—N. The predicted quantity of Ca to be liberated during trial 2.1 was calculated and treated as an exogenous Ca source in the dietary inclusion model. Based on the average phase 1 N retention value of 45% and average fecal N ratio (fecal N÷feed N·100%) of 8%, it was assumed that the remaining 47% would be excreted in the form of $NH_3$—N. Given that 892 g of 35% protein (5.6% N) feed was to be fed over the course of the experiment, 23.5 g of $NH_3$—N would theoretically be produced and would require 168 g of $CaCO_3$ (containing 67 g of Ca) for complete neutralization. When the additional Ca was included in the dietary inclusion model, the calculated quantity of available Ca was slightly greater than the quantity expected to be absorbed and retained by fish and plants. Accordingly, Ca was not specifically supplemented in either control or experimental diets during phase 1.

Copper and Fe were not supplemented because the phase 1 A values were negative, indicating that the diet would have negligible impact on dissolved concentrations. For instance, if the dietary inclusion levels were calculated for Fe based on A' values, the level theoretically required for equilibrium was 2,766 mg Fe/kg diet, a level well beyond levels demonstrated to elicit toxicity symptoms (1,380 mg Fe/kg; Tacon 1990). Potassium, Mg, Mn, P, Na, and Zn were all supplemented above the levels in the basal diet according to the dietary inclusion model. Calcium was added in the form of $Ca(H_2PO_4)_2$ to augment the amount of available Ca for the fish, but was not manipulated according to the dietary inclusion model because the amount of Ca added in the diet and predicted to be released from the $CaCO_3$ was sufficient to achieve equilibrium. Iron and Cu were added only to insure adequate nutrition.

Fish averaging 64 g were added to the control and experimental systems up to a biomass of 853 g. This biomass level was determined using the highest R' estimate (0.85) for N among the three trials of phase 1. This was done because the phase 2 settling tank, where the majority of denitrification was expected to occur, was superior in design to the phase 1 system because of its conical bottom and it allowed for more thorough solids removal and presumably less denitrification. Feeding at a rate of 4% bw/d commenced immediately after stocking fish.

Trial 2.2

Due to the calculation error of trial 2.1, this experiment represented the first valid testing of the hypothesis that equilibrium mineral concentrations could be maintained by manipulating dietary mineral concentrations. Parameters developed during trial 2.1 were used exclusively to determine the dietary inclusion rates for trial 2.2. The parameters used for trial 2.2 are listed in Appendix 5. Potassium, Mn, P, and Na all required supplementation above the mineral levels in the basal diet. Calcium was added in the form of $Ca(H_2PO_4)_2$ to augment the amount of available Ca for the fish, but was not manipulated according to the dietary inclusion model because the amount of Ca added in the diet and predicted to be released from the $CaCO_3$ was sufficient to achieve equilibrium. Magnesium and Zn were not supplemented because the basal levels were approximately equal to the desired levels. The diet and mineral mix compositions are listed in Tables 3.5 and 3.6, respectively. The predicted and actual mineral concentrations are listed in Appendix 6. Dextrin, rather than carboxymethylcellulose, was added to the diets as a binder at a level of 5%.

Fish averaging 51 g were added to the three control and three experimental systems up to a biomass of 1,422 g. Feeding at a rate of 4% bw/d (wet basis) commenced immediately.

Trial 2.3

The purpose of trial 2.3 was to repeat trial 2.2 because during trial 2.2, an unrepairable leak formed in one of the experimental replicates resulting in substantial water loss. The loss of the replicate weakened the experimental analysis. Accordingly, the initial fish biomass levels and dietary compositions of trial 2.2 and 2.3 were nearly identical. Differences in the desired dietary concentrations between trials 2.2 and 2.3 were due to the fact that some of the assumed model parameters (e.g., lettuce yield) were different because both trial 2.1 and 2.2 parameters were used in the estimations. As for trial 2.2, K, P, and Na were supplemented according to the dietary inclusion model, although Mn was not. The basal levels of Mg and Zn were approximately equal to the desired concentrations, so they were not supplemented. Iron, Cu, and Ca were supplemented to insure adequate nutrition. The diet and mineral mix compositions are listed in Tables 3.7 and 3.8, respectively, and the predicted and actual mineral concentrations are listed in Appendix 6.

Fish averaging 57 g were added to the three control and three experimental systems up to a biomass of 1,427 g. Feeding at a rate of 4% bw/d (wet basis) commenced immediately.

Trial 2.4

The basal compositions of the diets during trials 2.2 and 2.3 were specifically formulated to hold the concentrations of Mg, Na, and Zn down to the desired levels. As a result, the basal diet compositions of both the control and experimental diets were slightly different from the basal compositions found in commercial tilapia and catfish diets. Moreover, nutrients such as Na and Zn were not supplemented in the control diets, as they often are in commercial diets, in order to maintain nutritional equality with the experimental diets. Accordingly, the differences in the accumulation rates of some minerals between the control and experimental treatments during trials 2.2 and 2.3 were not necessarily representative of the differences between the experimental diet and a commercial diet. Therefore, trial 2.4 was conducted to demonstrate the ability of a designer diet and inability of the commercial diet to maintain several dissolved mineral concentrations at near-equilibrium levels by comparing the changes in nutrient concentration in systems receiving the commercial diet to those of systems receiving a designer diet.

In the experimental diet, K, Na, and P were supplemented. The basal levels of Mg and Zn were approximately equal to the desired levels and were not supplemented. The control diet was ground to a fine powder in a hammermill, moistened to 45% moisture, and repelleted according to the protocol previously outlined. The diet and mineral mix compositions are listed in Tables 3.9 and 3.10, respectively, and the predicted and actual mineral concentrations are listed in Appendix 6.

Fish averaging 29 g were added to the three control and three experimental systems up to a biomass of 1,364 g. Feeding at a rate of 4% bw/d (wet basis) commenced immediately.

TABLE 3.1

Proximate composition of the phase 1 experimental diet (dry)[1].

| Macronutrients (percent) | | Micronutrients (mg/kg) | | Other | |
|---|---|---|---|---|---|
| Ca | 1.61 | Cu | 18 | Percent protein | 41.6 |
| K | 1.28 | Fe | 544 | Percent moisture | 8.3 |
| Mg | 0.30 | Mn | 161 | Percent ash | 7.9 |
| Na | 0.47 | Zn | 384 | | |
| P | 1.48 | | | | |

[1]Floating Catfish 35, Rangen Inc., Buhl Idaho.

TABLE 3.2

Assumptions used in determining the initial fish biomass levels during phase 2.

| | Trial | | | |
|---|---|---|---|---|
| Assumption | 2.1 | 2.2 | 2.3 | 2.4 |
| $[N]_{fish}$ (percent of DM[1]) | 8.8 | 8.6 | 8.6 | 8.7 |
| $[N]_{lettuce}$ (percent of DM) | 4.5 | 4.6 | 4.6 | 4.6 |
| fish moisture (percent) | 73.0 | 71.0 | 71.9 | 72.7 |
| lettuce moisture (percent) | 95.5 | 96.5 | 96.4 | 96.4 |
| fish yield (g) | 713 | 1038 | 993 | 916 |
| lettuce yield (g) | 4500 | 4500 | 5000 | 5345 |
| feeding rate (percent bw/d) | 4.0 | 4.0 | 4.0 | 4.0 |
| total feed/trial (g) | 892 | 1453 | 1588 | 1493 |
| FCR[2] | 1.25 | 1.40 | 1.60 | 1.63 |
| adjusted availability (A') | 0.96 | 0.96 | 0.96 | 0.96 |
| adjusted recovery (R') | 0.85 | 0.71 | 0.74 | 0.71 |

[1]Dry matter.
[2]Food conversion ratio = diet fed ÷ fish growth.

TABLE 3.3

Composition (%) of the diets used in trial 2.1.

| Ingredient[1] | Control | Experimental |
|---|---|---|
| Anchovy meal | 13.0 | 13.0 |
| Soybean meal | 48.0 | 48.0 |
| Wheat middlings | 8.5 | 8.5 |
| Corn | 14.0 | 14.0 |
| Soybean oil | 5.0 | 5.0 |
| Vitamin premix[2] | 0.5 | 0.5 |
| Alphacel | 6.34 | 1.34 |
| Mineral premix[3] | 2.66 | 7.66 |
| CMC[4] | 2.00 | 1.34 |
| Total (percent) | 100 | 100 |

[1]Sources of ingredients were: fish meal, soybean meal, wheat flour, wheat middlings, corn, Rangen Inc. (Buhl, Idaho); soybean oil (Hain Pure Food Co., Los Angeles, California); vitamin premix, Moore Clark Co. (La Conner, Washington); alphacellulose, dextrin, ICN Biochemicals, Inc. (Costa Mesa, California); carboxymethylcellulose, Sigma Chemical Co. (St. Louis, Missouri).
[2]Vitamin premix added the following per kilogram of diet: vitamin A (palmitate or acetate), 552 IU; alpha tocopheryl acetate, 168 IU; menadione sodium bisulfite complex, 6 mg; thiamine mononitrate, 15.2 mg; riboflavin, 17.7 mg; pyridoxine HCl, 12.9; d-calcium pantothenate, 38.2; niacin, 74 mg; d-biotin, 0.2 mg; vitamin $B_{12}$, 0.02 mg; myoinositol, 44 mg; folic acid, 5.5 mg.
[3]See Table 3.4 for composition of mineral mix; micro mineral solution added the following per kilogram of diet: iodine, 0.1 mg; selenium, 0.2 mg.
[4]Carboxymethylcellulose; sodium salt.

TABLE 3.4

Composition (g/kg premix) of trial 2.1 mineral premixes.

| Chemical[1] | Control | Experimental |
|---|---|---|
| $FeSO_4.7H_2O$ | 62.9 | 20.4 |
| MgO | 0.0 | 49.7 |
| $MnSO_4.H_2O$ | 3.36 | 9.89 |
| $Ca(H_2PO_4)_2$ | 792 | 195 |
| $NaH_2PO_4.H_2O$ | 139 | 0 |
| $K_2HPO_4$ | 0 | 583 |
| NaCl | 0 | 79.7 |
| ZnO | 2.76 | 4.64 |
| $K_2SO_4$ | 0 | 57.9 |
| Total | 1000 | 1000 |

[1]All chemicals were obtained from Sigma Chemical Co. (St. Louis, Missouri).

TABLE 3.5

Composition (%) of the diets used in trial 2.2.

| Ingredient[1] | Control | Experimental |
|---|---|---|
| Anchovy meal | 12.0 | 12.0 |
| Soybean meal | 46.0 | 46.0 |
| Wheat flour | 8.2 | 8.2 |
| Corn | 24.0 | 24.0 |
| Soybean oil | 2.0 | 2.0 |
| Vitamin premix[2] | 1.0 | 1.0 |
| Alphacel | 2.37 | 0.00 |
| Mineral premix[3] | 0.41 | 2.80 |
| Dextrin[4] | 4.0 | 4.0 |
| Total (percent) | 100 | 100 |

[1]Sources of ingredients were: fish meal, soybean meal, wheat flour, wheat middlings, corn, Rangen Inc. (Buhl, Idaho); soybean oil (Hain Pure Food Co., Los Angeles, California); vitamin premix, Moore Clark Co. (La Conner, Washington); alphacellulose, dextrin, ICN Biochemicals, Inc. (Costa Mesa, California); carboxymethylcellulose, Sigma Chemical Co. (St. Louis, Missouri).
[2]Vitamin premix added the following per kilogram of diet: vitamin A (palmitate or acetate), 1104 IU; alpha tocopheryl acetate, 336 IU; menadione sodium bisulfite complex, 12 mg; thiamine mononitrate, 30.4 mg; riboflavin, 35.4 mg; pyridoxine HCl, 25.8; d-calcium pantothenate, 76.4; niacin, 148 mg; d-biotin, 0.4 mg; vitamin $B_{12}$, 0.04 mg; myoinositol, 88 mg; folic acid, 11 mg.
[3]See table 3.6 for composition of mineral mix; micro mineral solution added the following per kilogram of diet: iodine, 0.1 mg; selenium, 0.2 mg.
[4]Type 3 - Commercial grade from corn white powder; 12% soluble.

TABLE 3.6

Composition (g/kg premix) of trial 2.2 mineral premixes.

| Chemical[1] | Control | Experimental |
|---|---|---|
| $FeSO_4.7H_2O$ | 104 | 13 |
| KI | 0.94 | 0.14 |
| $MnSO_4.H_2O$ | 6.8 | 22.6 |
| $Ca(H_2PO_4)_2$ | 888 | 309 |
| $NaH_2PO_4.H_2O$ | 0 | 41.8 |
| $K_2HPO_4$ | 0 | 613 |
| NaCl | 0 | 0.43 |
| ZnO | 0 | 0.012 |
| Total | 1000 | 1000 |

[1]All chemicals were obtained from Sigma Chemical Co. (St. Louis, Missouri).

TABLE 3.7

Composition (%) of the diets used in trial 2.3.

| Ingredient[1] | Control | Experimental |
|---|---|---|
| Anchovy meal | 13.0 | 13.0 |
| Soybean meal | 44.0 | 44.0 |
| Wheat flour | 13.3 | 13.3 |
| Corn | 19.0 | 19.0 |
| Soybean oil | 3.0 | 3.0 |
| Vitamin premix[2] | 1.0 | 1.0 |
| Alphacel | 1.37 | 0.00 |
| Mineral premix[3] | 0.35 | 1.72 |
| Dextrin[4] | 5.0 | 5.0 |
| Total (percent) | 100 | 100 |

[1]Sources of ingredients were: fish meal, soybean meal, wheat flour, wheat middlings, corn, Rangen Inc. (Buhl, Idaho); soybean oil (Hain Pure Food Co., Los Angeles, California); vitamin premix, Moore Clark Co. (La Conner, Washington); alphacellulose, dextrin, ICN Biochemicals, Inc. (Costa Mesa, California); carboxymethylcellulose, Sigma Chemical Co. (St. Louis, Missouri).
[2]Vitamin premix added the following per kilogram of diet: vitamin A (palmitate or acetate), 1104 IU; alpha tocopheryl acetate, 336 IU; menadione sodium bisulfite complex, 12 mg; thiamine mononitrate, 30.4 mg; riboflavin, 35.4 mg; pyridoxine HCl, 25.8; d-calcium pantothenate, 76.4; niacin, 148 mg; d-biotin, 0.4 mg; vitamin $B_{12}$, 0.04 mg; myoinositol, 88 mg; folic acid, 11 mg.
[3]See table 3.8 for composition of mineral mix; micro mineral solution added the following per kilogram of diet: iodine, 0.1 mg; selenium, 0.2 mg.
[4]Type 3 - Commercial grade from corn white powder; 12% soluble.

TABLE 3.8

Composition (g/kg premix) of trial 2.3 mineral premixes.

| Chemical[1] | Control | Experimental |
|---|---|---|
| $FeSO_4.7H_2O$ | 135 | 26 |
| KI | 1.11 | 0.23 |
| $MnSO_4.H_2O$ | 7.06 | 1.46 |
| $Ca(H_2PO_4)_2$ | 857 | 179 |
| $K_2HPO_4$ | 0 | 376 |
| KCl | 0 | 417 |
| Total | 1000 | 1000 |

[1]All chemicals were obtained from Sigma Chemical Co. (St. Louis, Missouri).

TABLE 3.9

Composition (%) of the diets used in trial 2.4.

| Ingredient[1] | Experimental |
|---|---|
| Anchovy meal | 13.5 |
| Soybean meal | 45.8 |
| Wheat flour | 11.1 |
| Corn | 18.7 |
| Soybean oil | 2.5 |
| Vitamin premix[2] | 1.0 |
| Alphacel | 0.00 |
| Mineral premix[3] | 2.36 |
| Dextrin[4] | 5.0 |
| Total (percent) | 100 |

TABLE 3.9-continued

Composition (%) of the diets used in trial 2.4.

| Ingredient[1] | Experimental |
| --- | --- |

[1]Sources of ingredients were: fish meal, soybean meal, wheat flour, wheat middlings, corn, Rangen Inc. (Buhl, Idaho); soybean oil (Hain Pure Food Co., Los Angeles, California); vitamin premix, Moore Clark Co. (La Conner, Washington); alphacellulose, dextrin, ICN Biochemicals, Inc. (Costa Mesa, California); carboxymethylcellulose, Sigma Chemical Co. (St. Louis, Missouri).
[2]Vitamin premix added the following per kilogram of diet: vitamin A (palmitate or acetate), 1104 IU; alpha tocopheryl acetate, 336 IU; menadione sodium bisulfite complex, 12 mg; thiamine mononitrate, 30.4 mg; riboflavin, 35.4 mg; pyridoxine HCl, 25.8; d-calcium pantothenate, 76.4; niacin, 148 mg; d-biotin, 0.4 mg; vitamin $B_{12}$, 0.04 mg; myoinositol, 88 mg; folic acid, 11 mg.
[3]See table 3.10 for composition of mineral mix; micro mineral solution added the following per kilogram of diet: iodine, 0.1 mg; selenium, 0.2 mg.
[4]Type 3 - Commercial grade from corn white powder; 12% soluble.

TABLE 3.10

Composition (g/kg premix) of the trial 2.4 mineral premix.

| Chemical[1] | Experimental |
| --- | --- |
| $FeSO_4.7H_2O$ | 64.0 |
| KI | 0.17 |
| $MnSO_4.H_2O$ | 2.27 |
| $Ca(H_2PO_4)_2$ | 345 |
| $NaH_2PO_4.H_2O$ | 17.9 |
| $K_2HPO_4$ | 571 |
| Total | 1000 |

[1]All chemicals were obtained from Sigma Chemical Co. (St. Louis, Missouri).

Results and Discussion—Phase 1
Lettuce Yield and Growth

Lettuce grew at rates similar to values reported for other hydroponic systems (Bedasie and Stewart, 1984; Mongeau and Stewart, 1984; Prince and Koontz, 1984) although yield and growth decreased significantly between trials 1.1 and 1.3. A persistent nutritional disorder was apparent near the end of all three trials that caused severe tip burn on meristematic leaves of age 3 and 4 plants, which were clinical signs often observed in Ca-deficient plants. The accumulation of Na at the end of each trial right have inhibited Ca uptake, resulting in the observed clinical signs, because Ca concentrations remained high throughout phase 1.

Lettuce yields did not differ significantly among treatments although when average lettuce yield for each trial group were averaged, trial 1.3 yields differed significantly from both trials 1.1 and 1.2 (FIG. 4.1). Average total trial yields were 3942, 3615, and 2725 g for trials 1.1, 1.2, and 1.3, respectively. The decrease in average yield between trials 1.2 and 1.3 corresponded to total trial incident radiation levels outside the greenhouse facility which were 557, 537, and 378 $MJ/m^2$ for trials 1.1, 1.2, and 1.3, respectively. Although lettuce yield varied among systems and among trials, the addition of lettuce yield to the analysis of variance regression model as a covariate was non-significant. For this reason, the pooling of treatment responses replicated across time was justified.

Pest Control

Pest infestation by white flies, moth larvae, thrips, and aphids was a persistent problem during all trials, but control measures were effective in mitigating crop damage.

Fish Growth and Feeding

Daily instantaneous growth rates $(G_W)$[1] did not differ significantly among treatment levels (Appendix 13); when average $G_W$ values were compared by trial rather than by treatment, a significant difference was detected between trials 1.2 and 1.3. Daily instantaneous growth rates averaged 3.04, 3.17, and 2.77% for trials 1.1, 1.2, and 1.3, respectively. Feed efficiencies (wt. gain÷wt. diet fed·100%) were high and did not differ among treatments or between trials. Average trial feed efficiencies were 100, 112, and 105% for trials 1.1, 1.2, and 1.3, respectively, and fish weight increased from 3.8 to 97.3 g from the beginning of trial 1.1 to the end of trial 1.3.

[1]Daily instantaneous growth rate=$(\ln[W_1]-\ln[W_0])\div T$; where, $W_1$=weight at end of period, $W_0$=weight at beginning of period, and T=time interval in days.

Fish density did not affect growth rate or feed efficiency because growth rates did not differ significantly among treatment levels. Moreover, the fish grew rapidly despite the elevated nutrient concentrations of the solution. Although the fish differed in size between trials, the trial growth rates did not differ appreciably because the fish were fed restricted rations during all trials.

Water Quality

Unionized $NH_3$—N (<0.074 mg/l), $NO_2$—N (<0.05 mg/l), dissolved oxygen (>5.0 mg/l), temperature (27–32° C.), pH (7.5), and alkalinity (40–100 mg/l as $CaCO_3$) did not differ significantly among treatments and were considered acceptable for tilapia.

Relative Changes in Concentration

The disparity among the relative fractions of nutrients made available by fish and the fractions of nutrients assimilated by plants resulted in differential rates of change in concentration for the nutrients measured (FIG. 4.2). The relative changes in concentration (percent change from initial concentration) generally followed the trend: Zn>N≈Mg>K>Ca≈P>Cu>Fe>Mn, although some variation from this trend was observed.

This research confirmed that nutrients do not accumulate at equal rates in integrated systems if standard fish diets are used. Rakocy et al. (1993) reported that P, K, and Fe are deficient in waters from systems receiving standard diets, which was supported by the findings of this research. He also reported that the accumulation rates of major ions, in descending order of magnitude, were $NO_3$—N>Ca>K>$SO_4$>Na>P>Mg. In this study, the accumulation rates (absolute, not percentage change) were Na>$NO_3$—N≈Mg>K>Ca≈P. The probable reason for the observed differences is that the systems used by Rakocy et al. (1993) had gravel as a hydroponic support medium which served as a Ca source, whereas $NaHCO_3$ was used to maintain alkalinity in this study. Also, the mineral compositions of the diets were probably different. Rakocy et al. (1993) reported that the relative accumulation rates were K>N>P>Ca>S>Mg when KOH was added as an alkalinity source and that the micronutrients Fe, Zn, Mn, Cu, and B did not accumulate with respect to cumulative feed. In this study, changes in the dissolved quantities of Mn and Zn varied significantly with treatment level for while those of Fe and Cu did not.

Mass Balance and Nutrient Allocation

The ratios of the quantities of minerals recovered in lettuce tissue, fish tissue, and solids to the quantities of elements provided in the diet are illustrated in figures referenced in the following section (see FIG. 4.3 for example). The upper lines in each figure represent the sum of the percentages of dietary minerals recovered in lettuce tissue, fish tissue, and solids; sums exceeding 100% of dietary minerals indicate that mineral removal exceeded mineral production by fish resulting in a reduction in dissolved mineral concentration. Although minerals ultimately recovered in the lettuce, fish, and solids may have originated from the solution rather than the diet, the calculation of the ratio is a useful means of comparing the relative significance of lettuce, fish, and solids as nutrient sinks and provides an estimate of the fish biomass required to establish equilibrium concentrations (denoted by arrows). The ratios for lettuce decreased from the low to high biomass treatments because of the decreasing ratio of lettuce yield to fish yield. Ratios for fish did not differ significantly among treatment levels for any element. Mass recoveries of solids (weight of solids/weight of diet·100%) were 16.5% (151 g), 12.5% (377 g), 9.2% (902 g), and 8.8% (1804 g), and were apparently the cause of the general reduction of the solids ratio with treatment size observed for most nutrients. Solids ratios for Ca, Cu, Fe, and Zn showed significant treatment differences.

Calcium

The Ca concentrations in the solution for phase 1 are listed in Appendix 9. Calcium concentrations declined rapidly in all systems so they were supplemented during the trial with $CaCl_2 \cdot 6H_2O$. Calcium uptake by plants ranged from 97% of the quantity provided in the diet for the 151 g treatment to 13% for the 1804 g treatment (FIG. 4.3). The observed trend was due to the increasing ratio of lettuce to fish because lettuce tissue Ca concentrations did not differ significantly between treatment groups (Table 4.1). The Ca recovered in the fish ("apparent retention") ranged from 85% (151 g) to 102% (1804 g) of the Ca provided in the diet, but did not differ significantly among treatment groups. Significant populations of aquatic snails became established in several systems during trial 1.1 and all systems during trials 1.2 and 1.3. The snail populations were roughly equivalent among systems, and since nearly all snails were ultimately removed with the solids, the Ca concentrations of the solids were elevated more in low fish biomass levels than in high biomass levels. Calcium recovered in the solids ranged from 169% (151 g) to 71% (1804 g) of the Ca provided in the diet indicating low availability in the diet. The total quantity of Ca recovered in lettuce, fish, and solids exceeded the quantity provided in the diet for all treatment levels. A significant negative relationship between biomass level and change in the quantity of dissolved Ca was detected during trial 1.2, although no significant relationship was detected during trials 1.1 or 1.3 (Table 4.2 and FIG. 4.4). This negative relationship might have been caused by the precipitation of hydrous calcium phosphate. If phosphate production by fish was the rate limiting step, greater precipitation, and hence Ca loss, would have occurred in the larger biomass treatments.

Although the Ca bioavailability ([quantity of nutrient in the diet—quantity of nutrient in the solids]/quantity of nutrient in the diet) determinations were confounded by the presence of snails in the solids, a Ca bioavailability of 48% was estimated from several trial 1.1 systems not having snails. Despite low Ca availability, the quantities of Ca recovered in the fish were nearly equal to those in the diet for all treatment levels indicating that a significant fraction of the nutritional requirement was met through active uptake from the environment. Although the Ca concentrations of solids were artificially elevated by snails, the total quantity of Ca recovered in the fish, lettuce, and solids was 82% greater than the Ca provided in the diet for the highest biomass treatment, indicating that substantial increases in fish biomass or available dietary Ca would be required to provide sufficient Ca for plants if no exogenous Ca source was provided. Rakocy et al. (1993) demonstrated that with the addition of gravel substrate to an integrated system, the accumulation rate of Ca was increased several fold. In fact, the liberation of Ca from $CaCO_3$ can be estimated if the quantity of $H^+$ liberated by the bacterial oxidation of $NH_3$—N is known. Haug and McCarty (1971) in Wheaton (1977) estimated that 7.13 Kg of bicarbonate alkalinity as $CaCO_3$ is required to neutralize the hydrogen ions liberated from the bacterial oxidation of 1 kg of $NH_3$—N. However, it is important to avoid excessive accumulation of Ca in the medium because high Ca levels can interfere with the uptake of K and Mg by plants (Gerber 1985).

Copper

The Cu concentrations for phase 1 are listed in Appendix 9. Changes in the quantity of dissolved Cu did not vary significantly with treatment level in the integrated systems (FIG. 4.5) although the decrease in dissolved copper was significantly less in the control systems. Copper uptake by plants ranged from 107% of the quantity provided in the diet for the 377 g treatment to 22% for the 1804 g treatment (FIG. 4.6). The apparent retention of Cu by the fish ranged from 10% (151 g) to 20% (1804 g) of the Cu provided in the diet, but did not differ significantly among treatment groups. Quantities of Cu recovered in the solids ranged from 259% (377 g) to 143% (1804 g) of the Cu provided in the diet. The total quantity of Cu recovered in fish, plants, and solids exceeded the quantity provided in the diet for all treatment levels.

The change in Cu concentration did not vary significantly with treatment level and the quantity of Cu recovered in the solids typically exceeded the quantity provided in the diet indicating low biological availability and precipitation. Dissolved Cu concentrations in systems with fish dropped gradually over time while concentrations rose rapidly in control systems (Appendix 9). This suggests that some compound present in the fish diet encouraged precipitation.

Iron

The Fe concentrations for phase 1 are listed in Appendix 9. Change in quantity of Fe varied significantly with treatment level during trial 1.1, but not during trials 1.2 and 1.3 (FIG. 4.7). Iron uptake by plants ranged from 49% of the quantity provided in the diet for the 377 g treatment to 9% for the 1804 g treatment (FIG. 4.8). The apparent retention of Fe in the fish ranged from 4% (151 g) to 6% (902 g) of the Fe provided in the diet, but did not differ significantly among treatment groups. Quantities of Fe recovered in the solids ranged from 160% (151 g) to 99% (1804 g) of the Fe provided in the diet. The total quantity of Fe recovered in fish, plants, and solids exceeded the quantity provided in the diet for all treatments.

Although change in dissolved quantity of Fe varied significantly with treatment level during trial 1.1, this trend was not observed during trials 1.2 and 1.3. The quantity of Fe recovered in the solids was greater than or equal to the quantity recovered in the solids for all treatment levels indicating precipitation of Fe from the solution. Iron commonly precipitates as hydrous ferric oxide at pH levels above 6.5 (Alt 1980) and/or in the presence of ultraviolet radiation (Mohyuddin 1985), a process that would not have discriminated between treatment levels. Hydrous ferric oxide has a tendency to coat system components which may explain, in part, the poor recovery of Fe. The decreasing recovery of Fe in the solids (as percent of dietary Fe) with increasing biomass was probably the result of the Fe precipitate forming a relatively greater proportion of the solids in the lower biomass treatments. The stability of dissolved Fe can be increased by chelation with organic acids such as ethylenediamine tetraacetic acid (EDTA), diethylenetriamine pentaacetic acid (DTPA), or ethylenediamine di(o-hydroxyphenylacetic acid (EDDHA). Fischer (1984) reported that the relative stabilities of several chelated Fe compounds were FeEDDHA>FeDTPA>FeEDTA and that FeEDDHA was reasonably stable at pH values above 7.0. FeEDTA had the lowest availability of the chelated Fe forms at all pH levels.

Potassium

The K concentrations for phase 1 are listed in Appendix 9. Change in the quantity of dissolved K varied significantly with treatment level only during trial 1.3 (FIG. 4.9). Potassium uptake by plants ranged from 755% of the quantity provided in the diet for the 151 g treatment to 70% for the 1804 g treatment (FIG. 4.10). The apparent retention of K by the fish ranged from 23% (151 g) to 26% (902 g) of the K provided in the diet, but did not differ significantly among treatment groups. Quantities of K recovered in the solids ranged from 6% (151 g) to 3% (1804) of the K provided in the diet. The total quantity of K recovered in fish, plants, and solids exceeded the quantity provided in the diet for all but the 1804 g treatment.

Potassium concentrations declined in all systems because available dietary K was less than that consumed by fish and plants. The result was expected given that whole body K concentration of fish is low (~1%), and as a result, fish diets are typically low in K, while K can comprise over 10% of the dry matter of plants. Lettuce uptake dominated the K budget of system, consuming from 3 (1804 g) to 33 (151 g) times the quantity retained by the fish. The trace quantities of dietary K (3–6%) recovered in the solids confirmed that the availability of K in natural feedstuffs is typically high because it is present primarily in freely-soluble forms. Since the K was highly available and apparent retention by fish ranged from 23 to 26%, there was a strong correlation between fish biomass and change in the quantity of dissolved K, although the relationship was significant only during trial 1.3. These findings indicate that high fish to plant yield ratios or high dietary inclusion rates of K are required to satisfy the discrepancy between K production by fish and K uptake by plants.

Magnesium

The Mg concentrations during phase 1 are listed in Appendix 9. Change in the quantity of dissolved Mg varied significantly with treatment level during trials 1.2 and 1.3 (FIG. 4.11). Magnesium uptake by plants ranged from 133% of the quantity provided in the diet for the 151 g treatment to 14% for the 1804 g treatment (FIG. 4.12). The apparent retention of Mg by the fish ranged from 19% (151 g) to 22% (902 g) of the Mg provided in the diet, but did not differ significantly among treatment groups. Quantities of Mg recovered in the solids ranged from 24% (151 g) to 14% (1804 g) of the Mg provided in the diet. The total quantity of Mg recovered in fish, plants, and solids exceeded the quantity provided in the diet for the 151 and 377 g treatments, but was less than the quantity provided in the diet for the 902 and 1804 g treatments.

The changes in the quantities of dissolved Mg encompassed the theoretical equilibrium point (no change in quantity) for all treatment levels during trials 1.2 and 1.3 (FIG. 4.11). As shown in FIG. 4.11, the equilibrium biomass level is approximately 500 g of fish. Lettuce uptake dominated the Mg budget in the lower biomass treatments by consuming 3.6 (377 g) to 7 (151 g) times the quantity recovered in the fish. Apparent Mg retention by fish (19–22%) and that recovered in the solids (14–24%) were roughly equivalent indicating that while the bioavailability of Mg in the diet is high, it is less than that of K. The control of Mg accumulation is important because high Mg concentrations can interfere with Ca and K uptake and result in the accumulation of $SO_4$ (Gerber 1985).

Manganese

The Mn concentrations for phase 1 are listed in Appendix 9. Changes in quantity of dissolved Mn varied significantly with treatment level during all trials (FIG. 4.13). Manganese uptake by plants ranged from 192% of the quantity provided in the diet for the 377 g treatment to 62% for the 1804 g treatment (FIG. 4.14). The apparent retention of Mn by the fish was 3% of the Mn provided in the diet for all treatments. Quantities of Mn recovered in the solids ranged from 60% (377 g) to 40% (902 g) of the Mn provided in the diet. The total quantity of Mn recovered in fish, plants, and solids exceeded the quantity provided in the diet for all treatments.

The significant relationship between the change in the quantity of dissolved Mn and treatment level is misleading because during all three trials, Mn concentrations dropped sharply to very low levels. Lettuce uptake dominated the Mn budget while the apparent retention of Mn by fish was low (3%). Manganese availability for plants is reduced at high pH, but chelated forms can be used in high pH waters (Gerber 1985). The sharp drop in Mn concentration was probably due to the formation of a precipitate (e.g., $MnO_2$ or insoluble phosphates). The recovery of moderate (40–60%) amounts of Mn in the solids indicate low biological availability and/or precipitation.

Nitrogen

The accuracy of the $NO_3$—N measurements was compromised by the 5000-fold dilution required prior to analysis. Accordingly, any apparent relationships between treatment and change in concentration are unreliable listed in Appendix 9. Change in the quantity of $NO_3$—N varied significantly with treatment level only during trial 1.1 (FIG. 4.15). The recovery of known additions of N could not be determined accurately because the solution was the largest reservoir of N and the $NO_3$—N values were unreliable. Nitrogen uptake by plants ranged from 67% of the quantity provided in the diet for the 151 g treatment to 8% for the 1804 g treatment (FIG. 4.16). The apparent retention of N by the fish ranged from 42% (151 g) to 47% (902 g) of the N provided in the diet, but did not differ significantly among treatment groups. Quantities of N recovered in the solids ranged from 15% (151 g) to 7% (902) of the N provided in the diet. The total quantity of N recovered in fish, plants, and solids exceeded the quantity provided in the diet for the 151 g treatment and was less than the quantity provided in the diet for the 377, 902, and 1804 g treatments.

The marginally-significant relationship between treatment level and change in the quantity of dissolved $NO_3$—N during trial 1.1, and the absence of such a relationship during trials 1.2 and 1.3, indicate that treatment level had little effect on the accumulation rate of N in this study. Ammonia production and subsequent nitrification were clearly higher for higher treatment levels, as evidenced by higher acid-neutralizing requirements, indicating that substantial quantities of N were lost to denitrification. Indications of denitrification were the floating fecal mats in the clarifiers and the regular emanation of bubbles from the solids settled in the clarifiers. Because denitrification is an anaerobic process taking place primarily in the solids, it would seem that high treatment levels having larger deposits of solids than low treatment levels, would lose more N by denitrification; this appears to be the case in this study. Relative accumulation rates for N and Mg were roughly equivalent in contrast to the findings of Rakocy et al. (1993) in which $NO_3$—N accumulated faster than all other nutrients and accumulated much faster than Mg. In our study, N recovered in fish exceeded that recovered in plants in all but the 151 g treatments, but both plants and fish were substantial components of the nutrient budget. Only 8–15% of the N provided in the diet was recovered in the solids indicating that dietary N is highly available and that if denitrification were controlled, the rate of accumulation would vary significantly with biomass. The assumption of negligible N loss was generally incorrect although a near-equilibrium state was observed in a 377 g treatment (the treatment theoretically resulting in equilibrium) during trial 1.2. As illustrated in FIG. 4.16, the biomass level in which N recovered in fish, plants, and solids equals the quantity provided in the diet is approximately 350 g, but this assumes 100% recovery of N. The control of $NO_3$—N accumulation is important because high levels can inhibit the uptake of P (Douglas 1985) and very high levels are toxic to fish.

Sodium

The Na concentrations during phase 1 are listed in Appendix 9. Change in the quantity of dissolved Na varied significantly with treatment level only during trial 1.2 (FIG. 4.17). Sodium uptake by plants ranged from 116% of the quantity provided in the diet for the 151 g treatment to 10% for the 1804 g treatment (FIG. 4.18). The apparent retention of Na in the fish ranged from 57% (151 g) to 42% (1804 g) of the Na provided in the diet, but did not differ significantly among treatment groups. Quantities of Na recovered in the solids ranged from 19% (151 g) to 10% (1804) of the Na provided in the diet. The total quantity of Na recovered in fish, plants, and solids exceeded the quantity provided in the diet for all but the 1804 g treatment.

The rapid accumulation of Na was due primarily to the use of $NaHCO_3$ as an alkalinity source. The positive correlation between treatment level and increase in the quantity of dissolved Na was observed primarily because more $NaHCO_3$ was required to neutralize the hydrogen ions produced during the nitrification of $NH_4$—N in systems with higher biomass levels. Sodium bicarbonate should not be used as an alkalinity source for extended experiments because Na can accumulate to phytotoxic levels, and Na can interfere with the uptake of K and Ca at sub-phytotoxic levels (Douglas 1985).

Phosphorus

The P concentrations for phase 1 are listed in Appendix 9. Phosphorus concentrations dropped sharply during the first half of each trial. The quantity of P removed from the solution was much higher than the quantity absorbed and retained by the lettuce indicating that precipitation was occurring. Change in the quantity of dissolved P varied significantly with treatment level during all trials (FIG. 4.19). Phosphorus uptake by plants ranged from 48% of the quantity provided in the diet for the 151 g treatment to 7% for the 1804 g treatment (FIG. 4.20). The apparent retention of P by the fish ranged from 35% (151 g) to 39% (902 g) of the P provided in the diet, but did not differ significantly among treatment groups. Quantities of P recovered in the solids ranged from 59% (151 g) to 33% (1804 g) of the P provided in the diet. The total quantity of P recovered in fish, plants, and solids exceeded the quantity provided in the diet for all but the 1804 g treatment.

The sharp reduction in dissolved P over the first half of each trial could not be accounted for by the uptake of P by lettuce. A precipitate, with a mean composition of 42% Ca and 20% P, accumulated on the submersible heater elements of each system. The chemical composition of the precipitate is similar to that of calcium phosphate, $Ca_3(PO_4)_2$, which is 39% Ca and 20% P and is known to precipitate in hydroponic solutions (Gerber 1985). Iron and P tend to precipitate in hydroponic solutions as a function of pH (Douglas 1985). A pH of 7.5, while near-optimal for nitrification, is suboptimal for the solubility of P. The apparent retention of P from the diet, which varied from 51 to 59%, was in close agreement with the value of 50% determined by Lovell (1978) for channel catfish fed a soybean-based diet. The decreasing recovery of P in the solids with higher biomass treatments was probably due to the dissolution of solids.

Zinc

The Zn concentrations for trial 1 are listed in Appendix 9. Zinc accumulation rates varied significantly with treatment level during trials 1.1 and 1.3 (FIG. 4.21). Zinc uptake by plants ranged from 56% of the quantity provided in the diet for the 151 g treatment to 8% for the 1804 g treatment (FIG. 4.22). The apparent retention of Zn by the fish ranged from 35% (151 g) to 39% (902 g) of the Zn provided in the diet, but did not differ significantly among treatment groups. Quantities of Zn recovered in the solids ranged from 90% (151 g) to 48% (1804 g) of the Zn provided in the diet. The total quantity of Zn recovered in fish, plants, and solids exceeded the quantity provided in the diet for all but the 1804 g treatments.

Samples of makeup water were collected periodically, but because substantial variation in Zn concentration in makeup water was observed, the high recovery values of Zn (110–203%) were probably related to the inability to properly quantify the Zn added in the makeup water. There were no galvanized steel components in any of the experimental systems. The significant relationships between Zn accumulation and treatment level demonstrated that Zn can be controlled by varying fish to plant ratios.

Model Parameters

Values for adjusted availability (A') for all nutrients decreased significantly with increasing contribution of total nutrients by dietary sources when A' values of 1.00 were assumed for the control treatments (Appendix 12). The control A' value for all nutrients was assumed to be 1.00 because of the absence of quantifiable precipitate material at the end of each trial. When the control treatments were removed from the analysis, Ca, Cu, Fe, K, Mg, N, and Na still showed significant relationships, but Mn, P, and Zn did not.

The reduction in A' values with increasing dietary nutrient contribution was apparently the result of exogenous nutrients having higher availability than nutrients added in the diet, which must first be routed through the fish. As the fish biomass increased, the observed A' values appeared to approach the estimates for A ($[N_D-N_S]/N_D$), determined solely from the apparent bioavailability of minerals in the diet, thereby supporting the prediction that if all the nutrients were provided in the diet (the situation with designer diet use), A' would equal A.

Values for adjusted recovery (R') did not differ significantly between treatment levels like A' (Appendix 11). This is not surprising given that the factors influencing the R' parameter, such as inadvertent mineral supplementation, volatilization, and water loss/exchange would not have differed between treatments.

TABLE 4.1.

Elemental composition of phase 1 lettuce (dry wt.)

| Fish Biomass | Macronutrients (%) | | | | | | Micronutrients (mg/kg) | | | |
|---|---|---|---|---|---|---|---|---|---|---|
| (g) | Ca | K | Mg | N | Na | P | Cu | Fe | Mn | Zn |
| 0 | 1.9 | 10.9 | 0.33 | 4.3 | 0.44 | 1.1 | 23 | 710 | 370 | 170 |
| 151 | 1.8 | 11.0 | 0.46 | 4.7 | 0.70 | 0.9 | 27 | 470 | 270 | 240 |
| 377 | 2.2 | 10.4 | 0.29 | 4.6 | 0.58 | 1.1 | 38 | 730 | 500 | 260 |
| 902 | 1.9 | 10.9 | 0.33 | 4.3 | 0.44 | 1.1 | 23 | 710 | 370 | 170 |
| 1804 | 2.0 | 9.8 | 0.21 | 4.6 | 0.61 | 1.1 | 33 | 690 | 800 | 350 |

TABLE 4.2.

Changes in the total quantities of some elements present in soluble form within a system.[1]

| | Treatment | Ca | Cu | Fe | K | Mg | Mn | Na | P | Zn |
|---|---|---|---|---|---|---|---|---|---|---|
| Nutrient change[2] | 0 | $-37.3^{xy}$ | $-15.0^x$ | $-567^x$ | $-16.5^{xz}$ | $-0.93^{wx}$ | $115^x$ | 9.1 | $-4.15^x$ | $-28^x$ |
| | 151 | $-23.4^x$ | $-3.5^y$ | $-610^x$ | $-26.3^y$ | $-2.34^y$ | $-68^x$ | $25.6^{yz}$ | $-4.10^x$ | $39^{xy}$ |
| | 377 | $-27.1^x$ | $-15.1^x$ | $-781^x$ | $-21.9^{yz}$ | $-1.48^{wy}$ | $-114^x$ | $25.2^z$ | $-3.98^x$ | $25^y$ |
| | 902 | $-32.6^x$ | $-16.9^x$ | $-714^x$ | $-16.8^{yx}$ | $-0.51^x$ | $-107^x$ | $34.5^{yz}$ | $-3.43^y$ | $75^y$ |
| | 1804 | $-49.9^y$ | $-18.9^x$ | $-848^x$ | $-9.6^x$ | $1.04^z$ | $-112^x$ | $37.4^y$ | $-3.12^y$ | $184^z$ |
| | F[3] | 3.92* | 2.02 | 1.18 | 4.23* | 8.94* | 0.88 | -10.96* | 28.49* | 16.55* |

[1]Values represent the mean treatment values for all replicates during all trials.
[2]Nutrient change refers to the treatment mean change in quantity of dissolved elements in a system over a 28 day experiment. The quantity of dissolved Cu, Fe, Mn, and Zn are reported in milligrams; all other elements are reported in grams.
[3]Mean nutrient changes not having the same superscript are significantly different ($p < 0.05$). Starred F values indicate that significant ($p < 0.05$) treatment differences were detected using a one-way ANOVA modelled as a regression.

Results and Discussion—Phase 2

Lettuce Yield and Growth

Lettuce grew slightly faster during phase 2 than during phase 1; mean trial lettuce yields were 4501, 5363, 5328, and 4669 g per system for trials 2.1, 2.2, 2.3, and 2.4, respectively (FIG. 5.1). Significant differences in yield were detected between trials 2.1, 2.2 and 2.3 (inclusive), and 2.4 (Appendix 7), although the magnitude of the differences were small. Variation in lettuce yield within trials was minor and no significant difference was detected between lettuce yields of the experimental and control treatments during any trial. The predicted lettuce yield for trial 2.1 was 4500 g, based on lettuce yields prior to the first trial. The cause of the slight increase in yield during trials 2.2 and 2.3 is uncertain. Although light levels in the environmental chamber were less than saturation, light did not appear to be the cause of the observed yield differences. Light levels dropped from approximately 22,000 lux (20 cm above tallest lettuce plant) during trial 2.1 to 17,000 lux during trial 2.4. The increases in yield did not correspond to changes in light levels, but are more likely the result of subtle differences in the experimental protocols between trials, such as differences in the time of day in which transplanting took place. Plants did not show the Ca-deficiency symptoms observed during phase 1. This was probably due to the lower Na concentrations maintained during phase 1.

Fish Growth 2.1

During trial 2.1, the experimental fish grew at a daily instantaneous growth rate ($G_W$) of 1.97, which was significantly greater than the control $G_W$ of 1.73 (Appendix 13). Control and experimental fish grew from an initial weight of 64 g to 107 g and 112 g, respectively. Feed conversion ratios (FCR) were 1.35 (control) and 1.16 (experimental) during the first half of the experiment, but rose to 2.22 (control) and 1.83 (experimental) during the last half. The net trial FCR values of 1.69 (control) and 1.42 (experimental) were significantly different and were higher than the predicted level of 1.25 used for the dietary mineral inclusion calculations.

The cause of the different growth rates is uncertain. The divergence in growth rates was apparent at the first harvest although the difference was not yet significant. Water quality and environmental parameters were equivalent between treatments and negligible uneaten food was observed in both experimental or control replicates during the first half of the trial, suggesting that the difference was nutritional in origin. The sources of the basal ingredients and the method of diet manufacture were identical for both control and experimental diets. Notable differences in diet composition were that the control diet contained more alphacellulose (control 6.3%; experimental 1.3%), less mineral mix (control 2.7%; experimental 7.7%), and the mineral mix was markedly different in composition (Table 3.4). Mineral deficiencies were unlikely because mineral analysis of the control diet indicated that the minerals were present at levels well above the mineral requirements of tilapia if conservative mineral bioavailability estimates are assumed. Alternative explanations include inadvertent differences in diet manufacture that may have influenced vitamin nutrition. Ascorbic acid was present in the vitamin premix, but might have been oxidized more in the control diet than the experimental diet, resulting from subtle differences in manufacturing technique.

The growth rates and FCR values observed in both control and experimental treatments were significantly less than observed during phase 1. Several factors including the use of mixed-sex populations of fish rather than sex-reversed fish; the phase 1 diets had been steam extruded, thereby improving carbohydrate digestibility and reducing trypsin inhibitor activity; the phase 1 fish were fed more (5% versus 4%); the phase 1 diet had higher protein content (40% versus 35%); a floating diet was used during phase 1, whereas sinking diets were used during trial 2.1; the fish were different sizes; and the solvent-extracted soybean meal used during trial 2.1 was not heated to destroy any residual trypsin inhibitor. Size divergence between male and female fish was clearly apparent by the end of the trial and all control and experimental systems contained brooding females and/or fry at trial-end, indicating that the use of mixed-sex populations affected the observed growth rates. Substantial differences in FCR values are commonly observed between steam extruded and compressed pellets having virtually the same composition in commercial diets (C. Peterschmidt, pers. comm.), primarily due to improved carbohydrate digestibility, trypsin inhibitor destruction, and the fact that less feed typically goes uneaten with steam extruded diets. Trypsin inhibitor might have limited growth on the diet although the excellent food conversion ratios observed during the first half of the trial in the experimental treatments (1.16) would indicate otherwise because trypsin inhibitor would illicit its effects immediately. Lastly, fish size might have affected the results although the mean trial FCR value observed during trial 1.3, when fish were approximately the same size (38 to 97 g), was 1.14 and was only slightly lower than observed in the experimental treatments during the first half of trial 2.1.

The growth rates and FCR values for each treatment dropped dramatically after the first harvest. A marked reduction in appetite was observed the day of and the day after the mid-trial harvest, primarily due to the handling stress associated with the procedure. Although feeding on these days was restricted, some uneaten feed was observed which ultimately resulted in slightly cloudy water. Some uneaten feed at various stages of disintegration was regularly observed among the fecal material settled on the bottom of the fish tank during the latter half of the trial.

2.2

During trial 2.2, control and experimental fish grew at a $G_W$ of 1.71 and 1.60, respectively, which did not differ significantly (Appendix 13). Control fish grew from 53 to 92 g and experimental fish grew from 50 to 96 g, respectively. Feed conversion ratios were 1.48 (control) and 1.56 (experimental) during the first half of the experiment, but rose to 1.84 (control) and 2.06 (experimental) during the last half, resulting in net trial FCR values of 1.63 (control) and 1.77 (experimental). The FCR values did not differ significantly between treatments, but were both greater than the predicted level of 1.4 used for the dietary mineral inclusion calculations.

The growth rates and FCR values observed were approximately the same as during trial 2.1 for the control treatment although the growth rates were lower and the FCR values were higher for the experimental treatments. Unlike trial 2.1, the FCR and fish growth rates for trial 2.2 did not differ significantly between experimental and control treatments. The FCR values were higher during the first half of the trial than during trial 2.1, although they were similar during the latter half of the trial.

Ten days into the trial, mortalities were observed in an experimental replicate and by 14 days into the trial, mortalities were being steadily observed in both experimental and control treatments. The incidence of mortality increased following the first harvest and did not differ significantly between experimental and control treatments. The clinical signs observed in moribund fish were loss of equilibrium; loss of color or darkening of color; sunken eyes; dramatic fin erosion; circumferential hemorrhaging at the base of the pectoral fins; petechiation immediately caudal to the operculum and on the cranial third of the ventral abdomen; presence of clear, yellow-green, serous fluid in the abdominal cavity (ascites); and presence of small amounts of pale green gelatinous material in the adipose and connective tissue (edema). The infectious agent was very aggressive, as the time elapsed between the onset of clinical signs to mortality was approximately 24 hours. Two lots of fish were submitted two weeks apart to the Washington Animal Disease Diagnostic Laboratory (Pullman, Wash.). The first lot of two moribund were shipped live, although they died during transport. The bacteria *Aeromonas hydrophila, Klebsiella pneumoniae,* Pseudomonas spp., and *Citrobacter freundi* were isolated from the kidneys. Individual and groups of myocytes were fragmented, hypereosinophilic, and had degenerated. The muscles adjacent to the pectoral fins were most affected. The optic nerve of one fish and brainstem of the other had inflammatory cells having moderate focal infiltration with central to eccentric, round to bilobed hyperchromatic nuclei and abundant cytoplasmic round eosinophilic granules. Hepatocytes in both fish were distended by large, clear vacuoles having feathered edges. Brain, liver, kidneys, heart, gill, spleen and gastrointestinal tissues appeared normal.

The myopathy and absence of inflammation was suggestive of metabolic imbalances similar to that observed in vitamin E/selenium deficiencies (T. Baldwin, pers. comm.). Similarly, hepatocyte vacuolization is commonly observed in captive fish and is typically attributed to the diet (T. Baldwin, pers. comm.). The significance of the bacterial isolations were uncertain, and more samples were required for a presumptive diagnosis. Accordingly, a second pair of moribund fish were euthanized by MS-222 overdose and shipped on ice to the same laboratory. The fish showed ascites and edema similar to the fish of the prior submission, although the myopathy observed in the earlier samples was not observed. There was extensive centrilobular rarefication in the fish livers. Rarified areas were composed of hepatocytes distended by large, clear, centrally-oriented cytoplasmic vacuoles and nuclei were peripherally displaced. Extensive pancreatic necrosis and inflammation, degeneration, and necrosis of the spleen were observed in both fish. Gill epithelial cells lining the lamellae were hyperplastic.

Pancreatic necrosis is commonly a result of viral infection (T. Baldwin, pers. comm.) although the presumptive diagnosis was that the fish succumbed to a systemic bacterial infection of *A. hydrophila* or *P. multifilis*. Several of the clinical signs, including reduction in growth rate and FCR, were consistent with descriptions of aeromonad and pseudomonad septicemias in Tilapia spp. (Brock 1989). The hyperplastic gill epithelium was suggestive of an irritant(s) in the water (T. Baldwin, pers. comm.).

The fish had been held in a heated lakewater system prior to stocking into the experimental systems. The heat exchanger failed numerous times prior to using the fish for the experiment and the fish may have developed latent bacterial infections at that time. The stress associated with the transfer, experimental protocol, elevated nutrient levels in the experimental systems, and possible nutritional deficiencies may have suppressed the immunity of the fish and allowed the disease to ensue. The heat exchanger did not fail during the rearing of the fish used for trial 2.1 and no disease was observed, although the transfer procedure, experimental protocol, and nutrient concentrations of the water were identical to trial 2.2. Susceptibility might have been a result of nutritional deficiencies. Evidence for this was that the mortality rates for experimental treatments (26%) was consistently higher than that of the control treatments (15%) and that during the following trial, trial 2.3, experimental treatments experienced negligible mortality (1%) while control treatments experienced extremely high mortality (40%). The disparity in mortality rates between the experimental treatments of trials 2.2 (26%) and 2.3 (1%) occurred despite the fact that the diets were very similar and the ingredients were from the same lots. This suggests that a nutritional factor affected by slightly variable processing techniques predisposed fish to the disease. The myopathy observed in trial 2.2 was suggestive of vitamin E deficiency (NRC 1993), some other deficiency affecting the biological requirement and/or activity of vitamin E such as Se or vitamin C, or some factor increasing the vitamin E requirement (e.g., polyunsaturated fat content of the diet). It is improbable that Se deficiency contributed to the susceptibility because Se was added in the micromineral solution and trace mineral deficiencies generally take longer than 10 days to induce. The free form of ascorbic acid, the form most susceptible to atmospheric oxidation, was the form present in the vitamin mix and the hemorrhagic fins (J. E. Halver 1989) and gill hyperplasia (J. E. Halver, pers. comm.) were consistent with ascorbic acid deficiency signs. However, ascorbic acid deficiencies can take 12–20 weeks to manifest themselves (Halver, pers. comm.) and the onset of disease appeared 10 days into trial 2.2. Prior to trial 2.3, vitamin C deficiency was suspected, so the vitamin premix was supplemented with 75 mg/kg of ascorbic acid as L-ascorbyl-2-polyphosphate and 50 mg/kg of ascorbic acid as ascorbate-2-sulfate during subsequent trials.

2.3

During trial 2.3, the experimental fish grew at a $G_W$ of 1.78, which was significantly greater than the control $G_W$ of 1.36 (Appendix 13). Control fish grew from 55 to 96 g and experimental fish grew from 50 to 96 g, respectively. Feed conversion ratios were 1.38 (control) and 1.26 (experimental) during the first half of the experiment, but rose to 5.73 (control) and 1.98 (experimental) during the last half, resulting in significantly different net trial FCR values of 2.05 (control) and 1.51 (experimental). A FCR value of 1.60 had been used for the dietary mineral inclusion calculations.

The control fish suffered dramatic losses (40%) to the disease first observed during trial 2.2 although only one experimental treatment suffered any mortality (4%; experimental mean 1%). Control fish did not feed as vigorously as the experimental fish and they were fewer in number because the mortalities were not replaced. Consequently, the effective feeding rate of the control fish was higher than for the experimental treatments and a greater amount of uneaten feed was observed in the control treatment tanks. The reduction of appetite and loss of uneaten feed undoubtedly resulted in the poor growth rates and FCR values in the control treatment. Like trials 2.1 and 2.2, the growth rates and FCR values were poorer during the latter half of the experiment. The experimental and control diets had been supplemented with 75 mg/kg of ascorbic acid as L-ascorbyl-2-polyphosphate and 50 mg/kg of ascorbic acid as ascorbate-2-sulfate in an attempt to remedy the loss of fish. The mortality rate in the experimental treatment (1%) was dramatically less than the experimental treatment mortality observed during trial 2.2, although the trial 2.2 and 2.3 diets were very similar in composition, other than the difference in acsorbic acid supplementation. However, the mortality rate in the control treatments increased from trial 2.2 (15%) to trial 2.3 (40%), even though the composition of the diets were nearly identical and additional ascorbic acid had been added.

2.4

During trial 2.4, control fish grew at a $G_W$ of 2.24, which was significantly better than 1.78, the $G_W$ of the experimental fish (Appendix 13). Control and experimental fish grew from an initial weight of 29 g to 60 g and 51 g, respectively. Feed conversion ratios were 1.10 (control) and 1.22 (experimental) during the first half of the experiment, but rose to 1.17 (control) and 2.04 (experimental) during the last half, resulting in significantly different net trial FCR values of 1.13 (control) and 1.52 (experimental). A FCR value of 1.63 was used for the dietary mineral inclusion calculations.

The growth rates and FCR values for the experimental fish were consistent with values obtained during trials 2.1 through 2.3 while the control fish grew faster on the commercial control diet. The control diet was a re-pelleted version of the same diet used during phase 1, although the elemental composition showed marked differences (Appendix 6). The control FCR of 1.13 was equivalent to the FCR of 1.14 observed during trial 1.3 of phase 1, when the fish were approximately the same size as during trial 2.4 and when the floating diet was used. This indicates that the grinding and re-pelleting procedure did not greatly affect the nutritional quality of the diet.

Several factors may have contributed to the lower growth rates in the experimental treatments. The control diets had been previously steam extruded, a process which improves starch digestibility and reduces trypsin inhibitor activity whereas the soybean meal used in the experimental diets was not heated to reduce any remaining trypsin inhibitor. Additionally, the protein content of the control diet was also significantly higher (39%) than that of the experimental diets (35%).

The FCR values of the control replicates did not rise dramatically after the mid-trial harvest like the experimental replicates did. This suggests that a nutritional deficiency present in the experimental diets may have been compensated by body stores of the nutrient during the first half of the trial, but not during the latter half. Evidence for this is that the FCR values for control and experimental treatments were not significantly different at mid-trial. In fact, one of the experimental treatments had a lower FCR value than two of the control treatments at mid-trial.

The control and experimental fish suffered mortalities due to hemorrhagic septicemia at approximately the same rate, beginning at the same point in the experiment; control fish suffered 6% mortality and the experimental fish suffered 10% mortality. The fish were fed a commercial medicated diet containing sulfamerazine (Rangen, Inc., Buhl, Id.) for five days prior to the experiment. This treatment might have contributed to the lower mortality rates observed relative to previous trials.

In summary, the phase 2 fish did not grow as well as the phase 1 fish. Differences in carbohydrate digestibility and trypsin inhibitor levels were the most likely causes of the reduced growth rates and FCR values observed during phase 2 fish because the environmental and experimental conditions of both phases did not differ appreciably. Stressors prior to the experiments and dietary deficiencies may have contributed to disease susceptibility. The phase 2 growth rates and FCR values were acceptable, but not exemplary. Improvements in growth might have been achieved by reducing trypsin inhibitor levels in the soybean meal prior to diet manufacture and uneaten food might of been minimized by producing extruded, floating diets.

Nutrient Dynamics

During trial 2.1, a systematic error in calculating the mineral concentrations of the basal ingredients resulted in a 50% underestimation. Accordingly, the quantities of supplemental minerals were too low and the resulting dietary mineral concentrations were higher than desired. By coincidence, the Mg and P concentrations in the control diet were equivalent to the levels desired in the experimental diet, and because the bulk of the K in the experimental diet was provided in the mineral mix (not subject to the calculation error), the K content of the experimental diet was only slightly greater than desired (Appendix 6).

A power failure on the first day of the experiment occurred immediately after the initial water samples were taken. The water lines to the hydroponic troughs did not have siphon preventers and some water was lost. The quantity of water lost from each system was determined and the lost water was replaced with deionized water. A second water sample was taken after the solution was allowed to homogenize. A reduction in the concentrations of all nutrients was observed, and the amount was reliably quantified from the analysis of the samples taken before and after the incident.

Nitrogen 2.1

Following the initial water loss, $NO_3$—N concentrations dropped in both treatments and the reductions from initial concentrations of approximately 143 mg/l did not differ significantly between control (−27 mg/l or −19%) and experimental (−23 mg/l or −16%) treatments (FIG. 5.2). The highest R' value for N obtained during phase 1 (0.85) had been used for the determination of the initial fish biomass levels because it was presumed that the improved clarifier design of phase 2 would result in improved N recovery. The actual mean R' values determined were 0.69 and 0.74 for the control and experimental treatments, respectively, which were substantially less than predicted. The mean R' value for the control treatments was reduced by an exceptionally low value (0.64) in one of the replicates. The observed reduction of N concentrations in both treatments was due entirely to reduced R' because the A' values were equal to the predicted value (0.96) and less N was recovered in both plants and fish than predicted. The low N recovery rates indicated that the initial fish biomass level was too low and higher biomass levels would be required in subsequent trials.

2.2

Nitrate-N concentrations were at near-equilibrium for both treatments. Changes from initial concentrations of approximately 168 mg/l did not differ significantly between control (+7.3 mg/l or +4.3%) and experimental (+2.5 mg/l or +1.0%) treatments (FIG. 5.2). Control and experimental A' values equaled the predicted value (0.96), although the R' values for control (0.76) and experimental (0.73) treatments were slightly higher than predicted (0.71). The greater recovery of N was offset by slightly higher levels of N retained by fish, resulting in near-equilibrium conditions.

2.3

Nitrate-N concentrations dropped in both treatments and the reductions from initial concentrations of approximately 172 mg/l did not differ significantly between control (−45 mg/l or −26%) and experimental (−39 mg/l or −23%) treatments (FIG. 5.2). The A' values for control (0.96) and experimental (0.95) treatments were equivalent to the predicted value of 0.96, although R' values for control (0.58) and experimental (0.62) treatments were less than the predicted value of 0.74. The low recovery rates for both treatments were largely responsible for the observed drop in concentrations because N recovered in the lettuce was equivalent to predicted levels; N recovered in the fish was less than predicted, thereby increasing the available quantity of N; and A' values were approximately equal to predicted levels. The primary cause for the difference in R' values between control and experimental treatments was the low recovery of N in the fish of the control treatments because lettuce N and final dissolved N did not differ significantly between treatments. The dissolved concentrations of N remained stable during the first half of the experiment, but dropped during the latter half. This drop coincided with increasing concentrations of N and most minerals in the solids, which is indicative of uneaten feed. Solids N concentrations climbed from 4.1% to 6.6% in control treatments and from 4.2% to 6.7% in experimental treatments by trial end.

Denitrification loss undoubtedly contributed to the reduced recovery, but the cause of the change in recovery patterns from prior trials is uncertain. Organic material is required for denitrification (Wheaton 1977) and higher levels of organic matter in the solids, resulting from uneaten feed, may have stimulated denitrification. Denitrification is carried out by several genera of bacteria, including Pseudomonas sp. (Dawson and Murphy 1972), which were isolated from the mortalities submitted during this trial. Hemorrhagic septicemia in tilapia is commonly caused by Pseudomonas sp. (Brock 1989). It is possible that some factor may have stimulated the growth of Pseudomonas sp., resulting in both higher denitrification and disease.

Conclusions

Establishing equilibrium concentrations of dissolved N, primarily in the form of $NO_3$—N, is a fundamental step in designer diet development. This is because $NO_3$—N typically accumulates faster than most minerals in integrated systems using standard diets. Therefore, if equilibrium N concentrations are established, the concentrations of most minerals will generally drop below equilibrium. Establishing N equilibrium and supplementing the other minerals up to the equilibrium level appears to be the most appropriate approach to maintaining equilibrium if the diet is the primary source of nutrients.

Nitrogen recoveries in plants, fish, and solids are highly predictable and comprise substantial proportions of the N budget (N recovered in plants, fish, and solids comprised approximately 11%, 31% and 4% of dietary N) and therefore improve the predictability of N behavior. Values for A' were constant and only once did a slight difference from the predicted value of 0.96 occur (0.95 in the trial 2.3 experimental treatment). Nitrogen equilibrium was clearly demonstrated during trial 2.2 when recovery rates were accurately predicted. Accurate R' predictability is essential for establishing equilibrium N concentrations. However, N behavior during trials 2.1 and 2.3 demonstrated that substantial departures of N recovery from predicted recovery levels can occur. The R' values are likely to be sensitive to subtle differences in system design and operation because the primary determinant of R' values appears to be denitrification. Some level of denitrification may be desirable. For example, during phase 2, the R' values were approximately 0.70. At this level of recovery, the basal Mg levels in the diet were sufficient to achieve equilibrium dissolved Mg concentrations. Had the R' values been higher, Mg supplementation would have been required. The rate of denitrification can be readily increased by creating conditions that foster denitrification, such as infrequent solids collection, or by utilizing dentrification technology (Metcalf and Eddy, Inc. 1979)

Phase 2 represented the first establishment of N equilibrium in integrated systems as a result of deliberate manipulation of fish and plant biomass ratios strictly according to a mass-balance model. As such, it demonstrated the feasibility of N being the principal nutrient forming the first step of designer diet development.

Calcium

Trial 2.1

Following the initial water loss, Ca concentrations dropped in both treatments and the reductions from initial concentrations of approximately 131 mg/l were markedly different between control (−19 mg/l or −15%) and experimental (−33 mg/l or −25%) treatments although the difference was not significant (FIG. 5.3). The values for A' and R' could not be quantified with certainty because the quantity of Ca liberated from the $CaCO_3$ was uncertain. The A' and R' values, determined solely from known quantities of Ca added in the diet and by supplementation, differed between control and experimental treatments, though not significantly. The concentration of Ca was significantly higher in the control diet (1.4%) than in the experimental diet (1.2%), but significantly lower in the control solids (5.0%) than in the experimental solids (7.9%). Quantities of Ca equal to 91% of the Ca added in the experimental diet and 59% of the Ca added in the control diet were recovered in the solids. Since dietary Ca contributed substantially to the total Ca added in both control (16.7%) and experimental (14.9%) treatments, the difference in availability resulted in different A' values (control 0.90; experimental 0.86; n.s. p=0.07). This paradox suggests that the absorption of dietary Ca from the experimental diet was dramatically reduced by the elevated mineral content of the diet, since all other ingredients were the same. The levels of Mg were extremely high (0.61%) in the experimental diets and over half of the Mg was in the form of a highly-available salt (MgO). Conversely, the Mg concentration in the control diet was comparatively low (0.33%), and all of the Mg was provided by the basal ingredients. Calcium absorption may be reduced by elevated dietary Mg levels (Podoliak 1970), and it is likely that Mg was partially responsible for the observed paradox. Reduced Ca absorption may also occur at high P:Ca ratios (Lall 1989). The dietary concentrations of P were dramatically different between control (1.8%) and experimental (2.4%) treatments and since the basal ingredients contributed only 0.4% to each diet, the experimental diet had a much greater quantity of highly available P. Potassium, Mn, and Zn were also present at significantly higher levels in the experimental diet but the effects of these minerals is uncertain.

The retention of dietary N by fish differed significantly between control (27%) and experimental (33%) treatments, although the quantities of N recovered in the solids did not differ significantly. This indicates that while equivalent quantities of N were digested by control and experimental treatments, control treatments might have catabolized more protein, thereby resulting in increased secretion of $NH_3$. Given that Ca is liberated from $CaCO_3$ as it neutralizes acid produced during nitrification, the increased $NH_3$ production may have further contributed to more dissolved Ca in controls compared with experimental treatments. It was predicted that the Ca liberated from $CaCO_3$ would be sufficient to maintain concentrations at or above equilibrium levels. This was not the case during this trial indicating that a larger fish biomass was required.

Since a substantial proportion of the Ca recovered in the fish was absorbed directly from the environment (up to 65%), greater fish yield would tend to reduce Ca concentrations because more Ca would be absorbed. Although the higher recovery of Ca in experimental fish is consistent with this expected pattern, the difference in Ca recovered in fish between control and experimental treatments could have caused at most 14% of the observed difference.

Trial 2.2

Calcium concentrations were at near-equilibrium for both control and experimental treatments. The changes from initial concentrations of approximately 178 mg/l differed between control (+7.3 mg/l or +4.1%) and experimental (-11.5 mg/l or -6.4%) treatments although the difference was not significant (FIG. 5.3). Unlike trial 2.1, the A' values did not differ appreciably between control (0.93) and experimental (0.91) treatments. There was no significant difference in A' values, despite significant differences in Ca recovered in the solids of control and experimental treatments, largely because of the large contribution of exogenous Ca to total Ca added. As during trial 2.1, the concentrations of Ca in the solids were consistently higher in the experimental treatments. The concentrations of Ca (0.9%) and Mg (0.28%) were the same in both diets, although the concentrations of K, P, and Mn were significantly higher in the experimental diet. Magnesium concentrations were equal because the desired concentration was attained from the basal ingredients alone, so Mg was not supplemented to either diet. The disparity between control and experimental A' values during trial 2.2 was less than the disparity between A' values observed during trial 2.1, but the difference existed nonetheless. It appeared as though Mg contributed to the disparity in A' values observed during trial 2.1, but was not the only factor responsible. Potassium, Mn, and P were all present at higher concentrations in the trial 2.2 experimental diet and may have affected Ca uptake.

Although the biomass of fish during trial 2.1 was less than that of trial 2.2, the total quantities of dietary Ca added during the trials did not differ appreciably because the dietary Ca concentration of trial 2.1 was higher than that of trial 2.2. Despite this fact, Ca concentrations dropped more during trial 2.1 than during trial 2.2. For instance, during trial 2.1, 12 g of Ca were added to each control replicate in the diet, the Ca A' was 0.90, and the mean Ca concentration dropped 20.4%. Conversely, during trial 2.2, 12 g of Ca were added to each control replicate in the diet, the Ca A' was 0.93, and the concentrations rose 4.1%. The higher A' value during trial 2.2 would have contributed at most 0.4% to the 24.5% difference in response observed between trials 2.1 and 2.2. This demonstrated that the Ca liberated from $CaCO_3$ was strongly affected by biomass (via $NH_3$ excretion), which increased from 853 g fish per system during trial 2.1 to 1422 g fish per system during trial 2.2; and that Ca equilibrium is achieved when A' equals 0.96, R' equals 1.07 (note: this value is greater than 1.00 because the Ca liberated from $CaCO_3$ was not quantified and used in its determination), and the plant to fish yield ratio is approximately 6:1.

Trial 2.3

Calcium concentrations dropped in both treatments and the reductions from initial concentrations of approximately 189 mg/l were approximately the same for control (-28 mg/l or -14.9%) and experimental (-29 mg/l or -15.3%) treatments (FIG. 5.3). The A' and R' values and proportions of Ca recovered in the solids relative to dietary Ca did not differ appreciably from prior trials indicating another cause for the drop. Much like N, the concentrations were relatively stable during the first half of the trial, but dropped rapidly during the latter half, thereby suggesting the link between $NH_3$ excretion and Ca liberation. As demonstrated during trials 2.1 and 2.2, $NH_3$ production had a strong influence on the rate of Ca liberation from $CaCO_3$. Although the fish biomass during trial 2.3 (1427 g fish per system) was the same as trial 2.2 (1422 g fish per system), the $NH_3$ production was not necessarily equal during the latter half as indicated by the dramatic rise in solids N concentration during trial 2.3.

Under conditions where organic hydrogen sources are limiting, denitrification may proceed using inorganic hydrogen (predominantly $H^+$) provided an energy source is available (Wheaton 1979). As previously noted, N loss by denitrification was much higher during trial 2.3 than during previous trials. Denitrification might have been proceeding via a $H^+$-consuming pathway in the presence of solids having higher organic content, thereby reducing the quantity of Ca liberated from $CaCO_3$.

The lack of difference between treatments was surprising for several reasons. First, N recovered in the solids did not differ significantly between treatments while N retention by fish and protein efficiency ratios (PER)[1] were significantly higher in experimental treatments (Appendix 13). If the efficiency of protein utilization drops, N retention is less and proportionately more protein-N is catabolized for energy, resulting in greater $NH_3$ excretion. This implies that a greater proportion of N should have been excreted in the control treatments and that a relatively greater proportion of Ca should have been liberated from $CaCO_3$. Second, the disparity occurred despite the significantly different levels of Ca recovered in control and experimental treatment fish. Since a substantial proportion of Ca recovered in the fish was absorbed from the environment, the poorer growth of control fish would presumably reduce Ca removal from the solution relative to experimental treatments.

[1] PER=weight gain÷protein fed.

In summary, the observed drop in Ca concentrations during the latter half of the trial coincided with increasing loss of N in the solids and decreasing $NO_3$—N concentrations suggesting nitrification-linked causality. However, the lack of difference between treatments occurred despite the differences in Ca recovered in fish and apparent differences in $NH_3$ excretion. The drop in concentration might be partially attributed to denitrification occurring through a $H^+$-consuming pathway, although this is speculative.

Conclusion

The concentrations of Ca in fish are readily predictable, but because the concentrations are so high and fish constitute such a large component of the Ca budget in this system, minor errors in prediction might result in substantial errors in predicting Ca behavior. The low bioavailability of Ca in basal feedstuffs (approximately 40–50% in this study), the high Ca requirements of plants and fish, and the influence of dietary Ca on the bioavailability of other minerals, indicate that Ca is only a fair candidate for dietary manipulation in designer diets.

Calcium carbonate ($CaCO_3$), an alkalinity source used in recirculating systems, slowly dissolves to neutralize $H^+$ ions generated during nitrification. The quantity of Ca liberated as a result of nitrification is predictable and can be incorporated into the dietary inclusion model. During phase 2, the Ca liberated from $CaCO_3$, added in the diet, and added exogenously, following correction for availability and recovery, was calculated to be equal to or greater than the Ca absorbed and retained by the fish and plants. Near-equilibrium Ca concentrations were demonstrated during trial 2.2 and although Ca concentrations dropped during trials 2.1 and 2.3, Ca concentrations generally followed N concentrations, indicating the relationship between N and Ca. Calcium was effectively maintained within appropriate concentrations by passive dissolution and this appeared to be the most appropriate means of maintaining appropriate Ca concentrations. Due to the low solubility of $CaCO_3$, acid neutralization lags behind acid production, resulting in mildly acidic (pH≈6.5) water. The precipitation of several minerals is lower at that pH although the pH is suboptimal for nitrification.

Copper

Trial 2.1

Following the initial water loss, Cu concentrations increased in both treatments and the increases from initial concentrations of approximately 13 μg/l did not differ significantly between control (+4 μg/l or +23%) and experimental (+4 μg/l or +35%) treatments FIG. 5.4). The increase occurred despite the fact that 169% of the Cu in the control diet and 185% of the Cu in the experimental diet was recovered in the solids, indicating the precipitation of Cu. No Cu was detected in the deionized water used for water replacement but the recovery rates of Cu were 135% and 133% in the control and experimental treatments, respectively, suggesting a source of contamination. It was discovered that condensation was forming on the swing arms of the float valves, which were made of Cu, and water drops were falling back into the sump. This contamination source was corrected in trial 2.2 by coating each swing arm with a veneer of silicone cement. Even with the contamination source, the A' values were low (control 0.27; experimental 0.30), indicating both that the bioavailability of Cu in the diet was low and that extensive precipitation of Cu had occurred. Despite the low A', Cu concentrations remained relatively stable for both treatments within appropriate levels for lettuce.

The Cu recovered in the lettuce and fish was much less than predicted, primarily due to lower tissue Cu concentrations in both, although differences between predicted and actual R' values contributed the most to the poor predictability of the Cu response.

Trial 2.2

Copper concentrations were in near equilibrium in both treatments and the changes from initial concentrations of approximately 24 μg/l did not differ significantly between control (+1 μg/l or +7%) and experimental (+5 μg/l or +16%) treatments (FIG. 5.4). Unlike trial 2.1, less Cu was recovered in the solids than was added in the diet. The concentrations of Cu in the fish did not differ significantly between treatments while they did for lettuce Trial 2.3

Copper concentrations were in near equilibrium in both treatments and the changes from initial concentrations of approximately 14 μg/l did not differ significantly between control (−0.5 μg/l or −3.9%) and experimental (+1 μg/l or +9.4%) treatments. Like trial 2.1, the quantity of Cu recovered in the solids exceeded the quantity provided in both the control (140%) and experimental (130%) diets, indicating low bioavailability and precipitation. Nonetheless, Cu concentrations remained stable without dietary or exogenous supplementation.

Conclusion

Dietary Cu was characterized by extremely low bioavailability and the dissolved forms tended to precipitate out of solution. Therefore, Cu appears to be a poor candidate for manipulation in commercial designer diets. Dietary manipulation of Cu was not attempted during phase 2 because the quantities of Cu recovered in the solids generally exceeded the quantities added in the diet, indicating that the diet was not an effective means of controlling dissolved Cu concentration; and the Cu concentration required in the diet would far exceed levels demonstrated to be toxic to fish. It is worth noting that despite the low bioavailability and precipitation of Cu, Cu concentrations remained within levels appropriate for plants in both treatments, during all trials, without exogenous supplementation. Marked differences in plant and fish tissue concentrations were observed between phases 1 and 2, but they were fairly consistent and predictable within each phase. Copper concentrations ranged from 12 to 17 mg/kg in plants and from 7 to 11 mg/kg in fish during phase 2. Nonetheless, these ranges in Cu concentrations represent differences of up to 44% in plants and 53% in fish. Additionally, the Cu concentrations in phase 1 plants and fish exceeded phase 2 concentrations by as much as 185% and 133%, respectively, indicating the potential for difficulty in predicting the mass balance of Cu. The availability of dietary Cu might be enhanced by adding chelated forms to the diet. Chelation was not used during phase 2 because Cu concentrations remained at near-equilibrium levels and therefore increased bioavailability was not desirable.

Iron
Trial 2.1

Following the initial water loss, Fe concentrations dropped in all treatments and the reductions from initial concentrations of approximately 1.7 mg/l did not differ significantly between control (−1.0 mg/l or −56%) and experimental (−1.1 mg/l or −64%) treatments (FIG. 5.5). The percentages of Fe recovered in the solids relative to dietary Fe were 99% and 119% for control and experimental treatments, respectively, and only 3% of the dietary Fe was recovered in the fish, indicating low bioavailability and precipitation. The Fe concentrations in the plant and fish tissue were both approximately 50% of the concentrations observed during phase 1. The Fe concentration in the control fish (128 mg/kg) was higher than that of the experimental fish (83 mg/kg) while the Zn concentration in the experimental fish (93 mg/kg) was higher than that of the control fish (87 mg/kg). The depression of Fe concentrations in the experimental fish was consistent with the findings of Wekell et al. (1986), who reported that whole-body Fe was inversely related to dietary Zn concentration. Iron remained within concentrations suitable for lettuce although deficiency signs would have quickly ensued had the experiment been prolonged.

Trial 2.2

Iron concentrations dropped in all treatments and the reductions from initial concentrations of approximately 2.10 mg/l did not differ significantly between the control (−0.87 mg/l or −41%) and experimental (−0.82 mg/l or −39%) treatments (FIG. 5.5). The percentages of Fe recovered in the solids were 113% and 118% of the Fe added in the diet for the control and experimental treatments, respectively. The reduction in Fe concentration was more gradual than during trial 2.1, but this is because that both the A' and R' values were slightly higher.

Trial 2.3

Iron concentrations dropped in all treatments and the reductions from initial concentrations of approximately 2.2 mg/l did not differ significantly between control (−1.11 mg/l or −50%) and experimental (−1.06 mg/l or 48%) treatments (FIG. 5.5). The percentages of Fe recovered in the solids were 169% and 171% of the Fe added in the diet for the control and experimental treatments, respectively.

Conclusion

Iron is clearly a poor candidate for dietary manipulation in designer diets because of its low bioavailability, toxicity at elevated dietary concentrations (Desjardins 1985 in Halver 1989), and tendency to precipitate from solution. The availability and established use of relatively stable forms of Fe chelated with organic acids such as EDTA, DTPA, and EDDHA, make dietary manipulation even less appropriate as a means of controlling Fe concentrations in the solution for plants. This study demonstrated that the quantity of dietary Fe had no apparent effect on the behavior of Fe. Approximately 25 to 30% of the Fe added at the beginning of the trial was recovered in the plants and most of the remaining Fe was recovered in the solids. Despite the low availability, the behavior was readily predictable, as Fe concentrations dropped at nearly the same rate in all trials regardless of treatment. Given its predictable behavior, Fe might be maintained at equilibrium concentrations by chemical metering. The availability of inexpensive, accurate, test kits for Fe support this method of concentration maintenance.

Potassium
Trial 2.1

Following the initial water loss, K concentrations dropped in the control replicates and were at near-equilibrium in experimental replicates and the changes from initial concentrations of approximately 170 mg/l differed significantly between control (−31 mg/l or −18%) and experimental (+10 mg/l or +6%) treatments (FIG. 5.6). The actual K concentration in the control diet (1.4%) was greater and significantly different than the desired concentrations (0.7%) because of the aforementioned calculation error in the concentrations of the basal ingredients. In the experimental diet, the difference between actual K concentration (3.9%) and desired concentration (3.1%) was less marked because the K added in the mineral mix, which was not subject to the calculation error, comprised a much larger proportion of the total dietary K. The control K concentrations dropped precipitously despite the fact that the dietary concentrations were higher than desired. The A' values for control and experimental treatments were the same as predicted (0.99) while the R' values were less for both control and experimental treatments (0.90) than predicted (1.00). The concentrations of K in plant tissue were the same as during phase 1 while the concentrations in fish tissue were only slightly lower than phase 1 levels.

The A' and R' values were equal for both treatments despite significant differences in dietary K concentration. Nearly 70% of the K in the experimental diet was provided in the mineral mix while all of the K in the control diet was provided in the basal diet ingredients. The equal A' values demonstrated the high biological availability of K, regardless of source. During this trial, it was demonstrated that near-equilibrium K concentrations can be maintained at dietary inclusion levels over twice the levels in the basal diet. The inadequately low fish biomass level also provided the opportunity to observe the effects of inordinately high K concentrations on fish. The mineral mix in the experimental diet comprised 8.3% of the diet (dry basis) and nearly 60% of the mineral mix was comprised of $K_2HPO_4$, the sole source of supplemental K. The experimental fish grew significantly faster and had significantly lower FCR values than control fish. In addition to K, the experimental diets had significantly higher concentrations of Mg, Mn, P, Na, and Zn, so no conclusions can be drawn relating enhanced K concentration to fish growth.

Trial 2.2

Potassium concentrations dropped in the control treatment and were in equilibrium in the experimental treatment and the changes from initial concentrations of approximately 187 mg/l differed significantly between control (−27 mg/l or −14.5%) and experimental (+1.5 mg/l or +0.7%) treatments FIG. 5.6). The actual dietary K concentration in the experimental diet (2.1%) was close to the desired concentration (2.2%), the A' value (0.99) equaled the predicted value, and the R' value was slightly greater (0.93) than predicted (0.90). The higher recovery was counteracted by slightly more K being recovered in plants than expected. The result was equilibrium K concentrations in the experimental treatment. The K recovered in the lettuce, fish, and solids accounted for 66%, 5%, and 3% of the K in the experimental diets, respectively. The actual dietary K concentration in the control diet (1.2%) was slightly less than the predicted level (1.6%), the A' value (0.99) equaled the predicted value, and the R' value was slightly greater (0.94) than the predicted value (0.90). Potassium recovered in the lettuce, fish, and solids accounted for 124%, 8%, and 4% of the K added in the control diet, respectively, which resulted in the rapid reduction in K concentration.

Trial 2.3

Potassium concentrations dropped in the control treatment and were in equilibrium in the experimental treatment and the changes from initial concentrations of approximately 193 mg/l differed significantly between control (−26 mg/l or −13.6%) and experimental (−0.3 mg/l or −0.2%) treatments (FIG. 5.6). The actual dietary K concentration in the experimental diet (2.1%) was close to the desired concentration (2.2%), the A' value was equal to the expected value (0.99), and the R' value (0.95) was slightly greater than the expected value (0.92). Slightly more K was recovered in the experimental fish which counteracted the higher recovery, resulting in equilibrium concentrations. The K recovered in the lettuce, fish, and solids accounted for 68%, 10%, and 3% of the K added in the diet, respectively. The actual K concentration in the control diet (1.3%) was slightly less than the predicted value (1.5%), the A' value (0.99) equaled the predicted value, and the R' value (0.94) was slightly greater than the predicted level (0.92). The K recovered in the lettuce, fish, and solids accounted for 123%, 14%, and 4% of the K added in the control diet, respectively, and resulted in the rapid reduction in K concentration. For both treatments, the K recovered in the plants equaled the predicted value and the K recovered in the fish was slightly more than predicted.

Conclusion

In many respects, K is the model element for dietary manipulation—it has high bioavailability; nearly all of the K not retained by the fish is excreted in a soluble, available form; it does not seem to interfere appreciably with the absorption of other minerals; and the concentrations in the plant and fish tissue are stable and reliably predictable. Because of the high bioavailability of dietary K and high solubility of excreted K, the requirements of the plants can be met efficiently with dietary supplementation. This is an important factor because the mineral mix comprises less of the diet, thereby creating more room for other nutrients, and since the mineral supplements are among the most expensive components in fish diets on a per weight basis, it minimizes the cost of the mineral mix fraction.

Near-equilibrium concentrations were maintained during all trials in the experimental treatments and in two trials, changes in concentration were less than 1% over 4 weeks. Conversely, the K concentrations in the control treatments dropped steadily during all trials simply because K excreted by the fish was less than the quantity recovered in the plants. Plants were the dominant component in the K budget, consuming approximately 120% and 70% of the K provided in the control and experimental diets, respectively. This was primarily due to the high K content of the lettuce tissue (10–11%). Fish were a comparatively minor component of the mineral budget, retaining 8–14% of dietary K in the control treatments and 5–10% of dietary K in the experimental treatments. The concentrations of K in the solids were consistently higher in the experimental treatments although only 4% and 3% of the dietary K was recovered in the solids of the control and experimental treatments, respectively.

Magnesium
Trial 2.1

Following the initial water loss, Mg concentrations were at near-equilibrium in the control treatment and climbed steadily in the experimental treatment and the changes from initial concentrations of approximately 30 mg/l differed significantly between control (−0.3 mg/l or −1%) and experimental (+4 mg/l or +13%) treatments (FIG. 5.7). The actual Mg concentration in the control diet (0.34%) was higher and markedly different than the expected concentration (0.13%) and the actual concentration in the experimental diet (0.61%) was significantly higher than the desired concentration (0.38%). The actual Mg concentrations of the control diet (0.34%) were nearly equal to, but slightly less than, the concentrations desired in the experimental diet (0.38%). As a result, near equilibrium concentrations were observed in the control treatment. The increase in Mg concentration in the experimental treatment was because the actual concentrations were far greater than desired.

As previously mentioned, Mg might have reduced Ca absorption from the experimental diet. Additionally, the Mg concentrations in the experimental diet were far in excess of concentrations demonstrated to dramatically depress growth (0.32%) at low dietary protein concentrations (24%) and slightly depress growth at high dietary protein concentrations (44%) in *Tilapia nilotica* fingerlings (Dabrowska et al. 1989b). The actual protein concentration (35%) was intermediate of these concentrations and the significantly higher growth rates observed in the experimental fish was inconsistent with their findings. The tissue concentrations of Ca, Mg, K, and P were higher, though not significantly, in the experimental fish than in the control fish which was consistent with the general observations of Dabrowska et al. (1989) that the fish tissue concentrations of Ca, Mg, K, and P increase with increasing dietary Mg concentration.

Trial 2.2

Magnesium concentrations were at near-equilibrium in both the control and experimental treatments and the changes from initial concentrations of approximately 32 mg/l were nearly equal between control (−0.4 mg/l or −1.3%) and experimental (−0.3 mg/l or −0.7%) treatments (FIG. 5.7). Although the actual concentration in the experimental diet (0.28%) was slightly greater than the concentration theoretically resulting in equilibrium (0.21%), equilibrium was observed in both control and experimental treatments because the R' values for the control (0.87) and experimental (0.88) treatments were slightly less than predicted (0.91). Magnesium was not supplemented to either diet because the concentration provided in the basal ingredients was slightly greater than the theoretical concentration resulting in equilibrium.

Trial 2.3

Magnesium concentrations were at near-equilibrium in both the control and experimental treatments and the changes from initial concentrations of approximately 32 mg/l differed slightly between control (−1.1 mg/l or −3.3%) and experimental (−0.5 mg/l or −1.5%) treatments (FIG. 5.7). The actual concentration in the experimental diet (0.30%) was slightly greater than the concentration theoretically resulting in equilibrium (0.24%), which used trial 2.1 and trial 2.2 mean A' and R' values for determining the dietary inclusion rate. The R' value observed for both control and experimental treatments was slightly less than predicted and counteracted the slightly higher dietary Mg concentrations, thereby resulting in equilibrium.

Conclusion

Magnesium, much like K, is a model nutrient for dietary manipulation because it has high bioavailability in natural feedstuffs; the plant and fish tissue Mg concentrations, A' values, and R' values are stable and predictable; and most of the Mg not used by fish is excreted into the solution in a soluble, available form. Equilibrium concentrations were maintained during all trials in unsupplemented diets because the Mg concentrations in the basal diets were approximately equal to the predicted concentrations for equilibrium.

The concentration of Mg required in the diet is closely related to the R' value for N. During phase 2, the R' value for N was approximately 0.72. At this rate of N recovery, it was purely coincidental that the Mg concentrations in the basal diet were appropriate for maintaining equilibrium concentrations. Had the R' for N been higher than observed during phase 2, fewer fish (less diet) would have been required for N equilibrium, the Mg concentrations in the basal diets would have been inadequate, and supplementation would have been required. Conversely, if the recovery of N had been lower than observed during phase 2, more fish would have been required for N equilibrium and the Mg concentrations in the basal diet would have been excessive. The former situation could be easily remedied by adding supplemental Mg although the latter situation requires reformulation of the basal diet if the resulting rate of Mg accumulation is unacceptable.

The dramatic growth retardation at elevated dietary Mg demonstrated by Dabrowska et al. (1989b) might be an important consideration in designer diet development. However, growth retardation was not observed in this study at a Mg concentration at nearly twice the highest concentration used in their study.

Magnesium oxide (MgO), which has high bioavailability, was used to supplement the diet, and resulted in a significantly higher Mg accumulation rate in the experimental treatment during trial 2.1. Dabrowska et al. (1989a) determined that MgO and Mg-acetate have high bioavailability to *Tilapia nilotica*, but $MgSO_4$ does not. Accordingly, if Mg supplementation is required, MgO or Mg-acetate are likely to be effective sources.

Manganese

During all the trials of phase 2, Mn concentrations fluctuated erratically with no apparent correlation with dietary Mn concentration (FIG. 5.8). The rapid disappearance of Mn from the solution, probably resulting from the formation of a precipitates such as manganese oxides, hydroxides, or phosphates, prevented the changes in concentration from being reliably quantified. Dietary Mn modification was attempted during trials 2.1 and 2.2 because although the phase 1 A' and R' values were extremely variable, the values were consistently positive. By the end of trial 2.2, it was readily apparent that the changes in Mn concentration were not effectively controlled by supplementing Mn in the diet, so Mn manipulation was not attempted during trials 2.3 and 2.4. Manganese A' and R' values were erratic, Mn concentrations in plant tissue varied by as much as 71% during phase 2, and Mn concentrations in fish tissue varied 140% during phase 2, indicating that Mn is unpredictable and a poor candidate for dietary manipulation. It is worth noting that while Mn concentrations were unpredictable and varied widely, neither deficiency or toxicity signs were ever observed in plants.

Sodium

Trial 2.1

Following the initial water loss, Na concentrations climbed slowly in both the control and experimental treatments and the changes from initial concentrations of approximately 3.1 mg/l differed significantly between control (+5.2 mg/l or +156%) and experimental (+8.4 mg/l or +262%) treatments (FIG. 5.9). The dietary Na concentrations were markedly higher in the experimental diet (0.79%) than the desired concentration (0.34%) because of the aforementioned calculation error and it was assumed, in error, that the carboxymethylcellulose used as a binder did not contain substantial quantities of minerals. On the contrary, the binder used was the Na salt of carboxymethylcellulose and had a high concentration of Na (9.3% by weight). The A' values (0.99) were consistent with phase 1 values (0.98), but the R' values (control 0.85; experimental 0.84) were less than the predicted value (1.00). The Na concentrations in the lettuce tissue were approximately 50% of the phase 1 concentrations and as a result, Na recovered in the lettuce was 39% and 44% of the predicted quantity in the control and experimental treatments, respectively. Accordingly, less Na should have been added to the diet.

Although the accumulation of Na was rapid on a relative basis, the absolute magnitude of change was insignificant with regard to toxicity to plants. Sodium can induce nutritional disorders at concentrations as low as 100 mg/l (Resh 1989). During phase 1, Na-induced Ca deficiency signs appeared mid-trial as Na levels approached 100 mg/l. The most rapid Na accumulation rate occurred in the experimental treatment in which Na concentrations rose from 3.3 mg/l to 8.4 mg/l in 28 days. At this accumulation rate, it would have taken approximately 530 days for a concentration of 100 mg/l to be reached. Given that in hydroponic plant culture, Na concentrations are important for toxicological, and not nutritional reasons, the observed accumulation rates were completely acceptable.

Trial 2.2

Sodium concentrations climbed slowly in both the control and experimental treatments and the changes from initial concentrations of approximately 4.9 mg/l differed significantly between control (+1.8 mg/l or +38%) and experimental (+2.6 mg/l or +49%) treatments (FIG. 5.9). The accumulation of Na occurred because the Na recovered in the fish was less than predicted for both treatments and the dietary concentrations (0.30%) were higher than estimated for equilibrium to occur (0.2%). It was not practical to lower the concentration of Na below 0.3% because of the Na concentrations of the basal ingredients. Although the dietary concentrations were equal for both treatments, the changes in concentration differed significantly, primarily because the tissue Na concentrations in the control fish were consistently higher that in the experimental fish. The cause of the divergent tissue concentrations is uncertain.

Trial 2.3

Sodium concentrations climbed slowly in both the control and experimental treatments and the changes from initial concentrations of approximately 4.3 mg/l differed significantly between control (+3.4 mg/l or +82%) and experimental (+1.8 mg/l or +41%) treatments (FIG. 5.9). Sodium accumulated primarily because recovery rates were slightly higher than predicted and dietary Na concentrations were higher in both diets (0.29%) than desired (0.21%). As during trial 2.2, the changes in concentration differed significantly despite equal dietary Na concentrations. In contrast to trial 2.2, the experimental fish had significantly higher tissue Na concentrations than control fish. This may have been related to the disease condition of the control fish.

Conclusion

Sodium is unique among the nutrients considered for dietary manipulation in that it is not an essential nutrient for most plants and the primary concern in hydroponics is to minimize accumulation. In this study, the abundance of Na in most natural foodstuffs, high availability of dietary Na, high recovery of Na added, and low concentrations of Na in both plant and fish tissue indicated that supplemental Na was not required and is unlikely to be required in other integrated systems. The Na present in the basal feedstuffs is generally sufficient to meet the nutritional requirements of fish (Lall 1989). The greatest rate of Na accumulation was observed in the experimental treatment of trial 2.1. At that rate of accumulation, it would take nearly 1.5 years to approach phytotoxic levels, so Na accumulation does not appear to be a material concern if not supplemented in the diet.

Phosphorus
Trial 2.1

Following the initial water loss, P concentrations were at near-equilibrium in the control treatment and climbed slowly in the experimental treatment and the changes from initial concentrations of approximately 15.3 mg/l differed between control (+1.5 mg/l or +9.6%) and experimental (+7.5 mg/l or +49.3%) treatments although the difference was not significant (FIG. 5.10). The A' values for the control (0.82) and experimental (0.80) treatments were greater than the predicted level from phase 1 (0.71). Conversely, the R' values of the control (0.78) and experimental (0.79) treatments were slightly less than the predicted value of 0.82. Although these discrepancies were counteracting, there was a net increase in the amount of available P. The dietary P concentrations were 1.8% and 2.4% in the control and experimental treatments, respectively, and the desired concentration for the experimental diet (2.1%) treatments was between the control and experimental concentrations. Near-equilibrium concentrations were observed in the control treatment, although the dietary P concentrations were lower than desired, because the net P availability was higher.

Trial 2.2

Phosphorus concentrations were at near-equilibrium in the control treatment and climbed slowly in the experimental treatment and the changes from initial concentrations of approximately 15.7 mg/l differed significantly between control (−1.4 mg/l or −8.5%) and experimental (+8.8 mg/l or +57.1%) treatments (FIG. 5.10). The A' values for the control (0.83) and experimental (0.84) treatments were slightly lower than the predicted value (0.81), and were counterbalanced by the R' values for the control (0.76) and experimental (0.75), which were slightly lower than predicted. The dietary P concentrations in the experimental diet (1.44%) were approximately equal to the desired concentration (1.50%), but the quantity of P recovered in the fish was only 41% of the predicted amount, thereby resulting in the observed increase in concentration. Near equilibrium concentrations were observed in the control treatment despite the fact that the dietary P concentration (0.95%) was significantly less than the concentration predicted to result in equilibrium (1.50%). The failure of control P concentrations to drop occurred primarily because the P recovered in the fish was only 45% of the predicted quantity. The discrepancies between predicted and actual quantities of P recovered in the fish fully accounted for the observed changes in concentration.

Trial 2.3

Phosphorus decreased in both control and experimental treatments and the changes from initial concentrations of approximately 17.1 mg/l differed slightly between control (−10.7 mg/l or −64%) and experimental (−9.3 mg/l or −53%) treatments although the difference was not significant (FIG. 5.10). The concentrations dropped rapidly at the onset of the trial, and slowly after a few days into the trial. The A' values for the control (0.78) and experimental (0.79) treatments were lower than the predicted value (0.82), and the R' values for both the control (0.47) and experimental (0.56) treatments were dramatically less than the predicted value of 0.77. A possible cause for the rapid drop in concentrations was the precipitation of hydrous calcium phosphate as observed during phase 1. The initial fill water was city water dechlorinated by activated carbon filtration. Activated carbon tends to raise pH and it is possible that the precipitation of hydrous calcium phosphate occurred during the first three days of the trial while the pH was above neutral. The poor recovery might be explained by the settlement of precipitates in the sump. Calcium carbonate remaining in the sump at the end of each trial was not collected and any phosphorous precipitates in the sump would have gone undetected.

Conclusion

Phosphorus appears to be a promising candidate for dietary manipulation owing to its moderate bioavailability and predictable concentrations in fish and lettuce tissue. Near-equilibrium concentrations were achieved during phase 2 at dietary P concentrations other than the concentrations predicted to result in equilibrium due primarily to departures of R' and fish P concentrations from predicted values. Adjusted recovery (R') rates varied from 0.47 to 0.78 in control treatments and from 0.56 to 0.86 in the experimental treatments during phase 2. When the A' and R' values were accurately predicted, the changes in P concentrations were primarily determined by the P retained by fish. Because of the high concentration of P in fish (2.4–3.3%) and lettuce (1.1%) tissue, accurate prediction of fish and plant biomasses are essential for properly modifying the P content of the diet. It was demonstrated that the dietary P concentrations required for equilibrium P concentrations were much higher than the concentrations required to meet the P requirements of the fish. The ability to maintain P equilibrium will depend on maintaining pH levels at or below 7.0 because P forms precipitates at mildly basic pH levels. Mildly acidic pH levels are suboptimal for nitrifying bacteria, which have pH optima between 7.0 and 7.5. Operating below optimal pH levels appears to be a necessary concession for dietary P manipulation to be effective in controlling dissolved P concentrations.

The bioavailability of P in both natural feedstuffs is generally low, but varies with species, apparently as a result of different gastric pH levels (Ogino et al. 1979). Additionally, the bioavailability of P varies significantly between feedstuffs. Feedstuffs made from seeds, such as soybean meal, have low bioavailability because they contain P primarily in the form of phytic acid, which is unavailable to fish. Since the fish species generally cultivated in recirculating systems with low exchange rates, namely channel catfish and Tilapia spp., are fed diets high in soybean content, the majority of P must be provided supplementally. The choice of P supplement should be based on P bioavailability, which generally increases with increasing solubility (NRC 1993), and the ability to meet other mineral specifications with a single supplement (e.g., $Ca(H_2PO_4)_2$, $MgHPO_4 \cdot 3H_2O$, $NaH_2PO_4 \cdot H_2O$, and $K_2HPO_4$). A primary objective of designer diet development for integrated systems is the enhancement of P excreted by fish, which is contrary to the general trend observed in the commercial fish feed industry toward diets containing less P. Both objectives aspire to reduce the P lost in the feces, while the designer diet objective is to enhance urinary P loss by inundating the fish with available P.

Zinc
Trial 2.1

Following the initial water loss, Zn concentrations increased steadily in the control treatment and rapidly in the experimental treatment and the changes from initial concentrations of approximately 32 $\mu g/l$ differed significantly between control (+140 $\mu g/l$ or +432%) and experimental (+490 $\mu g/l$ or +1530%) treatments (FIG. 5.11). The steady accumulation in the control treatment occurred despite the fact that the dietary Zn concentration (149 mg/kg) was much less than the concentration theoretically resulting in equilibrium (344 mg/kg), and the rapid accumulation in the experimental treatment occurred although the dietary Zn concentration (462 mg/kg) was comparable to the desired concentration. The control A' and R' values were slightly higher than predicted and the quantities of Zn recovered in the fish and lettuce were dramatically less than predicted, thereby resulting in the rapid accumulation of Zn. In the experimental treatment, the A' was higher than predicted, the R' was lower than predicted, and like the control treatment, the Zn recovered in the fish and lettuce was much less than predicted. The Zn concentrations in the plant tissue were 26% and 34% of the predicted concentration (290 mg/kg) for the control and experimental treatments, respectively, while the Zn concentrations in the fish tissue were 29% and 27% of the predicted concentration (400 mg/kg), respectively. The Zn concentrations in fish tissue might have been depressed by the monocalcium phosphate ($Ca(H_2PO_4)_2$) added to the diets. Hardy and Shearer (1985) concluded that tricalcium phosphate ($Ca_3(PO_4)_2$) depressed whole body Zn concentrations in rainbow trout by reducing the bioavailability of Zn in the diet.

The lower recovery in fish and plants contributed equivalently to the increase in the control treatment, while in the experimental treatment, the high A' value and low recovery in the fish and plants contributed equivalently to the dramatic rise in Zn concentration. The final Zn concentrations observed in the experimental treatment were well above the maximum recommended concentration for continuous exposure to fish (50 $\mu$g/l; Post 1987), exceeding 500 $\mu$g/l by the end of the trial.

Trial 2.2

Zinc concentrations increased steadily in both the control and experimental treatments and the changes from initial concentrations of approximately 61 $\mu$g/l differed slightly between control (+69 $\mu$g/l or +123%) and experimental (+64 $\mu$g/l or +89%) treatments although the difference was not significant (FIG. 5.11). The diets were not supplemented because the concentration in the basal diet (50 mg/kg) was approximately equal to the desired concentration (51 mg/kg) and for this reason, the treatments did not differ appreciably. The A' values were slightly higher than expected, but the accumulations in control and experimental treatments were predominantly due to the low quantities of Zn recovered in the fish of both treatments. The Zn concentrations at trial-end in the control (125 $\mu$g/l) and experimental (135 $\mu$g/l) treatments exceeded conservative recommendations for continuous exposure, but were less than concentrations commonly experienced in industry.

Trial 2.3

Zinc concentrations increased steadily in both the control and experimental treatments and the changes from initial concentrations of approximately 50 $\mu$g/l differed slightly between control (+70 $\mu$g/l or +140%) and experimental (+60 $\mu$g/l or +120%) treatments although the difference was not significant (FIG. 5.11). The dietary Zn concentrations in the control (72 mg/kg) and experimental (71 mg/kg) treatments were higher than the desired level (31 mg/kg) because of the Zn concentrations of the basal feedstuffs. The A' and R' values for the control and experimental treatments were approximately equal to the predicted values. The combined quantities of Zn recovered in the fish and plants did not differ appreciably from the predicted quantities in either. The accumulation of Zn observed was due primarily to the concentrations of Zn in the diets being higher than desired.

Conclusion

Zinc was the only micronutrient that responded in a predictable fashion to dietary manipulation. This was because of its moderate bioavailability, high recovery rate, and relatively stable and predictable concentrations in fish and plant tissue. Zinc often accumulates in solution in closed, recirculating systems if fish diets are rich in Zn. Since Zn concentrations should never exceed 1 mg/l for hydroponically-grown plants (Douglas 1985) and the maximum recommended concentration for continuous exposure to fish is 0.05 mg/l (Post 1987), the prevention of Zn accumulation in solution is likely to be the primary goal of dietary Zn manipulation. As previously mentioned, the $Ca(H_2PO_4)_2$ may have reduced the bioavailability of Zn thereby reducing the whole body Zn levels in the fish. The reduction of Zn availability by Ca and P is thought to occur in the gut by the absorption of Zn onto insoluble calcium phosphate complexes which are ultimately excreted in the feces (Hardy and Shearer 1985). Given the tendency of Zn to accumulate in solution, factors reducing the bioavailability of Zn might actually be beneficial. However, the Zn requirement of the fish must be met. During trials 2.2 and 2.3, Zn was not supplemented and the dietary Zn concentrations varied between 50 and 70 mg/kg. Given that only 25 to 30% of dietary Zn was recovered in the solids, the concentrations were apparently nutritionally adequate if a Zn requirement of 20 mg/kg is assumed (McClain and Gatllin 1988).

Comparison of a commercial diet with a designer diet (trial 2.4)

During trial 2.4, significant differences between the changes in the concentrations of several nutrients were detected (Table 5.1). As expected, changes in the concentrations of Ca and Mg did not differ significantly between control and experimental treatments because the dietary inclusion rates were similar. Both Ca and Mg concentrations appeared to be at near-equilibrium (FIGS. 5.12 and 5.13). The changes in $NO_3$—N concentrations did not differ significantly between treatments, despite the higher protein concentration of the control diet, because the control fish grew better and the additional N recovered in the control fish exceeded the difference in dietary N between the two treatments. Nitrate-N concentrations were at near-equilibrium in both treatments (FIG. 5.14). Changes in the concentrations of Cu and Fe did not differ significantly between treatments because, as demonstrated during phase 2, the diets had negligible effect on dissolved concentrations. For example, the Fe concentration of the control diet (300 mg/kg) was less than one-half the Fe concentration of the experimental diet (611 mg/kg), yet the changes in Fe concentrations did not differ significantly between treatments. The concentrations of Cu remained acceptable for plants in both treatments during trial 2.4, but Fe would have required supplementation had the trial been prolonged (FIG. 5.12). The concentrations of K and P dropped rapidly in the control treatment but were at near-equilibrium in the experimental treatment (FIGS. 5.13 and 5.14). Changes in the concentrations of K and P differed significantly between treatments. The concentrations of Na increased in both treatments (FIG. 5.14), but the changes in concentrations were significantly higher in the control treatment than in the experimental treatment. Despite the rise in Na concentrations, the accumulation rates of Na observed in both treatments were considered acceptable because they were relatively slow. The changes in concentrations of Zn were significantly higher in the control treatment than the experimental treatment. The rapid accumulation rate of Zn in the control treatment was unacceptable for hydroponics because Zn toxicity to both the plants and fish might have ensued had the trial been prolonged. However, the rate of Zn accumulation in the experimental treatment was acceptable for hydroponics (FIG. 5.15).

The results of trial 2.4 highlight the ability of designer diets and relative inability of commercial diets to maintain the concentrations of the measured nutrients over prolonged periods within ranges suitable for hydroponic plant culture. In the experimental treatments, the concentrations of Ca, K, Mg, N, and P remained at near-equilibrium ($\leq 5\%$ change in concentration) and the concentrations of Cu and Mn remained within ranges suitable for plants. Although Na and Zn accumulated in the experimental treatments, the slow rate of accumulation was acceptable. In the control treatment, the Ca, Mg, and N concentrations remained at near-equilibrium, but the concentrations of K and P did not. As in the experimental treatments, the concentrations of Cu and Mn remained within suitable ranges and the accumulation rate of Na was considered acceptable. However, the rapid accumulation of Zn in the control treatments would have soon resulted in Zn toxicity in the plants.

Despite the fact that several nutrients in the control treatment remained at near-equilibrium concentrations and others remained within levels suitable for plants, the rapid decrease in the concentrations of K and P and the rapid rise of the Zn concentration indicate that the commercial diet was inadequate. Moreover, Mg equilibrium in the control treatment was coincidental because the concentration of Mg in the basal diet happened to equal the level predicted by the dietary inclusion level.

The reduction of K and P in the control treatment demonstrated that the commercial diet was inadequate for prolonged hydroponic plant culture because according to Liebig's law of the minimum, the nutritive constituent present in a limiting amount determines the yield of a plant crop, provided that other environmental factors controlling growth are non-limiting (Douglas 1985). Conversely, the concentrations of nearly all the measured nutrients in the experimental treatment (except Fe) remained acceptable during trial 2.4 and would have presumably remained appropriate for a prolonged period.

The purpose of trial 2.4 was to compare nutrient concentrations in integrated systems receiving a designer diet with those in integrated systems receiving a representative commercial diet. The findings of Rakocy et al. (1993) and of this study demonstrated that the accumulation rates of individual nutrients can differ substantially when different commercial diets are used. Furthermore, the mineral concentrations of a specific commercial diet can differ substantially between batches. For instance, the commercial diet used during phase 1 and trial 2.4 was the same brand, but the Cu, Fe, Na, N, P, and Zn concentrations differed by 20, 82, 27, 12, 19, and 68%, respectively. Such variation in elemental composition is common in commercial diets. This is typically because the use of linear programming to least-cost formulate diets, in response to changing costs of feedstuffs, often results in differing diet formulations with roughly equivalent nutritive value. Accordingly, if commercial diets are used in integrated systems and deficiencies are corrected for by the addition of supplemental nutrients to the solution, the commercial diet itself might require custom manufacture to ensure constant diet composition.

Despite the relative inability of the commercial diet to maintain suitable mineral concentrations, the growth rates and FCR values of the fish fed the commercial diets during phase 1 and trial 2.4 were superior to those of the fish receiving the designer diet. The lower growth rates of fish receiving the designer diets was not due to the elevated mineral concentrations. Conversely, the elevated mineral content of the designer diets may have caused the higher growth rates of the experimental fish during trials 2.1 and 2.3 and may have conferred disease resistance to the experimental fish during trial 2.3. The development of steam-extruded designer diets may combine the excellent growth characteristics of the commercial diet with the benefits of the designer diet.

The dietary inclusion model was effective in predicting the mineral inclusion rates necessary for equilibrium mineral concentrations. Equilibrium concentrations were achieved for most minerals during trial 2.2, the first valid test of the model. Like any model, its utility depends on the accuracy of the parameters used to determine mineral inclusion rates. Discrepancies between the predicted and actual changes in mineral concentrations were invariably due to inaccurate prediction of model parameters or the inability to achieve the desired mineral inclusion rates (e.g., Zn and Na). As a model based on the principles of mass balance, it is readily adaptable to any integrated system in which nutrient inputs and outputs are known.

Application of model to commercial integrated systems

Extension of results to commercial systems

The integrated systems used during this study were useful in validating the dietary inclusion model, but were different from commercial recirculating systems in several respects. The complete reuse of water in this study allowed for maximum mineral retention and accountability while few commercial systems operate at daily recirculation rates above 95%; deionized water was used to replace water lost by evaporation and transpiration whereas in commercial systems, the makeup water typically is high in mineral content; commercial systems are much larger in scale; and the density of fish was less than typical commercial densities.

Some similarities also exist. The methods of solids removal and biofiltration were representative of commercial methods and the plant and fish species are likely candidates for commercial integrated systems. Moreover, the integrated systems used in this study operated at steady state. Namely, the average ratio of fish to plants and the rates of fish and plant yield were relatively constant. Constant rates of fish yield are readily maintained on a commercial level provided the quality of the rearing conditions (e.g., temperature) does not fluctuate appreciably throughout the year. However, if the hydroponic plants depend on natural light, substantial fluctuations in plant yield may occur. Ideally, an integrated system using a single designer diet formulation should have a relatively constant ratio of plant to fish biomass. In this study, the ratios of plant to fish biomass varied around a mean ratio because the plants and fish removed during harvest constituted a substantial proportion of the existing biomass. As the size of the system increases, and correspondingly the biomasses of fish and plants and frequency of their harvests also increase, the amplitude of variation around the mean ratio will theoretically be reduced.

Model revision

The application of the dietary inclusion model to existing or planned commercial integrated aquaculture-hydroponics systems is facilitated by modifying the model, primarily because of differences in the operation of the systems used during this study and actual commercial systems. In all commercial systems, some water is periodically replaced to help maintain water quality and/or remove solids. The recirculation rates, namely the proportions of system volumes retained on a daily basis, are not 100%, as during this study. Because of the elevated nutrient concentrations in integrated systems, the discharged water represents a significant source of nutrient loss. Additionally, the replacement water used in commercial systems may contain substantial quantities of dissolved minerals that are available to plants. In equation 18, we had:

$$(D[N]_D + N_A) A'R' = F[N]_F + P[N]_P + N_R, \quad (18)$$

In commercial systems the terms $D[N]_D$, $A'$, $F[N]_F$, and $P[N]_P$ are derived as they were during this study, but the terms $N_A$ and $N_R$ have different derivations. In this study, nearly all of the exogenously derived nutrients were added at the onset of the experiment in the form of nutrient supplements. Although initial solution inoculation might be used in commercial applications, at steady state operation, most exogenously added nutrients will be added in the makeup water, dissolved from chemical buffers (e.g., $CaCO_3$), or supplemented by the grower. Thus, the initial inoculum represents a negligible proportion of $N_A$ when a system is operated at steady state over a prolonged period. Likewise, in this study, the term $N_R$ was equal to the quantity of nutrient added in the inoculum because equilibrium concentrations were maintained. Therefore, under steady state conditions over a prolonged period, the term $N_R$ represents a negligible quantity of nutrients and can be dropped from equation 18.

Equation 18 assumes a specified period of time. An equivalent equation, based on rates rather than a specified period of time, can be developed. Such mass balance models are commonly used to determine operational requirements necessary to sustain adequate water quality for fish in recirculating systems (Losordo and Westers 1994) and are directly applicable to nutrient maintenance in integrated systems. Rates of nutrient input can be substituted directly into equation 18 and the recovery term can be converted as follows:

$$(R_D[N]_D + R_A) A' = R_F[N]_F + R_P[N]_P + R_L, \quad (20)$$

where:

$R_D$ = Rate of diet administration $[N]_D$ = Dietary nutrient concentration $R_A$ = Rate of exogenous nutrient addition $R_F$ = Rate of fish growth $[N]_F$ = Fish nutrient concentration $R_P$ = Rate of plant growth $[N]_P$ = Plant nutrient concentration $R_L$ = Rate of nutrient loss The recovery term was converted, given that $(R_D[N]_D + R_A) A'R' = (R_D[N]_D + R_A) A' - R_L$. Equation 20 states that at steady state nutrient concentrations, the rates of nutrient addition and generation equals the quantity of nutrient consumption and loss.

The $R_A$ term can be subdivided into the rate of exogenous nutrient addition in the replacement water and the rate of additional nutrient supplementation as follows:

$$(R_D[N]_D + Q_I[N]_I + R_E) A' = R_F[N]_F + R_P[N]_P + R_L, \quad (21)$$

where, $Q_I$ = Replacement water flow rate $[N]_I$ = Replacement water nutrient concentration $R_E$ = Rate of additional nutrient supplementation Moreover, if the system is operating at a recirculation rate less than 100%, the $R_L$ term may represent substantial rates of nutrient loss in the discharge as well as other losses, unlike during this study. Accordingly, the $R_L$ term may be subdivided:

$$(R_D[N]_D + Q_I[N]_I + R_E) A' = R_F[N]_F + R_P[N]_P + R_V + R_O, \quad (22)$$

where:

$R_V$ = rate of nutrient loss by volatilization, precipitation of nutrients not recovered in the solids, and net uptake by algae, microbes, etc.

$R_O$ = Rate of nutrient loss by water discharge

Equation 22 can be further modified by subtracting $R_V$ from both sides and factoring out $(R_D[N]_D + Q_I[N]_I + R_E) A'$, resulting in:

$$(R_D[N]_D + Q_I[N]_I + R_E) A' \cdot \left[1 - \frac{R_V}{(R_D[N]_D + Q_I[N]_I + R_E) A'}\right] = \quad (27)$$
$$R_F[N]_F + R_P[N]_P + R_O.$$

The term R" is defined as:

$$R'' = \left[1 - \frac{R_V}{(R_D[N]_D + Q_I[N]_I + R_E) A'}\right]$$

where R" represents the recovery of available nutrients after nutrient loss by volatilization, precipitation of nutrients not recovered in the solids, and net uptake by algae, microbes, etc., but does not include nutrients lost by discharge. The R" term is estimated by the R' term when the recirculation rate is 100%, as during this study, because the nutrients lost in the discharge are negligible at a 100% recirculation rate and the biological and chemical processes affecting nutrient recovery are assumed to be independent of recirculation rate.

By replacing the $R_O$ term with the product of effluent water flow (assuming $Q_I = Q_O$) and effluent nutrient concentration ($[N]_O$), the final mass balance model is derived:

$$(R_D[N]_D + Q_I[N]_I + R_E) A'R'' - Q_I[N]_O = R_F[N]_F + R_P[N]_P. \quad (27)$$

Model application

The steps required to apply the dietary inclusion model to existing or planned commercial integrated systems are: to determine the plant and fish species and proximate composition of each; determine the water discharge rates or the recirculation rate and system volume; determine the elemental composition of the replacement water source; determine the objective solution nutrient concentrations; estimate the A' and R" values; determine the protein level of the diet and weighted average system feeding rate[1]; estimate the plant or fish yield, whichever is fixed; determine the corresponding plant or fish yield necessary to achieve N equilibrium; design and manufacture the designer diet to have the mineral concentrations specified by the dietary inclusion model; conduct a pilot study to test the pilot diet and to refine model parameters; and re-determine the composition of the diet and validate efficacy. A diet design scenario for a hypothetical commercial integrated system is presented in Appendix 16.

[1] It is assumed that the size/age group composition of the commercial integrated system is a constant. Therefore, the weighted average feeding rate is derived by summing the products of the feeding rates and the relative biomass proportions of each size/age group.

Under certain circumstances, a commercial operation may desire to produce a certain ratio of fish to plants for say, marketing purposes. The steps in designer diet development would be to define the fish and plant biomasses; calculate the recirculation rate required for N equilibrium using the dietary inclusion model; and using the known recirculation rate, calculate the inclusion rates of minerals using the dietary inclusion model.

Limitations

Designer diet development requires technical expertise to ensure proper experimental, sampling, and analytical techniques. If the fish and/or plant yield rates fluctuate, more than one diet formulation may be required. As the recycle ratio of water is decreased, the potential plant yield for an integrated system with a set biomass of fish is dramatically reduced as depicted in Appendix 16, Figure A.16.1.

Unless the diet is manufactured by the commercial entity operating the integrated system, private feed manufacturers must be contracted. Many feed manufacturers are willing to modify the composition of currently-marketed diets for a nominal fee, provided the quantities required are sufficiently large (typically above 350–450 metric tons per year), and the costs of any additional ingredients are recovered in the price. Designer diets are not as amenable to least-cost diet formulation as standard fish diets because changing the basal feedstuffs in designer diets may result in marked changes in model parameters. Accordingly, the long-term costs of basal feedstuffs might be higher for designer diets than for standard diets.

There are limits to the quantities of minerals that can be added to diets without observing ill effects in the fish. Animals fed graded quantities of many essential elements show homeostatically-controlled whole body elemental levels over a wide range of dietary concentrations or intake levels above required levels, but are incapable of maintaining homeostasis above toxic concentrations (Spivey et al. 1981). Above the toxic level, the whole-body concentrations increase with dietary level or intake and toxicity signs eventually ensue. Moreover, fish respond to elevated dietary concentrations or dietary quantities in like manner (Shearer, 1995). For instance, the whole body Fe concentrations of fish fed a diet containing 200 mg Fe/kg diet at a feeding rate of 2.5% bw/d are likely to be approximately equal to the whole body Fe concentrations of fish fed a diet containing 100 mg Fe/kg diet at a feeding rate of 5% bw/d. Accordingly, if a single designer diet is fed to multiple ages of fish, the upper limit of mineral supplementation might be determined by the youngest fish, which are typically fed at a higher rate. Likewise, the elemental and proximate composition of fishes can change with age, environment, physiological state, or diet (Shearer 1994; Shearer et al. 1994). Consequently, the nutrient dynamics of the system may change if the objective harvest sizes of the fish change.

Economic limitations might also exist because the mineral supplements added to fish diets are among the most expensive feedstuffs. Under the assumptions of the scenario presented in Appendix 16, it was estimated that costs of the designer and commercial diets were nearly equal (commercial diet: $0.370/kg; designer diet: $0.375/kg) at a recycle ratio of 0.70, but different at a recycle ratio of 1.00 (commercial diet: $0.370/kg; designer diet: $0.401/kg; Figure A.16.2). However, if the assumed K content of plants was reduced from 10% to 4%, the costs of the designer and commercial diets were approximately equal, regardless of recycle ratio. Under some circumstances, it might be more cost effective to combine dietary mineral manipulation and exogenous supplementation, provided stable mineral concentrations can be maintained and the concentrations can be inexpensively monitored. In such a situation, the diet would still be custom manufactured to avoid fluctuations in dietary mineral concentrations.

TABLE 5.1.

Nutrient concentration changes in the experimental and control treatment solutions during trial 2.4.

| | Control | | | | Experimental | | | |
|---|---|---|---|---|---|---|---|---|
| Nutrient | Initial conc. (mg/l) | Final conc. (mg/l) | Change in conc. (mg/l)[1] | % change | Initial conc. (mg/l) | Final conc. (mg/l) | Change in conc. (mg/l) | % change |
| N | 171 | 183 | $12^x$ | 7.0 | 170 | 174 | $5^x$ | 2.7 |
| Ca | 176 | 192 | $16^x$ | 9.3 | 170 | 176 | $6^x$ | 3.8 |
| Cu | 0.013 | 0.022 | $0.010^x$ | 77.6 | 0.014 | 0.02 | $0.006^x$ | 43.1 |
| Fe | 2.19 | 1.49 | $-0.65^x$ | −29.8 | 2.16 | 1.49 | $-0.67^x$ | −31.0 |
| K | 186 | 167 | $-19^x$ | −10.4 | 184 | 192 | $8^y$ | 4.3 |
| Mg | 31.8 | 32 | $0.2^x$ | 0.8 | 31.4 | 31.3 | $0.0^x$ | −0.2 |
| Mn[2] | 0.207 | 0.229 | 0.023 | −33.2 | 0.147 | 0.026 | −0.121 | −85.8 |
| Na | 3.4 | 8.2 | $4.8^y$ | 143.0 | 3.2 | 6.4 | $3.2^y$ | 100.0 |
| P | 15.8 | 12 | $-3.8^x$ | −24.1 | 16.1 | 17 | $0.9^y$ | 5.4 |
| Zn | 0.045 | 0.296 | $0.251^x$ | 553.8 | 0.044 | 0.095 | $0.051^y$ | 116.3 |

[1] Nutrient concentration changes not having the same superscript are significantly different ($p < 0.05$).
[2] Due to rapid precipitation that occured following the addition of Mn at the beginning of trial 2.4, the actual changes in concentration are uncertain.

Summary and Conclusions

Designer diet development

The dietary inclusion model was derived from the concept of mass conservation. The model was validated by maintaining near-equilibrium concentrations of Ca, K, Mg, N, and P, suitable concentrations of Mn and Cu, and acceptable accumulation rates of Na and Zn, in representative integrated aquaculture-hydroponics systems, by modifying the mineral concentrations of the fish diets according to the model. Calcium appears to be best controlled indirectly by using calcareous buffering materials. Copper, Fe, and Mn are not promising candidates unless the bioavailabilities of each are increased. Potassium, Mg, N, Na, and Zn are excellent candidates for dietary manipulation. Phosphorus is a good candidate under conditions of controlled pH, but behaves unpredictably at basic pH levels.

The fish grew well under the elevated nutrient concentrations used in this study, but may have been less disease resistant as a result. The costs of designer diets vary substantially with recycle ratio and elemental plant composition, but are similar to commercial diet costs under certain circumstances.

In summary, the model is readily applicable to virtually any freshwater recirculating fish culture system operating at a recycle ratio sufficiently high to maintain appropriate N concentrations and having an environment suitable for hydroponic plant culture. Hence, the dietary inclusion model may serve as useful tool for integrated system operators requiring a greater level of control over dissolved mineral concentrations Suggestions for further research Improving the bioavailabilities of minerals in the basal feedstuffs might reduce the costs of the mineral supplements. For instance, the incorporation of phytase into designer diets containing phytic acid may increase the bioavailabilities of dietary P and divalent cations.

The dietary inclusion model could be modified to accommodate situations in which waste products (e.g., solids, fish processing scrap, plant roots, etc.) might be reclaimed and re-incorporated into the nutrient solution. The potential for dietary modification to increase plant yields in integrated aquaculture-horticulture operations, by providing limiting nutrients, might be investigated. Economic evaluation of combining dietary mineral manipulation with exogenous nutrient supplementation may reveal cost-benefits under certain circumstances.

The development of or application of existing hydroponically-compatible plant strains having lower mineral contents might reduce the costs of designer diets. This study utilized *Tilapia nilotica* because the tilapias are the most promising candidates for culture in commercial recirculating systems. However, the compatability of other fish species with integrated systems requires investigation. Lastly, the incorporation of some important plant nutrients such as boron, molybdenum, and sulfur, into designer diets according to the dietary inclusion model, has yet to be examined.

REFERENCES CITED

Alt, D. 1980. Changes in the composition of the nutrient solution during plant growth—an important factor in soilless culture. In: Fifth International Congress on Soilless Culture. Proceedings of a Conference, May 18–24, 1980, at Wageningen, The Netherlands, pp. 97–110.

AOAC. 1975. Official Methods of Analysis, 12th ed. Association of Official Analytical Chemists, Washington, D.C.

APHA. 1992. Standard Methods for the Examination of Water and Wastewater, 18th ed. American Public Health Association, Inc., New York.

Baldwin, T. 1995. Fish Pathologist, Washington Animal Disease and Diagnostic Laboratory, Washington State University, Pullman, Wash. Personal communication.

Bedasie, S. and K. A. Stewart. 1984. Effect of intermittent flow on the growth and development of lettuce cv. *salina*. In: Sixth International Congress on Soilless Culture. Proceedings of a Conference, Apr. 29–May 5, 1984, at Lunteren, The Netherlands, pp. 139–144.

Brock, J. A. 1989. Diseases of Tilapia. Aquaculture Development Program publication, Department of Land and Natural Resources, Hawaii, 65 pp.

Burgoon, P. S. and C. Baum. 1984. Year round fish and vegetable production in a passive solar greenhouse. In: Sixth International Congress on Soilless Culture. Proceedings of a Conference, Apr. 29–May 5, 1984, at Lunteren, The Netherlands, pp. 151–171.

Clarkson, D. T. and J. B. Hanson. 1980. The mineral nutrition of higher plants. Ann. Rev. Plant Physiol. 31: 239–298.

Clarkson, R. and S. D. Lane. 1991. Use of a small-scale nutrient-film hydroponic technique to reduce mineral accumulation in aquarium water. Aquacult. Fish. Manage. 22: 37–45.

Cooper, A. 1984. The ABC of NFT. Grower Books, London, 184 pp.

Cowley, C. B., D. Knox, J. W. Adron, S. George, and B. Pirie. 1977. The production of renal calcinosis by magnesium deficiency in rainbow trout (*Salmo gairdneri*). Br. J. Nutr. 38: 127–135.

Dabrowska, H., K. Meyer-Burgdorff, and K. D. Gunther. 1989a. Availability of various magnesium compounds to tilapia (*Oreochromis niloticus*). Aquaculture 76: 269–276.
1989b. Interaction between dietary protein and magnesium level in tilapia (*Oreochromis niloticus*). Aquaculture 76: 277–291.

Dawson, R. N and K. L. Murphy. 1972. The temperature dependency of biological denitrification. Water Res. 6: 71–83.

De Silva, S. S., R. M. Gunasekera, and D. Atapattu. 1989. The dietary protein requirements of young tilapia and an evaluation of the least cost dietary protein levels. Aquaculture 80: 271–284.

Douglas, J. S. 1985. Advanced Guide to Hydroponics. Pelham Books, London, 369 pp.

Fischer, P. 1984. Stability of various forms of chelated iron in nutrient solutions of different pH-values. In: Sixth International Congress on Soilless Culture. Proceedings of a Conference, Apr. 29–May 5, 1984, at Lunteren, The Netherlands, pp. 225–233.

Friedman, L. and S. I. Shibko. 1972. Nonnutrient components of the diet. In: J. E. Halver (editor), Fish Nutrition. Academic Press, New York, pp. 182–255.

Gatlin, D. M., III, E. H. Robinson, W. E. Poe, and R. P. Wilson. 1982. Magnesium requirement of fingerling channel catfish and signs of magnesium deficiency. J. Nutr. 112:1182–1187.

Gatlin, D. M., III, and R. P. Wilson. 1983. Dietary zinc requirement of fingerling channel catfish. J. Nutr. 113: 630–635.

1984. Studies on the manganese requirement of fingerling channel catfish. Aquaculture 41: 31–36.

1986a. Dietary copper requirement of fingerling channel catfish. Aquaculture 54:277–285.

1986b. Characterization of iron deficiency and the dietary iron requirement of fingerling channel catfish. Aquaculture 52: 191–198.

Gerber, J. M. 1985. Plant growth and nutrient formulas. In: A. J. Savage (editor), Hydroponics worldwide: state of the art in soilless crop production. International Center for Special Studies, Honolulu, Hi., pp. 58–69.

Glass, A. D. M. 1989. Plant Nutrition—An Introduction to Current Concepts. Jones and Bartlett Publishers, Boston, Mass., 234 pp.

Halver, J. E. 1989. The vitamins. In: J. E. Halver (Editor), Fish Nutrition, 2nd ed. Academic Press, Inc., New York, pp. 31–109

1994. Professor Emeritus, University of Washington, School of Fisheries, Seattle, Wash. Personal communication.

Hardy, R. W. 1995. Director, Utilization Research Division, Northwest Fisheries Science Center, Seattle, Wash. Personal communication.

Hardy, R. W. and K. D. Shearer. 1985. Effect of dietary calcium phosphate and zinc supplementation on whole body zinc concentration of rainbow trout (*Salmo gairdneri*). Can J. Fish. Aquat. Sci. 42: 181–184.

Haug, R. R. and P. L. McCarty. 1971. Nitrification with the submerged filter. Paper presented at the Annual Conference of the Water Pollution Control Federation, San Francisco.

Haylor, G. S., M. C. M. Beridge, and K. Jauncey. 1988. Phosphorus nutrition of juvenile *Oreochromis niloticus*. In: T. S. V. Pullin, T. Bhukaswan, K. Tonguthai, and J. L. Maclean (Editors). The Second International Symposium on Tilapia in Aquaculture. ICLARM Conference Proceedings 15. Department of Fisheries, Bangkok, Thailand, and International Center for Living Aquatic Resources Management, Manila, Philippines, pp. 341–345.

Hilton, J. W. 1989. The interaction of vitamins, minerals, and diet composition in the diet of fish. Aquaculture 79(1–4): 223–244.

Hoagland, D. R. and D. I. Arnon. 1950. The water-culture method for growing plants without soil. Calif. Agr. Exp. Sta. Circ. 347.

Hurlbert, S. H. 1984. Pseudoreplication and the design of ecological field experiments. Ecol. Monogr. 54(2): 187–209.

Jacobson, L. 1951. Maintenance of iron supply in nutrient solutions by a single addition of ferric potassium ethylenediamine tetraacetic acid. Plant Physiol. 26: 411–413.

Jensen, M. H. and W. L. Collins. 1985. Hydroponic Vegetable Production. Hortic. Rev. 7: 453–558.

Ketola, H. G. 1979. Influence of dietary zinc on cataracts in rainbow trout (*Salmo gairdneri*). J. Nutr. 109: 965–969.

Knox, D., C. B. Cowey, and H. W. Adron. 1981. Studies on the nutriion of salmonid fish. The magnesium requirement of rainbow trout (*Salmo gairdneri*). Br. J. Nutr. 45: 137–148.

1982. Effects of dietary copper and copper:zinc ratio on rainbow trout, *Salmo gairdneri*. Aquaculture 27: 111–119.

1983. Studies on the nutrition of rainbow trout (*Salmo gairdneri*) magnesium deficiency. The effect of feeding with magnesium supplemented diet. Br. J. Nutr. 50: 121–128.

Lall, S. P. 1989. The minerals. In: J. E. Halver (Editor), Fish Nutrition, 2nd ed. Academic Press, Inc., New York, pp. 219–257.

Lall, S. P. and J. A. Hines. 1987. Iron and copper requirement of Atlantic salmon (*Salmo salar*) grown in sea water. Fish. Mar. Serv. Tech. Rep. 688: 1–16.

Lanno, R. P., S. J. Slinger, and J. W. Hilton. 1985a. Maximum tolerable and toxicity levels of dietary copper in rainbow trout (*Salmo gairdneri* Richardson). Aquaculture 49: 257–268.

1985b. Effect of ascorbic acid on dietary copper toxicity in rainbow trout (*Salmo gairdneri* Richardson). Aquaculture 49: 269–287.

Losordo, T. M. and H. Westers. 1994. System carrying capacity and flow estimation. In: M. B. Timmons and T. M. Losordo (Editors), Aquaculture Water Reuse Systems: Engineering Design and Management, Developments in Aquaculture and Fisheries Science, 27. Elsevier, Amsterdam, pp. 9–60.

Lovell, R. T. 1978. Dietary phosphorus requirement of channel catfish (*Ictalurus punctatus*) Trans. Am. Fish. Soc. 107: 617–621.

Maynard, D. N. and A. V. Barker. 1971. Critical nitrate levels for leaf lettuce, radish, and spinach plants. Comm. Soil Sci. Plant Anal. 2(6): 461–470.

McClain, W. R. and D. M. Gatlin, III. 1988. Dietary zinc requirement of *Oreochromis aureus* and effects of dietary calcium and phytate on the zinc bioavailability. J. World Aquacult. Soc. 19: 103–108.

Mengel, K. and E. A. Kirkby. 1987. Principles of Plant Nutrition, 4th ed. International Potash Institute, Bern, Switzerland, 687 pp.

Metcalf & Eddy, Inc. 1979. Wastewater Engineering: Treatment, Disposal, and Reuse, 2nd ed. McGraw-Hill Book Company, New York, 920 pp.

Miller, D. W, R. J. Vetter, and G. J. Atchison. 1980. Effect of temperature and dissolved oxygen on uptake and retention of $^{54}Mn$ in fish. Health Phys. 38: 221–225.

Mongeau, R. and K. A. Stewart. 1984. Effect of solution temperature on the growth and development of lettuce cv. *ostinata*. In: Sixth International Congress on Soilless Culture. Proceedings of a Conference, Apr. 29–May 5, 1984, at Lunteren, The Netherlands, pp. 387–392.

Mohyuddin, M. 1985. Crop cultivars and disease control. In: A. J. Savage (Editor), Hydroponics worldwide: state of the are in soilless crop production. International Center for Special Studies, Honolulu, Hi., pp. 42–50.

Nair, A., J. E. Rakocy, and J. A. Hargreaves. 1985. Water quality characteristics of a closed recirculating system for tilapia culture and tomato hydroponics. In: Second International Conference on Warm Water Aquaculture—Finfish. Proceedings of a conference, Hawaii. pp. 223–254.

National Research Council. 1983. Nutrient Requirements of Warmwater Fishes and Shellfishes. National Academy Press, Washington, D.C., 102 pp.

National Research Council. 1993. Nutrient Requirements of Fish. National Academy Press, Washington, D.C., 114 pp.

Nose, T. and S. Arai. 1979. Recent advances on studies on mineral nutrition of fish in Japan. In: V. R. Pillay and W. A. Dill (Editors), Advances in Aquaculture. Fishing News, Farnham, England, pp. 584–590.

Ogino, C. and J. Y. Chiou. 1976. Mineral requirements in fish. 2. Magnesium requirements of carp. Bull Jpn. Soc. Sci. Fish. 42: 71–75.

Ogino, C., and G. Y. Yang. 1978. Requirement of rainbow trout for dietary zinc. Bull. Jpn. Soc. Sci. Fish. 44: 1015–1018.

1979. Requirement of carp for dietary zinc. Bull. Jpn. Soc. Sci. Fish. 45(8): 967–969.

1980. Requirements of carp and rainbow trout for dietary manganese and copper. Bull Jpn. Soc. Sci. Fish. 46: 455–458.

Ogino, C., F. Takashima, and J. Y. Chiou. 1978. Requirements of rainbow trout for dietary magnesium. Bull. Jpn. Soc. Sci. Fish. 44: 1105–1108.

Ogino, C., L. Takeuchi, H. Takeda, and T. Watanabe. 1979. Availability of dietary phosphorus in carp and rainbow trout. Bull Jpn. Soc. Sci. Fish. 45: 1527–1532.

Oikari, A. O. J. and J. C. Rankin. 1985. Renal excretion of magnesium in a freshwater teleost, *Salmo gairdneri*. J. Exp. Biol. 117: 319–333.

Parker, D., A. Anouti, and G. Dickenson. 1990. Experimental results—Integrated fish/plant production system. Env. Res. Lab. Rept. #ERL 90-34 (unpubl.), 12 pp.

Peterschmidt, C. 1995. Marketing Representative, Aquaculture Feeds Division, Rangen Inc., Buhl, Id. Personal communication.

Podoliak, H. A. 1970. Fish. Res. Bull. N.Y. 33: 56–65.

Popma, T. J. 1982. Digestibility of selected feedstuffs and naturally occurring algae by tilapia. Ph.D. dissertation. Auburn University, Auburn, Ala.

Post, G. 1987. Textbook of Fish Health. T.F.H. Publications, Inc., Neptune City, N.J., 288 pp.

Prince, R. P. and H. V. Koontz. 1984. Lettuce production from a systems approach. In: Sixth International Congress on Soilless Culture. Proceedings of a Conference, Apr. 29–May 5, 1984, at Lunteren, The Netherlands, pp. 533–547.

Rakocy, J. E. 1989a. Vegetable hydroponics and fish culture—a productive interface. World Aquacult. 20(3): 42–47.

1989b. Hydroponic lettuce production in a recirculating fish culture system. University of the Virgin Islands Agricultural Experiment Station, Island Perspectives, 3: 4–10.

Rakocy, J. E. and J. A. Hargreaves. 1993. Integration of vegetable hydroponics with fish culture: a review. In: J. K. Wang (Editor), Techniques for Modern Aquaculture. Proceedings of a Conference, Jun. 21–23, 1993, at Spokane, Wash., pp. 112–136.

Rakocy, J. E., J. A. Hargreaves, and D. S. Bailey. 1989. Effects of hydroponic vegetable production on water quality in a closed recirculating system. J. World Aquacult. Soc. 20(1): 64A.

1993. Integration of vegetable hydroponics with fish culture: a review. In: J. K. Wang (Editor), Techniques for Modern Aquaculture. Proceedings of a Conference, Jun. 21–23, 1993, at Spokane, Wash., pp. 112–136.

Resh, H. M. 1991. Hydroponic Food Production, 4th ed. Woodbridge Press Publishing Company, Santa Barbara, Calif. 462 pp.

Robinson, E. H., S. D. Rawles, P. B. Brown, H. E. Yette, and L. W. Greene. 1986. Dietary calcium requirement of channel catfish (*Ictalurus punctatus*), reared in calcium-free water. Aquaculture 53: 263–270.

Robinson, E. H., D. Labomascus, P. B. Brown, and T. L. Linton. 1987. Dietary calcium and phosphorus requirements of *Oreochromis aureus* reared in calcium-free water. Aquaculture 64: 267–276.

Roeder, M. and R. H. Roeder. 1966. Effect of iron on growth rate of fishes. J. Nutr. 90: 86–90.

Roorda van Eysinga, J. P. N. L. and K. W. Smilde. 1971. Nutritional disorders in glasshouse lettuce. Cent. Agric. Publ. Doc., 56pp.

Santiago, C. B. and R. T. Lovell. 1988. Amino acid requirement for growth of Nile tilapia. J. Nutr. 118: 1540–1546.

Seawright, D. E. 1993. A method for investigating nutrient dynamics in integrated aquaculture-hydroponics systems. In: J. K. Wang (Editor), Techniques for Modern Aquaculture. Proceedings of a Conference, Jun. 21–23, 1993, at Spokane, Wash., pp. 137–147.

Shearer, K. D. 1984. Changes in elemental composition of hatchery-reared rainbow trout, *Salmo gairdneri*, associated with growth and reproduction. Can. J. Fish. Aquat. Sci. 41: 1592–1600.

1988. Dietary potassium requirement of juvenile chinook salmon. Aquaculture 73: 119–129.

1989. Whole body magnesium concentration as an indicator of magnesium status in rainbow trout (*Salmo gairdneri*). Aquaculture 77: 201–210.

1994. Factors affecting the proximate composition of cultured fishes with emphasis on salmonids. Aquaculture 119: 63–68.

1995. The use of factorial modeling to determine the dietary requirements for essential elements in fishes. Aquaculture 133: 57–72.

Shearer, K. D and T. Åsgård. 1990. Availability of dietary magnesium to rainbow trout as determined by apparent retention. Aquaculture 86: 51–61.

1992. The effect of water-borne magnesium on the dietary magnesium requirement of rainbow trout (*Oncorhynchus mykiss*). Fish Physiol. Biochem. 9: 387–392.

Shearer, K. D., T. Åsgård, G. Andorsdóttir, and G. H. Aas. 1994. Whole body elemental and proximate composition of Atlantic salmon (*Salmo salar*) during the life cycle. J. Fish Biol. 44: 785–797.

Spivey, M. R., R. M. Jacobs, A. O. L. Jones, B. E. Fry, Jr., M. Rakowska, R. P. Hamilton, B. F. Harland, C. L. Stone, and S.-H. Tao. 1981. Animal models for assessing the bioavailability of essential and toxic elements. Cereal Chem. 58(1): 6–11.

Sutton, R. J. and W. M. Lewis. 1982. Further observations on a fish production system that incorporates hydroponically grown plants. Prog. Fish-Cult. 44(1): 55–59.

Tacon, A. G. J., 1990. Standard Methods for the Nutrition and Feeding of Farmed Fish and Shrimp (Vol.1: The Essential Nutrients). Argent Laboratories Press, Redmond, Wash. 117 pp.

Van Toever, W. and K. T. MacKay. 1981. A modular recirculation hatchery and rearing system for salmonids utilizing ecological design principles. In: Aquaculture in Heated Effluents and Recirculated Systems (vol.2). Proceedings of a Symposium, May 28–30, Stravanger, Berlin, pp. 403–413.

Watanabe, T., S. Satoh, and T. Takeuchi. 1988. Availability of minerals in fish meal to fish. Asian Fish. Sci. 1: 175–195.

Wekell, J. C., K. D. Shearer, and C. R. Houle. 1983. High zinc supplementation of rainbow trout diets. Prog. Fish-Cult. 45: 144–147.

Wekell, J. C., K. D. Shearer, and E. J. Gauglitz, Jr. 1986. Zinc supplementation of trout diets: tissue indicators of body zinc status. Prog. Fish-Cult. 48: 205–212.

Wheaton, F. W. 1977. Aquacultural Engineering. Krieger Publishing Company, Malabar, Fla. 708 pp.

Winsor, G. and P. Adams 1987. Glasshouse Crops (vol. b): Diagnosis of Mineral Disorders in Plants, J. B. D. Robinson (Editor). Ministry of Agriculture, Fisheries, and Food/Agricultural and Food Research Council, Her Majesty's Stationery Office, London, England, 168 pp.

Wren, S. W. 1984. Comparison of hydroponic crop production techniques in a recirculating fish culture system. M.S. Thesis, Texas A&M University, College Station, Tex., 66 pp.

Zar, J. H. 1984. Biostatistical Analysis. Prentice-Hall, Inc., Englewood Cliffs, N.J. 718 pp.

Zweig, R. D. 1986. An integrated fish culture hydroponic vegetable production system. Aquaculture magazine May/June, pp. 34–40.

APPENDIX 1

Hydroponic Nutrient Solution

TABLE A.1.1

Hydroponic nutrient solution composition during phases 1 and 2.

| Chemical[1] | Quantity (g) per liter stock solution | Phase 1 Vol. stock solution per system (ml)[2] | Phase 2 Vol. stock solution per system (ml)[3] |
|---|---|---|---|
| $KH_2PO_4$ | 136.1 g/l | 138 | 238 |
| $KNO_3$ | 101.1 g/l | 1100 | 1900 |
| $Ca(NO_3)_2 \cdot 4H_2O$ | 236.2 g/l | 1100 | 1900 |

TABLE A.1.1-continued

Hydroponic nutrient solution composition during phases 1 and 2.

| Chemical[1] | Quantity (g) per liter stock solution | Phase 1 Vol. stock solution per system (ml)[2] | Phase 2 Vol. stock solution per system (ml)[3] |
|---|---|---|---|
| $MgSO_4.7H_2O$ | 246.5 g/l | 275 | 475 |
| A-5[4] | — | 275 | 475 |
| FeNaEDTA[5] | — | 138 | 238 |

[1]All chemicals were obtained from Sigma Chemical Co. (St. Louis, Missouri).
[2]Experimental system volume approximately 320 l.
[3]Experimental system volume approximately 475 l.
[4]See following page for composition of A-5 solution.
[5]See page describing the preparation of FeNaEDTA in Appendix 1.

TABLE A.1.2

Composition of A-5 nutrient solution[1].

| Chemical[2] | Quantity per liter stock solution | Volume stock solution per liter A-5 solution |
|---|---|---|
| $H_3BO_3$ | 28.6 g/l | 100 ml/l |
| $ZnCl_2$ | 4.2 g/l | 25 ml/l |
| $CuCl_2.2H_2O$ | 2.12 g/l | 25 ml/l |
| $Na_2MoO_4.2H_2O$ | 0.504 g/l | 25 ml/l |
| $MnCl_2.4H_2O$ | 12.1 g/l | 25 ml/l |

[1]Hoagland, D. R. and D. I. Arnon. 1950. The water-culture method for growing plants without soil. Calif. Agr. Exp. Sta. Circ. 347.
[2]All chemicals were obtained from Sigma Chemical Co. (St. Louis, Missouri).

TABLE A.1.3.

Resulting elemental concentrations (mg/l[mM])[1]

| Element[4] | Phase 1[2] mg/l | mM | Phase 2 mg/l | mM | Hoagland's no. 1 soln.[3] mg/l | mM |
|---|---|---|---|---|---|---|
| B  | 0.2   | 0.02   | 0.25  | 0.02   | 0.5   | 0.05 |
| Ca | 146   | 3.6    | 173   | 4.3    | 200   | 5.0 |
| Cu | 0.04  | 0.0006 | 0.013 | 0.0002 | 0.05  | 0.0008 |
| Fe | 2.1   | 0.04   | 2.2   | 0.04   | 5     | 0.09 |
| K  | 147   | 3.8    | 185   | 4.7    | 235   | 6.0 |
| Mg | 20.3  | 0.84   | 31.6  | 1.30   | 48.6  | 2.00 |
| Mn | 0.21  | 0.004  | 0.18  | 0.003  | 0.5   | 0.009 |
| Mo | 0.021 | 0.0002 | 0.025 | 0.0003 | 0.05  | 0.0005 |
| N  | 144   | 10     | 170   | 12     | 210   | 15 |
| P  | 13    | 0.42   | 16    | 0.52   | 31    | 1.00 |
| Zn | 0.14  | 0.002  | 0.045 | 0.0007 | 0.05  | 0.001 |

[1]The elemental concentrations resulted from the addition of nutrients and the nutrients present in the initial fill water.
[2]The nutrient concentrations in the control systems were 36% higher.
[3]From Hoagland and Arnon (1950).
[4]The concentrations of B and Mo were calculated from know additions, but the concentrations in the initial fill water and the final concentrations were not verified by elemental analysis.

Preparation of Ferric Sodium Ethylenediamine Tetra-acetate[1]

1. Dissolve 21.44 g NaOH in 500 ml of distilled water contained in a large Pyrex or stainless steel beaker (2+ liter capacity).
2. Dissolve 52.2 g ethylenediamine tetra-acetic acid (EDTA, acid form) in the above sodium hydroxide solution.
3. Dissolve 49.8 g $FeSO_4.7H_2O$ in the solution from step 2.
4. Dilute with distilled water to 2000 ml.
5. Aerate over night to produce the stable brown ferric complex, which should have a pH of about 5.5.
6. One ml of the EDTA complex added to one liter of nutrient solution provides 5 mg/liter (5 ppm) of Fe.

[1] Recipe modified from Jacobson (1951).

APPENDIX 2

Methods for Proximate Analysis

Crude nitrogen

Approximately 0.25 g of fish or diet, or 0.40 g of lettuce or solids were weighed on an analytical balance, and were placed in a digestion tube with 0.5 g $CuSO_4$, 5.0 g $Na_2SO_4$, and 10.0 ml concentrated $H_2SO_4$. The samples were digested using a Buchi 430 digestion unit (Brinkman Instruments Inc, Westbury, N.Y.). Samples were heated with the instrument set at the highest setting. The digestion was allowed to continue 15 min after the mixture became clear, which took approximately 30 minutes. Samples were allowed to cool at room temperature for at least 30 minutes prior to distillation. Cooled samples were placed into a Buchi 322/343 distillation/control unit and steam was applied to the sample until the solid had completely melted. Prior to the distillation of the first sample, the pH probe was calibrated at pH 4.0 and pH 7.0. Distillate was titrated with a Metrohm 655 dosimat digital titrator. The distillation and titration steps were executed automatically with 50 ml of distilled water being added to the sample, immediately followed by the addition of 60 ml of a 25% (weight:volume) NaOH solution. The sample was allowed a 10 s reaction time prior to distillation. The sample was distilled for 200 s and the distillate was collected into a receiving flask containing 30 ml of a 2% (weight:volume) $H_3BO_3$ solution having a pH of 4.25. Following distillation, the distillate was back-titrated with 0.1 N HCl to a pH of 4.25. Backtitration stopped when recieving flask pH remained stable for 10 s.

One system blank, two reagent blanks and one to two $(NH_4)_2SO_4$ standards (21.2% N) were run at the beginning of each day and one reagent blank was run prior to each sample lot. Reagent blank values less than 0.25 ml were considered acceptable as were standard determinations of 21.0–21.4% N.

Ash

Approximately 0.25 g of fish or solids, or 0.50 g of lettuce were weighed on an analytical balance and placed into borosilicate liquid scintillation vials (The Vial, Research Products International, Inc., Mt. Prospect, Ill.) that had been individually marked using a diamond-tip pencil. Samples in vials were pre-ashed on a laboratory hot plate (model PC 100, Corning Glass work, Corning, N.Y.) for 45 minutes, transferred to a muffle furnace (Furnpg,157 atrol 133, Thermolyne Sybbron Corp., Dubuque, Iowa). Samples were ashed for 16 h at 550° C. Once ashed, the samples were allowed to cool to approximately 300° C. at which time they were transferred to dessicators, within which they cooled to room temperature before weighing. Ashed samples were re-weighed on an analytical balance and determinations were percent ash of the dry sample.

Minerals

Samples were prepared for mineral analysis by first ashing samples according to the ash method previously outlined. Ashed samples were dissolved in equal parts (2.15 ml) of concentrated (70.4%) $HNO_3$ and concentrated (37.0%) $H_2SO_4$ (Baker Analyzed Reagents, J. T. Baker, Phillipsburg, N.J.) for 4–8 hours within the scintillation vial; diluted to 20 ml with deionized water and allowed to set for 16 h; homogenized using a vibratory vial shaker; and allowed to set for at least 16 h to let flocculant material to settle out of solution. A 1.0 ml supernatant sample was taken from each undisturbed sample vial using an autopipetor and placed in a new scintillation vial, into which 9.0 ml of deionized water was dispensed from an automated dispensor. The resulting sample dilution was 1:200. Blank samples were prepared using the same protocol, using new scintillation vials. Water samples were prepared by adding a small volume of concentrated $H_2SO_4$ to the sample vials during phase 1, but not during phase 2. Deionized water was used for water blank samples. Samples were analyzed for Ca, Cr, Cu, Fe, K, Mg, Mn, P, Na, Sr, and Zn using an inductively coupled argon plasma emission spectrophotometer (Jarrell-Ash AtomComp, Fisher Scientific, Waltham, Mass.). Mineral concentrations of the initial dry samples were determined by back calculation.

Nitrate-N

During phase 1, $NO_3$—N concentrations were measured by the automated cadmium reduction method (APHA 1992) using an autoanalyzer (Alpkem RFA-300, Alpkem, Inc., Wilmington, Del.). Frozen water samples were thawed, thoroughly mixed, and were allowed to set for four hours to allow particulate matter within the samples to settle out of solution. Water samples were carefully decanted from the storage bottles into separate borosilicate glass scintillation vials. The original water samples were refrozen and the subsamples were diluted 1:5000 by serial dilution prior to analysis.

During phase 2, $NO_3$—N concentrations were determined according to the ultraviolet spectrophotometric screening method (APHA 1992) using a spectrophotometer (Perkin-Elmer Lambda 3 UV/VIS Spectrophotometer, The Perkin-Elmer Corp., Coleman Instruments Division, Oak Brook, Ill.). Frozen samples were prepared for subsampling and subsampled as during phase 1. Subsamples of approximately 0.7 g were gravimetrically diluted 40:1 on an analytical balance by the addition of 18 g of deionized water and 0.385 g of 1N HCl. Standard $NO_3$ stock solutions were prepared before each analysis by dissolving 0.7218 g of $KNO_3$, that had dried overnight in a drying oven at 105° C., in water and diluting to 1000 ml. Intermediate $NO_3$ solutions were prepared by diluting 100 ml of the standard stock solution to 1000 ml. The resulting intermediate solution contained 10.0 $\mu$g $NO_3$—N/ml. The standard dilutions for the standard curve were prepared by diluting gravimetrically 0.00, 1.00, 2.00, 4.00, 7.00, 10.00, 15.00, 20.00, 25.00, 35.00, and 50.00 g of the intermediate solution to 50.00 g using deionized water and approximately 18.75 g of each dilution was decanted into a borosilicate scintillation vial. Standard dilutions were acidified in the same manner as the samples by adding 0.385 g of 1 N HCl to each vial. The resulting standard dilutions contained between 0.0 and 9.8 mg $NO_3$—N/l. The absorbance of the standard dilutions and samples were measured at 220 nm against deionized water set at zero absorbance using 1.5-cm quartz cells. The absorbance of the standard dilutions and samples were re-measured at 275 nm to determine interferences from organic matter within the samples. Twice the absorbance values of the standard dilutions and samples at 275 nm were subtracted from the absorbance values at 220 nm to correct for organic matter within samples. Nitrate-N concentrations of the original samples were determined by comparing corrected absorbance values to the standard curve and back-calculating.

APPENDIX 3

Sample Calculation of Dietary Inclusion Rates

The following is an example of the determination of initial fish biomass based on N equilibrium and using the initial biomass, a determination of the dietary inclusion rate for K. The following parameters were estimated from Phase 1 and will be used for the determination of fish biomasses (and quantity of diet) and K dietary inclusion rate.

| Parameter | Values | | | |
|---|---|---|---|---|
| | N | K | 28-day yield (g) | percent dry matter |
| Fish | 8.8 | 1.2 | Quantity of diet/1.25 | 23.0 |
| Lettuce | 4.6 | 10.2 | 4500 | 4.5 |
| Recovery (R') | 0.77 | 1.00 | | |
| Availability (A') | 0.96 | 0.99 | | |

The dietary mineral inclusion model $$[N]_D = \frac{\frac{N_F + N_P + N_R}{A' \cdot R'} - N_A}{D} \quad (23)$$

can be modified as, $$(D[N]_D + N_A) A'R' = F[N]_F + P[N]_P + N_R$$

where, $D$ = Quantity of dry diet $[N]_D$ = Mineral concentration of dry diet $F$ = Fish yield (dry matter)

$[N]_F$ = Mineral concentration in dry fish tissue $P$ = Plant yield (dry matter)

$[N]_P$ = Mineral concentration in dry plant tissue

By inserting the phase 1 values as estimates for phase 2 into equation 2, $[N]_D = 0.056$ (35% protein, protein/$N \approx 6.25$)

$N_A = 168$ mg $NO_3$—N/1·475 1
   $= 79.8$ g $NO_3$—N (475 liter system volume)

$A' = 0.96$ $R' = 0.77$ $F = 0.23 \cdot D / 1.25$ (23% dry matter; $FCR = 1.25$)

$[N]_F = 0.088$ (8.8% N)

$P = 4500 \cdot 0.045$ (4500 gram yield at 4.5% dry matter)

$[N]_P = 0.046$ (4.6% N)

$N_R = N_A = 79.8$ g $NO_3$—N (assuming equilibrium)

we have $(0.056D + 79.8)(0.96)(0.77) = (0.088)(0.23) D/1.25 + (4500)(0.045)(0.046) + (79.8)$.

Solving for D, $D = 1196$ g of dry diet.

Given that $D$=(Fish biomass)·(trial duration[days])·(feeding rate[%body weight/day]), and that trial duration is 28 days and fish are to be fed 4% of their body weight per day (%bw/d), it follows that:

$$\text{Fish biomass} = \frac{1196}{0.04 \cdot 28} = 1068 \text{ g fish (wet weight)}.$$

Hence, it is estimated that a biomass of 1068 g of fish fed 4% bw/d (dry diet basis) of a 35% protein diet will excrete sufficient N to maintain equilibrium concentrations of dissolved N.

Once the quantity of diet to be fed over the period of a trial has been determined, the inclusion rates of other minerals can be estimated provided model parameter estimates are available. For example, the determination of the dietary inclusion rate of K for phase 2 would proceed as follows:

Assuming, $N_A = 175 \text{ mg K}/1 \cdot 475 \text{ l} = 83.13 \text{ g K}$ $A' = 0.99$ $R' = 1.00$ $F = 0.23 \cdot D/1.25$ $[N]_F = 0.012 \ (1.2\% \ K)$ $P = 4500 \cdot 0.045$ $[N]_P = 0.102 \ (10.2\% \ K)$ $N_R = N_A = 83.125 \text{ g K (assuming equilibrium)}$ and substituting the above parameters into equation (2), $(1196[N]_D + 83.13)(0.99)(1.00) =$ $$(0.23)\frac{(1196)}{(1.25)}(0.012) + (4500)(0.045)(0.102) + 83.125$$

and therefore $[N]_D = 0.02017$ or 2.02% of the diet.

The dietary inclusion model predicts that under the given assumptions, a diet having 2.02% K, fed at a rate of 4% bw/d to 1068 g of fish for 28 days, would result in dissolved K equilibrium.

APPENDIX 4

Proximate Composition of Phase 2 Dietary Ingredients

TABLE A.4.1.

Proximate analysis of dietary ingredients used during trials 2.1, 2.2, and 2.3.

| | Mean Values[1] | | | | | | | | | | |
|---|---|---|---|---|---|---|---|---|---|---|---|
| | Ca | Cu | Fe | K | Mg | Mn | Na | P | Zn | % Protein | % moisture |
| Anchovy meal | 53800 | 1.36 | 339 | 5440 | 3590 | 16.1 | 12100 | 32600 | 93.3 | 69 | 7.8 |
| Corn | 91 | 0 | 22.7 | 4530 | 1610 | 8.3 | 99.3 | 3550 | 14.2 | 10 | 11.5 |
| Wheat Flour | 502 | 0 | 45.8 | 4090 | 1570 | 49.3 | 0 | 3880 | 28.7 | 16 | 11.3 |
| Wheat Middlings | 1400 | 9.46 | 137 | 12400 | 5140 | 145 | 87.7 | 10900 | 97.3 | 20 | 9.3 |
| Soybean meal | 4350 | 18.1 | 684 | 26700 | 4330 | 61.3 | 726 | 8530 | 68.4 | 51 | 9.2 |
| CMC | 168 | 0 | 7.4 | 292 | 53 | 0.9 | 92900 | 11.9 | 0 | 0 | 3.6 |
| Alphacel | 125 | 0 | 17.6 | 384 | 31 | 1.2 | 722 | 3.7 | 0 | 0 | 6.4 |
| Soybean oil | 0 | 0 | 0 | 334 | 0 | 0.6 | 0 | 4.4 | 0 | 0 | 0.0 |

[1]Mineral concentrations are in mg/kg (dry).

TABLE A.4.2.

Proximate analysis of dietary ingredients used during trial 2.4[2].

| | Mean Values | | | | | | | | | | |
|---|---|---|---|---|---|---|---|---|---|---|---|
| | Ca | Cu | Fe | K | Mg | Mn | Na | P | Zn | Protein | % moisture |
| corn | 48 | 2.3 | 28.7 | 4180 | 1520 | 6.3 | 398 | 3140 | 37.6 | 8.8 | 14.0 |
| soybean meal | 3800 | 21.1 | 225 | 27600 | 4420 | 50.8 | 905 | 8050 | 93.9 | 51.4 | 12.0 |
| wheat flour | 898 | 5.9 | 48.7 | 5190 | 1930 | 43.7 | 636 | 4030 | 54.4 | 12.7 | 8.7 |

[2]The anchovy meal, alphacellulose, and soybean oil used was the same as used during trials 2.1, 2.2, and 2.3.

APPENDIX 5

Model Parameters Used During Phase 2

TABLE A.5.1.

Model parameters used during phase 2.

| Assumption | | Trial | | | |
|---|---|---|---|---|---|
| | | 2.1[1] | 2.2 | 2.3 | 2.4 |
| General | fish moisture (%) | 73.0 | 71.0 | 71.9 | 72.7 |
| | lettuce moisture (%) | 95.5 | 96.5 | 96.4 | 96.4 |
| | fish yield (g) | 713 | 1038 | 993 | 916 |
| | lettuce yield (g) | 4500 | 4500 | 5000 | 5345 |
| | feeding rate (% bw/d) | 4.0 | 4.0 | 4.0 | 4.0 |
| | total feed/trial | 892 | 1453 | 1588 | 1493 |
| | FCR | 1.25 | 1.40 | 1.60 | 1.63 |
| $[N]_F$ | [Ca] (% DM) | 4.7 | 5.7 | 5.7 | 5.6 |
| | [Cu] (mg/kg) | 16.3 | 8.11 | 8.56 | 9.01 |
| | [Fe] (mg/kg) | 200 | 103 | 99 | 94 |
| | [K] (% DM) | 1.2 | 0.80 | 0.71 | 0.75 |
| | [Mg] (% DM) | 0.21 | 0.18 | 0.18 | 0.18 |
| | [Mn] (mg/kg) | 15.0 | 4.5 | 5.4 | 4.7 |
| | [N] (% DM) | 8.8 | 8.6 | 8.7 | 8.6 |
| | [Na] (% DM) | 0.84 | 0.62 | 0.63 | 0.62 |
| | [P] (% DM) | 2.9 | 3.1 | 3.1 | 3.0 |
| | [Zn] (mg/kg) | 453 | 114 | 94 | 99 |
| $[N]_P$ | [Ca] (% DM) | 2.0 | 1.4 | 1.6 | 1.6 |
| | [Cu] (mg/kg) | 33 | 14 | 13 | 14 |
| | [Fe] (mg/kg) | 700 | 311 | 373 | 430 |
| | [K] (% DM) | 10.2 | 10.8 | 10.8 | 10.7 |
| | [Mg] (% DM) | 0.44 | 0.49 | 0.50 | 0.50 |
| | [Mn] (mg/kg) | 504 | 317 | 328 | 327 |
| | [N] (% DM) | 4.5 | 4.6 | 4.6 | 4.6 |
| | [Na] (% DM) | 0.58 | 0.35 | 0.32 | 0.33 |
| | [P] (% DM) | 1.11 | 1.16 | 1.15 | 1.16 |
| | [Zn] (mg/kg) | 250 | 87 | 76 | 78 |
| A' | Ca | 0.87 | 0.88 | 0.90 | 0.90 |
| | Cu | 0.40 | 0.28 | 0.43 | 0.43 |
| | Fe | 0.52 | 0.39 | 0.44 | 0.44 |
| | K | 0.99 | 0.99 | 0.99 | 0.99 |
| | Mg | 0.95 | 0.97 | 0.97 | 0.97 |
| | Mn | 0.75 | 0.77 | 0.56 | 0.56 |
| | N | 0.96 | 0.96 | 0.96 | 0.96 |
| | Na | 0.98 | 0.99 | 0.99 | 0.99 |
| | P | 0.71 | 0.81 | 0.82 | 0.82 |
| | Zn | 0.57 | 0.68 | 0.74 | 0.74 |
| R' | Ca | 1.00 | 0.97 | 0.99 | 0.99 |
| | Cu | 1.00 | 5.71 | 1.20 | 1.20 |
| | Fe | 0.50 | 0.82 | 0.94 | 0.94 |
| | K | 1.00 | 0.90 | 0.92 | 0.92 |
| | Mg | 0.91 | 0.91 | 0.89 | 0.89 |
| | Mn | 0.92 | 0.28 | 1.56 | 1.56 |
| | N | 0.85 | 0.71 | 0.73 | 0.73 |
| | Na | 1.00 | 0.85 | 0.79 | 0.79 |
| | P | 0.82 | 0.79 | 0.77 | 0.77 |
| | Zn | 1.00 | 1.03 | 1.04 | 1.04 |
| $N_A$ | Ca (g) | 173 | 225 | 225 | 222 |
| | Cu (mg) | 11.9 | 11.9 | 11.9 | 11.9 |
| | Fe (mg) | 1188 | 1188 | 1188 | 1188 |
| | K (g) | 83.1 | 87.7 | 84.5 | 84.5 |
| | Mg (g) | 11.6 | 11.6 | 12.3 | 12.4 |
| | Mn (mg) | 119 | 119 | 119 | 119 |
| | N (g) | 79.8 | 79.8 | 79.8 | 79.8 |
| | Na (g) | 2.2 | 2.2 | 2.2 | 2.2 |
| | P (g) | 7.4 | 7.4 | 7.4 | 7.4 |
| | Zn (mg) | 11.9 | 11.9 | 28.4 | 20.6 |

[1]Phase 1 model parameters were used for trial 2.1.

APPENDIX 6

Phase 2 Predicted and Actual Dietary Mineral Concentrations

TABLE A.6.1.

Trial 2.1 predicted and actual dietary mineral concentrations.

| | Control diet | | Experimental diet | |
|---|---|---|---|---|
| | Predicted | Actual | Predicted | Actual |
| Mineral | Inclusion rate[1] | Inclusion rate[2] | Predicted Inclusion rate | Actual Inclusion rate |
| Ca (%) | 0.78 | 1.36 | 0.66 | 1.17 |
| Cu (mg/kg) | 5 | 9 | 5 | 7 |
| Fe (mg/kg) | 500 | 833 | 500 | 739 |
| Mg (%) | 0.13 | 0.36 | 0.37 | 0.61 |
| Mn (mg/kg) | 50 | 90 | 230 | 327 |
| N (%) | 5.60 | 5.68 | 5.60 | 5.47 |
| P (%) | 1.10 | 1.77 | 2.10 | 2.40 |
| K (%) | 0.68 | 1.45 | 2.70 | 3.90 |
| Na (%) | 0.08 | 0.55 | 0.32 | 0.79 |
| Zn (mg/kg) | 100 | 149 | 344 | 462 |

[1]The desired inclusion rate.
[2]Due to a systematic error in determining the mineral concentrations of the basal feedstuffs, the mineral concentrations in the control and experimental diets were higher than desired.

TABLE A.6.2.

Trial 2.2 predicted and actual dietary mineral concentrations.

| | Control diet | | Experimental diet | |
|---|---|---|---|---|
| | Predicted | Actual | Predicted | Actual |
| Mineral | Inclusion rate | Inclusion rate | Predicted Inclusion rate | Actual Inclusion rate |
| Ca (%) | 0.93 | 0.88 | 1.02 | 0.94 |
| Cu (mg/kg) | 9.7 | 9.3 | 9.7 | 10.7 |
| Fe (mg/kg) | 500 | 412 | 500 | 368 |
| Mg (%) | 0.32 | 0.28 | 0.32 | 0.28 |
| Mn (mg/kg) | 50 | 43 | 264 | 280 |
| N (%) | 5.60 | 5.58 | 5.60 | 5.56 |
| P (%) | 1.10 | 0.95 | 1.50 | 1.44 |
| K (%) | 1.58 | 1.18 | 2.24 | 2.11 |
| Na (%) | 0.20 | 0.27 | 0.20 | 0.31 |
| Zn (mg/kg) | 54 | 49 | 54 | 50 |

TABLE A.6.3.

Trial 2.3 predicted and actual dietary mineral concentrations.

|  | Control diet | | Experimental diet | |
|---|---|---|---|---|
| Mineral | Predicted Inclusion rate | Actual Inclusion rate | Predicted Inclusion rate | Actual Inclusion rate |
| Ca (%) | 0.97 | 0.94 | 0.97 | 0.93 |
| Cu (mg/kg) | 9.4 | 9.8 | 9.4 | 10.0 |
| Fe (mg/kg) | 500 | 439 | 500 | 426 |
| K (%) | 1.53 | 1.26 | 2.18 | 2.05 |
| Mg (%) | 0.32 | 0.30 | 0.32 | 0.30 |
| Mn (mg/kg) | 50 | 36 | 50 | 34 |
| Na (%) | 0.22 | 0.29 | 0.21 | 0.29 |
| N (%) | 5.60 | 5.56 | 5.60 | 5.60 |
| P (%) | 1.10 | 0.98 | 1.34 | 1.10 |
| Zn (mg/kg) | 54 | 72 | 54 | 71 |

TABLE A.6.4.

Trial 2.4 predicted and actual dietary mineral concentrations.

|  | Control diet | Experimental diet | |
|---|---|---|---|
| Mineral | Actual Inclusion rate | Predicted Inclusion rate | Actual Inclusion rate |
| Ca (%) | 1.55 | 1.00 | 1.01 |
| Cu (mg/kg) | 15.0 | 10.8 | 12.9 |
| Fe (mg/kg) | 299 | 500 | 611 |
| K (%) | 1.21 | 2.09 | 2.08 |
| Mg (%) | 0.31 | 0.30 | 0.30 |
| Mn (mg/kg) | 163 | 50 | 61 |
| Na (%) | 0.37 | 0.23 | 0.31 |
| N (%) | 5.97 | 5.60 | — |
| P (%) | 1.24 | 1.37 | 1.38 |
| Zn (mg/kg) | 229 | 66 | 61 |

APPENDIX 7

Fresh Lettuce Yields During Phase 1 and Phase 2

TABLE A.7.1

Phase 1 fresh lettuce yields (g).

|  | Trial | | | Trials |
|---|---|---|---|---|
|  | 2.1 | 2.2 | 2.3 | 1.1–1.3 |
| Treatment (g) | | | | |
| 0 | 3321 | 3142 | 3249 | |
| 0 | 3500 | 3485 | 2867 | |
| 151 | 3572 | — | — | |
| 151 | 2507 | — | — | |
| 377 | 4784 | 3523 | 1989 | |
| 377 | 4923 | 3220 | 2370 | |
| 902 | 4682 | 3860 | 2704 | |
| 902 | 4243 | 3825 | 3363 | |
| 1804 | — | 3915 | 2642 | |
| 1804 | — | 3953 | 2615 | |
| Means[1,2] | | | | |
| 0 | 3411 | 3314 | 3058 | 3261x |
| 151 | 3040 | — | — | 3040[x] |
| 377 | 4854 | 3372 | 2180 | 3468[x] |
| 902 | 4463 | 3843 | 3034 | 3780[x] |
| 1804 | — | 3934 | 2629 | 3281[x] |
| Trial | 3942[a] | 3615[a] | 2725[b] | |

[1]Treatments within a trial were compared using a two-sample t-test and trial means were compared using ANOVA, both at a significance level of 0.05.
[2]Mean lettuce yields not having the same superscript are significantly different ($p < 0.05$).

TABLE A.7.2

Phase 2 fresh lettuce yields (g).

|  | Trial | | | |
|---|---|---|---|---|
|  | 2.1 | 2.2 | 2.3 | 2.4 |
| Treatment | | | | |
| Control | 4452 | 5238 | 5357 | 4848 |
| Control | 4417 | 5452 | 5319 | 4647 |
| Control | 4611 | 5590 | 5591 | 4841 |
| Experimental | 4276 | 5088 | 5077 | 4503 |
| Experimental | 4645 | 5375 | 5132 | 4463 |
| Experimental | 4606 | 5433 | 5491 | 4715 |
| Means | | | | |
| Control | 4493 | 5427 | 5422 | 4778 |
| Experimental | 4509 | 5299 | 5233 | 4560 |
| Trial[1] | 4501[w] | 5363[xy] | 5328[y] | 4669[z] |

APPENDIX 8

Elemental Analysis of Initial Fill and Makeup Water

TABLE A.8.1.

Elemental analysis of initial fill and makeup water.

| | Phase 1 | | Trial 2.1[2] | Trial 2.2 | | Trial 2.3 | | Trial 2.4 | |
|---|---|---|---|---|---|---|---|---|---|
| Element | Fill water | Distilled water | DI water | Fill water | DI water | Fill water | DI water | Fill water | DI water |
| Ca | 11.8 | 0.2 | — | 10.0 | 0.4 | 9.5 | 0.3 | 12.6 | 0.2 |
| Cu | 0.02 | 0.05 | — | — | — | — | — | — | — |
| Fe | — | — | — | — | — | — | — | — | — |
| K | 0.56 | 0.38 | 5.25 | 2.42 | 2.62 | — | — | 2.33 | — |
| Mg | 1.4 | — | — | 1.6 | — | 1.4 | — | 2.0 | — |
| Mn | — | — | — | — | — | — | — | — | — |
| Na | 2.4 | 0.8 | — | 1.5 | — | 2.0 | — | 0.9 | — |
| P | — | — | 0.10 | 0.33 | 0.12 | 0.20 | 0.12 | 0.43 | 0.10 |
| Zn | 0.117 | 0.038 | — | 0.018 | — | 0.017 | 0.011 | 0.010 | 0.001 |

[1]Concentrations are listed in mg/l and were determined using an inductively-coupled argon plasma emission spectrophotometer. Hyphens indicate that the values were low and could not be reliably quantified. During phase 1, the sytems were initially filled with chlorinated city water that was dechlorinated using sodium thiosulfate. During phase 2, city water was used following dechlorination by activated charcoal filtration.
[2]Initial fill water samples were not collected at the beginning of trial 2.1.

APPENDIX 9

Uncorrected and Corrected Phase 1 Mineral Concentrations

TABLE A.9.1.

Phase 1 dissolved Ca concentrations (mg/l)[2].

| | | | Days into trial | | | | | | Days into trial | | | | |
|---|---|---|---|---|---|---|---|---|---|---|---|---|---|
| Trial 1.1 | Treatment | 0 | 2 | 7 | 17 | 24 | 30 | 0 | 2 | 7 | 17 | 24 | 30 |
| | 0 | 206 | 187 | 116 | 100 | 99 | 160 | 206 | 187 | 116 | 100 | 99 | 93 |
| | 151 | 160 | 167 | 122 | 107 | 99 | 138 | 160 | 167 | 122 | 107 | 99 | 88 |
| | 377 | 160 | 154 | 122 | 101 | 93 | 127 | 160 | 154 | 122 | 101 | 93 | 77 |
| | 902 | 161 | 169 | 129 | 103 | 104 | 134 | 161 | 169 | 129 | 103 | 104 | 83 |

| | | | Days into trial | | | | | | Days into trial | | | | |
|---|---|---|---|---|---|---|---|---|---|---|---|---|---|
| Trial 1.2 | Treatment | 0 | 5 | 8 | 16 | 22 | 28 | 0 | 5 | 8 | 16 | 22 | 28 |
| | 0 | 206 | 175 | 168 | 166 | | 329 | 206 | 175 | 168 | 166 | 59 | 58 |
| | 377 | 160 | 162 | 133 | 125 | 313 | 301 | 160 | 162 | 133 | 125 | 114 | 102 |
| | 902 | 161 | 158 | 137 | 117 | 252 | 212 | 161 | 158 | 137 | 117 | 53 | 13 |
| | 1804 | 159 | 154 | 129 | 102 | 209 | 206 | 159 | 154 | 129 | 102 | 10 | 7 |

| | | | Days into trial | | | | | | | Days into trial | | | | | |
|---|---|---|---|---|---|---|---|---|---|---|---|---|---|---|---|
| Trial 1.3 | Treatment | 0 | 2 | 4 | 8 | 15 | 18 | 23 | 28 | 0 | 2 | 4 | 8 | 15 | 18 | 23 | 28 |
| | 0 | 206 | 186 | 182 | 172 | 173 | 331 | 331 | 329 | 206 | 186 | 182 | 172 | 173 | 60 | 60 | 58 |
| | 377 | 160 | 177 | 150 | 128 | 109 | 312 | 258 | 251 | 160 | 177 | 150 | 128 | 109 | 113 | 59 | 52 |
| | 902 | 159 | 198 | 167 | 143 | 118 | 313 | 302 | 280 | 159 | 198 | 167 | 143 | 118 | 114 | 103 | 81 |
| | 1804 | 162 | 196 | 154 | 133 | 105 | 290 | 216 | 208 | 162 | 196 | 154 | 133 | 105 | 91 | 17 | 9 |

[2]Treatment mean elemental concentrations in solution samples taken from the fish tanks.

TABLE A.9.2.

Phase 1 dissolved Cu concentrations (mg/l)[1].

| Trial 1.1 | Treatment | Days into trial | | | | | | Days into trial | | | | | |
| --- | --- | --- | --- | --- | --- | --- | --- | --- | --- | --- | --- | --- | --- |
| | | 0 | 2 | 7 | 17 | 24 | 30 | 0 | 2 | 7 | 17 | 24 | 30 |
| | 0 | 0.047 | 0.035 | 0.035 | 0.044 | 0.060 | 0.062 | 0.047 | 0.032 | 0.026 | 0.023 | 0.031 | 0.029 |
| | 151 | 0.040 | 0.025 | 0.034 | 0.045 | 0.052 | 0.054 | 0.040 | 0.024 | 0.027 | 0.030 | 0.030 | 0.029 |
| | 377 | 0.040 | 0.029 | 0.038 | 0.045 | 0.050 | 0.051 | 0.040 | 0.027 | 0.031 | 0.030 | 0.029 | 0.026 |
| | 902 | 0.040 | 0.030 | 0.030 | 0.036 | 0.037 | 0.037 | 0.040 | 0.029 | 0.023 | 0.020 | 0.015 | 0.012 |

| Trial 1.2 | Treatment | Days into trial | | | | | | Days into trial | | | | | |
| --- | --- | --- | --- | --- | --- | --- | --- | --- | --- | --- | --- | --- | --- |
| | | 0 | 5 | 8 | 16 | 22 | 28 | 0 | 5 | 8 | 16 | 22 | 28 |
| | 0 | 0.047 | 0.022 | 0.023 | 0.041 | 0.043 | 0.041 | 0.047 | 0.016 | 0.013 | −0.007 | −0.012 | −0.021 |
| | 377 | 0.040 | 0.015 | 0.018 | 0.024 | 0.022 | 0.022 | 0.040 | 0.011 | 0.010 | −0.012 | −0.019 | −0.024 |
| | 902 | 0.040 | 0.013 | 0.019 | 0.026 | 0.026 | 0.021 | 0.040 | 0.009 | 0.011 | −0.010 | −0.016 | −0.025 |
| | 1804 | 0.040 | 0.020 | 0.026 | 0.032 | 0.029 | 0.030 | 0.040 | 0.016 | 0.019 | −0.004 | −0.012 | −0.017 |

| Trial 1.3 | Treatment | Days into trial | | | | | | | | Days into trial | | | | | | |
| --- | --- | --- | --- | --- | --- | --- | --- | --- | --- | --- | --- | --- | --- | --- | --- |
| | | 0 | 2 | 4 | 8 | 15 | 18 | 23 | 28 | 0 | 2 | 4 | 8 | 15 | 18 | 23 | 28 |
| | 0 | 0.047 | 0.024 | 0.026 | 0.032 | 0.037 | 0.046 | 0.046 | 0.046 | 0.047 | 0.022 | 0.021 | 0.022 | 0.019 | −0.004 | −0.004 | −0.004 |
| | 377 | 0.040 | 0.027 | 0.020 | 0.032 | 0.024 | 0.021 | 0.019 | 0.019 | 0.040 | 0.025 | 0.016 | 0.025 | 0.010 | −0.016 | −0.019 | −0.018 |
| | 902 | 0.040 | 0.030 | 0.020 | 0.018 | 0.018 | 0.020 | 0.018 | 0.017 | 0.040 | 0.028 | 0.016 | 0.011 | 0.005 | −0.017 | −0.019 | −0.020 |
| | 1804 | 0.040 | 0.031 | 0.027 | 0.028 | 0.024 | 0.023 | 0.024 | 0.020 | 0.040 | 0.029 | 0.023 | 0.021 | 0.010 | −0.014 | −0.013 | −0.018 |

[1]Treatment mean elemental concentrations in solution samples taken from the fish tanks.

TABLE A.9.3.

Phase 1 dissolved Fe concentrations (mg/l)[1].

| Trial 1.1 | Treatment | Days into trial | | | | | | Days into trial | | | | | |
| --- | --- | --- | --- | --- | --- | --- | --- | --- | --- | --- | --- | --- | --- |
| | | 0 | 2 | 7 | 17 | 24 | 30 | 0 | 2 | 7 | 17 | 24 | 30 |
| | 0 | 0.04 | 0.20 | 2.16 | 1.50 | 1.15 | 0.83 | 0.04 | 2.88 | 2.15 | 1.49 | 1.13 | 0.83 |
| | 151 | 0.04 | 0.11 | 1.42 | 0.71 | 0.43 | 0.28 | 0.04 | 2.16 | 1.41 | 0.69 | 0.41 | 0.28 |
| | 377 | 0.04 | 0.08 | 1.79 | 0.94 | 0.69 | 0.48 | 0.04 | 2.14 | 1.79 | 0.93 | 0.67 | 0.48 |
| | 902 | 0.04 | 0.07 | 1.70 | 1.00 | 0.80 | 0.60 | 0.04 | 2.14 | 1.69 | 0.99 | 0.78 | 0.60 |

| Trial 1.2 | Treatment | Days into trial | | | | | | Days into trial | | | | | |
| --- | --- | --- | --- | --- | --- | --- | --- | --- | --- | --- | --- | --- | --- |
| | | 0 | 5 | 8 | 16 | 22 | 28 | 0 | 5 | 8 | 16 | 22 | 28 |
| | 0 | 0.56 | 0.36 | 0.29 | 2.40 | 1.59 | 1.05 | 0.56 | 0.36 | 0.28 | −0.49 | −1.30 | −1.85 |
| | 377 | 0.43 | 0.37 | 0.20 | 1.71 | 0.74 | 0.45 | 0.43 | 0.36 | 0.20 | −0.47 | −1.44 | −1.73 |
| | 902 | 0.43 | 0.34 | 0.19 | 1.66 | 0.90 | 0.54 | 0.43 | 0.33 | 0.19 | −0.49 | −1.27 | −1.63 |
| | 1804 | 0.42 | 0.34 | 0.22 | 1.65 | 0.87 | 0.66 | 0.42 | 0.34 | 0.21 | −0.50 | −1.28 | −1.50 |

| Trial 1.3 | Treatment | Days into trial | | | | | | | | Days into trial | | | | | | |
| --- | --- | --- | --- | --- | --- | --- | --- | --- | --- | --- | --- | --- | --- | --- | --- |
| | | 0 | 2 | 4 | 8 | 15 | 18 | 23 | 28 | 0 | 2 | 4 | 8 | 15 | 18 | 23 | 28 |
| | 0 | 2.88 | 2.42 | 2.17 | 2.02 | 1.96 | 4.29 | 3.29 | 3.01 | 2.88 | 2.41 | 2.16 | 2.02 | 1.95 | 1.40 | 0.40 | 0.11 |
| | 377 | 2.14 | 1.91 | 1.50 | 1.04 | 0.53 | 2.00 | 1.12 | 0.62 | 2.14 | 1.91 | 1.50 | 1.04 | 0.52 | −0.15 | −1.04 | −1.54 |
| | 902 | 2.15 | 2.20 | 1.62 | 1.22 | 0.75 | 2.29 | 1.65 | 1.26 | 2.15 | 2.20 | 1.61 | 1.21 | 0.74 | 0.13 | −0.52 | −0.91 |
| | 1804 | 2.15 | 2.20 | 1.38 | 1.05 | 0.63 | 2.11 | 1.47 | 0.95 | 2.15 | 2.20 | 1.38 | 1.04 | 0.62 | −0.05 | −0.70 | −1.22 |

[1]Treatment mean elemental concentrations in solution samples taken from the fish tanks.

TABLE A.9.4.

Phase 1 dissolved K concentrations (mg/l)[1].

| Trial 1.1 | Treatment | Days into trial | | | | | | Days into trial | | | | | |
| --- | --- | --- | --- | --- | --- | --- | --- | --- | --- | --- | --- | --- | --- |
| | | 0 | 2 | 7 | 17 | 24 | 30 | 0 | 2 | 7 | 17 | 24 | 30 |
| | 0 | 200 | 205 | 203 | 169 | 149 | 126 | 200 | 205 | 203 | 169 | 149 | 126 |
| | 151 | 151 | 186 | 155 | 135 | 118 | 105 | 151 | 186 | 155 | 135 | 118 | 105 |
| | 377 | 148 | 171 | 145 | 111 | 95 | 74 | 148 | 171 | 145 | 111 | 95 | 74 |
| | 902 | 149 | 188 | 154 | 128 | 125 | 115 | 149 | 188 | 154 | 128 | 125 | 115 |

| Trial 1.2 | Treatment | Days into trial | | | | | | Days into trial | | | | | |
| --- | --- | --- | --- | --- | --- | --- | --- | --- | --- | --- | --- | --- | --- |
| | | 0 | 5 | 8 | 16 | 22 | 28 | 0 | 5 | 8 | 16 | 22 | 28 |
| | 0 | 200 | 165 | 151 | 124 | 110 | 102 | 200 | 165 | 151 | 124 | 110 | 102 |
| | 377 | 151 | 162 | 130 | 123 | 118 | 113 | 151 | 162 | 130 | 123 | 118 | 113 |
| | 902 | 151 | 149 | 137 | 127 | 120 | 114 | 151 | 149 | 137 | 127 | 120 | 114 |
| | 1804 | 163 | 159 | 146 | 137 | 132 | 129 | 163 | 159 | 146 | 137 | 132 | 129 |

| Trial 1.3 | Treatment | Days into trial | | | | | | | | Days into trial | | | | | | | |
| --- | --- | --- | --- | --- | --- | --- | --- | --- | --- | --- | --- | --- | --- | --- | --- | --- | --- |
| | | 0 | 2 | 4 | 8 | 15 | 18 | 23 | 28 | 0 | 2 | 4 | 8 | 15 | 18 | 23 | 28 |
| | 0 | 200 | 181 | 178 | 161 | 151 | 144 | 129 | 119 | 200 | 181 | 178 | 161 | 151 | 144 | 129 | 119 |
| | 377 | 148 | 162 | 148 | 135 | 117 | 118 | 109 | 106 | 148 | 162 | 148 | 135 | 117 | 118 | 109 | 106 |
| | 902 | 149 | 183 | 164 | 152 | 140 | 144 | 138 | 135 | 149 | 183 | 164 | 152 | 140 | 144 | 138 | 135 |
| | 1804 | 151 | 185 | 157 | 158 | 154 | 155 | 152 | 156 | 151 | 185 | 157 | 158 | 154 | 155 | 152 | 156 |

[1]Treatment mean elemental concentrations in solution samples taken from the fish tanks.

TABLE A.9.5.

Phase 1 dissolved Mg concentrations (mg/l)[1].

| Trial 1.1 | Treatment | Days into trial | | | | | |
| --- | --- | --- | --- | --- | --- | --- | --- |
| | | 0 | 2 | 7 | 17 | 24 | 30 |
| | 0 | 27.6 | 28.1 | 26.7 | 23.9 | 23.0 | 21.9 |
| | 151 | 20.6 | 26.2 | 21.7 | 20.8 | 19.6 | 19.0 |
| | 377 | 20.5 | 26.0 | 22.0 | 19.7 | 18.9 | 17.3 |
| | 902 | 20.8 | 27.0 | 22.5 | 22.0 | 23.4 | 22.8 |

| Trial 1.2 | Treatment | Days into trial | | | | | |
| --- | --- | --- | --- | --- | --- | --- | --- |
| | | 0 | 5 | 8 | 16 | 22 | 28 |
| | 0 | 18.2 | 17.0 | 16.0 | 15.0 | 14.4 | 13.9 |
| | 377 | 13.6 | 16.3 | 14.4 | 14.8 | 14.9 | 14.8 |
| | 902 | 13.7 | 16.2 | 15.5 | 16.1 | 16.2 | 16.8 |
| | 1804 | 13.5 | 15.8 | 15.9 | 17.6 | 18.4 | 20.1 |

| Trial 1.3 | Treatment | Days into trial | | | | | | | |
| --- | --- | --- | --- | --- | --- | --- | --- | --- | --- |
| | | 0 | 2 | 4 | 8 | 15 | 18 | 23 | 28 |
| | 0 | 18.2 | 14.6 | 14.4 | 13.6 | 13.7 | 13.2 | 13.0 | 12.2 |
| | 377 | 13.5 | 15.9 | 14.4 | 13.5 | 12.4 | 13.0 | 12.4 | 12.4 |
| | 902 | 13.5 | 18.1 | 15.8 | 15.3 | 15.2 | 15.8 | 16.3 | 16.9 |
| | 1804 | 13.8 | 18.2 | 15.3 | 15.9 | 17.5 | 18.0 | 19.3 | 20.3 |

[1]Treatment mean elemental concentrations in solution samples taken from the fish tanks.

TABLE A.9.6.

Phase 1 dissolved Mn concentrations (mg/l)[1].

| Trial 1.1 | Treatment | Days into trial | | | | | | Days into trial | | | | | |
|---|---|---|---|---|---|---|---|---|---|---|---|---|---|
| | | 0 | 2 | 7 | 17 | 24 | 30 | 0 | 2 | 7 | 17 | 24 | 30 |
| | 0 | 0.289 | 0.351 | 0.026 | 0.000 | 0.019 | 0.000 | 0.289 | 0.351 | 0.026 | −0.001 | 0.019 | 0.000 |
| | 151 | 0.217 | 0.081 | 0.001 | 0.005 | 0.009 | 0.007 | 0.217 | 0.081 | 0.001 | 0.005 | 0.009 | 0.007 |
| | 377 | 0.216 | 0.048 | 0.029 | 0.016 | 0.019 | 0.013 | 0.216 | 0.048 | 0.029 | 0.016 | 0.019 | 0.013 |
| | 902 | 0.219 | 0.087 | 0.019 | 0.025 | 0.027 | 0.033 | 0.219 | 0.087 | 0.019 | 0.025 | 0.027 | 0.033 |

| Trial 1.2 | Treatment | Days into trial | | | | | | Days into trial | | | | | |
|---|---|---|---|---|---|---|---|---|---|---|---|---|---|
| | | 0 | 5 | 8 | 16 | 22 | 28 | 0 | 5 | 8 | 16 | 22 | 28 |
| | 0 | 0.289 | 0.005 | 0.001 | 0.152 | 0.002 | 0.003 | 0.289 | 0.005 | 0.001 | −0.137 | −0.287 | −0.286 |
| | 377 | 0.217 | 0.001 | 0.004 | 0.067 | 0.027 | 0.015 | 0.217 | 0.001 | 0.004 | −0.150 | −0.191 | −0.202 |
| | 902 | 0.219 | 0.003 | 0.008 | 0.019 | 0.031 | 0.024 | 0.219 | 0.003 | 0.008 | −0.200 | −0.188 | −0.195 |
| | 1804 | 0.216 | 0.007 | 0.035 | 0.062 | 0.058 | 0.109 | 0.216 | 0.007 | 0.035 | −0.153 | −0.158 | −0.107 |

| Trial 1.3 | Treatment | Days into trial | | | | | | | Days into trial | | | | | | |
|---|---|---|---|---|---|---|---|---|---|---|---|---|---|---|---|
| | | 0 | 2 | 4 | 8 | 15 | 18 | 23 | 28 | 0 | 2 | 4 | 8 | 15 | 18 | 23 | 28 |
| | 0 | 0.289 | 0.215 | 0.116 | 0.017 | −0.002 | 0.109 | 0.000 | 0.007 | 0.289 | 0.215 | 0.116 | 0.017 | −0.002 | −0.180 | −0.296 | −0.282 |
| | 377 | 0.216 | 0.494 | 0.046 | 0.021 | 0.005 | 0.003 | 0.003 | 0.003 | 0.216 | 0.494 | 0.046 | 0.021 | 0.005 | −0.213 | −0.212 | −0.213 |
| | 902 | 0.216 | 0.629 | 0.180 | 0.029 | 0.026 | 0.031 | 0.034 | 0.036 | 0.216 | 0.629 | 0.180 | 0.029 | 0.026 | −0.185 | −0.182 | −0.180 |
| | 1804 | 0.220 | 0.997 | 0.434 | 0.071 | 0.065 | 0.076 | 0.199 | 0.067 | 0.220 | 0.997 | 0.434 | 0.071 | 0.065 | −0.143 | −0.020 | −0.153 |

[1]Treatment mean elemental concentrations in solution samples taken from the fish tanks.

TABLE A.9.7.

Phase 1 dissolved N concentrations (mg/l)[1].

| Trial 1.1 | Treatment | Days into trial | | | | | | | | | |
|---|---|---|---|---|---|---|---|---|---|---|---|
| | | 0 | 2 | 6 | 9 | 14 | 17 | 20 | 24 | 27 | 30 |
| | 0 | 192 | 165 | 170 | 216 | 227 | 204 | 199 | 161 | 153 | 144 |
| | 151 | 144 | 148 | 141 | 131 | 169 | 150 | 147 | 128 | 123 | 115 |
| | 377 | 143 | 136 | 127 | 124 | 156 | 156 | 139 | 126 | 102 | 92 |
| | 902 | 145 | 139 | 143 | 134 | 173 | 183 | 171 | 166 | 157 | 160 |

| Trial 1.2 | Treatment | Days into trial | | | | | | | |
|---|---|---|---|---|---|---|---|---|---|
| | | 0 | 1 | 5 | 8 | 13 | 16 | 18 | 22 | 28 |
| | 0 | 253 | 251 | 249 | 227 | 204 | 209 | 191 | 188 | 192 |
| | 377 | 189 | 192 | 215 | 196 | 203 | 188 | 184 | 187 | 179 |
| | 902 | 191 | 159 | 201 | 202 | 226 | 185 | 184 | 173 | 183 |
| | 1804 | 188 | 162 | 190 | 204 | 214 | 196 | 183 | 188 | 187 |

| Trial 1.3 | Treatment | Days into trial | | | | | | |
|---|---|---|---|---|---|---|---|---|
| | | 0 | 2 | 4 | 8 | 15 | 18 | 23 | 28 |
| | 0 | 253 | 240 | 263 | 227 | 166 | 197 | 186 | 179 |
| | 377 | 188 | 213 | 200 | 187 | 163 | 155 | 107 | 118 |
| | 902 | 188 | 251 | 216 | 209 | 194 | 172 | 160 | 168 |
| | 1804 | 191 | 270 | 208 | 209 | 173 | 163 | 143 | 168 |

[1]Treatment mean elemental concentrations in solution samples taken from the fish tanks.

TABLE A.9.8.

Phase 1 dissolved Na concentrations (mg/l)[1].

| Trial 1.1 | Treatment | Days into trial | | | | | |
|---|---|---|---|---|---|---|---|
| | | 0 | 2 | 7 | 17 | 24 | 30 |
| | 0 | 2.4 | 8.9 | 90.6 | 89.0 | 87.9 | 86.2 |
| | 151 | 2.4 | 14.7 | 52.8 | 77.5 | 83.4 | 81.3 |
| | 377 | 2.4 | 14.5 | 53.6 | 72.7 | 75.7 | 69.6 |
| | 902 | 2.4 | 18.7 | 57.4 | 81.3 | 112.5 | 104.1 |

| Trial 1.2 | Treatment | Days into trial | | | | | |
|---|---|---|---|---|---|---|---|
| | | 0 | 5 | 8 | 16 | 22 | 28 |
| | 0 | 2.4 | 7.3 | 7.0 | 9.3 | 9.7 | 15.8 |
| | 377 | 2.4 | 42.7 | 36.8 | 66.4 | 77.7 | 77.1 |
| | 902 | 2.4 | 41.0 | 38.2 | 72.3 | 76.4 | 77.5 |
| | 1804 | 2.4 | 39.6 | 37.8 | 96.0 | 104.0 | 107.5 |

| Trial 1.3 | Treatment | Days into trial | | | | | | |
|---|---|---|---|---|---|---|---|---|
| | | 0 | 2 | 4 | 8 | 15 | 18 | 23 | 28 |
| | 0 | 2.4 | 14.7 | 15.0 | 15.3 | 16.4 | 18.2 | 19.1 | 18.3 |
| | 377 | 2.4 | 33.7 | 66.5 | 88.1 | 91.6 | 99.9 | 93.9 | 93.0 |
| | 902 | 2.4 | 55.1 | 88.0 | 118.3 | 139.7 | 148.8 | 145.2 | 145.8 |
| | 1804 | 2.4 | 39.2 | 71.7 | 96.8 | 133.3 | 134.6 | 130.8 | 128.6 |

[1]Treatment mean elemental concentrations in solution samples taken from the fish tanks.

TABLE A.9.9.

Phase 1 dissolved P concentrations (mg/l)[1].

| Trial 1.1 | Treatment | Days into trial | | | | | | Days into trial | | | | | |
|---|---|---|---|---|---|---|---|---|---|---|---|---|---|
| | | 0 | 2 | 7 | 17 | 24 | 30 | 0 | 2 | 7 | 17 | 24 | 30 |
| | 0 | 17.6 | 17.2 | 3.7 | 1.0 | 0.5 | 0.3 | 17.6 | 17.2 | 3.7 | 1.0 | 0.5 | 0.3 |
| | 151 | 13.2 | 15.7 | 4.0 | 1.1 | 0.8 | 0.5 | 13.2 | 15.7 | 4.0 | 1.1 | 0.8 | 0.5 |
| | 377 | 13.1 | 15.2 | 6.2 | 2.6 | 2.0 | 1.3 | 13.1 | 15.2 | 6.2 | 2.6 | 2.0 | 1.3 |
| | 902 | 13.2 | 16.1 | 9.8 | 5.2 | 4.1 | 3.6 | 13.2 | 16.1 | 9.8 | 5.2 | 4.1 | 3.6 |

| Trial 1.2 | Treatment | Days into trial | | | | | | Days into trial | | | | | |
|---|---|---|---|---|---|---|---|---|---|---|---|---|---|
| | | 0 | 5 | 8 | 16 | 22 | 28 | 0 | 5 | 8 | 16 | 22 | 28 |
| | 0 | 17.6 | 0.8 | 0.3 | 0.4 | 0.1 | 0.2 | 17.6 | 0.8 | 0.3 | 0.4 | 0.1 | 0.2 |
| | 377 | 13.2 | 4.8 | 1.3 | 0.9 | 0.5 | 0.5 | 13.2 | 4.8 | 1.3 | 0.9 | 0.5 | 0.5 |
| | 902 | 13.3 | 7.5 | 3.3 | 2.3 | 1.7 | 2.1 | 13.3 | 7.5 | 3.3 | 2.3 | 1.7 | 2.1 |
| | 1804 | 13.0 | 10.2 | 5.4 | 4.2 | 3.0 | 3.7 | 13.0 | 10.2 | 5.4 | 4.2 | 3.0 | 3.7 |

| Trial 1.3 | Treatment | Days into trial | | | | | | | | Days into trial | | | | | | | |
|---|---|---|---|---|---|---|---|---|---|---|---|---|---|---|---|---|---|
| | | 0 | 2 | 4 | 8 | 15 | 18 | 23 | 28 | 0 | 2 | 4 | 8 | 15 | 18 | 23 | 28 |
| | 0 | 17.6 | 13.3 | 10.2 | 6.2 | 3.4 | 2.3 | 0.8 | 0.9 | 17.6 | 13.3 | 10.2 | 6.2 | 3.4 | 2.3 | 0.8 | 0.9 |
| | 377 | 13.1 | 14.7 | 7.4 | 3.6 | 2.4 | 1.3 | 0.8 | 0.8 | 13.1 | 14.7 | 7.4 | 3.6 | 2.4 | 1.3 | 0.8 | 0.8 |
| | 902 | 13.1 | 19.4 | 12.0 | 7.4 | 4.9 | 3.1 | 2.3 | 2.1 | 13.1 | 19.4 | 12.0 | 7.4 | 4.9 | 3.1 | 2.3 | 2.1 |
| | 1804 | 13.3 | 15.9 | 10.4 | 8.8 | 6.6 | 4.0 | 3.8 | 3.4 | 13.3 | 15.9 | 10.4 | 8.8 | 6.6 | 4.0 | 3.8 | 3.4 |

[1]Treatment mean elemental concentrations in solution samples taken from the fish tanks.

APPENDIX 10

Recovery of Nutrients as Percent of Diet During Phase 1

TABLE A.10.1

Recovery of minerals as percent of diet during phase 1.

| Fish | Biomass (g) | Ca | Cu | Fe | K | Mg | Mn | N | Na | P | Zn |
|---|---|---|---|---|---|---|---|---|---|---|---|
| Plants | 151 | 97 | 78 | 46 | 755 | 133 | 156 | 67 | 116 | 48 | 56 |
|  | 377 | 70 | 107 | 49 | 385 | 72 | 192 | 38 | 51 | 33 | 32 |
|  | 902 | 26 | 38 | 20 | 154 | 30 | 87 | 16 | 23 | 13 | 15 |
|  | 1804 | 13 | 22 | 9 | 70 | 14 | 62 | 8 | 10 | 7 |  |
| Fish | 151 | 85 | 10 | 4 | 23 | 19 | 3 | 42 | 57 | 51 | 35 |
|  | 377 | 94 | 17 | 5 | 24 | 20 | 3 | 43 | 48 | 54 | 36 |
|  | 902 | 102 | 19 | 6 | 26 | 22 | 3 | 47 | 52 | 59 | 39 |
|  | 1804 | 97 | 20 | 5 | 24 | 21 | 3 | 44 | 43 | 55 | 36 |
| Solids | 151 | 169 | 226 | 160 | 6 | 24 | 56 | 15 | 19 | 59 | 90 |
|  | 377 | 125 | 259 | 160 | 5 | 19 | 60 | 10 | 12 | 46 | 50 |
|  | 902 | 90 | 152 | 124 | 3 | 17 | 40 | 7 | 11 | 40 | 47 |
|  | 1804 | 71 | 143 | 99 | 3 | 14 | 43 | 8 | 10 | 33 | 48 |
| Total | 151 | 351 | 314 | 210 | 783 | 176 | 214 | 124 | 191 | 158 | 181 |
|  | 377 | 289 | 383 | 215 | 414 | 111 | 255 | 92 | 112 | 133 | 118 |
|  | 902 | 218 | 209 | 149 | 183 | 69 | 130 | 70 | 86 | 112 | 101 |
|  | 1804 | 182 | 185 | 113 | 97 | 49 | 108 | 59 | 63 | 95 | 92 |

APPENDIX 11

Model Parameter Estimates Determined from Phase 1 Data

TABLE A.11.1.

Estimates of model parameters determined using phase 1 data[1].

|  | Availability (A')[a] Trial | | | | Availability (A')[b] Trial | | | | Recovery (R)[c] Trial | | | | Recovery (R')[d] Trial | | | |
|---|---|---|---|---|---|---|---|---|---|---|---|---|---|---|---|---|
|  | 1.1 | 1.2 | 1.3 | Mean | 1.1 | 1.2 | 1.3 | Mean | 1.1 | 1.2 | 1.3 | Mean | 1.1 | 1.2 | 1.3 | Mean |
| Ca | 0.09 | 0.00 | −0.28 | −0.06 | 0.91 | 0.87 | 0.83 | 0.87 | 0.90 | 1.06 | 1.09 | 1.02 | 0.89 | 1.06 | 1.12 | 1.02 |
| Cu | −0.79 | −1.17 | −0.85 | −0.94 | 0.41 | 0.35 | 0.45 | 0.40 | 1.36 | 1.14 | 0.92 | 1.14 | 0.46 | 2.25 | 0.89 | 1.20 |
| Fe | −0.23 | −0.41 | −0.39 | −0.34 | 0.57 | 0.42 | 0.58 | 0.52 | 0.70 | 0.81 | 0.65 | 0.72 | 0.54 | 0.55 | 0.42 | 0.50 |
| K | 0.95 | 0.97 | 0.96 | 0.96 | 0.99 | 0.99 | 0.99 | 0.99 | 1.02 | 1.01 | 1.04 | 1.03 | 1.02 | 1.04 | 1.07 | 1.04 |
| Mg | 0.80 | 0.83 | 0.83 | 0.82 | 0.96 | 0.94 | 0.94 | 0.95 | 0.90 | 0.94 | 0.90 | 0.91 | 0.90 | 0.93 | 0.89 | 0.91 |
| Mn | 1.70 | 0.57 | 0.49 | 0.92 | 0.75 | 0.78 | 0.73 | 0.75 | 1.08 | 0.83 | 0.77 | 0.89 | 1.26 | 0.78 | 0.72 | 0.92 |
| N | 0.89 | 0.89 | 0.89 | 0.89 | 0.96 | 0.96 | 0.96 | 0.96 | 0.85 | 0.78 | 0.71 | 0.78 | 0.84 | 0.77 | 0.70 | 0.77 |
| Na | 3.33 | −1.47 | −1.88 | −0.01 | 0.99 | 0.98 | 0.98 | 0.98 | 1.14 | 0.95 | 1.29 | 1.13 | 1.14 | 0.95 | 1.29 | 1.13 |
| P | 0.60 | 0.57 | 0.57 | 0.58 | 0.76 | 0.68 | 0.68 | 0.71 | 0.80 | 0.91 | 0.89 | 0.87 | 0.73 | 0.87 | 0.85 | 0.82 |
| Zn | 0.41 | 0.46 | 0.53 | 0.47 | 0.58 | 0.54 | 0.60 | 0.57 | 1.61 | 1.33 | 1.16 | 1.37 | 2.23 | 1.76 | 1.28 | 1.75 |

[1]Mean trial values.

APPENDIX 13

Fish Growth

TABLE A 13.1.

Trial 1.1 fish growth.

| | Initial | | End of Trial | | | | | | |
|---|---|---|---|---|---|---|---|---|---|
| Treatment[1] | Mean wt. (g) | Total wt. (g) | Mean wt. (g) | Yield (g) | FCR | Mortality (%) | $G_W{}^2$ | N retention (%) | Approx. PER |
| 151 | 3.8 | 150 | 11.8 | 197 | 1.04 | 0 | 3.00 | 34 | 2.24 |
| 377 | 3.8 | 376 | 12.0 | 548 | 1.03 | 0 | 2.99 | 34 | 2.25 |

TABLE A-continued

| 902 | 3.8 | 900 | 12.3 | 1308 | 0.95 | 0 | 3.14 | 36 | 2.43 |

13.2.
Trial 1.2 fish growth.

| | Initial | | End of Trial | | | | | | |
|---|---|---|---|---|---|---|---|---|---|
| Treatment | Mean wt. (g) | Total wt. (g) | Mean wt. (g) | Yield (g) | FCR | Mortality (%) | $G_W$ | N retention (%) | Approx. PER |
| 377 | 11.5 | 378 | 40.6 | 570 | 0.86 | 0 | 3.28 | 41 | 2.96 |
| 902 | 11.5 | 901 | 41.0 | 1378 | 0.84 | 1 | 3.31 | 41 | 3.00 |
| 1804 | 12.4 | 1803 | 36.5 | 2291 | 1.02 | 0 | 2.93 | 34 | 2.50 |

13.3.
Trial 1.3 fish growth.

| | Initial | | End of Trial | | | | | | |
|---|---|---|---|---|---|---|---|---|---|
| Treatment | Mean wt. (g) | Total wt. (g) | Mean wt. (g) | Yield (g) | FCR | Mortality (%) | $G_W$ | N retention (%) | Approx. PER |
| 377 | 36.5 | 382 | 100.2 | 404 | 0.99 | 0 | 2.73 | 41 | 2.53 |
| 902 | 38.0 | 889 | 94.9 | 1138 | 1.01 | 0 | 2.71 | 40 | 2.48 |
| 1804 | 38.1 | 1791 | 96.8 | 2242 | 0.89 | 0 | 2.86 | 47 | 2.86 |

[1]Table values represent treatment means.
[2]Daily instantaneous growth rate $(G_W) = (\ln(W_1) - \ln(W_0)) \div T$; where, $W_1$ = weight at end of period, $W_0$ = weight at beginning of period, and T = time interval in days.

TABLE A.13.4.

Trial 2.1 fish growth.

| | Initial | | Mid-Trial | | | End of Trial | | | Trial Summary | | | | |
|---|---|---|---|---|---|---|---|---|---|---|---|---|---|
| Treatment | Mean wt. (g) | Total wt. (g) | Mean wt. (g) | Yield (g) | FCR | Mean wt. (g) | Yield (g) | FCR | FCR | Mortality (%) | $G_W$[1] | N retention (%) | Approx. PER |
| Control | 65.5 | 852 | 89.6 | 312. | 1.38 | 104.1 | 181 | 2.53 | 1.81 | 0 | 1.63 | 23 | 1.58 |
| Experimental | 65.8 | 856 | 91.4 | 333 | 1.29 | 112.7 | 261 | 1.77 | 1.50 | 0 | 1.88 | 27 | 1.90 |
| Experimental | 65.6 | 853 | 99.3 | 438 | 0.98 | 112.0 | 251 | 1.84 | 1.29 | 0 | 2.11 | 32 | 2.21 |
| Control | 65.5 | 852 | 90.4 | 323 | 1.34 | 107.7 | 216 | 2.11 | 1.65 | 0 | 1.75 | 25 | 1.73 |
| Experimental | 61.0 | 854 | 86.5 | 357 | 1.20 | 111.5 | 246 | 1.89 | 1.48 | 0 | 1.91 | 28 | 1.93 |
| Control | 60.8 | 851 | 84.5 | 332 | 1.33 | 109.0 | 224 | 2.00 | 1.60 | 0 | 1.79 | 25 | 1.78 |
| Means[2] | | | | | | | | | | | | | |
| Control | 64.0 | 852 | 88.1[a] | 322[a] | 1.35[a] | 106.9[a] | 207[a] | 2.22[a] | 1.69[a] | 0 | 1.73[a] | 24[a] | 1.70[a] |
| Experimental | 64.1 | 854 | 92.4[a] | 376[a] | 1.16[a] | 112.1[b] | 253[b] | 1.83[a] | 1.42[b] | 0 | 1.97[b] | 29[b] | 2.02[b] |

[1]Daily instantaneous growth rate $(G_W) = (\ln(W_1) - \ln(W_0)) \div T$; where, $W_1$ = weight at end of period, $W_0$ = weight at beginning of period, and T = time interval in days.
[2]Values not having the same superscript are significantly different ($p < 0.05$).

TABLE A.13.5.

Trial 2.2 fish growth.

| Treatment | Initial | | Mid-Trial | | | End of Trial | | | Trial Summary | | | | |
|---|---|---|---|---|---|---|---|---|---|---|---|---|---|
| | Mean wt. (g) | Total wt. (g) | Mean wt. (g) | Yield (g) | FCR | Mean wt. (g) | Yield (g) | FCR | FCR | Mortality (%) | $G_W^1$ | N retention (%) | Approx. PER |
| Experimental | 49.0 | 1422 | 72.3 | 511 | 1.42 | 93.0 | 329 | 2.04 | 1.66 | 28 | 1.66 | 29 | 1.72 |
| Control | 52.4 | 1414 | 69.7 | 501 | 1.45 | 90.1 | 452 | 1.53 | 1.48 | 19 | 1.84 | 33 | 1.93 |
| Experimental | 45.8 | 1416 | 66.3 | 418 | 1.74 | 94.6 | 297 | 2.39 | 2.00 | 31 | 1.46 | 27 | 1.43 |
| Control | 54.8 | 1425 | 74.5 | 513 | 1.42 | 89.9 | 339 | 2.01 | 1.65 | 12 | 1.67 | 32 | 1.74 |
| Control | 50.9 | 1426 | 71.8 | 465 | 1.56 | 96.9 | 350 | 1.96 | 1.72 | 14 | 1.61 | 30 | 1.66 |
| Experimental | 52.9 | 1428 | 71.3 | 480 | 1.52 | 101.6 | 384 | 1.76 | 1.61 | 19 | 1.69 | 34 | 1.77 |
| Means[2] | | | | | | | | | | | | | |
| Control | 52.7 | 1422 | 72.0[a] | 493[a] | 1.48[a] | 92.3[b] | 380[a] | 1.84[a] | 1.62[a] | 15 | 1.71[a] | 32[a] | 1.78[a] |
| Experimental | 50.2 | 1422 | 70.0[a] | 470[a] | 1.56[a] | 96.4[a] | 336[a] | 2.06[a] | 1.76[a] | 26 | 1.60[a] | 30[a] | 1.64[a] |

[1]Daily instantaneous growth rate $(G_W) = (\ln(W_1) - \ln(W_0)) \div T$; where, $W_1$ = weight at end of period, $W_0$ = weight at beginning of period, and T = time intervals in days.
[2]Values not having the same superscript are significantly different ($p < 0.05$).

TABLE A.13.6.

Trial 2.3 fish growth.

| Treatment | Initial | | Mid-Trial | | | End of Trial | | | Trial Summary | | | | |
|---|---|---|---|---|---|---|---|---|---|---|---|---|---|
| | Mean wt. (g) | Total wt. (g) | Mean wt. (g) | Yield (g) | FCR | Mean wt. (g) | Yield (g) | FCR | FCR | Mortality (%) | $G_W^1$ | N retention (%) | Approx. PER |
| Control | 59.4 | 1427 | 89.2 | 549 | 1.26 | 114.7 | 273 | 2.10 | 1.54 | 38 | 1.62 | 25 | 1.85 |
| Experimental | 62.2 | 1430 | 89.7 | 633 | 1.14 | 112.9 | 298. | 2.05 | 1.43 | 4 | 1.79 | 40 | 2.00 |
| Experimental | 58.6 | 1407 | 77.3 | 476 | 1.46 | 99.8 | 418 | 1.67 | 1.56 | 0 | 1.76 | 35 | 1.84 |
| Control | 55.2 | 1436 | 75.2 | 538 | 1.28 | 86.7 | 118 | 5.71 | 2.08 | 42 | 1.34 | 26 | 1.37 |
| Experimental | 55.1 | 1432 | 78.8 | 617 | 1.18 | 94.4 | 314 | 2.24 | 1.54 | 0 | 1.79 | 37 | 1.86 |
| Control | 49.2 | 1427 | 69.7 | 457 | 1.58 | 86.1 | 63 | 9.37 | 2.52 | 41 | 1.11 | 23 | 1.13 |
| Means[2] | | | | | | | | | | | | | |
| Control | 54.6 | 1430 | 78.0[a] | 515[a] | 1.38[a] | 95.8[a] | 151[a] | 5.73[a] | 2.05[a] | 40 | 1.36[a] | 25[a] | 1.45[a] |
| Experimental | 58.6 | 1423 | 81.9[a] | 575[a] | 1.26[a] | 102.4[a] | 343[a] | 1.98[a] | 1.51[a] | 1 | 1.78[b] | 37[b] | 1.90[a] |

[1]Daily instantaneous growth rate $(G_W) = (\ln(W_1) - \ln(W_0)) \div T$; where, $W_1$ = weight at end of period, $W_0$ = weight at beginning of period, and T = time interval in days.
[2]Values not having the same superscript are significantly different ($p < 0.05$).

TABLE A.13.7.

Trial 2.4 fish growth.

| Treatment | Initial | | Mid-Trial | | | End of Trial | | | Trial Summary | | | | |
|---|---|---|---|---|---|---|---|---|---|---|---|---|---|
| | Mean wt. (g) | Total wt. (g) | Mean wt. (g) | Yield (g) | FCR | Mean wt. (g) | Yield (g) | FCR | FCR | Mortality (%) | $G_W$ | N retention (%) | Approx. PER |
| Control | 29.8 | 1369 | 43.3 | 665 | 1.12 | 61.8 | 487 | 1.21 | 1.16 | 38 | 2.18 | 45 | 2.22 |
| Experimental | 28.5 | 1369 | 42.1 | 650 | 1.10 | 55.9 | 303 | 2.06 | 1.44 | 4 | 1.89 | 37 | 1.99 |
| Control | 30.9 | 1361 | 47.4 | 694 | 1.07 | 64.7 | 586 | 1.01 | 1.05 | 0 | 2.37 | 49 | 2.45 |
| Experimental | 27.7 | 1355 | 40.4 | 566 | 1.25 | 48.3 | 301 | 1.90 | 1.52 | 42 | 1.77 | 35 | 1.88 |
| Experimental | 29.4 | 1351 | 41.6 | 546 | 1.29 | 49.2 | 273 | 2.15 | 1.62 | 0 | 1.69 | 33 | 1.76 |
| Control | 27.1 | 1381 | 41.0 | 671 | 1.11 | 54.5 | 476 | 1.28 | 1.18 | 41 | 2.16 | 44 | 2.17 |
| Means | | | | | | | | | | | | | |
| Control | 29.3 | 1370 | 43.9[a] | 677[a] | 1.10[a] | 60.3[a] | 517[a] | 1.17[a] | 1.13[a] | 26 | 2.24[a] | 46[a] | 2.28[a] |
| Experimental | 28.5 | 1358 | 41.4[a] | 588[a] | 1.22[a] | 51.1[a] | 292[b] | 2.04[b] | 1.52[b] | 15 | 1.78[b] | 35[b] | 1.88[b] |

APPENDIX 14

Phase 2 Dissolved Nutrient Concentrations

TABLE A.14.1.

Trial 2.1 dissolved Ca concentrations (mg/l).

| System | Treatment | 24-May | 25-May | 27-May | 31-May | 3-Jun | 6-Jun | 10-Jun | 14-Jun | 17-Jun | 20-Jun | Δ [Ca] |
|---|---|---|---|---|---|---|---|---|---|---|---|---|
| 1 | Control | 146 | 135 | 130 | 128 | 117 | 122 | 116 | 113 | 102 | 102 | −44 |
| 2 | Experimental | 147 | 134 | 127 | 123 | 127 | 113 | 111 | 107 | 101 | 99 | −48 |
| 3 | Experimental | 141 | 130 | 124 | 125 | 120 | 115 | 113 | 108 | 102 | 101 | −40 |
| 4 | Control | 140 | 131 | 125 | 122 | 130 | 126 | 127 | 124 | 117 | 117 | −23 |
| 5 | Experimental | 140 | 129 | 120 | 123 | 115 | 108 | 106 | 100 | 96 | 93 | −47 |
| 6 | Control | 138 | 127 | 123 | 128 | 124 | 121 | 122 | 121 | 118 | 118 | −19 |
| Mean | Control | 141 | 131 | 126 | 126 | 124 | 123 | 122 | 119 | 112 | 112 | −29 |
|  | Experimental | 143 | 131 | 124 | 124 | 121 | 112 | 110 | 105 | 100 | 98 | −45 |

TABLE A.14.2.

Trial 2.2 dissolved Ca concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [Ca] |
|---|---|---|---|---|---|---|---|---|---|---|---|---|---|---|---|
| 1 | Experimental | 178 | 171 | 168 | 169 | 167 | 166 | 166 | 167 | 168 | 157 | 158 | 150 | 163 | −14 |
| 2 | Control | 178 | 177 | 175 | 177 | 180 | 181 | 180 | 188 | 193 | 171 | 186 | 189 | 194 | 16 |
| 3 | Experimental | 183 | 177 | 176 | 179 | 176 | 172 | 173 | 187 | 177 | 170 | 172 | 176 | 174 | −9 |
| 4 | Control | 184 | 174 | 167 | 172 | 173 |  | 171 | 187 | 177 | 174 | 174 | 181 | 179 | −5 |
| 5 | Control | 169 | 168 | 175 | 175 | 173 | 171 | 171 | 187 | 175 | 178 | 174 | 179 | 180 | 11 |
| 6 | Experimental | 176 | 170 | 167 | 161 | 150 | 140 | 135 | 138 | 128 | 126 | 123 | 131 | 129 |  |
| Mean[2] | Control | 177 | 173 | 172 | 175 | 176 | 176 | 174 | 187 | 182 | 174 | 178 | 183 | 184 | 7 |
|  | Experimental | 180 | 174 | 172 | 174 | 172 | 169 | 170 | 177 | 173 | 163 | 165 | 163 | 169 | −12 |

[2]System 6 excluded.

TABLE A.14.3.

Trial 2.3 dissolved Ca concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 185 | 181 | 178 | 181 | 180 | 177 | 173 | 172 |
| 2 | Experimental | 190 | 181 | 180 | 185 | 182 | 183 | 182 | 181 |
| 3 | Experimental | 189 | 184 | 182 | 187 | 182 | 174 | 174 | 171 |
| 4 | Control | 187 | 179 | 180 | 184 | 183 | 177 | 183 | 177 |
| 5 | Experimental | 191 | 181 | 180 | 182 | 183 | 175 | 174 | 170 |
| 6 | Control | 191 | 178 | 179 | 182 | 182 | 174 | 175 | 173 |
| Mean | Control | 188 | 179 | 179 | 182 | 182 | 176 | 177 | 174 |
|  | Experimental | 190 | 182 | 181 | 185 | 183 | 177 | 177 | 174 |

| System | Treatment | 7-Dec | 9-Dec | 12-Dec | 15-Dec | 17-Dec | End of Trial 19-Dec | 27-Dec | Δ [Ca] |
|---|---|---|---|---|---|---|---|---|---|
| 1 | Control | 171 | 174 | 168 | 168 | 165 | 158 | 150 | −27 |
| 2 | Experimental | 183 | 185 | 179 | 183 | 165 | 169 | 160 | −21 |
| 3 | Experimental | 171 | 175 | 167 | 166 | 163 | 163 | 159 | −26 |
| 4 | Control | 178 | 178 | 169 | 168 | 163 | 159 | 141 | −27 |
| 5 | Experimental | 171 | 171 | 165 | 160 | 153 | 151 | 139 | −40 |
| 6 | Control | 174 | 174 | 169 | 167 | 164 | 161 | 153 | −30 |
| Mean | Control | 174 | 175 | 169 | 168 | 164 | 160 | 148 | −28 |
|  | Experimental | 175 | 177 | 170 | 170 | 160 | 161 | 153 | −29 |

TABLE A.14.4.

Trial 2.4 dissolved Ca concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 183 | 185 | 186 | 185 | 205 | 193 | 207 | 196 |
| 2 | Experimental | 170 | 169 | 170 | 176 | 179 | 188 | 197 | 191 |
| 3 | Control | 173 | 174 | 174 | 174 | 182 | 193 | 196 | 189 |
| 4 | Experimental | 167 | 172 | 171 | 169 | 176 | 184 | 188 | 187 |
| 5 | Experimental | 172 | 173 | 170 | 171 | 178 | 191 | 192 | 187 |
| 6 | Control | 171 | 171 | 171 | 171 | 178 | 198 | 202 | 201 |
| Mean | Control | 176 | 177 | 177 | 177 | 188 | 194 | 202 | 196 |
|  | Experimental | 170 | 171 | 170 | 172 | 178 | 188 | 193 | 188 |

| System | Treatment | 10-Feb | 13-Feb | 15-Feb | 17-Feb | End of Trial 20-Feb | 24-Feb | Δ [Ca] |
|---|---|---|---|---|---|---|---|---|
| 1 | Control | 198 | 189 | 193 | 193 | 194 |  | 11.6 |
| 2 | Experimental | 195 | 179 | 184 | 186 | 179 | 174 | 8.9 |
| 3 | Control | 191 | 181 | 183 | 189 | 186 | 183 | 13.5 |
| 4 | Experimental | 187 | 177 | 180 | 185 | 177 | 176 | 10.2 |
| 5 | Experimental | 183 | 178 | 170 | 174 | 173 | 176 | 0.1 |
| 6 | Control | 196 | 189 | 191 | 192 | 195 | 197 | 24.1 |
| Mean | Control | 195 | 186 | 189 | 191 | 192 | 190 | 16 |
|  | Experimental | 188 | 178 | 178 | 182 | 176 | 175 | 6 |

TABLE A.14.5.

Trial 2.1 dissolved Cu concentrations (mg/l).

| System | Treatment | 24-May | 25-May | 27-May | 31-May | 3-Jun | 6-Jun | 10-Jun | 14-Jun | 17-Jun | 20-Jun | Δ [Cu] |
|---|---|---|---|---|---|---|---|---|---|---|---|---|
| 1 | Control | 0.015 | 0.011 | 0.017 | 0.016 | 0.020 | 0.017 | 0.013 | 0.013 | 0.014 | 0.013 | −0.003 |
| 2 | Experimental | 0.017 | 0.013 | 0.018 | 0.020 | 0.013 | 0.020 | 0.023 | 0.022 | 0.019 | 0.021 | 0.004 |
| 3 | Experimental | 0.010 | 0.009 | 0.051 | 0.015 | 0.011 | 0.017 | 0.017 | 0.017 | 0.016 | 0.013 | 0.003 |
| 4 | Control | 0.014 | 0.019 | 0.024 | 0.026 | 0.025 | 0.031 | 0.029 | 0.025 | 0.021 | 0.023 | 0.009 |
| 5 | Experimental | 0.010 | 0.013 | 0.024 | 0.018 | 0.014 | 0.018 | 0.016 | 0.013 | 0.014 | 0.013 | 0.003 |
| 6 | Control | 0.012 | 0.017 | 0.029 | 0.020 | 0.016 | 0.021 | 0.018 | 0.023 | 0.016 | 0.021 | 0.009 |
| Mean | Control | 0.014 | 0.015 | 0.023 | 0.020 | 0.020 | 0.023 | 0.020 | 0.020 | 0.017 | 0.019 | 0.005 |
|  | Experimental | 0.012 | 0.012 | 0.031 | 0.018 | 0.012 | 0.018 | 0.019 | 0.017 | 0.016 | 0.016 | 0.003 |

TABLE A.14.6.

Trial 2.2 dissolved Cu concentrations (mg/l).

| System | Treatment | 15-Aug | 18-Aug | 20-Aug | 22-Aug | 25-Aug | 27-Aug | 29-Aug |
|---|---|---|---|---|---|---|---|---|
| 1 | Experimental | 0.020 | 0.022 | 0.017 | 0.023 | 0.048 | 0.114 | 0.024 |
| 2 | Control | 0.017 | 0.016 | 0.017 | 0.019 | 0.026 | 0.026 | 0.027 |
| 3 | Experimental | 0.035 | 0.015 | 0.026 | 0.023 | 0.031 | 0.043 | 0.031 |
| 4 | Control | 0.024 | 0.016 | 0.021 | 0.020 | 0.027 |  | 0.028 |
| 5 | Control | 0.033 | 0.019 | 0.021 | 0.027 | 0.031 | 0.043 | 0.027 |
| 6 | Experimental | 0.017 | 0.012 | 0.016 | 0.016 | 0.022 | 0.025 | 0.013 |
| Mean[1] | Control | 0.025 | 0.017 | 0.020 | 0.022 | 0.028 | 0.035 | 0.027 |
|  | Experimental | 0.027 | 0.018 | 0.021 | 0.023 | 0.040 | 0.078 | 0.028 |

| System | Treatment | 31-Aug | 2-Sep | 5-Sep | 8-Sep | 10-Sep | 12-Sep | Δ [Cu] |
|---|---|---|---|---|---|---|---|---|
| 1 | Experimental | 0.096 | 0.024 | 0.027 | 0.033 | 0.024 | 0.026 | 0.007 |
| 2 | Control | 0.027 | 0.022 | 0.027 | 0.024 | 0.027 | 0.029 | 0.012 |
| 3 | Experimental | 0.040 | 0.025 | 0.039 | 0.035 | 0.038 | 0.037 | 0.002 |
| 4 | Control | 0.036 | 0.027 | 0.030 | 0.034 | 0.033 | 0.024 | −0.001 |
| 5 | Control | 0.042 | 0.030 | 0.030 | 0.035 | 0.026 | 0.026 | −0.007 |
| 6 | Experimental | 0.021 | 0.020 | 0.019 | 0.024 | 0.022 | 0.022 |  |
| Mean[1] | Control | 0.035 | 0.027 | 0.029 | 0.031 | 0.028 | 0.026 | 0.002 |
|  | Experimental | 0.068 | 0.025 | 0.033 | 0.034 | 0.031 | 0.032 | 0.004 |

[1]System 6 excluded.

TABLE A.14.7.

Trial 2.3 dissolved Cu concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 0.011 | 0.014 | 0.018 | 0.024 | 0.020 | 0.014 | 0.016 | 0.015 |
| 2 | Experimental | 0.012 | 0.013 | 0.014 | 0.018 | 0.019 | 0.019 | 0.024 | 0.018 |
| 3 | Experimental | 0.017 | 0.018 | 0.026 | 0.030 | 0.024 | 0.026 | 0.022 | 0.018 |
| 4 | Control | 0.013 | 0.012 | 0.019 | 0.022 | 0.022 | 0.026 | 0.025 | 0.020 |
| 5 | Experimental | 0.016 | 0.017 | 0.026 | 0.032 | 0.034 | 0.035 | 0.030 | 0.024 |
| 6 | Control | 0.012 | 0.016 | 0.021 | 0.025 | 0.025 | 0.027 | 0.027 | 0.019 |
| Mean | Control | 0.012 | 0.014 | 0.019 | 0.024 | 0.022 | 0.022 | 0.023 | 0.018 |
|  | Experimental | 0.015 | 0.016 | 0.022 | 0.027 | 0.026 | 0.027 | 0.025 | 0.020 |

| System | Treatment | 7-Dec | 9-Dec | 12-Dec | 15-Dec | 17-Dec | End of Trial 19-Dec | 27-Dec | Δ [Cu] |
|---|---|---|---|---|---|---|---|---|---|
| 1 | Control | 0.016 | 0.018 | 0.016 | 0.012 | 0.011 | 0.011 | 0.012 | 0.000 |
| 2 | Experimental | 0.021 | 0.019 | 0.018 | 0.018 | 0.013 | 0.013 | 0.012 | 0.000 |
| 3 | Experimental | 0.020 | 0.019 | 0.019 | 0.020 | 0.018 | 0.015 | 0.018 | −0.002 |
| 4 | Control | 0.026 | 0.024 | 0.015 | 0.014 | 0.009 | 0.010 | 0.011 | −0.003 |
| 5 | Experimental | 0.024 | 0.022 | 0.021 | 0.017 | 0.020 | 0.022 | 0.015 | 0.006 |
| 6 | Control | 0.026 | 0.025 | 0.020 | 0.019 | 0.014 | 0.014 | 0.015 | 0.002 |
| Mean | Control | 0.023 | 0.022 | 0.017 | 0.015 | 0.012 | 0.011 | 0.013 | 0.000 |
|  | Experimental | 0.022 | 0.020 | 0.019 | 0.018 | 0.017 | 0.017 | 0.015 | 0.001 |

TABLE A.14.8.

Trial 2.4 dissolved Cu concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 0.010 | 0.015 | 0.017 | 0.024 | 0.018 | 0.024 | 0.024 | 0.018 |
| 2 | Experimental | 0.013 | 0.017 | 0.016 | 0.020 | 0.021 | 0.018 | 0.023 | 0.016 |
| 3 | Control | 0.017 | 0.036 | 0.021 | 0.020 | 0.024 | 0.025 | 0.023 | 0.022 |
| 4 | Experimental | 0.012 | 0.017 | 0.022 | 0.016 | 0.025 | 0.027 | 0.024 | 0.024 |
| 5 | Experimental | 0.018 | 0.017 | 0.022 | 0.022 | 0.024 | 0.026 | 0.021 | 0.024 |
| 6 | Control | 0.011 | 0.018 | 0.023 | 0.022 | 0.024 | 0.028 | 0.024 | 0.031 |
| Mean | Control | 0.013 | 0.023 | 0.020 | 0.022 | 0.022 | 0.025 | 0.024 | 0.024 |
|  | Experimental | 0.014 | 0.017 | 0.020 | 0.019 | 0.024 | 0.024 | 0.023 | 0.021 |

| System | Treatment | 10-Feb | 13-Feb | 15-Feb | 17-Feb | End of Trial 20-Feb | 24-Feb | Δ [Cu] |
|---|---|---|---|---|---|---|---|---|
| 1 | Control | 0.020 | 0.020 | 0.027 | 0.025 | 0.020 |  | 0.010 |
| 2 | Experimental | 0.023 | 0.019 | 0.020 | 0.020 | 0.017 | 0.016 | 0.005 |
| 3 | Control | 0.021 | 0.027 | 0.022 | 0.022 | 0.023 | 0.030 | 0.006 |
| 4 | Experimental | 0.027 | 0.022 | 0.022 | 0.029 | 0.020 | 0.030 | 0.008 |
| 5 | Experimental | 0.026 | 0.026 | 0.023 | 0.020 | 0.024 | 0.025 | 0.006 |
| 6 | Control | 0.022 | 0.027 | 0.026 | 0.024 | 0.025 | 0.027 | 0.024 |
| Mean | Control | 0.021 | 0.025 | 0.025 | 0.024 | 0.022 | 0.029 | 0.010 |
|  | Experimental | 0.025 | 0.022 | 0.022 | 0.023 | 0.020 | 0.024 | 0.006 |

TABLE A.14.9.

Trial 2.1 dissolved Fe concentrations (mg/l).

| System | Treatment | 24-May | 25-May | 27-May | 31-May | 3-Jun | 6-Jun | 10-Jun | 14-Jun | 17-Jun | 20-Jun | Δ [Fe] |
|---|---|---|---|---|---|---|---|---|---|---|---|---|
| 1 | Control | 2.21 | 1.85 | 1.84 | 1.74 | 1.48 | 1.57 | 1.09 | 1.23 | 0.81 | 0.69 | −1.52 |
| 2 | Experimental | 2.21 | 1.69 | 1.76 | 1.63 | 1.67 | 1.35 | 0.97 | 1.05 | 0.68 | 0.59 | −1.62 |
| 3 | Experimental | 2.13 | 1.75 | 1.71 | 1.69 | 1.52 | 1.39 | 0.98 | 1.08 | 0.77 | 0.67 | −1.46 |
| 4 | Control | 2.12 | 1.79 | 1.79 | 1.62 | 1.71 | 1.59 | 1.23 | 1.38 | 1.03 | 0.81 | −1.31 |
| 5 | Experimental | 2.06 | 1.68 | 1.65 | 1.64 | 1.40 | 1.25 | 0.90 | 0.94 | 0.76 | 0.58 | −1.48 |
| 6 | Control | 2.03 | 1.58 | 1.68 | 1.73 | 1.49 | 1.37 | 0.94 | 1.17 | 0.85 | 0.78 | −1.25 |
| Mean | Control | 2.12 | 1.74 | 1.77 | 1.69 | 1.56 | 1.51 | 1.09 | 1.26 | 0.90 | 0.76 | −1.36 |
|  | Experimental | 2.13 | 1.70 | 1.71 | 1.65 | 1.53 | 1.33 | 0.95 | 1.02 | 0.74 | 0.61 | −1.52 |

TABLE A.14.10.

Trial 2.2 dissolved Fe concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [Fe] |
|---|---|---|---|---|---|---|---|---|---|---|---|---|---|---|---|
| 1 | Experimental | 1.21 | 1.95 | 1.92 | 1.88 | 1.74 | 1.59 | 1.58 | 1.59 | 1.64 | 1.21 | 1.37 | 1.28 | 1.21 | 0.00 |
| 2 | Control | 1.62 | 1.97 | 1.98 | 1.95 | 1.87 | 1.81 | 1.70 | 1.82 | 1.82 | 1.23 | 1.63 | 1.57 | 1.38 | −0.25 |
| 3 | Experimental | 1.40 | 1.98 | 1.98 | 1.97 | 1.82 | 1.78 | 1.70 | 1.87 | 1.74 | 1.41 | 1.58 | 1.51 | 1.38 | −0.02 |
| 4 | Control | 1.33 | 1.97 | 1.92 | 1.89 | 1.80 |  | 1.66 | 1.88 | 1.73 | 1.01 | 1.58 | 1.52 | 1.23 | −0.10 |
| 5 | Control | 1.63 | 1.96 | 2.02 | 1.95 | 1.69 | 1.65 | 1.55 | 1.73 | 1.55 | 1.24 | 1.42 | 1.41 | 1.14 | −0.49 |
| 6 | Experimental | 1.58 | 1.88 | 1.82 | 1.65 | 1.49 | 1.32 | 1.17 | 1.27 | 1.10 | 0.72 | 1.04 | 1.05 | 0.93 |  |
| Mean[1] | Control | 1.53 | 1.97 | 1.97 | 1.93 | 1.79 | 1.73 | 1.64 | 1.81 | 1.70 | 1.16 | 1.55 | 1.50 | 1.25 | −0.28 |
|  | Experimental | 1.30 | 1.96 | 1.95 | 1.92 | 1.78 | 1.68 | 1.64 | 1.73 | 1.69 | 1.31 | 1.48 | 1.40 | 1.30 | −0.01 |

[1]System 6 excluded.

TABLE A.14.11.

Trial 2.3 dissolved Fe concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 2.19 | 2.17 | 2.12 | 2.09 | 2.02 | 1.84 | 1.85 | 1.71 |
| 2 | Experimental | 2.12 | 2.19 | 2.17 | 2.17 | 2.08 | 2.06 | 1.99 | 1.87 |
| 3 | Experimental | 2.25 | 2.19 | 2.19 | 2.21 | 2.07 | 1.88 | 1.90 | 1.75 |
| 4 | Control | 2.18 | 2.13 | 2.12 | 2.10 | 2.05 | 1.98 | 1.96 | 1.80 |
| 5 | Experimental | 2.22 | 2.13 | 2.06 | 1.98 | 1.93 | 1.81 | 1.70 | 1.46 |
| 6 | Control | 2.26 | 2.20 | 2.14 | 2.09 | 2.04 | 1.83 | 1.84 | 1.67 |
| Mean | Control | 2.21 | 2.16 | 2.13 | 2.09 | 2.04 | 1.88 | 1.88 | 1.73 |
|  | Experimental | 2.20 | 2.17 | 2.14 | 2.12 | 2.03 | 1.92 | 1.87 | 1.69 |

| System | Treatment | 7-Dec | 9-Dec | 12-Dec | 15-Dec | 17-Dec | End of Trial 19-Dec | 27-Dec | Δ [Fe] |
|---|---|---|---|---|---|---|---|---|---|
| 1 | Control | 1.69 | 1.69 | 1.51 | 1.40 | 1.28 | 1.15 | 0.80 | −1.04 |
| 2 | Experimental | 1.86 | 1.85 | 1.51 | 1.69 | 1.37 | 1.34 | 0.85 | −0.78 |
| 3 | Experimental | 1.72 | 1.73 | 1.57 | 1.55 | 1.44 | 1.38 | 1.17 | −0.87 |
| 4 | Control | 1.78 | 1.76 | 1.45 | 1.39 | 1.17 | 1.04 | 0.55 | −1.14 |
| 5 | Experimental | 1.37 | 1.30 | 1.07 | 0.94 | 0.78 | 0.69 | 0.34 | −1.54 |
| 6 | Control | 1.64 | 1.61 | 1.43 | 1.33 | 1.22 | 1.11 | 0.75 | −1.15 |
| Mean | Control | 1.70 | 1.69 | 1.46 | 1.37 | 1.22 | 1.10 | 0.70 | −1.11 |
|  | Experimental | 1.65 | 1.63 | 1.38 | 1.39 | 1.20 | 1.14 | 0.79 | −1.06 |

TABLE A.14.12.

Trial 2.4 dissolved Fe concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 2.23 | 2.17 | 2.04 | 1.81 | 1.91 | 1.71 | 1.75 | 1.61 |
| 2 | Experimental | 2.25 | 2.15 | 2.01 | 1.97 | 1.99 | 1.74 | 1.76 | 1.66 |
| 3 | Control | 2.17 | 2.22 | 2.20 | 1.99 | 1.97 | 1.82 | 1.80 | 1.71 |
| 4 | Experimental | 2.11 | 2.11 | 2.07 | 1.86 | 1.90 | 1.78 | 1.76 | 1.69 |
| 5 | Experimental | 2.13 | 2.13 | 2.04 | 2.04 | 2.00 | 1.92 | 1.86 | 1.76 |
| 6 | Control | 2.17 | 2.14 | 2.09 | 2.00 | 1.87 | 1.81 | 1.75 | 1.69 |
| Mean | Control | 2.19 | 2.17 | 2.11 | 1.93 | 1.91 | 1.78 | 1.77 | 1.67 |
|  | Experimental | 2.16 | 2.13 | 2.04 | 1.95 | 1.96 | 1.81 | 1.79 | 1.70 |

| System | Treatment | 10-Feb | 13-Feb | 15-Feb | 17-Feb | End of Trial 20-Feb | 24-Feb | Δ [Fe] |
|---|---|---|---|---|---|---|---|---|
| 1 | Control | 1.59 | 1.59 | 1.53 | 1.48 | 1.45 |  | −0.78 |
| 2 | Experimental | 1.69 | 1.61 | 1.58 | 1.57 | 1.47 | 1.29 | −0.77 |
| 3 | Control | 1.71 | 1.65 | 1.58 | 1.60 | 1.54 | 1.52 | −0.63 |
| 4 | Experimental | 1.67 | 1.63 | 1.58 | 1.59 | 1.50 | 1.49 | −0.61 |
| 5 | Experimental | 1.71 | 1.70 | 1.56 | 1.54 | 1.50 | 1.51 | −0.63 |
| 6 | Control | 1.61 | 1.60 | 1.53 | 1.52 | 1.49 | 1.46 | −0.67 |
| Mean | Control | 1.64 | 1.62 | 1.55 | 1.53 | 1.49 | 1.49 | −0.65 |
|  | Experimental | 1.69 | 1.65 | 1.57 | 1.57 | 1.49 | 1.43 | −0.67 |

TABLE A.14.13.

Trial 2.1 dissolved K concentrations (mg/l).

| System | Treatment | 24-May | 25-May | 27-May | 31-May | 3-Jun | 6-Jun | 10-Jun | 14-Jun | 17-Jun | 20-Jun | Δ [Ca] |
|---|---|---|---|---|---|---|---|---|---|---|---|---|
| 1 | Control | 191 | 176 | 169 | 164 | 174 | 158 | 152 | 150 | 148 | 145 | −46 |
| 2 | Experimental | 193 | 172 | 168 | 175 | 164 | 174 | 177 | 180 | 180 | 184 | −8 |
| 3 | Experimental | 184 | 169 | 168 | 161 | 173 | 171 | 175 | 180 | 176 | 178 | −6 |
| 4 | Control | 183 | 169 | 164 | 173 | 162 | 154 | 154 | 149 | 144 | 139 | −45 |
| 5 | Experimental | 182 | 167 | 163 | 172 | 173 | 170 | 174 | 174 | 178 | 175 | −7 |
| 6 | Control | 180 | 165 | 160 | 163 | 153 | 147 | 146 | 140 | 138 | 134 | −46 |
| Mean | Control | 185 | 170 | 164 | 167 | 163 | 153 | 151 | 146 | 143 | 139 | −45 |
|  | Experimental | 186 | 169 | 166 | 169 | 170 | 172 | 175 | 178 | 178 | 179 | −7 |

TABLE A.14.14.

Trial 2.2 dissolved K concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [K] |
|---|---|---|---|---|---|---|---|---|---|---|---|---|---|---|---|
| 1 | Experimental | 183 | 179 | 176 | 178 | 182 | 186 | 185 | 187 | 193 | 184 | 185 | 175 | 185 | 3 |
| 2 | Control | 188 | 181 | 177 | 181 | 179 | 176 | 176 | 180 | 182 | 163 | 169 | 167 | 166 | −22 |
| 3 | Experimental | 190 | 185 | 183 | 184 | 188 | 188 | 185 | 199 | 194 | 187 | 187 | 192 | 190 | 0 |
| 4 | Control | 188 | 178 | 170 | 177 | 176 |  | 170 | 181 | 168 | 164 | 163 | 165 | 162 | −26 |
| 5 | Control | 190 | 184 | 181 | 177 | 174 | 171 | 168 | 178 | 165 | 163 | 160 | 160 | 156 | −34 |
| 6 | Experimental | 182 | 176 | 177 | 176 | 167 | 161 | 156 | 161 | 152 | 151 | 152 | 155 | 155 |  |
| Mean[1] | Control | 189 | 181 | 176 | 179 | 176 | 173 | 171 | 179 | 171 | 163 | 164 | 164 | 161 | −27 |
|  | Experimental | 186 | 182 | 179 | 181 | 185 | 187 | 185 | 193 | 194 | 186 | 186 | 183 | 188 | 1 |

[1]System 6 excluded.

TABLE A.14.15.

Trial 2.3 dissolved K concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 192 | 185 | 185 | 188 | 186 | 185 | 185 | 192 |
| 2 | Experimental | 197 | 185 | 190 | 196 | 193 | 194 | 196 | 194 |
| 3 | Experimental | 192 | 187 | 191 | 199 | 195 | 196 | 196 | 194 |
| 4 | Control | 189 | 183 | 186 | 186 | 185 | 183 | 182 | 175 |
| 5 | Experimental | 193 | 185 | 189 | 190 | 192 | 192 | 192 | 192 |
| 6 | Control | 197 | 186 | 187 | 186 | 185 | 184 | 184 | 179 |
| Mean | Control | 192 | 185 | 186 | 187 | 186 | 184 | 184 | 179 |
|  | Experimental | 194 | 186 | 190 | 195 | 194 | 194 | 194 | 193 |

| System | Treatment | 7-Dec | 9-Dec | 12-Dec | 15-Dec | 17-Dec | End of Trial 19-Dec | 27-Dec | Δ [K] |
|---|---|---|---|---|---|---|---|---|---|
| 1 | Control | 181 | 179 | 172 | 176 | 172 | 168 | 162 | −24 |
| 2 | Experimental | 197 | 196 | 192 | 198 | 194 | 194 | 192 | −3 |
| 3 | Experimental | 195 | 198 | 192 | 194 | 199 | 199 | 193 | 6 |
| 4 | Control | 171 | 172 | 166 | 169 | 168 | 164 | 149 | −25 |
| 5 | Experimental | 191 | 194 | 189 | 189 | 191 | 189 | 183 | −4 |
| 6 | Control | 178 | 177 | 173 | 171 | 173 | 167 | 161 | −30 |
| Mean | Control | 177 | 176 | 170 | 172 | 171 | 166 | 157 | −26 |
|  | Experimental | 194 | 196 | 191 | 194 | 194 | 194 | 189 | 0 |

TABLE A.14.16.

Trial 2.4 dissolved K concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 186 | 181 | 184 | 186 | 195 | 178 | 183 | 170 |
| 2 | Experimental | 188 | 182 | 190 | 201 | 209 | 190 | 196 | 188 |
| 3 | Control | 189 | 186 | 193 | 191 | 192 | 183 | 186 | 174 |
| 4 | Experimental | 180 | 179 | 185 | 187 | 194 | 187 | 189 | 185 |
| 5 | Experimental | 185 | 182 | 187 | 190 | 194 | 190 | 189 | 183 |
| 6 | Control | 184 | 181 | 186 | 190 | 183 | 177 | 176 | 171 |
| Mean | Control | 186 | 183 | 187 | 189 | 190 | 180 | 181 | 172 |
|  | Experimental | 184 | 111 | 188 | 192 | 199 | 189 | 191 | 185 |

| System | Treatment | 10-Feb | 13-Feb | 15-Feb | 17-Feb | End of Trial 20-Feb | 24-Feb | Δ [K] |
|---|---|---|---|---|---|---|---|---|
| 1 | Control | 172 | 173 | 170 | 167 | 168 |  | −17.8 |
| 2 | Experimental | 192 | 202 | 200 | 200 | 201 | 195 | 12.7 |
| 3 | Control | 176 | 179 | 175 | 173 | 170 | 160 | −19.4 |
| 4 | Experimental | 185 | 192 | 192 | 194 | 191 | 182 | 10.6 |
| 5 | Experimental | 180 | 189 | 184 | 187 | 186 | 181 | 0.4 |
| 6 | Control | 167 | 168 | 166 | 163 | 163 | 155 | −21.0 |
| Mean | Control | 172 | 172 | 170 | 168 | 167 | 157 | −19 |
|  | Experimental | 186 | 194 | 192 | 194 | 192 | 186 | 8 |

TABLE A.14.17.

Trial 2.1 dissolved Mg concentrations (mg/l).

| System | Treatment | 24-May | 25-May | 27-May | 31-May | 3-Jun | 6-Jun | 10-Jun | 14-Jun | 17-Jun | 20-Jun | Δ [Mg] |
|---|---|---|---|---|---|---|---|---|---|---|---|---|
| 1 | Control | 33.8 | 31.2 | 30.1 | 30.0 | 30.9 | 30.2 | 29.7 | 30.1 | 29.9 | 30.2 | −3.7 |
| 2 | Experimental | 33.8 | 30.4 | 29.5 | 30.7 | 30.3 | 31.3 | 32.1 | 33.2 | 33.3 | 34.3 | 0.5 |
| 3 | Experimental | 32.5 | 29.9 | 29.3 | 28.7 | 30.7 | 31.0 | 32.1 | 33.4 | 33.1 | 34.2 | 1.7 |
| 4 | Control | 32.3 | 30.2 | 29.2 | 30.5 | 30.1 | 29.6 | 30.3 | 30.4 | 30.1 | 30.1 | −2.3 |
| 5 | Experimental | 32.3 | 29.9 | 28.9 | 30.5 | 31.1 | 31.0 | 32.1 | 32.6 | 33.5 | 33.4 | 1.2 |
| 6 | Control | 31.7 | 29.0 | 28.5 | 29.7 | 28.9 | 28.5 | 28.9 | 29.1 | 29.4 | 29.3 | −2.3 |
| Mean | Control | 32.6 | 30.2 | 29.3 | 30.1 | 30.0 | 29.5 | 29.6 | 29.8 | 29.8 | 29.9 | −2.8 |
|  | Experimental | 32.9 | 30.0 | 29.2 | 30.0 | 30.7 | 31.1 | 32.1 | 33.0 | 33.3 | 34.0 | 1.1 |

TABLE A.14.18.

Trial 2.2 dissolved Mg concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [Mg] |
|---|---|---|---|---|---|---|---|---|---|---|---|---|---|---|---|
| 1 | Experimental | 31.2 | 30.3 | 29.8 | 30.3 | 30.5 | 30.7 | 30.6 | 30.8 | 32.1 | 30.6 | 30.8 | 29.0 | 31.1 | −0.2 |
| 2 | Control | 32.6 | 31.1 | 30.4 | 31.5 | 31.4 | 31.1 | 31.0 | 32.9 | 33.4 | 29.2 | 32.0 | 31.6 | 32.2 | −0.4 |
| 3 | Experimental | 32.2 | 31.3 | 31.0 | 31.4 | 31.7 | 31.4 | 31.2 | 33.6 | 32.6 | 31.8 | 31.8 | 32.0 | 31.9 | −0.3 |
| 4 | Control | 31.8 | 30.3 | 29.5 | 30.9 | 31.0 |  | 30.6 | 33.1 | 31.1 | 31.2 | 31.1 | 31.7 | 31.6 | −0.2 |
| 5 | Control | 32.1 | 31.3 | 31.4 | 31.4 | 31.1 | 30.9 | 30.6 | 33.1 | 30.9 | 31.9 | 31.2 | 31.5 | 31.5 | −0.6 |
| 6 | Experimental | 30.5 | 29.6 | 29.6 | 29.3 | 27.8 | 26.6 | 26.1 | 26.9 | 25.4 | 25.5 | 25.1 | 26.1 | 26.1 |  |
| Mean[1] | Control | 32.2 | 30.9 | 30.4 | 31.3 | 31.2 | 31.0 | 30.7 | 33.0 | 31.8 | 30.7 | 31.4 | 31.6 | 31.7 | −0.4 |
|  | Experimental | 31.7 | 30.8 | 30.4 | 30.8 | 31.1 | 31.1 | 30.9 | 32.2 | 32.3 | 31.2 | 31.3 | 30.5 | 31.5 | −0.2 |

[1]System 6 excluded.

TABLE A.14.19.

Trial 2.3 dissolved Mg concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 32.7 | 31.0 | 30.9 | 31.4 | 31.3 | 31.5 | 31.5 | 31.7 |
| 2 | Experimental | 33.0 | 30.7 | 31.2 | 32.0 | 31.3 | 31.5 | 31.8 | 31.7 |
| 3 | Experimental | 32.1 | 30.8 | 31.4 | 32.3 | 31.6 | 32.1 | 31.7 | 31.7 |
| 4 | Control | 31.5 | 30.1 | 30.7 | 31.2 | 31.2 | 31.2 | 31.3 | 30.7 |
| 5 | Experimental | 32.1 | 30.4 | 30.9 | 31.1 | 31.5 | 31.4 | 31.2 | 31.6 |
| 6 | Control | 32.2 | 30.5 | 30.8 | 31.1 | 31.2 | 31.1 | 31.1 | 31.3 |
| Mean | Control | 32.1 | 30.6 | 30.8 | 31.3 | 31.2 | 31.3 | 31.3 | 31.2 |
|  | Experimental | 32.4 | 30.6 | 31.2 | 31.8 | 31.5 | 31.7 | 31.6 | 31.7 |

| System | Treatment | 7-Dec | 9-Dec | 12-Dec | 15-Dec | 17-Dec | End of Trial 19-Dec | 27-Dec | Δ [Mg] |
|---|---|---|---|---|---|---|---|---|---|
| 1 | Control | 31.7 | 31.9 | 31.2 | 31.9 | 31.7 | 31.2 | 30.6 | −1.5 |
| 2 | Experimental | 32.1 | 32.3 | 31.6 | 32.6 | 30.2 | 31.7 | 31.6 | −1.3 |
| 3 | Experimental | 31.9 | 32.5 | 31.8 | 32.0 | 32.6 | 32.7 | 32.4 | 0.6 |
| 4 | Control | 30.8 | 30.8 | 30.2 | 30.8 | 30.8 | 30.5 | 28.5 | −0.9 |
| 5 | Experimental | 31.9 | 32.2 | 31.7 | 31.5 | 31.3 | 31.3 | 30.5 | −0.8 |
| 6 | Control | 31.5 | 31.5 | 31.4 | 31.5 | 31.9 | 31.4 | 31.0 | −0.8 |
| Mean | Control | 31.3 | 31.4 | 30.9 | 31.4 | 31.5 | 31.1 | 30.0 | −1.1 |
|  | Experimental | 32.0 | 32.4 | 31.7 | 32.0 | 31.4 | 31.9 | 31.5 | −0.5 |

TABLE A.14.20.

Trial 2.4 dissolved Mg concentrations (mg/l).

| System | Treatment    | 23-Jan | 25-Jan | 27-Jan | 30-Jan | 1-Feb | 3-Feb | 6-Feb | 8-Feb |
|--------|--------------|--------|--------|--------|--------|-------|-------|-------|-------|
| 1      | Control      | 32.3   | 30.8   | 31.3   | 31.9   | 33.8  | 31.3  | 33.1  | 31.3  |
| 2      | Experimental | 32.4   | 30.7   | 31.3   | 32.9   | 34.2  | 31.1  | 32.3  | 31.3  |
| 3      | Control      | 31.9   | 31.1   | 32.5   | 32.4   | 33.0  | 31.9  | 32.7  | 31.3  |
| 4      | Experimental | 30.5   | 29.7   | 30.4   | 30.6   | 31.7  | 30.3  | 30.9  | 30.6  |
| 5      | Experimental | 31.3   | 30.3   | 30.5   | 31.5   | 32.0  | 31.3  | 31.3  | 30.8  |
| 6      | Control      | 31.1   | 30.3   | 31.2   | 32.6   | 31.7  | 31.3  | 31.8  | 31.6  |
| Mean   | Control      | 31.8   | 30.8   | 31.7   | 32.3   | 32.9  | 31.5  | 32.5  | 31.4  |
|        | Experimental | 31.4   | 30.2   | 30.7   | 31.7   | 32.6  | 30.9  | 31.5  | 30.9  |

| System | Treatment    | 10-Feb | 13-Feb | 15-Feb | 17-Feb | End of Trial 20-Feb | 24-Feb | Δ [Mg] |
|--------|--------------|--------|--------|--------|--------|---------------------|--------|--------|
| 1      | Control      | 31.9   | 32.4   | 32.4   | 31.4   | 31.8                |        | −0.52  |
| 2      | Experimental | 32.0   | 32.6   | 31.6   | 32.3   | 32.2                | 31.9   | −0.14  |
| 3      | Control      | 32.0   | 32.5   | 31.7   | 32.2   | 32.2                | 31.1   | 0.30   |
| 4      | Experimental | 30.7   | 31.1   | 30.6   | 31.4   | 30.8                | 30.1   | 0.38   |
| 5      | Experimental | 30.2   | 31.3   | 29.9   | 30.7   | 30.9                | 31.0   | −0.39  |
| 6      | Control      | 31.1   | 31.7   | 31.0   | 31.0   | 32.1                | 31.3   | 0.95   |
| Mean   | Control      | 31.6   | 32.2   | 31.7   | 31.5   | 32.0                | 31.2   | 0.2    |
|        | Experimental | 31.0   | 31.7   | 30.7   | 31.5   | 31.3                | 31.0   | 0.0    |

TABLE A.14.21.

Trial 2.1 dissolved Mn concentrations (mg/l).

| System | Treatment    | 24-May | 25-May | 27-May | 31-May | 3-Jun | 6-Jun | 10-Jun | 14-Jun | 17-Jun | 20-Jun | Δ [Mn] |
|--------|--------------|--------|--------|--------|--------|-------|-------|--------|--------|--------|--------|--------|
| 1      | Control      | 0.018  | 0.002  | 0.011  | 0.029  | 0.027 | 0.010 | 0.003  | 0.006  | 0.004  | 0.001  | −0.017 |
| 2      | Experimental | 0.033  | 0.001  | 0.010  | 0.028  | 0.018 | 0.043 | 0.057  | 0.060  | 0.043  | 0.048  | 0.015  |
| 3      | Experimental | −0.002 | −0.001 | 0.007  | 0.004  | 0.018 | 0.022 | 0.023  | 0.019  | 0.010  | 0.009  | 0.011  |
| 4      | Control      | 0.006  | 0.001  | 0.018  | 0.025  | 0.035 | 0.073 | 0.038  | 0.021  | 0.012  | 0.010  | 0.004  |
| 5      | Experimental | 0.002  | 0.001  | 0.011  | 0.013  | 0.002 | 0.011 | 0.025  | 0.010  | 0.012  | 0.014  | 0.012  |
| 6      | Control      | −0.001 | −0.003 | 0.006  | 0.050  | 0.016 | 0.049 | 0.049  | 0.053  | 0.031  | 0.030  | 0.031  |
| Mean   | Control      | 0.008  | 0.000  | 0.012  | 0.035  | 0.026 | 0.044 | 0.030  | 0.027  | 0.015  | 0.014  | 0.006  |
|        | Experimental | 0.011  | 0.000  | 0.009  | 0.015  | 0.013 | 0.025 | 0.035  | 0.029  | 0.022  | 0.024  | 0.012  |

TABLE A.14.22.

Trial 2.2 dissolved Mn concentrations (mg/l).

| System | Treatment    | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [Mn] |
|--------|--------------|--------|--------|--------|--------|--------|--------|--------|--------|-------|-------|-------|--------|--------|--------|
| 1      | Experimental | 0.004  | 0.003  | 0.035  | 0.054  | 0.110  | 0.090  | 0.067  | 0.068  | 0.076 | 0.046 | 0.044 | 0.066  | 0.069  | 0.065  |
| 2      | Control      | 0.084  | 0.000  | 0.015  | 0.106  | 0.129  | 0.068  | 0.037  | 0.021  | 0.025 | 0.029 | 0.072 | 0.096  | 0.095  | 0.011  |
| 3      | Experimental | 0.005  | 0.046  | 0.088  | 0.182  | 0.213  | 0.116  | 0.118  | 0.104  | 0.108 | 0.101 | 0.154 | 0.208  | 0.190  | 0.186  |
| 4      | Control      | 0.038  | −0.002 | 0.010  | 0.060  | 0.042  |        | 0.038  | 0.045  | 0.041 | 0.041 | 0.080 | 0.086  | 0.054  | 0.016  |
| 5      | Control      | 0.046  | 0.032  | 0.071  | 0.123  | 0.067  | 0.036  | 0.037  | 0.027  | 0.026 | 0.020 | 0.048 | 0.068  | 0.027  | −0.019 |
| 6      | Experimental | 0.066  | 0.031  | 0.032  | 0.083  | 0.046  | 0.046  | 0.039  | 0.053  | 0.041 | 0.039 | 0.083 | 0.091  | 0.064  |        |
| Mean[1]| Control      | 0.056  | 0.010  | 0.032  | 0.096  | 0.079  | 0.052  | 0.037  | 0.031  | 0.030 | 0.030 | 0.066 | 0.083  | 0.059  | 0.003  |
|        | Experimental | 0.004  | 0.025  | 0.062  | 0.118  | 0.161  | 0.103  | 0.092  | 0.086  | 0.092 | 0.073 | 0.099 | 0.137  | 0.129  | 0.125  |

[1]System 6 excluded.

TABLE A.14.23.

Trial 2.3 dissolved Mn concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 0.029 | 0.002 | 0.021 | 0.056 | 0.074 | 0.016 | 0.007 | 0.003 |
| 2 | Experimental | 0.023 | 0.022 | 0.017 | 0.056 | 0.077 | 0.069 | 0.059 | 0.020 |
| 3 | Experimental | 0.092 | 0.026 | 0.071 | 0.078 | 0.023 | 0.025 | 0.018 | 0.017 |
| 4 | Control | 0.019 | 0.001 | 0.027 | 0.086 | 0.086 | 0.082 | 0.070 | 0.021 |
| 5 | Experimental | 0.035 | 0.003 | 0.021 | 0.035 | 0.032 | 0.021 | 0.010 | 0.001 |
| 6 | Control | 0.021 | 0.032 | 0.033 | 0.064 | 0.059 | 0.048 | 0.015 | 0.010 |
| Mean | Control | 0.023 | 0.012 | 0.027 | 0.069 | 0.073 | 0.049 | 0.031 | 0.011 |
|  | Experimental | 0.050 | 0.017 | 0.036 | 0.057 | 0.044 | 0.038 | 0.029 | 0.013 |

| System | Treatment | 7-Dec | 9-Dec | 12-Dec | 15-Dec | 17-Dec | End of Trial 19-Dec | 27-Dec | Δ [Mn] |
|---|---|---|---|---|---|---|---|---|---|
| 1 | Control | 0.005 | 0.009 | 0.019 | 0.007 | 0.007 | 0.005 | 0.000 | −0.025 |
| 2 | Experimental | 0.020 | 0.023 | 0.009 | 0.009 | 0.008 | 0.003 | 0.001 | −0.020 |
| 3 | Experimental | 0.019 | 0.021 | 0.019 | 0.021 | 0.029 | 0.014 | 0.004 | −0.078 |
| 4 | Control | 0.030 | 0.032 | 0.010 | 0.009 | 0.001 | 0.001 | 0.000 | −0.018 |
| 5 | Experimental | 0.003 | 0.008 | 0.007 | 0.003 | 0.004 | 0.002 | 0.002 | −0.034 |
| 6 | Control | 0.010 | 0.013 | 0.006 | 0.004 | 0.005 | 0.003 | −0.001 | −0.018 |
| Mean | Control | 0.015 | 0.018 | 0.012 | 0.007 | 0.005 | 0.003 | 0.000 | −0.020 |
|  | Experimental | 0.014 | 0.017 | 0.012 | 0.011 | 0.014 | 0.006 | 0.002 | −0.044 |

TABLE A.14.24.

Trial 2.4 dissolved Mn concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 0.185 | 0.050 | 0.047 | 0.069 | 0.141 | 0.245 | 0.416 | 0.415 |
| 2 | Experimental | 0.009 | 0.128 | 0.056 | 0.096 | 0.097 | 0.113 | 0.198 | 0.207 |
| 3 | Control | 0.238 | 0.208 | 0.139 | 0.049 | 0.068 | 0.061 | 0.060 | 0.071 |
| 4 | Experimental | 0.191 | 0.076 | 0.043 | 0.044 | 0.066 | 0.134 | 0.221 | 0.273 |
| 5 | Experimental | 0.241 | 0.155 | 0.104 | 0.151 | 0.171 | 0.212 | 0.237 | 0.215 |
| 6 | Control | 0.197 | 0.097 | 0.067 | 0.098 | 0.143 | 0.210 | 0.274 | 0.297 |
| Mean | Control | 0.207 | 0.118 | 0.084 | 0.072 | 0.118 | 0.172 | 0.250 | 0.261 |
|  | Experimental | 0.147 | 0.120 | 0.068 | 0.097 | 0.111 | 0.153 | 0.219 | 0.232 |

| System | Treatment | 10-Feb | 13-Feb | 15-Feb | 17-Feb | End of Trial 20-Feb | 24-Feb | Δ [Mn] |
|---|---|---|---|---|---|---|---|---|
| 1 | Control | 0.405 | 0.478 | 0.466 | 0.474 | 0.446 |  | 0.261 |
| 2 | Experimental | 0.173 | 0.062 | 0.043 | 0.032 | 0.015 | 0.007 | 0.006 |
| 3 | Control | 0.082 | 0.074 | 0.056 | 0.065 | 0.082 | 0.139 | −0.156 |
| 4 | Experimental | 0.251 | 0.137 | 0.079 | 0.065 | 0.032 | 0.063 | −0.159 |
| 5 | Experimental | 0.184 | 0.122 | 0.055 | 0.028 | 0.032 | 0.037 | −0.209 |
| 6 | Control | 0.234 | 0.241 | 0.193 | 0.210 | 0.160 | 0.195 | −0.037 |
| Mean | Control | 0.240 | 0.264 | 0.238 | 0.250 | 0.229 | 0.167 | 0.023 |
|  | Experimental | 0.203 | 0.107 | 0.059 | 0.042 | 0.026 | 0.035 | −0.121 |

TABLE A.14.25.

Trial 2.1 dissolved NO$_3$—N concentrations (mg/l).

| System | Treatment | 24-May | 25-May | 27-May | 31-May | 3-Jun | 6-Jun | 10-Jun | 14-Jun | 17-Jun | 20-Jun | Δ [N] |
|---|---|---|---|---|---|---|---|---|---|---|---|---|
| 1 | Control | 145 | 144 | 145 | 142 | 135 | 134 | 128 | 119 | 107 | 105 | −40 |
| 2 | Experimental | 151 | 146 | 143 | 138 | 137 | 135 | 131 | 128 | 128 | 123 | −27 |
| 3 | Experimental | 148 | 143 | 143 | 137 | 138 | 137 | 133 | 128 | 121 | 122 | −25 |
| 4 | Control | 146 | 143 | 143 | 143 | 139 | 139 | 136 | 131 | 121 | 121 | −25 |
| 5 | Experimental | 144 | 141 | 141 | 135 | 132 | 132 | 129 | 122 | 119 | 117 | −27 |
| 6 | Control | 147 | 141 | 139 | 135 | 134 | 132 | 132 | 127 | 121 | 122 | −25 |
| Mean | Control | 146 | 143 | 142 | 140 | 136 | 135 | 132 | 125 | 116 | 116 | −30 |
|  | Experimental | 148 | 144 | 142 | 137 | 136 | 134 | 131 | 126 | 123 | 121 | −27 |

TABLE A.14.26.

Trial 2.2 dissolved NO$_3$—N concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [Mg] |
|---|---|---|---|---|---|---|---|---|---|---|---|---|---|---|---|
| 1 | Experimental | 165 | 166 | 166 | 167 | 167 | 164 | 167 | 167 | 165 | 163 | 165 | 161 | 167 | 2 |
| 2 | Control | 165 | 166 | 170 | 171 | 176 | 170 | 174 | 173 | 175 | 168 | 171 | 178 | 180 | 15 |
| 3 | Experimental | 172 | 169 | 169 | 172 | 169 | 166 | 170 | 172 | 171 | 171 | 173 | 175 | 175 | 3 |
| 4 | Control | 170 | 168 | 163 | 169 | 169 |  | 168 | 171 | 171 | 172 | 173 | 171 |  | 1 |
| 5 | Control | 166 | 167 | 170 | 169 | 168 | 163 | 168 | 171 | 171 | 172 | 173 | 173 | 172 | 6 |
| 6 | Experimental | 167 | 165 | 162 | 161 | 161 | 140 | 136 | 130 | 129 | 127 | 129 | 134 | 134 |  |
| Mean[1] | Control | 167 | 167 | 168 | 169 | 171 | 167 | 170 | 172 | 172 | 170 | 172 | 175 | 174 | 7 |
|  | Experimental | 169 | 167 | 168 | 169 | 168 | 165 | 168 | 170 | 168 | 167 | 169 | 168 | 171 | 2 |

[1]System 6 excluded.

TABLE A.14.27.

Trial 2.3 dissolved NO$_3$—N concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 173 | 167 | 167 | 168 | 169 | 164 | 164 | 159 |
| 2 | Experimental | 174 | 171 | 167 | 172 | 173 | 171 | 170 | 167 |
| 3 | Experimental | 171 | 169 | 169 | 167 | 165 | 164 | 163 | 158 |
| 4 | Control | 171 | 164 | 164 | 170 | 168 | 169 | 168 | 161 |
| 5 | Experimental | 171 | 168 | 167 | 166 | 169 | 170 | 165 | 154 |
| 6 | Control | 171 | 168 | 169 | 168 | 168 | 164 | 165 | 157 |
| Mean | Control | 172 | 166 | 167 | 169 | 168 | 166 | 165 | 159 |
|  | Experimental | 172 | 169 | 168 | 168 | 169 | 168 | 166 | 160 |

| System | Treatment | 7-Dec | 9-Dec | 12-Dec | 15-Dec | 17-Dec | End of Trial 19-Dec | 27-Dec | Δ [N] |
|---|---|---|---|---|---|---|---|---|---|
| 1 | Control | 159 | 161 | 150 | 144 | 135 | 129 | 126 | −44 |
| 2 | Experimental | 166 | 170 | 164 | 168 | 154 | 142 | 140 | −33 |
| 3 | Experimental | 159 | 162 | 154 | 159 | 145 | 144 | 148 | −27 |
| 4 | Control | 161 | 160 | 146 | 145 | 127 | 121 | 117 | −50 |
| 5 | Experimental | 154 | 155 | 146 | 136 | 124 | 115 | 116 | −56 |
| 6 | Control | 158 | 161 | 146 | 146 | 137 | 131 | 129 | −40 |
| Mean | Control | 159 | 161 | 147 | 145 | 133 | 127 | 124 | −45 |
|  | Experimental | 160 | 162 | 155 | 154 | 141 | 133 | 134 | −39 |

TABLE A.14.28.

Trial 2.4 dissolved NO$_3$—N concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 168 | 169 | 171 | 170 | 178 | 177 | 184 | 180 |
| 2 | Experimental | 170 | 169 | 170 | 176 | 179 | 176 | 183 | 179 |
| 3 | Control | 173 | 174 | 174 | 174 | 182 | 179 | 181 | 180 |
| 4 | Experimental | 167 | 172 | 171 | 169 | 176 | 176 | 178 | 180 |
| 5 | Experimental | 172 | 173 | 170 | 171 | 178 | 174 | 181 | 175 |
| 6 | Control | 171 | 171 | 171 | 171 | 178 | 179 | 182 | 178 |
| Mean | Control | 171 | 171 | 172 | 172 | 179 | 178 | 182 | 179 |
|  | Experimental | 170 | 171 | 170 | 172 | 178 | 175 | 181 | 178 |

| System | Treatment | 10-Feb | 13-Feb | 15-Feb | 17-Feb | End of Trial 20-Feb | 24-Feb | Δ [N] |
|---|---|---|---|---|---|---|---|---|
| 1 | Control | 175 | 178 | 181 | 179 | 188 |  | 19.5 |
| 2 | Experimental | 178 | 177 | 178 | 181 | 176 | 175 | 5.7 |
| 3 | Control | 177 | 177 | 178 | 179 | 180 | 178 | 7.0 |
| 4 | Experimental | 179 | 178 | 179 | 179 | 175 | 177 | 8.3 |
| 5 | Experimental | 174 | 174 | 173 | 173 | 172 | 174 | −0.2 |
| 6 | Control | 176 | 177 | 179 | 180 | 180 | 182 | 9.2 |
| Mean | Control | 176 | 177 | 179 | 180 | 183 | 180 | 12 |
|  | Experimental | 177 | 176 | 177 | 177 | 174 | 175 | 5 |

TABLE A.14.29.

Trial 2.1 dissolved Na concentrations (mg/l).

| System | Treatment | 24-May | 25-May | 27-May | 31-May | 3-Jun | 6-Jun | 10-Jun | 14-Jun | 17-Jun | 20-Jun | Δ [Na] |
|---|---|---|---|---|---|---|---|---|---|---|---|---|
| 1 | Control | 3.71 | 3.55 | 4.01 | 4.60 | 5.63 | 6.01 | 6.44 | 7.50 | 8.42 | 8.78 | 5.07 |
| 2 | Experimental | 2.86 | 2.64 | 3.25 | 4.50 | 5.22 | 6.73 | 7.75 | 9.33 | 10.04 | 11.24 | 8.38 |
| 3 | Experimental | 3.04 | 2.91 | 4.43 | 3.19 | 5.49 | 6.98 | 7.81 | 9.72 | 10.65 | 11.81 | 8.77 |
| 4 | Control | 3.40 | 3.18 | 3.66 | 4.45 | 4.76 | 5.65 | 6.70 | 7.38 | 7.89 | 8.44 | 5.04 |
| 5 | Experimental | 3.73 | 3.46 | 4.17 | 4.87 | 6.21 | 7.51 | 8.66 | 9.91 | 11.29 | 11.81 | 8.09 |
| 6 | Control | 2.86 | 2.76 | 3.16 | 4.27 | 4.12 | 5.42 | 6.12 | 7.00 | 7.57 | 8.27 | 5.41 |
| Mean | Control | 3.32 | 3.16 | 3.61 | 4.44 | 4.84 | 5.69 | 6.42 | 7.29 | 7.96 | 8.50 | 5.17 |
|  | Experimental | 3.21 | 3.00 | 3.95 | 4.19 | 5.64 | 7.07 | 8.07 | 9.65 | 10.66 | 11.62 | 8.41 |

TABLE A.14.30.

Trial 2.2 dissolved Na concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [Na] |
|---|---|---|---|---|---|---|---|---|---|---|---|---|---|---|---|
| 1 | Experimental | 5.0 | 4.8 | 4.2 | 4.8 | 5.2 | 6.4 | 5.6 | 6.7 | 6.3 | 6.2 | 6.6 | 6.4 | 7.3 | 2.3 |
| 2 | Control | 4.8 | 4.5 | 4.3 | 4.5 | 4.8 | 5.5 | 4.9 | 5.3 | 6.2 | 5.0 | 6.1 | 6.2 | 6.7 | 1.9 |
| 3 | Experimental | 5.5 | 5.0 | 4.8 | 5.3 | 5.6 | 6.0 | 6.1 | 7.0 | 6.9 | 6.9 | 7.3 | 8.2 | 8.2 | 2.8 |
| 4 | Control | 4.7 | 4.4 | 4.4 | 4.4 | 4.8 |  | 4.8 | 5.5 | 5.2 | 5.3 | 5.7 | 6.0 | 6.3 | 1.6 |
| 5 | Control | 4.8 | 4.5 | 4.4 | 5.0 | 4.4 | 4.7 | 4.8 | 5.5 | 5.2 | 5.6 | 5.9 | 6.2 | 6.7 | 1.9 |
| 6 | Experimental | 4.5 | 4.6 | 4.3 | 4.6 | 4.9 | 4.4 | 4.3 | 4.8 | 4.6 | 4.7 | 5.0 | 5.4 | 5.7 |  |
| Mean[1] | Control | 4.8 | 4.5 | 4.4 | 4.6 | 4.7 | 5.1 | 4.8 | 5.4 | 5.6 | 5.3 | 5.9 | 6.2 | 6.6 | 1.8 |
|  | Experimental | 5.2 | 4.9 | 4.5 | 5.0 | 5.4 | 6.2 | 5.9 | 6.9 | 6.6 | 6.5 | 7.0 | 7.3 | 7.8 | 2.5 |

[1]System 6 excluded.

TABLE A.14.31.

Trial 2.3 dissolved Na concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 4.1 | 4.2 | 4.8 | 4.6 | 4.8 | 4.8 | 5.3 | 5.8 |
| 2 | Experimental | 4.2 | 4.1 | 4.5 | 4.5 | 4.5 | 4.7 | 5.0 | 4.9 |
| 3 | Experimental | 4.4 | 4.5 | 4.8 | 5.0 | 4.8 | 5.1 | 5.0 | 5.4 |
| 4 | Control | 4.3 | 4.3 | 4.7 | 4.9 | 5.0 | 5.1 | 5.4 | 6.3 |
| 5 | Experimental | 4.6 | 4.3 | 4.9 | 4.7 | 5.2 | 5.1 | 5.2 | 5.4 |
| 6 | Control | 4.2 | 4.3 | 4.8 | 4.8 | 5.5 | 5.8 | 6.1 | 6.4 |
| Mean | Control | 4.2 | 4.3 | 4.7 | 4.8 | 5.1 | 5.2 | 5.6 | 6.2 |
|  | Experimental | 4.4 | 4.3 | 4.7 | 4.8 | 4.8 | 5.0 | 5.0 | 5.2 |

| System | Treatment | 7-Dec | 9-Dec | 12-Dec | 15-Dec | 17-Dec | End of Trial 19-Dec | 27-Dec | Δ [Na] |
|---|---|---|---|---|---|---|---|---|---|
| 1 | Control | 6.0 | 6.4 | 6.4 | 7.1 | 7.1 | 7.2 | 7.6 | 3.1 |
| 2 | Experimental | 5.3 | 5.1 | 5.7 | 5.9 | 5.6 | 6.1 | 6.1 | 1.9 |
| 3 | Experimental | 5.6 | 5.5 | 5.4 | 6.1 | 6.1 | 6.1 | 6.5 | 1.7 |
| 4 | Control | 6.8 | 6.8 | 6.9 | 7.5 | 7.9 | 7.8 | 7.5 | 3.4 |
| 5 | Experimental | 5.4 | 5.6 | 5.9 | 5.9 | 6.1 | 6.3 | 6.2 | 1.8 |
| 6 | Control | 7.0 | 7.3 | 7.3 | 7.5 | 7.8 | 8.0 | 7.9 | 3.8 |
| Mean | Control | 6.6 | 6.8 | 6.9 | 7.4 | 7.6 | 7.7 | 7.7 | 3.5 |
|  | Experimental | 5.4 | 5.4 | 5.7 | 6.0 | 5.9 | 6.2 | 6.3 | 1.8 |

TABLE A.14.32.

Trial 2.4 dissolved Na concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 3.6 | 3.6 | 3.8 | 4.3 | 5.2 | 4.6 | 5.4 | 5.3 |
| 2 | Experimental | 3.2 | 3.5 | 3.6 | 4.2 | 4.0 | 3.7 | 4.1 | 4.1 |
| 3 | Control | 3.4 | 3.5 | 4.3 | 4.6 | 4.9 | 5.2 | 5.8 | 5.8 |
| 4 | Experimental | 3.4 | 3.4 | 4.2 | 3.3 | 3.8 | 3.8 | 3.8 | 3.9 |
| 5 | Experimental | 2.9 | 3.4 | 3.4 | 3.5 | 3.6 | 3.8 | 4.0 | 4.1 |
| 6 | Control | 3.2 | 3.5 | 3.8 | 4.6 | 4.4 | 4.8 | 5.2 | 5.6 |
| Means | Control | 3.4 | 3.5 | 4.0 | 4.5 | 4.8 | 4.9 | 5.5 | 5.6 |
|  | Experimental | 3.2 | 3.4 | 3.7 | 3.7 | 3.8 | 3.8 | 3.9 | 4.0 |

| System | Treatment | 10-Feb | 13-Feb | 15-Feb | 17-Feb | End of Trial 20-Feb | 24-Feb | Δ [Na] |
|---|---|---|---|---|---|---|---|---|
| 1 | Control | 5.9 | 7.1 | 6.0 | 7.4 | 7.8 |  | 4.2 |
| 2 | Experimental | 4.2 | 5.7 | 7.2 | 6.3 | 6.7 | 6.7 | 3.4 |
| 3 | Control | 6.1 | 7.7 | 7.6 | 8.4 | 8.6 | 8.9 | 5.2 |
| 4 | Experimental | 4.2 | 5.5 | 5.7 | 6.1 | 6.1 | 6.6 | 2.7 |
| 5 | Experimental | 4.3 | 5.8 | 5.7 | 6.0 | 6.3 | 6.6 | 3.4 |
| 6 | Control | 5.6 | 6.8 | 6.9 | 7.5 | 8.2 | 8.5 | 5.0 |
| Means | Control | 5.9 | 7.2 | 6.8 | 7.8 | 8.2 | 8.7 | 4.8 |
|  | Experimental | 4.2 | 5.7 | 6.2 | 6.2 | 6.4 | 6.6 | 3.2 |

TABLE A.14.33.

Trial 2.1 dissolved P concentrations (mg/l).

| System | Treatment | 24-May | 25-May | 27-May | 31-May | 3-Jun | 6-Jun | 10-Jun | 14-Jun | 17-Jun | 20-Jun | Δ [P] |
|---|---|---|---|---|---|---|---|---|---|---|---|---|
| 1 | Control | 17.5 | 15.8 | 15.6 | 15.7 | 16.9 | 16.1 | 15.1 | 15.1 | 11.5 | 12.3 | −5.2 |
| 2 | Experimental | 17.4 | 15.7 | 16.0 | 16.8 | 16.4 | 18.5 | 20.0 | 20.9 | 20.8 | 22.9 | 5.5 |
| 3 | Experimental | 16.8 | 15.2 | 15.9 | 14.5 | 18.7 | 19.8 | 20.8 | 21.9 | 22.9 | 24.1 | 7.3 |
| 4 | Control | 16.5 | 15.4 | 15.0 | 16.8 | 17.1 | 17.7 | 18.1 | 18.9 | 17.6 | 18.5 | 2.0 |
| 5 | Experimental | 16.8 | 14.9 | 14.6 | 17.7 | 16.2 | 17.0 | 18.0 | 18.9 | 20.3 | 21.3 | 4.5 |
| 6 | Control | 15.9 | 14.6 | 14.4 | 16.2 | 15.0 | 15.8 | 16.5 | 17.5 | 18.0 | 19.4 | 3.4 |
| Mean | Control | 16.7 | 15.3 | 15.0 | 16.2 | 16.3 | 16.5 | 16.6 | 17.2 | 15.7 | 16.7 | 0.1 |
|  | Experimental | 17.0 | 15.3 | 15.5 | 16.3 | 17.1 | 18.4 | 19.6 | 20.6 | 21.3 | 22.8 | 5.8 |

TABLE A.14.34.

Trial 2.2 dissolved P concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [P] |
|---|---|---|---|---|---|---|---|---|---|---|---|---|---|---|---|
| 1 | Experimental | 15.0 | 13.4 | 13.4 | 14.3 | 15.6 | 16.6 | 18.4 | 18.9 | 19.0 | 18.4 | 20.7 | 20.2 | 23.4 | 8.3 |
| 2 | Control | 16.4 | 15.1 | 14.6 | 14.9 | 15.9 | 15.4 | 15.4 | 15.0 | 16.5 | 14.6 | 16.1 | 16.8 | 17.3 | 0.8 |
| 3 | Experimental | 15.7 | 16.0 | 16.2 | 17.4 | 18.2 | 18.8 | 20.2 | 22.1 | 20.5 | 21.5 | 22.9 | 25.0 | 25.0 | 9.3 |
| 4 | Control | 15.9 | 14.6 | 13.0 | 13.3 | 13.7 |  | 13.6 | 14.6 | 13.7 | 12.9 | 14.2 | 14.4 | 13.2 | −2.8 |
| 5 | Control | 15.8 | 14.8 | 14.4 | 14.3 | 13.2 | 13.1 | 13.2 | 14.4 | 12.9 | 13.1 | 13.4 | 13.8 | 13.6 | −2.2 |
| 6 | Experimental | 15.1 | 14.6 | 13.4 | 14.1 | 14.3 | 14.2 | 14.4 | 15.9 | 15.0 | 16.2 | 18.1 | 19.0 | 20.0 |  |
| Mean[1] | Control | 16.1 | 14.8 | 14.0 | 14.2 | 14.3 | 14.3 | 14.1 | 14.7 | 14.4 | 13.5 | 14.6 | 15.0 | 14.7 | −1.4 |
|  | Experimental | 15.4 | 14.7 | 14.8 | 15.9 | 16.9 | 17.7 | 19.3 | 20.5 | 19.7 | 20.0 | 21.8 | 22.6 | 24.2 | 8.8 |

[1]System 6 excluded.

TABLE A.14.35.

Trial 2.3 dissolved P concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 16.3 | 14.5 | 10.8 | 9.9 | 9.0 | 7.8 | 7.7 | 7.2 |
| 2 | Experimental | 17.9 | 14.8 | 11.8 | 11.6 | 11.3 | 11.2 | 11.2 | 10.5 |
| 3 | Experimental | 17.2 | 14.2 | 11.4 | 11.4 | 10.2 | 8.7 | 8.9 | 8.4 |
| 4 | Control | 16.5 | 14.8 | 12.0 | 11.3 | 10.7 | 10.5 | 10.6 | 9.6 |
| 5 | Experimental | 17.3 | 14.8 | 12.0 | 11.2 | 10.6 | 9.9 | 9.3 | 7.8 |
| 6 | Control | 17.3 | 13.4 | 10.4 | 9.7 | 9.2 | 7.7 | 7.7 | 7.2 |
| Mean | Control | 16.7 | 14.2 | 11.1 | 10.3 | 9.6 | 8.7 | 8.7 | 8.0 |
|  | Experimental | 17.5 | 14.6 | 11.8 | 11.4 | 10.7 | 9.9 | 9.8 | 8.9 |

| System | Treatment | 7-Dec | 9-Dec | 12-Dec | 15-Dec | 17-Dec | End of Trial 19-Dec | 27-Dec | Δ [P] |
|---|---|---|---|---|---|---|---|---|---|
| 1 | Control | 7.3 | 7.5 | 6.9 | 6.2 | 6.3 | 5.6 | 3.1 | −10.7 |
| 2 | Experimental | 10.9 | 11.1 | 10.4 | 11.0 | 9.1 | 9.2 | 4.2 | −8.6 |
| 3 | Experimental | 8.4 | 8.8 | 8.5 | 8.9 | 9.2 | 9.3 | 8.3 | −7.9 |
| 4 | Control | 9.7 | 9.8 | 8.6 | 8.4 | 7.9 | 6.7 | 3.3 | −9.8 |
| 5 | Experimental | 7.7 | 7.6 | 7.0 | 6.5 | 6.3 | 5.9 | 3.2 | −11.3 |
| 6 | Control | 7.4 | 7.4 | 6.8 | 6.2 | 6.2 | 5.6 | 3.1 | −11.6 |
| Mean | Control | 8.1 | 8.2 | 7.5 | 6.9 | 6.8 | 5.9 | 3.2 | −10.7 |
|  | Experimental | 9.0 | 9.2 | 8.6 | 8.8 | 8.2 | 8.2 | 5.2 | −9.3 |

TABLE A.14.36.

Trial 2.4 dissolved P concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 15.5 | 14.3 | 11.9 | 10.1 | 12.0 | 11.6 | 13.4 | 12.8 |
| 2 | Experimental | 16.7 | 15.1 | 13.4 | 15.6 | 15.6 | 14.6 | 16.3 | 16.2 |
| 3 | Control | 16.2 | 16.1 | 13.5 | 12.8 | 14.0 | 13.6 | 13.8 | 13.2 |
| 4 | Experimental | 15.4 | 14.1 | 14.0 | 11.4 | 13.1 | 13.4 | 14.4 | 14.8 |
| 5 | Experimental | 16.2 | 15.1 | 13.5 | 14.7 | 15.1 | 15.2 | 15.7 | 15.7 |
| 6 | Control | 15.8 | 14.1 | 12.1 | 11.9 | 11.9 | 12.3 | 13.0 | 13.0 |
| Mean | Control | 15.8 | 14.8 | 12.5 | 11.6 | 12.6 | 12.5 | 13.4 | 13.0 |
|  | Experimental | 16.1 | 14.8 | 13.6 | 13.9 | 14.6 | 14.4 | 15.5 | 15.6 |

| System | Treatment | 10-Feb | 13-Feb | 15-Feb | 17-Feb | End of Trial 20-Feb | 24-Feb | Δ [P] |
|---|---|---|---|---|---|---|---|---|
| 1 | Control | 12.5 | 12.6 | 12.3 | 12.2 | 12.0 |  | −3.5 |
| 2 | Experimental | 16.7 | 16.5 | 17.2 | 17.9 | 17.6 | 15.9 | 0.9 |
| 3 | Experimental | 13.0 | 12.3 | 11.9 | 12.3 | 12.1 | 12.4 | −4.0 |
| 4 | Control | 15.4 | 16.3 | 16.3 | 17.3 | 16.2 | 17.6 | 0.8 |
| 5 | Experimental | 15.7 | 16.6 | 15.2 | 16.3 | 17.1 | 17.8 | 0.9 |
| 6 | Control | 12.1 | 11.9 | 11.5 | 11.7 | 11.8 | 12.3 | −4.0 |
| Mean | Control | 12.5 | 12.3 | 11.9 | 12.1 | 12.0 | 12.4 | −4.0 |
|  | Experimental | 15.9 | 16.5 | 16.3 | 17.2 | 17.0 | 17.1 | 0.9 |

TABLE A.14.37.

Trial 2.1 dissolved Zn concentrations (mg/l).

| System | Treatment | 24-May | 25-May | 27-May | 31-May | 3-Jun | 6-Jun | 10-Jun | 14-Jun | 17-Jun | 20-Jun | Δ [Zn] |
|---|---|---|---|---|---|---|---|---|---|---|---|---|
| 871 | Control | 0.033 | 0.029 | 0.080 | 0.081 | 0.188 | 0.099 | 0.111 | 0.137 | 0.150 | 0.143 | 0.110 |
| 2 | Experimental | 0.039 | 0.031 | 0.070 | 0.131 | 0.092 | 0.253 | 0.345 | 0.397 | 0.441 | 0.520 | 0.480 |
| 3 | Experimental | 0.043 | 0.031 | 0.156 | 0.085 | 0.204 | 0.277 | 0.343 | 0.425 | 0.474 | 0.536 | 0.493 |
| 4 | Control | 0.024 | 0.021 | 0.071 | 0.154 | 0.099 | 0.127 | 0.149 | 0.139 | 0.147 | 0.188 | 0.164 |
| 5 | Experimental | 0.030 | 0.034 | 0.078 | 0.166 | 0.201 | 0.254 | 0.347 | 0.411 | 0.464 | 0.517 | 0.488 |
| 6 | Control | 0.034 | 0.046 | 0.073 | 0.090 | 0.090 | 0.096 | 0.129 | 0.146 | 0.171 | 0.177 | 0.142 |
| Mean | Control | 0.030 | 0.032 | 0.075 | 0.108 | 0.126 | 0.107 | 0.130 | 0.140 | 0.156 | 0.169 | 0.139 |
|  | Experimental | 0.037 | 0.032 | 0.101 | 0.127 | 0.165 | 0.262 | 0.345 | 0.411 | 0.460 | 0.524 | 0.487 |

TABLE A.14.38.

Trial 2.2 dissolved Zn concentrations (mg/l).

| System | Treatment | 15-Aug | 18-Aug | 20-Aug | 22-Aug | 25-Aug | 27-Aug | 29-Aug | 31-Aug | 2-Sep | 5-Sep | 8-Sep | 10-Sep | 12-Sep | Δ [Zn] |
|---|---|---|---|---|---|---|---|---|---|---|---|---|---|---|---|
| 1 | Experimental | 0.057 | 0.059 | 0.058 | 0.059 | 0.086 | 0.166 | 0.088 | 0.149 | 0.095 | 0.104 | 0.122 | 0.094 | 0.148 | 0.091 |
| 2 | Control | 0.042 | 0.066 | 0.064 | 0.081 | 0.140 | 0.099 | 0.123 | 0.093 | 0.117 | 0.103 | 0.120 | 0.123 | 0.121 | 0.079 |
| 3 | Experimental | 0.086 | 0.072 | 0.092 | 0.074 | 0.105 | 0.110 | 0.109 | 0.111 | 0.122 | 0.136 | 0.135 | 0.119 | 0.121 | 0.036 |
| 4 | Control | 0.055 | 0.057 | 0.076 | 0.092 | 0.077 |  | 0.097 | 0.099 | 0.105 | 0.109 | 0.127 | 0.118 | 0.124 | 0.069 |
| 5 | Control | 0.072 | 0.058 | 0.073 | 0.083 | 0.102 | 0.133 | 0.116 | 0.123 | 0.131 | 0.130 | 0.135 | 0.147 | 0.130 | 0.058 |
| 6 | Experimental | 0.056 | 0.048 | 0.067 | 0.058 | 0.082 | 0.055 | 0.063 | 0.082 | 0.080 | 0.097 | 0.102 | 0.108 | 0.112 |  |
| Mean[1] | Control | 0.056 | 0.060 | 0.071 | 0.085 | 0.106 | 0.116 | 0.112 | 0.105 | 0.118 | 0.114 | 0.127 | 0.129 | 0.125 | 0.069 |
|  | Experimental | 0.071 | 0.065 | 0.075 | 0.066 | 0.096 | 0.138 | 0.099 | 0.130 | 0.108 | 0.120 | 0.128 | 0.106 | 0.135 | 0.063 |

[1]System 6 excluded.

TABLE A.14.39.

Trial 2.3 dissolved Zn concentrations (mg/l).

| System | Treatment | 21-Nov | 22-Nov | 24-Nov | 26-Nov | 28-Nov | 30-Nov | 2-Dec | 5-Dec |
|---|---|---|---|---|---|---|---|---|---|
| 1 | Control | 0.057 | 0.050 | 0.063 | 0.082 | 0.082 | 0.076 | 0.090 | 0.101 |
| 2 | Experimental | 0.051 | 0.045 | 0.050 | 0.064 | 0.066 | 0.054 | 0.067 | 0.082 |
| 3 | Experimental | 0.057 | 0.038 | 0.064 | 0.088 | 0.104 | 0.082 | 0.084 | 0.094 |
| 4 | Control | 0.026 | 0.040 | 0.083 | 0.065 | 0.072 | 0.078 | 0.086 | 0.094 |
| 5 | Experimental | 0.079 | 0.055 | 0.065 | 0.076 | 0.081 | 0.089 | 0.084 | 0.106 |
| 6 | Control | 0.021 | 0.043 | 0.050 | 0.067 | 0.080 | 0.070 | 0.074 | 0.080 |
| Mean | Control | 0.035 | 0.044 | 0.065 | 0.071 | 0.078 | 0.075 | 0.083 | 0.092 |
|  | Experimental | 0.062 | 0.046 | 0.060 | 0.076 | 0.083 | 0.075 | 0.078 | 0.094 |

| System | Treatment | 7-Dec | 9-Dec | 12-Dec | 15-Dec | 17-Dec | End of Trial 19-Dec | 27-Dec | Δ [P] |
|---|---|---|---|---|---|---|---|---|---|
| 1 | Control | 0.106 | 0.118 | 0.106 | 0.123 | 0.116 | 0.129 | 0.121 | 0.073 |
| 2 | Experimental | 0.098 | 0.094 | 0.100 | 0.096 | 0.089 | 0.109 | 0.101 | 0.058 |
| 3 | Experimental | 0.107 | 0.106 | 0.121 | 0.117 | 0.137 | 0.126 | 0.145 | 0.068 |
| 4 | Control | 0.088 | 0.119 | 0.141 | 0.107 | 0.126 | 0.118 | 0.117 | 0.092 |
| 5 | Experimental | 0.114 | 0.097 | 0.107 | 0.087 | 0.096 | 0.095 | 0.081 | 0.016 |
| 6 | Control | 0.105 | 0.100 | 0.109 | 0.109 | 0.114 | 0.114 | 0.086 | 0.093 |
| Mean | Control | 0.100 | 0.112 | 0.119 | 0.113 | 0.119 | 0.120 | 0.108 | 0.086 |
|  | Experimental | 0.106 | 0.099 | 0.109 | 0.100 | 0.107 | 0.110 | 0.109 | 0.048 |

TABLE A.14.40.

Trial 2.4 dissolved Zn concentrations (mg/l).

| System | Treatment | 23-Jan | 25-Jan | 27-Jan | 30-Jan | 1-Feb | 3-Feb | 6-Feb | 8-Feb |
|---|---|---|---|---|---|---|---|---|---|
| 1 | Control | 0.043 | 0.044 | 0.072 | 0.104 | 0.145 | 0.167 | 0.181 | 0.188 |
| 2 | Experimental | 0.038 | 0.066 | 0.038 | 0.052 | 0.061 | 0.058 | 0.065 | 0.067 |
| 3 | Control | 0.056 | 0.070 | 0.088 | 0.119 | 0.163 | 0.170 | 0.230 | 0.214 |
| 4 | Experimental | 0.050 | 0.049 | 0.061 | 0.074 | 0.077 | 0.075 | 0.087 | 0.100 |
| 5 | Experimental | 0.044 | 0.046 | 0.058 | 0.066 | 0.072 | 0.083 | 0.084 | 0.082 |
| 6 | Control | 0.037 | 0.053 | 0.074 | 0.116 | 0.127 | 0.159 | 0.193 | 0.186 |
| Mean | Control | 0.045 | 0.056 | 0.078 | 0.113 | 0.145 | 0.165 | 0.201 | 0.196 |
|  | Experimental | 0.044 | 0.054 | 0.052 | 0.064 | 0.070 | 0.072 | 0.079 | 0.083 |

| System | Treatment | 10-Feb | 13-Feb | 15-Feb | 17-Feb | End of Trial 20-Feb | 24-Feb | Δ [Zn] |
|---|---|---|---|---|---|---|---|---|
| 1 | Control | 0.198 | 0.225 | 0.223 | 0.250 | 0.262 |  | 0.219 |
| 2 | Experimental | 0.076 | 0.075 | 0.086 | 0.084 | 0.072 | 0.075 | 0.034 |
| 3 | Control | 0.230 | 0.265 | 0.274 | 0.313 | 0.335 | 0.339 | 0.279 |
| 4 | Experimental | 0.111 | 0.095 | 0.102 | 0.111 | 0.104 | 0.110 | 0.054 |
| 5 | Experimental | 0.088 | 0.093 | 0.097 | 0.096 | 0.110 | 0.107 | 0.066 |
| 6 | Control | 0.192 | 0.227 | 0.228 | 0.241 | 0.292 | 0.273 | 0.255 |
| Mean | Control | 0.207 | 0.239 | 0.242 | 0.268 | 0.314 | 0.306 | 0.267 |
|  | Experimental | 0.092 | 0.088 | 0.095 | 0.097 | 0.095 | 0.097 | 0.051 |

APPENDIX 15

Phase 2 Model Parameters

TABLE A.15.1.

Estimates for model parameters determined from phase 2 data.

| Parameter | Trial 2.1 | | Trial 2.2 | | Trial 2.3 | | Trial 2.4 | |
|---|---|---|---|---|---|---|---|---|
| | Experimental | Control | Experimental | Control | Experimental | Control | Experimental | Control |
| A | | | | | | | | |
| Ca | 0.09 | 0.41 | 0.38 | 0.48 | 0.45 | 0.43 | 0.47 | 0.59 |
| Cu | −0.85 | −0.69 | 0.25 | 0.15 | 0.06 | 0.09 | −0.04 | 0.10 |
| Fe | −0.19 | 0.01 | −0.18 | −0.13 | 0.01 | 0.07 | −0.27 | −1.35 |
| K | 0.98 | 0.96 | 0.97 | 0.96 | 0.98 | 0.96 | 0.97 | 0.96 |
| Mg | 0.87 | 0.82 | 0.86 | 0.88 | 0.88 | 0.87 | 0.87 | 0.88 |
| Mn | 0.77 | 0.47 | 0.76 | 0.50 | 0.65 | 0.65 | −0.09 | 0.35 |
| N | 0.91 | 0.91 | 0.93 | 0.93 | 0.92 | 0.91 | 0.91 | 0.92 |
| Na | 0.99 | 0.98 | 0.98 | 0.98 | 0.98 | 0.98 | 0.97 | 0.97 |
| P | 0.74 | 0.74 | 0.78 | 0.74 | 0.74 | 0.70 | 0.75 | 0.71 |
| Zn | 0.71 | 0.61 | 0.69 | 0.71 | 0.67 | 0.66 | 0.58 | 0.68 |
| A' | | | | | | | | |
| Ca | 0.86 | 0.90 | 0.92 | 0.93 | 0.92 | 0.92 | 0.92 | 0.92 |
| Cu | 0.30 | 0.27 | 0.58 | 0.55 | 0.39 | 0.37 | 0.25 | 0.31 |
| Fe | 0.35 | 0.43 | 0.50 | 0.50 | 0.64 | 0.67 | 0.44 | 0.34 |
| K | 0.99 | 0.99 | 0.99 | 0.99 | 0.99 | 0.99 | 0.99 | 0.99 |
| Mg | 0.96 | 0.97 | 0.97 | 0.98 | 0.97 | 0.97 | 0.97 | 0.98 |
| Mn | 0.77 | 0.53 | 0.77 | 0.58 | 0.90 | 0.90 | 0.56 | 0.58 |
| N | 0.96 | 0.96 | 0.96 | 0.96 | 0.96 | 0.96 | 0.96 | 0.96 |
| Na | 0.99 | 0.99 | 0.99 | 0.99 | 0.99 | 0.99 | 0.98 | 0.98 |
| P | 0.80 | 0.82 | 0.84 | 0.83 | 0.83 | 0.81 | 0.83 | 0.80 |
| Zn | 0.72 | 0.65 | 0.79 | 0.79 | 0.73 | 0.72 | 0.66 | 0.70 |
| R | | | | | | | | |
| Ca | 0.96 | 0.98 | 1.78 | 1.97 | 1.79 | 1.81 | 2.02 | 2.08 |
| Cu | 1.33 | 1.35 | 1.11 | 1.11 | 1.23 | 1.16 | 1.32 | 1.37 |
| Fe | 0.94 | 0.89 | 1.03 | 1.01 | 0.82 | 0.72 | 1.02 | 1.22 |
| K | 0.90 | 0.90 | 0.93 | 0.94 | 0.95 | 0.95 | 0.95 | 0.95 |
| Mg | 0.91 | 0.91 | 0.88 | 0.87 | 0.89 | 0.87 | 0.87 | 0.89 |
| Mn | 0.44 | 1.05 | 0.55 | 1.48 | 0.48 | 0.48 | 0.77 | 0.87 |
| N | 0.75 | 0.70 | 0.74 | 0.76 | 0.63 | 0.60 | 0.80 | 0.85 |
| Na | 0.85 | 0.86 | 0.69 | 0.78 | 0.80 | 0.83 | 0.88 | 1.03 |
| P | 0.83 | 0.83 | 0.79 | 0.80 | 0.62 | 0.55 | 0.88 | 0.98 |
| Zn | 0.93 | 1.11 | 1.01 | 1.08 | 0.95 | 1.02 | 1.06 | 0.86 |
| R' | | | | | | | | |
| Ca | 0.96 | 0.98 | 0.97 | 1.07 | 0.98 | 0.97 | 1.15 | 1.21 |
| Cu | 2.61 | 8.81 | 1.19 | 1.21 | 2.04 | 1.50 | 2.81 | 2.36 |
| Fe | 0.85 | 0.79 | 1.07 | 1.04 | 0.71 | 0.59 | 1.07 | 1.70 |
| K | 0.90 | 0.90 | 0.93 | 0.94 | 0.95 | 0.95 | 0.95 | 0.95 |
| Mg | 0.90 | 0.91 | 0.88 | 0.87 | 0.88 | 0.87 | 0.87 | 0.89 |
| Mn | 0.28 | 1.17 | 0.42 | 1.95 | 0.43 | 0.43 | 0.61 | 0.74 |
| N | 0.74 | 0.69 | 0.73 | 0.76 | 0.62 | 0.59 | 0.79 | 0.84 |
| Na | 0.84 | 0.85 | 0.69 | 0.78 | 0.80 | 0.83 | 0.88 | 1.03 |
| P | 0.79 | 0.78 | 0.75 | 0.76 | 0.53 | 0.45 | 0.86 | 0.97 |
| Zn | 0.90 | 1.16 | 1.01 | 1.10 | 0.94 | 1.03 | 1.10 | 0.81 |
| $[N]_P$ | | | | | | | | |
| Ca (%) | 1.48 | 1.40 | 1.60 | 1.78 | 1.79 | 1.68 | 1.54 | 1.57 |
| Cu (mg/kg) | 13.8 | 13.3 | 13.1 | 11.7 | 16.8 | 13.8 | 14.4 | 13.5 |
| Fe (mg/kg) | 323 | 299 | 424 | 444 | 613 | 480 | 624 | 418 |
| K (%) | 10.8 | 10.7 | 11.0 | 10.7 | 10.4 | 10.5 | 10.4 | 10.4 |
| Mg (%) | 0.49 | 0.49 | 0.51 | 0.53 | 0.49 | 0.52 | 0.50 | 0.51 |
| Mn (mg/kg) | 341 | 293 | 270 | 409 | 326 | 325 | 329 | 238 |
| N (%) | 4.60 | 4.60 | – | – | – | – | – | – |
| Na (%) | 0.37 | 0.33 | 0.34 | 0.25 | 0.32 | 0.36 | 0.42 | 0.45 |
| P (%) | 1.16 | 1.15 | 1.14 | 1.16 | 1.19 | 1.13 | 1.11 | 1.14 |
| Zn (mg/kg) | 98 | 76 | 69 | 59 | 91 | 73 | 72 | 83 |
| $[N]_F$ | | | | | | | | |
| Ca (%) | 5.7 | 5.7 | 6.2 | 5.4 | 5.0 | 5.4 | 4.2 | 4.1 |
| Cu (mg/kg) | 9.3 | 7.0 | 9.5 | 8.5 | 9.4 | 10.4 | 8.5 | 10.7 |
| Fe (mg/kg) | 90 | 116 | 93 | 97 | 85 | 82 | 101 | 95 |
| K (%) | 0.84 | 0.76 | 0.64 | 0.61 | 0.84 | 0.81 | 0.69 | 0.71 |
| Mg (%) | 0.18 | 0.18 | 0.18 | 0.17 | 0.18 | 0.19 | 0.15 | 0.14 |
| Mn (mg/kg) | 5.1 | 4.0 | 7.4 | 5.1 | 3.5 | 3.1 | 3.8 | 6.1 |

TABLE A.15.1.-continued

Estimates for model parameters determined from phase 2 data.

| Parameter | Trial 2.1 | | Trial 2.2 | | Trial 2.3 | | Trial 2.4 | |
|---|---|---|---|---|---|---|---|---|
| | Experimental | Control | Experimental | Control | Experimental | Control | Experimental | Control |
| N (%) | 8.8 | 8.4 | 8.8 | 8.8 | 8.6 | 8.4 | 8.5 | 8.5 |
| Na (%) | 0.64 | 0.59 | 0.61 | 0.67 | 0.67 | 0.52 | 0.49 | 0.53 |
| P (%) | 3.13 | 3.12 | 3.28 | 2.91 | 2.79 | 3.01 | 2.41 | 2.38 |
| Zn (mg/kg) | 111 | 117 | 77 | 73 | 106 | 111 | 83 | 89 |

APPENDIX 16

Hypothetical Commercial Designer Diet Development

Following is an example of designer diet development for a commercial integrated system. The system parameters necessary for the calculation are as follows:

Fish: species: Nile tilapia (*Tilapia nilotica*)
   standing biomass: 90,000 kg (considered set)
   weighted average feeding rate: 3% bw/d
   weighted average FCR: 1.3
   proximate composition: 72% moisture; following as % of dry matter: 54% protein, 34% lipid, and 12% ash Plant: species: romaine lettuce (*Lactuca sativa longifolia*)
   standing biomass: to be determined from N mass balance
   yield: assume weekly yield is 50% of average standing biomass
   moisture content: 95.4%

System characteristics:
   volume: 1,000,000 l
   recirculation rate (daily): 95%
   flow rate: 50,000 l per day (131 lpm)

Initial dietary specifications:
   protein: 35% (dry weight)
   digestible energy: 8.5 kcal/g protein Elemental composition of fish and plants[1]:

| Elemental composition of fish and plants[1]: | | |
|---|---|---|
| Nutrient | Fish | Plants |
| Ca (%) | 5.2 | 1.6 |
| Cu (mg/kg) | 9.2 | 13.8 |
| Fe (mg/kg) | 95 | 450 |
| K (%) | 0.75 | 10.6 |
| Mg (%) | 0.17 | 0.50 |
| Mn (mg/kg) | 4.8 | 320 |
| N (%) | 8.6 | 4.6 |
| Na (%) | 0.6 | 0.4 |
| P (%) | 2.9 | 1.2 |
| Zn (mg/kg) | 96 | 78 |

[1]Phase 2 mean values.

| Elemental composition of the replacement water: | |
|---|---|
| Mineral | Concentration (mg/l) |
| Ca | 50 |
| Cu | 0.01 |
| Fe | 0.1 |
| K | 5 |
| Mg | 10 |
| Mn | 0.05 |
| $NO_3$—N | 0 |
| $NH_4$—N | 0 |
| Na | 50 |
| P | 2 |
| Zn | 0.05 |

| Objective hydroponic nutrient solution concentrations: | |
|---|---|
| Element | Concentration (mg/l) |
| Ca | 173 |
| Cu | 0.013 |
| Fe | 2.2 |
| K | 185 |
| Mg | 31.6 |
| Mn | 0.18 |
| N | 170 |
| P | 16 |
| Zn | 0.05 |

Determination of plant yield and standing biomass

This scenario assumes that the fish component is fixed and the size of the hydroponic plant component is being designed to accommodate the existing fish component. The determination of plant yield and standing biomass, based on N mass balance, proceeds by applying the modified dietary inclusion model:

$$(R_D[N]_D + Q_I[N]_I + R_E) A'R'' - Q_I[N]_O = R_F[N]_F + R_P[N]_P. \quad (27)$$

where, $R_D$ = daily feeding rate = 2,700 kg/day $[N]_D$ = dietary N concentration = 5.6%

$Q_I$ = replacement water flow rate = 50,000 l per day $[N]_I$ = incoming N concentration = 0.0 g/l $R_E$ = supplemental N addition = 0.0 g per day -continued $A'$ = adjusted availability = 0.96 (phase 2 average)

$R''$ = adjusted recovery estimate
 = 0.72 (based on phase 2 average $R'$ value)

$[N]_O$ = average solution N concentration = 0.170 g/l $R_F$ = daily fish yield (dry matter)
 = $(9 \cdot 10^7 \text{ g fish}) \cdot (0.03 \text{ g feed}/[\text{g fish} \cdot \text{day}]) \cdot$
 $(0.28 \text{ g dry matter}/\text{g fish})$ $[N]_F$ = fish N concentration (dry) = 8.6%

$R_P$ = daily plant yield (dry matter) = to be calculated $[N]_P$ = plant N concentration (dry) = 4.6%

By inserting these values into equation 27:

$$([9 \cdot 10^7][0.03][0.056] + 0.0 + 0.0)(0.96)(0.72) - (5 \cdot 10^4)(0.170) =$$
$$([9 \cdot 10^7][0.03][0.086][0.28]) \div 1.3 + (0.046)R_P,$$

and solving for $R_P$, we have:

$R_P$ = 1,000 kg of lettuce (dry wt.) yield per day.

This is equivalent to 21,740 kg of lettuce plants assuming the plants are 95.4% dry matter.

The dietary mineral concentrations are then determined using $R_P$. The parameters used for determining the dietary concentrations of Ca, K, Mg, P, Na, and Zn and the resulting dietary concentrations are listed in Table A.16.1. It is assumed that Cu, Fe, and Mn will be supplemented in the diet up to the predicted dietary concentrations, although equilibrium concentrations might not result. Iron and Mn may require exogenous supplementation with chelated mineral forms. The predicted inclusion rate of Ca was negative because theoretically, the quantity of Ca liberated from $CaCO_3$ was greater than the combined quantities of Ca recovered in the fish and plants and lost in the discharged water. The basal diet and mineral mix compositions of the hypothetical designer diet are listed in Tables A.16.2 and A.16.3, respectively. The resulting elemental concentrations equal the predicted dietary inclusion rates listed in Table A.16.1.

Alternative scenarios

An operator may want to predict the effects of operating the integrated system under different conditions, such as different recycle ratios, or growing plants having different elemental composition. The sustainable plant biomass that can be maintained while maintaining equilibrium N concentrations can be determined at different recycle ratios. For each integrated system, there exists a critical recycle ratio, below which N concentrations cannot be maintained at appropriate levels. Figure A.16.1 illustrates the sustainable plant biomass levels at different recycle ratios under the assumptions presented in this Appendix. Below a recycle ratio of 0.70, the fish do not generate sufficient N to maintain $NO_3$—N concentrations at 170 mg/l, and the sustainable biomass equals zero. At any recycle ratio above the critical recycle ratio, the plant biomass (or yield) can be determined, assuming the fish component is set, and the composition of the diet can be determined as before. The dietary mineral inclusion rates, required supplements, diet compositions, and ingredient prices for hypothetical commercial and designer diets at different recycle ratios are listed in

TABLE A.16.1.

Model parameters and resulting dietary inclusions rates for hypothetical designer diet.

| Nutrient | $[N]_F{}^1$ | $R_D{}^2$ | $R_F{}^2$ | $[N]_P{}^1$ | $R_P{}^2$ | $R_E{}^3$ | $Q_I{}^4$ | $[N]_I{}^5$ | $[N]_O{}^5$ | $R''$ | $A'$ | $[N]_D{}^6$ | % |
|---|---|---|---|---|---|---|---|---|---|---|---|---|---|
| Ca | 0.052 | 2,700 | 582 | 0.016 | 1,000 | 246413 | 50,000 | 0.05 | 0.173 | 1.00 | 0.91 | −69840 | −6.98 |
| Cu | 0.0000092 | 2,700 | 582 | 1.4E−05 | 1,000 | 0 | 50,000 | 0.00001 | 0.000013 | 1.00 | 0.38 | 19 | 0.0019 |
| Fe | 0.0000950 | 2,700 | 582 | 0.00045 | 1,000 | 0 | 50,000 | 0.0001 | 0.0022 | 0.98 | 0.48 | 483 | 0.0483 |
| K | 0.0075 | 2,700 | 582 | 0.106 | 1,000 | 0 | 50,000 | 0.005 | 0.185 | 0.93 | 0.99 | 48025 | 4.80 |
| Mg | 0.0017 | 2,700 | 582 | 0.005 | 1,000 | 0 | 50,000 | 0.01 | 0.032 | 0.88 | 0.97 | 3108 | 0.31 |
| Mn | 0.0000048 | 2,700 | 582 | 0.00032 | 1,000 | 0 | 50,000 | 0.00005 | 0.00018 | 0.75 | 0.70 | 233 | 0.0233 |
| Na | 0.006 | 2,700 | 582 | 0.004 | 1,000 | 0 | 50,000 | 0.05 | 0.00 | 0.84 | 0.99 | 3524 | 0.35 |
| P | 0.029 | 2,700 | 582 | 0.012 | 1,000 | 0 | 50,000 | 0.002 | 0.016 | 0.74 | 0.92 | 16108 | 1.61 |
| Zn | 0.000096 | 2,700 | 582 | 0.000078 | 1,000 | 0 | 50,000 | 0.0005 | 0.0005 | 1.00 | 0.72 | 81 | 0.0081 |

[1] g/g dry fish.
[2] kg.
[3] g. All the exogenous Ca was assumed to have been liberated from $CaCO_3$. It was assumed that 3.2% of the dietary weight would be excreted as $NH_3$—N and 7.13 kg of alkalinity (as $CaCO_3$) would be required for neutrilization.
[4] liters.
[5] g/l.
[6] mg mineral/kg diet (dry basis).

TABLE A.16.2

Diet composition of the hypothetical designer diet.

| Ingredient | % diet |
|---|---|
| Anchovy meal | 13.00 |
| Soybean meal | 46.20 |
| Wheat flour | 11.05 |
| Soybean oil | 2.50 |
| Corn | 19.00 |
| Vitamin Premix | 1.50 |
| Vitamin C | 0.01 |
| Choline chloride | 0.10 |
| Mineral Premix[1] | 6.59 |
| | 100.00 |

[1]Composition in Table A.16.3.

TABLE A.16.3

Mineral premix composition of the hypothetical designer diet.

| Mineral supplement | g/kg premix |
|---|---|
| $CuSO_4 \cdot 5H_2O$ | 0.47 |
| $FeSO_4 \cdot 7H_2O$ | 19.72 |
| MgO | 1.64 |
| $MnSO_4 \cdot H_2O$ | 8.64 |
| $K_2HPO_4$ | 528.00 |
| NaCl | 6.74 |
| KCl | 435.00 |

TABLE A.16.3-continued

Mineral premix composition of the hypothetical designer diet.

| Mineral supplement | g/kg premix |
|---|---|
| ZnO | 0.29 |
| Trace minerals[2] | 0.07 |
| | 1000.00 |

[2]$KI$, $Na_2SeO_3$, and $CoSO_4$; added to mixture in aqueous solution.

Table A.16.4. The concentrations of several minerals in the plants have substantial influence on the required dietary inclusion levels. For instance, the majority of the mineral mix presented in this Appendix, and hence cost of the mineral mix, is comprised of K supplements. However, the plant K concentration assumption used was high. Namely, good growth has been observed in lettuce plants having K contents ranging from 4.1 to 10% (Roorda van Eysinga and Smilde 1971). The mineral concentrations can differ markedly between plant varieties and plants grown under different conditions. Accordingly, careful selection of low-mineral plant varieties may reduce the costs of designer diets. The compositions and costs of designer diets are listed in Table A.16.4 at two different plant K levels (4% and 10%) to demonstrated the dramatic effect plant mineral concentrations have on designer diet compositions and costs. The costs of the hypothetical designer diets (approximately $0.375/kg diet at all recycle ratios greater than 0.70) were only slightly greater than that of the commercial diet ($0.370/kg diet) when the lettuce K content was assumed to be 4% (Table A.16.4 and Figure A.16.2). However, the costs of the designer and commercial diets differed substantially, particularly at the higher recycle ratios, when a lettuce K content of 10% was assumed.

TABLE A.16.4.

Dietary mineral inclusion rates, required supplements, diet compositions, and ingredient prices for hypothetical commercial and designer diets at different recycle ratios and different lettuce K contents.

| | Recycle ratio ($[N]_P$ = 10%) | | | | Recycle ratio ($[N]_P$ = 4%) | | | |
|---|---|---|---|---|---|---|---|---|
| | 1.00 | 0.90 | 0.80 | 0.70 | 1.00 | 0.90 | 0.80 | 0.70 |
| Nutrient | | | | | | | | |
| Cu | 21 | 17 | 13 | 9 | 21 | 17 | 13 | 9 |
| Fe | 463 | 502 | 540 | 579 | 463 | 502 | 540 | 579 |
| K | 52272 | 43770 | 35268 | 26767 | 20818 | 22128 | 23438 | 24748 |
| Mg | 2999 | 3215 | 3432 | 3648 | 2999 | 3215 | 3432 | 3648 |
| Mn | 269 | 197 | 124 | 52 | 269 | 197 | 124 | 52 |
| Na | 3665 | 1813 | 0 | 0 | 3665 | 1813 | 0 | 0 |
| P | 16909 | 15293 | 13676 | 12060 | 16909 | 15293 | 13676 | 12060 |
| Zn | 76 | 85 | 94 | 103 | 76 | 85 | 94 | 103 |
| N | 56000 | 56000 | 56000 | 56000 | 56000 | 56000 | 56000 | 56000 |
| Mineral supplements (mg/kg dry diet) | | | | | | | | |
| $CuSO_4 \cdot 5H_2O$ | 42 | 26 | 10 | 0 | 42 | 26 | 10 | 0 |
| $FeSO_4 \cdot 7H_2O$ | 1310 | 1502 | 1694 | 1885 | 1310 | 1502 | 1694 | 1885 |
| $K_2HPO_4$ | 56116 | 46194 | 36271 | 26349 | 13534 | 16452 | 19370 | 22288 |
| MgO | 0 | 296 | 655 | 1013 | 0 | 296 | 655 | 1013 |
| $MnSO_4 \cdot H_2O$ | 731 | 507 | 284 | 61 | 731 | 507 | 284 | 61 |
| NaCl | 3666 | 0 | 0 | 0 | 3666 | 0 | 0 | 0 |
| $Ca(H_2PO_4)_2$ | 0 | 0 | 0 | 0 | 8271 | 6313 | 4355 | 2397 |
| ZnO | 15 | 27 | 38 | 49 | 15 | 27 | 38 | 49 |
| Total (dry) | 6.19 | 4.86 | 3.90 | 2.94 | 2.76 | 2.51 | 2.64 | 2.77 |
| Total (wet) | 5.69 | 4.47 | 3.58 | 2.70 | 2.54 | 2.31 | 2.43 | 2.55 |

TABLE A.16.4.-continued

Dietary mineral inclusion rates, required supplements, diet compositions, and ingredient prices for hypothetical commercial and designer diets at different recycle ratios and different lettuce K contents.

Diet composition (% of wet diet)

| | | | | | | | | |
|---|---|---|---|---|---|---|---|---|
| Fish meal | 13.00 | 13.00 | 13.00 | 13.00 | 13.00 | 13.00 | 13.00 | 13.00 |
| Soybean meal | 46.25 | 46.25 | 46.25 | 46.25 | 46.25 | 46.25 | 46.25 | 46.25 |
| Wheat flour | 11.05 | 11.05 | 11.05 | 11.05 | 11.05 | 11.05 | 11.05 | 11.05 |
| Soybean oil | 2.50 | 2.50 | 2.50 | 2.50 | 2.50 | 2.50 | 2.50 | 2.50 |
| Corn | 20.89 | 22.12 | 23.00 | 23.89 | 24.05 | 24.28 | 24.16 | 24.04 |
| Vitamin C | 0.01 | 0.01 | 0.01 | 0.01 | 0.01 | 0.01 | 0.01 | 0.01 |
| Choline | 0.10 | 0.10 | 0.10 | 0.10 | 0.10 | 0.10 | 0.10 | 0.10 |
| Vitamin premix | 0.50 | 0.50 | 0.50 | 0.50 | 0.50 | 0.50 | 0.50 | 0.50 |
| Mineral premix | 5.69 | 4.47 | 3.58 | 2.70 | 2.54 | 2.31 | 2.43 | 2.55 |
| Total (% wet) | 100.00 | 100.00 | 100.00 | 100.00 | 100.00 | 100.00 | 100.00 | 100.00 |

Price ($/kg diet)[1]

| | | | | | | | | |
|---|---|---|---|---|---|---|---|---|
| Fish meal | 0.072 | 0.072 | 0.072 | 0.072 | 0.072 | 0.072 | 0.072 | 0.072 |
| Soybean meal | 0.142 | 0.142 | 0.142 | 0.142 | 0.142 | 0.142 | 0.142 | 0.142 |
| Wheat flour | 0.041 | 0.041 | 0.041 | 0.041 | 0.041 | 0.041 | 0.041 | 0.041 |
| Soybean oil | 0.010 | 0.010 | 0.010 | 0.010 | 0.010 | 0.010 | 0.010 | 0.010 |
| Corn | 0.046 | 0.049 | 0.051 | 0.053 | 0.053 | 0.053 | 0.053 | 0.053 |
| Vitamin C | 0.001 | 0.001 | 0.001 | 0.001 | 0.001 | 0.001 | 0.001 | 0.001 |
| Choline | 0.001 | 0.001 | 0.001 | 0.001 | 0.001 | 0.001 | 0.001 | 0.001 |
| Vitamin premix | 0.028 | 0.028 | 0.028 | 0.028 | 0.028 | 0.028 | 0.028 | 0.028 |
| Mineral premix | 0.056 | 0.044 | 0.035 | 0.027 | 0.025 | 0.023 | 0.024 | 0.025 |
| Total | | | | | | | | |
| Designer diet | 0.398 | 0.388 | 0.381 | 0.375 | 0.373 | 0.372 | 0.372 | 0.373 |
| Commercial diet | 0.370 | 0.370 | 0.370 | 0.370 | 0.370 | 0.370 | 0.370 | 0.370 |

Commercial diet price ($/kg diet)

| | % of diet | $/kg diet |
|---|---|---|
| Fish meal | 13.00 | 0.072 |
| Soybean meal | 46.25 | 0.142 |
| Wheat flour | 11.05 | 0.041 |
| Soybean oil | 2.50 | 0.010 |
| Corn | 24.59 | 0.054 |
| Vitamin C | 0.01 | 0.001 |
| Choline | 0.10 | 0.001 |
| Vitamin premix | 0.50 | 0.028 |
| Mineral premix[2] | 2.00 | 0.020 |
| Total | 100.00 | 0.369 |

[1]The feedstuffs prices used in the calculations were ($/kg) fish meal, 0.550; soybean meal; 0.308; wheat flour, 0.374; soybean oil, 0.396; corn, 0.220; vitamin C, 11.220; choline, 1.012; vitamin premix, 5.588; and mineral premix, 0.990.
[2]The mineral premix contained 1.5% $CaHPO_4$ and 0.5% trace mineral mix.

APPENDIX 17

Commonly Used Mineral Supplements

TABLE A.17.1

Major salts used commonly in fish and shrimp diets.[1]

| Element | Salt | Chemical formula |
|---|---|---|
| Ca | Calcium carbonate | $CaCO_3$ |
| | Dicalcium phosphate, anhydrous | $CaHPO_4$ |
| | Dicalcium phosphate, dihydrate | $CaHPO_4 \cdot 2H_2O$ |
| | Tricalcium phosphate | $Ca_3(PO4)_2$ |
| | Calcium sulfate | $CaSO_4$ |
| | Bone meal | |
| | Oystershell grit | |
| | Ground limestone | $CaCO_3$ |
| Cl | Sodium chloride | NaCl |
| | Potassium chloride | KCl |
| Cr | Chromic chloride | $CrCl_2$ |
| Co | Cobalt chloride, pentahydrate | $CoCl_2 \cdot 5H_2O$ |
| | Cobalt chloride, hexahydrate | $CoCl_2 \cdot 6H_2O$ |
| Cu | Copper sulfate | $CuSO_4$ |
| | Copper sulfate, pentahydrate | $CuSO_4 \cdot 5H_2O$ |

TABLE A.17.1-continued

Major salts used commonly in fish and shrimp diets.[1]

| Element | Salt | Chemical formula |
|---|---|---|
| | Copper chloride | $CuCl_2$ |
| I | Potassium iodide | KI |
| | Potassium iodate | $KIO_3$ |
| | Calcium iodate | $Ca(IO_3)_2$ |
| | Sodium iodide | NaI |
| | Ethylenediamine dihydriodide | $C_2H_8N_2 \cdot 2HI$ |
| Fe | Ferrous sulfate, heptahydrate | $FeSO_4 \cdot 7H_2O$ |
| Mg | Magnesium carbonate | $MgCO_3$ |
| | Magnesium sulfate | $MgSO_4$ |
| | Magnesium sulfate, heptahydrate | $MgSO_4 \cdot 7H_2O$ |
| | Magnesium oxide | MgO |
| Mn | Manganese dioxide | $MnO_2$ |

TABLE A.17.1-continued

Major salts used commonly in fish and shrimp diets.[1]

| Element | Salt | Chemical formula |
|---|---|---|
| | Manganese carbonate | $MnCO_3$ |
| | Manganese chloride, tetrahydrate | $MnCl.4H_2O$ |
| | Manganese sulfate, | $MnSO_4$ |
| | Manganese sulfate, hydrate | $MnSO_4.H_2O$ |
| | Manganese sulfate, tetrahydrate | $MnSO_2.4H_2O$ |
| Mo | Sodium molybdate, dihydrate | $Na_2MoO_4.2H_2O$ |
| | Sodium molybdate, pentahydrate | $NaMO_4.5H_2O$ |
| P | Potassium orthophosphate | $K_2HPO_4$ |
| | Potassium dihydrogen orthoposphate | $KH_2PO_4$ |
| | Sodium hydrogen orthophosphate | $Na_2HPO_4$ |
| | Sodium dihydrogen orthophosphate, hydrate | $NaH_2PO_4.H_2O$ |
| | Sodium dihydrogen orthophosphate, dehydrate | $NaH_2PO_4.2H_2O$ |
| | Rock phosphate | $(Ca_3[PO_4]_2)_3CaF_2$ |
| K | Potassium chloride | $KCl$ |
| | Potassium carbonate | $K_2CO_3$ |
| | Potassium bicarbonate | $KHCO_3$ |
| | Potassium acetate | $KC_2H_3O_2$ |
| | Potassium orthophosphate | $K_3PO_4$ |
| | Potassium sulfate | $K_2SO_4$ |
| Se | Sodium selenite | $Na_2SeO_3$ |
| | Sodium selenate | $NaSeO_4$ |
| Na | Sodium chloride | $NaCl$ |
| | Sodium bicarbonate | $NaHCO_3$ |
| | Sodium sulfate | $Na_2SO_4$ |
| Zn | Zinc carbonate | $ZnCO_3$ |
| | Zinc chloride | $ZnCl_2$ |
| | Zinc oxide | $ZnO$ |
| | Zinc sulfate | $ZnSO_4$ |
| | Zinc sulfate, hydrate | $ZnSO_4.H_2O$ |
| | Zinc sulfate, heptahydrate | $ZnSO_4.7H_2O$ |

[1]Modified from Tacon (1990).

APPENDIX 18

List of Model Parameters $N_D$ = Quantity of mineral added in the diet $N_A$ = Quantity of mineral added in the makeup water and supplements, or leached from the system components $N_L$ = Quantity of mineral lost from the system $N_F$ = Quantity of mineral absorbed and retained by the fish $N_P$ = Quantity of mineral absorbed and retained by the plants $N_R$ = Quantity of dissolved mineral remaining in the system at the end of the experiment $N_{Pr}$ = Quantity of mineral precipitated from the solution that is not deposited in the solids $N_V$ = Quantity of mineral lost by volatilization $N_t$ = Quantity of mineral remaining lost by intentional or unintentional water discharge $N_M$ = Net quantity of mineral uptake by algae, microbes, etc.

$N_S$ = Quantity of mineral removed in the solids $N_{DS}$ = Minerals entrained in solids directly from the fish $N_{DP}$ = Soluble minerals excreted by the fish that precipitate and collect in the solids $N_{AP}$ = Soluble minerals added exogenously that precipitate and collect in the solids System availability $(A) = \dfrac{(N_D - N_S)}{N_D}$ Adjusted system availability $(A') = \dfrac{N_D + N_A - N_S}{N_D + N_A}$ Recovery $(R) = \dfrac{N_F + N_P + N_R}{N_D - N_S}$ Adjusted recovery $(R') = \dfrac{N_F + N_P + N_R}{N_D + N_A - N_S}$.

D = Quantity of dry diet $[N]_D$ = Mineral concentration in dry diet

F = Fish yield (dry matter)

$[N]_F$ = Mineral concentration in dry fish tissue

P = Plant yield (dry matter)

$[N]_P$ = Mineral concentration in dry plant tissue $R_D$ = Rate of diet administration $[N]_D$ = Dietary nutrient concentration $R_A$ = Rate of exogenous nutrient addition $R_F$ = Rate of fish growth $R_P$ = Rate of plant growth $R_L$ = Rate of nutrient loss $Q_I$ = Replacement water flow rate $[N]_I$ = Replacement water nutrient concentration $R_E$ = Rate of additional nutrient supplementation $R_V$ = rate of nutrient loss by volatilization, precipitation of nutrients not recovered in the solids, and net uptake by algae, microbes, etc.

$R_O$ = Rate of nutrient loss by water discharge $R''$ = Adjusted recovery if less than 100% recycle ratio $= \left[1 - \dfrac{R_V}{(R_D[N]_D + Q_I[N]_I + R_E)A'}\right]$

I claim:

1. In an integrated aquaculture-hydroponics system for the concurrent production of fish and plant species, wherein a feed is added to meet the fish and plant species nutrient requirements, a method for maintaining dissolved mineral concentrations in the system at optimal levels, comprising the following steps:

(a) determining a nitrogen concentration in said feed that produces a substantially constant nitrogen concentration in the system;
(b) for each of a plurality of minerals in the system, determining a rate of decrease of the concentration of said mineral in the system when said nitrogen concentration is maintained substantially constant; and
(c) supplement said feed with each of said plurality of minerals such that the concentration of the mineral is maintained substantially constant in the system.

2. The method of claim 1, wherein said plurality of minerals is selected from the group consisting of calcium, copper, iron, potassium, magnesium, manganese, sodium, potassium and zinc.

3. The method of claim 1, wherein said steps (a) and (b) are carried out using a mass balanced model.

* * * * *